(12) United States Patent
Marshman et al.

(10) Patent No.: US 12,384,539 B2
(45) Date of Patent: Aug. 12, 2025

(54) PAYLOAD RETRIEVAL APPARATUS WITH INTERNAL UNLOCKING FEATURE AND SECURITY FEATURES FOR USE WITH A UAV

(71) Applicant: Wing Aviation LLC, Palo Alto, CA (US)

(72) Inventors: Elizabeth Marshman, San Francisco, CA (US); Jasper Lee Lewin, Santa Cruz, CA (US); Ivan Qiu, Redwood City, CA (US)

(73) Assignee: Wing Aviation LLC, Palo Alto, CA (US)

( * ) Notice: Subject to any disclaimer, the term of this patent is extended or adjusted under 35 U.S.C. 154(b) by 41 days.

(21) Appl. No.: 18/400,653

(22) Filed: Dec. 29, 2023

(65) Prior Publication Data

US 2024/0217658 A1   Jul. 4, 2024

Related U.S. Application Data

(60) Provisional application No. 63/477,869, filed on Dec. 30, 2022.

(51) Int. Cl.
*B64D 1/22* (2006.01)
*B64U 10/60* (2023.01)
*B64U 101/66* (2023.01)

(52) U.S. Cl.
CPC ............ *B64D 1/22* (2013.01); *B64U 10/60* (2023.01); *B64U 2101/66* (2023.01); *B64U 2201/10* (2023.01)

(58) Field of Classification Search
CPC . B64D 1/22; B64D 1/12; B64U 10/60; B64U 2101/66; B64U 2101/67
See application file for complete search history.

(56) References Cited

U.S. PATENT DOCUMENTS 3,270,895 A * 9/1966 Stewart .................... B64B 1/00
                                                          D12/323
3,807,577 A * 4/1974 Bell ....................... B66C 21/00
                                                           414/23

(Continued)

FOREIGN PATENT DOCUMENTS

CN          115489735 A    12/2022

OTHER PUBLICATIONS

International Search Report and Written Opinion for Int. App. No. PCT/US2023/086400, mailed Nov. 8, 2024.

*Primary Examiner* — Justin M Benedik
(74) *Attorney, Agent, or Firm* — McDonnell Boehnen Hulbert & Berghoff LLP

(57) ABSTRACT

A payload retrieval apparatus having a base, an autoloader assembly mounted to the base including: a payload holder configured to hold a payload for retrieval by a UAV, a channel coupled to the payload holder configured to direct a payload retriever suspended from the UAV to the payload holder, and a locking feature configured to lock access to the payload on the payload holder that includes has a movable end that extends through a wall of the channel into an interior of the channel, wherein when the payload retriever contacts the movable end of the locking member, the movable end moves outwardly thereby unlocking the payload on the payload holder, wherein the payload holder is positioned such that when the payload retriever exits the channel, the payload retriever engages a handle of the payload and removes the payload from the payload holder.

26 Claims, 76 Drawing Sheets

(56) References Cited

U.S. PATENT DOCUMENTS

| | | | | |
|---|---|---|---|---|
| 3,865,251 A * | 2/1975 | Langford | ............... | B66C 21/00 244/33 |
| 4,055,316 A * | 10/1977 | Chipper | ............... | B64B 1/50 104/23.1 |
| 5,080,302 A * | 1/1992 | Hoke | ............... | B64B 1/50 244/33 |
| 6,091,161 A * | 7/2000 | Dehlsen | ............... | F03B 13/10 290/43 |
| 7,183,663 B2 * | 2/2007 | Roberts | ............... | F03D 9/25 290/55 |
| 7,287,724 B2 * | 10/2007 | Hase | ............... | B64B 1/50 244/33 |
| 8,205,835 B2 * | 6/2012 | Wiley | ............... | B63B 35/44 244/33 |
| 8,602,349 B2 * | 12/2013 | Petrov | ............... | G05D 1/0866 244/17.23 |
| 8,907,516 B2 * | 12/2014 | Carroll | ............... | F03D 5/00 290/55 |
| 9,043,052 B2 * | 5/2015 | So | ............... | G08G 9/00 701/3 |
| 9,045,218 B2 * | 6/2015 | Childress | ............... | B60L 9/00 |
| 9,174,733 B1 * | 11/2015 | Burgess | ............... | B64D 1/12 |
| 9,561,852 B1 * | 2/2017 | Beaman | ............... | B64C 37/02 |
| 10,577,105 B2 * | 3/2020 | Prager | ............... | B64D 1/22 |
| 2011/0180667 A1 * | 7/2011 | O'Brien | ............... | B64U 10/60 244/135 R |
| 2013/0233964 A1 * | 9/2013 | Woodworth | ............... | B64U 10/60 244/175 |
| 2013/0306791 A1 * | 11/2013 | McGeer | ............... | B64F 1/02 244/110 F |
| 2016/0059963 A1 | 3/2016 | Burgess | | |
| 2017/0073071 A1 * | 3/2017 | Salzmann | ............... | B64U 10/10 |
| 2017/0121023 A1 * | 5/2017 | High | ............... | B64D 9/00 |
| 2018/0141682 A1 | 5/2018 | Blake | | |
| 2019/0084674 A1 | 3/2019 | Jones | | |
| 2019/0100314 A1 | 4/2019 | Prager | | |
| 2019/0185162 A1 | 6/2019 | Prager | | |
| 2019/0256210 A1 | 8/2019 | Prager | | |
| 2019/0375504 A1 | 12/2019 | Schmalzried | | |
| 2022/0073214 A1 | 3/2022 | Liske | | |

* cited by examiner

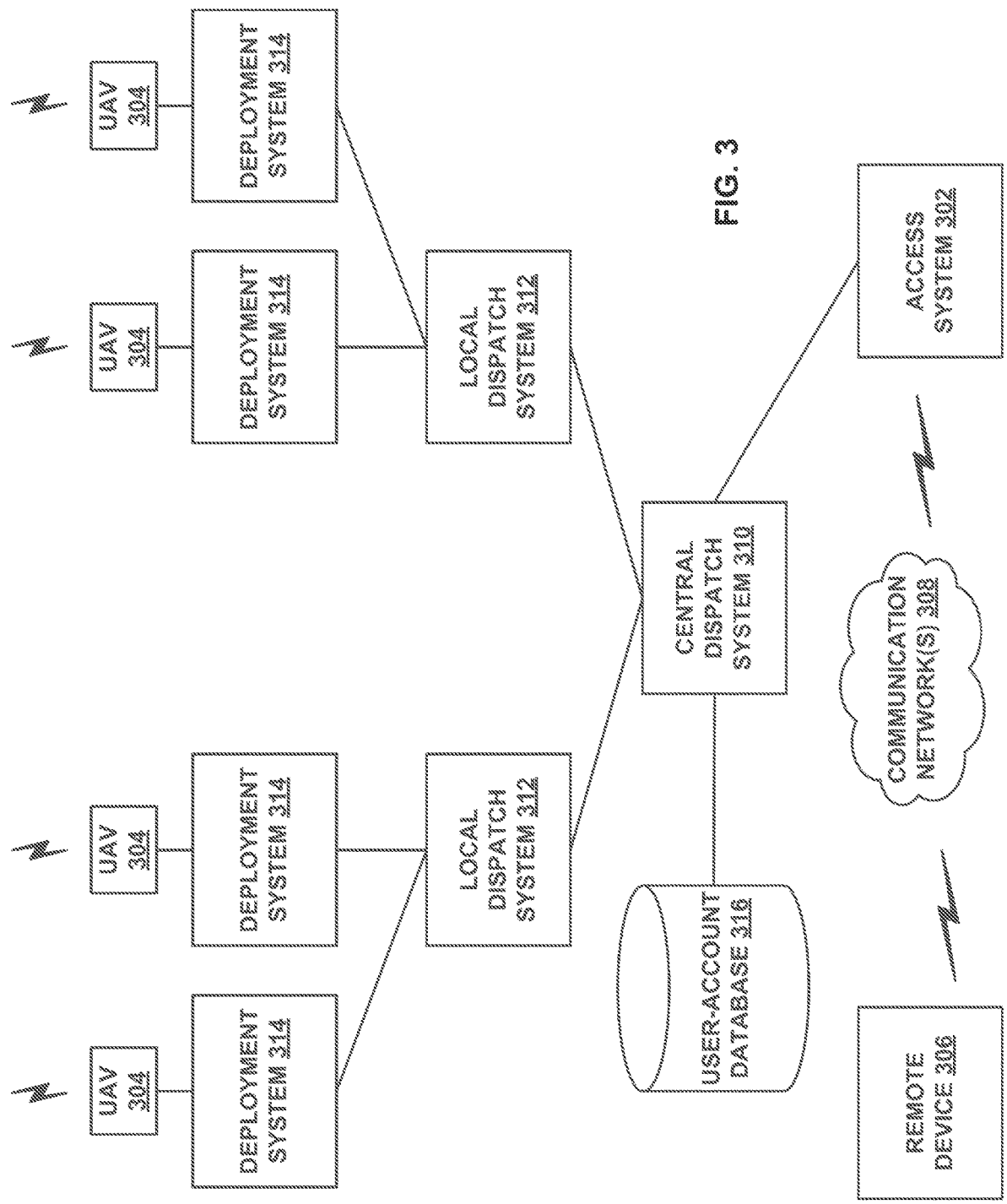

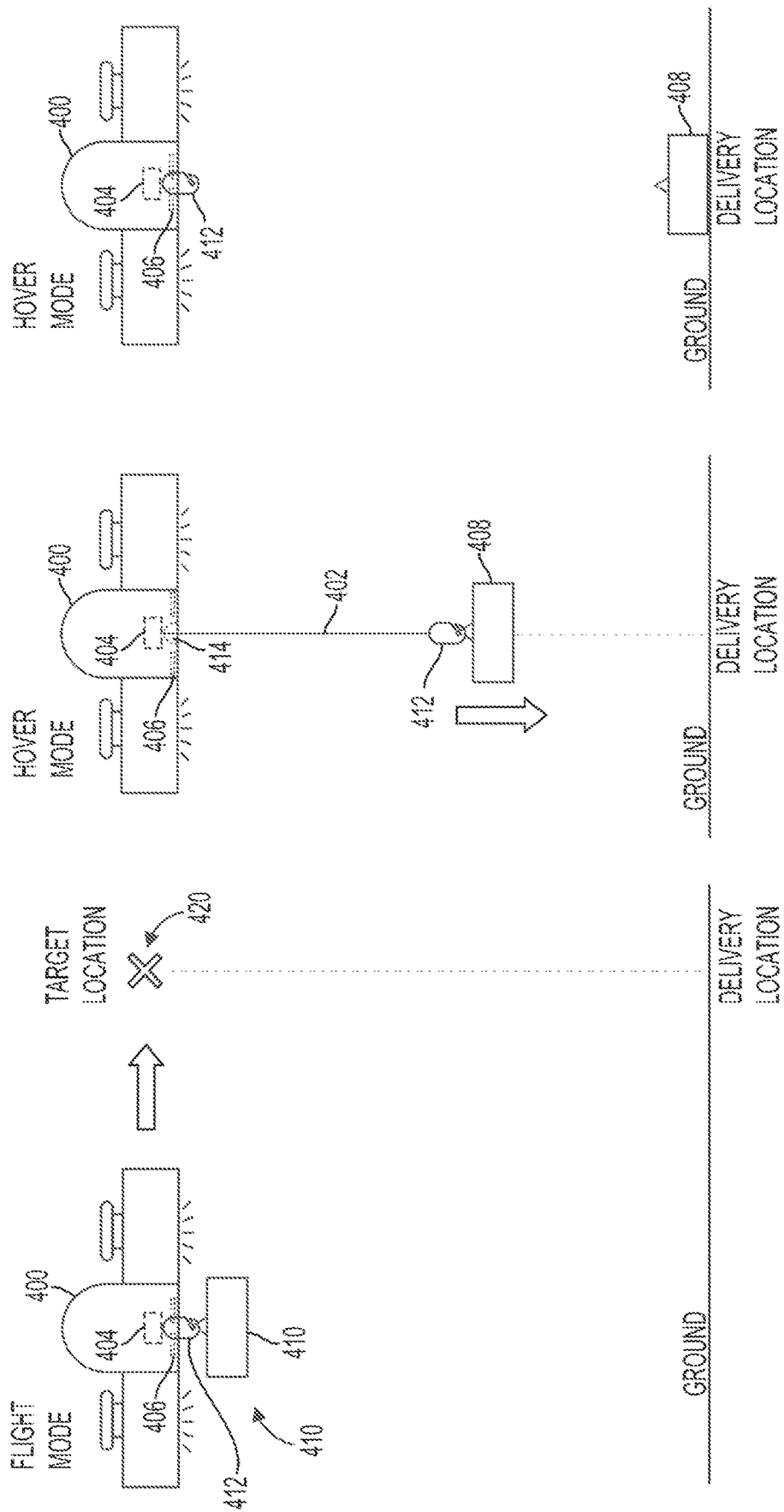

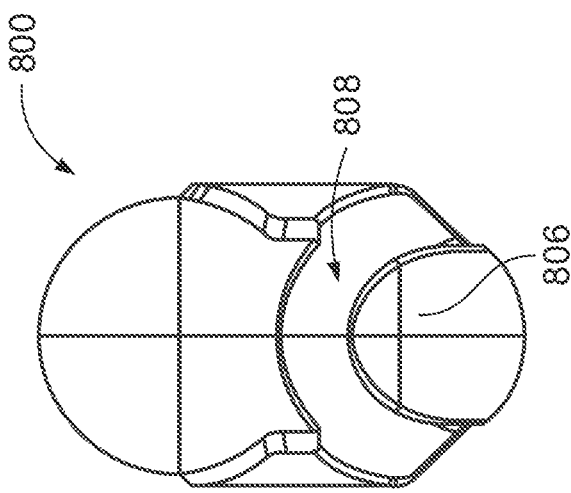
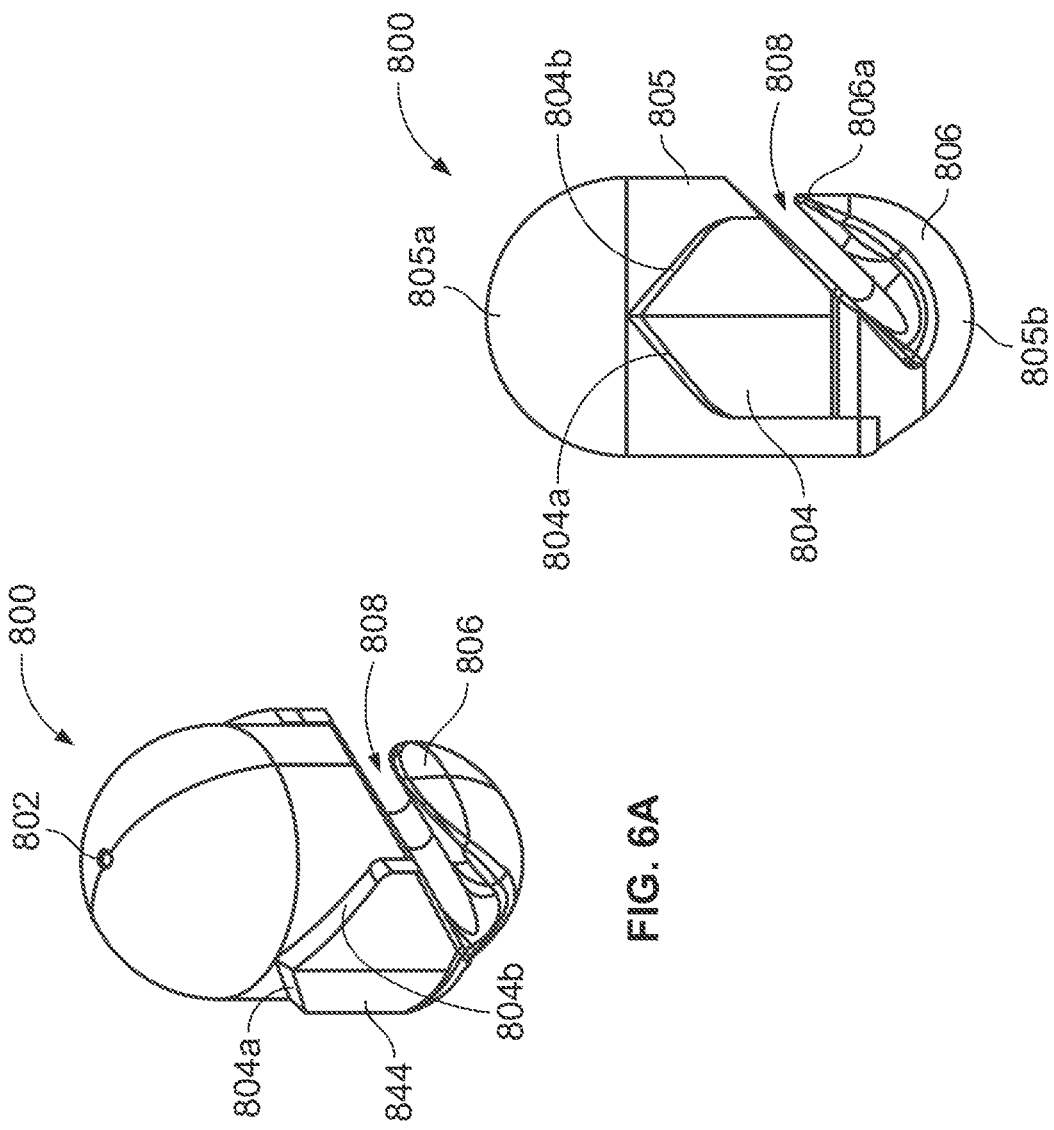
FIG. 6C
FIG. 6B
FIG. 6A

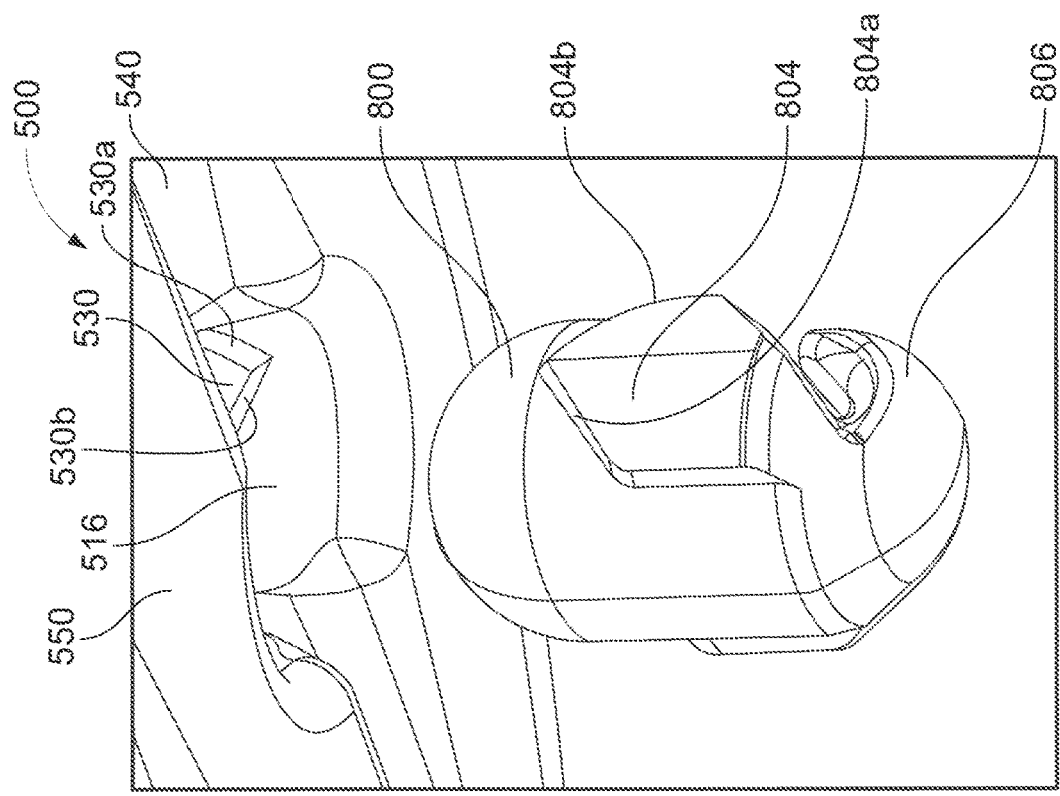
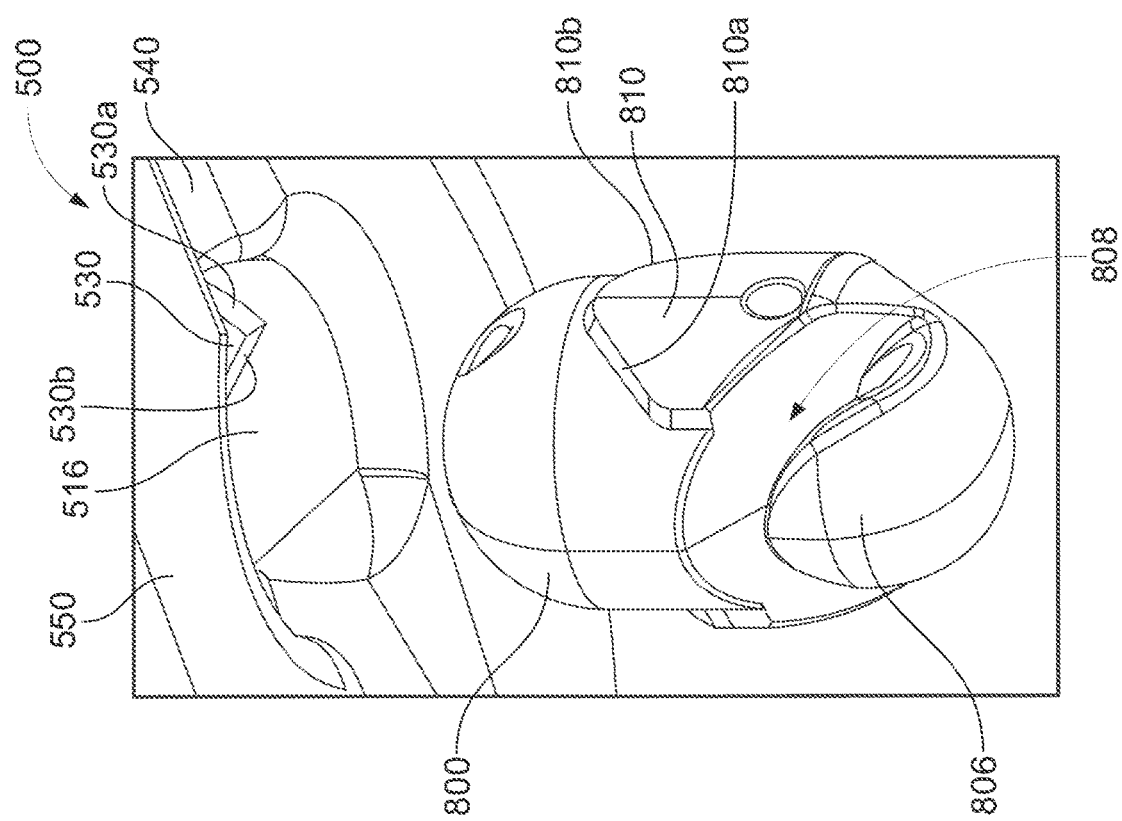

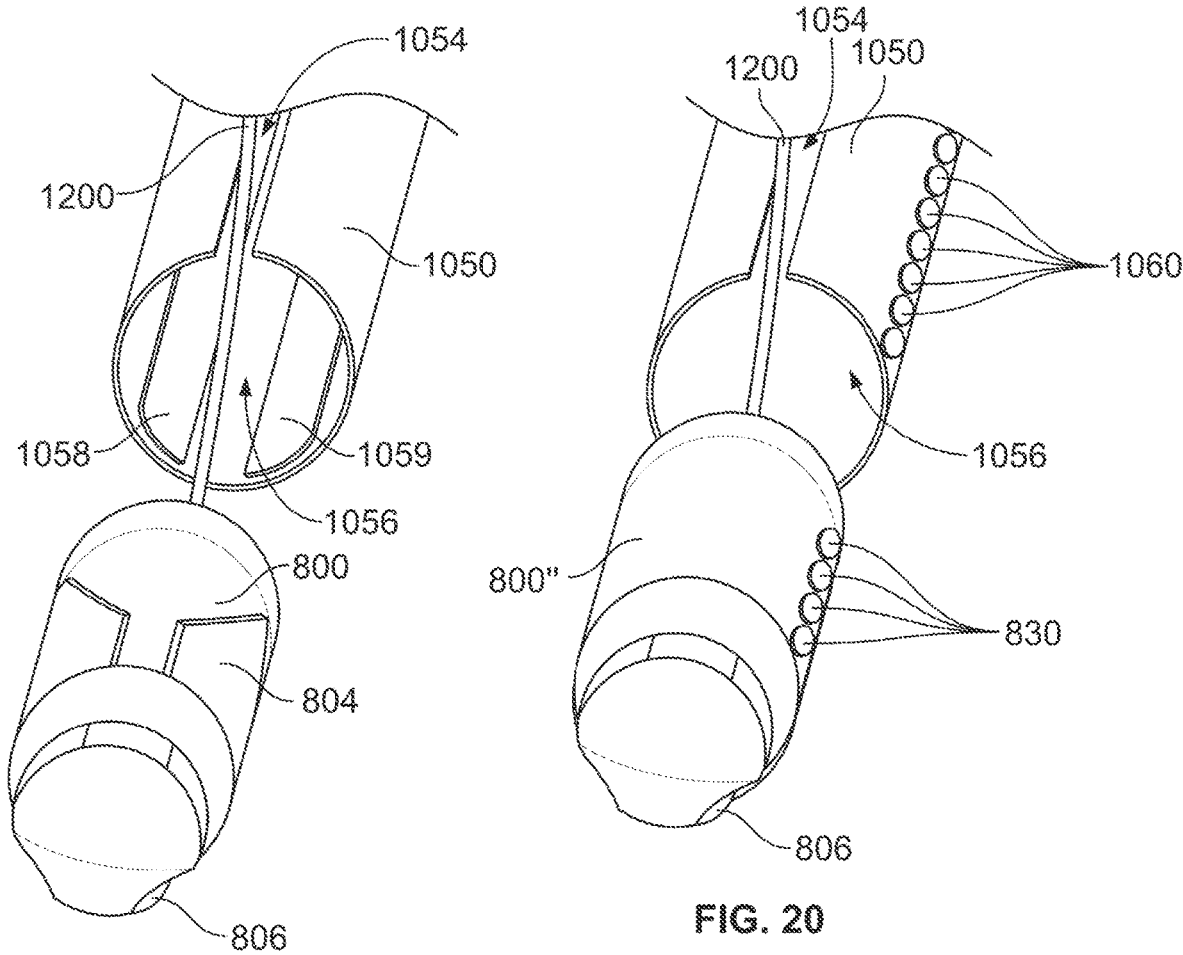
FIG. 19
FIG. 20
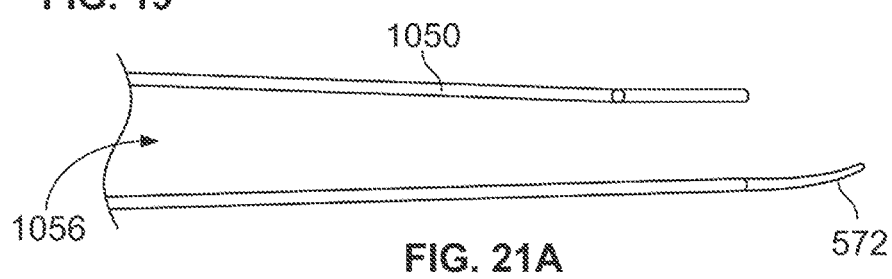
FIG. 21A
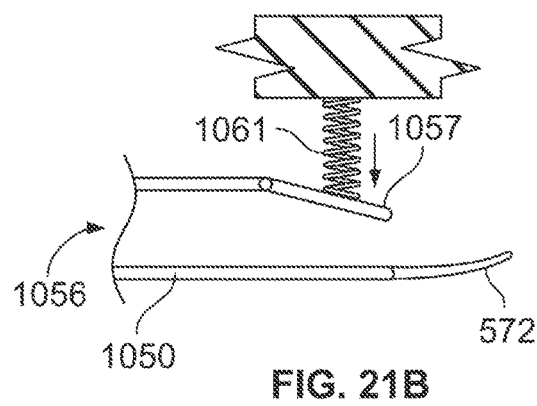
FIG. 21B

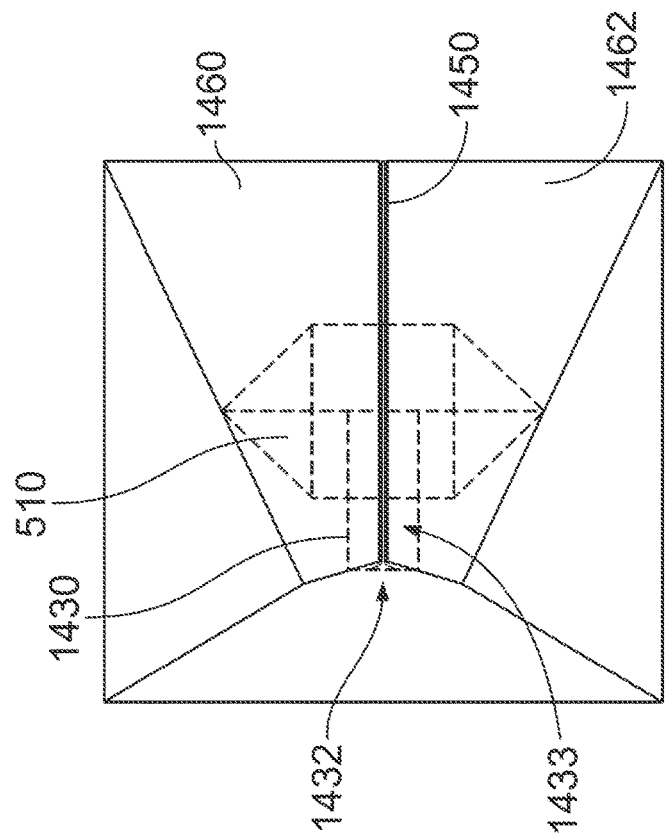
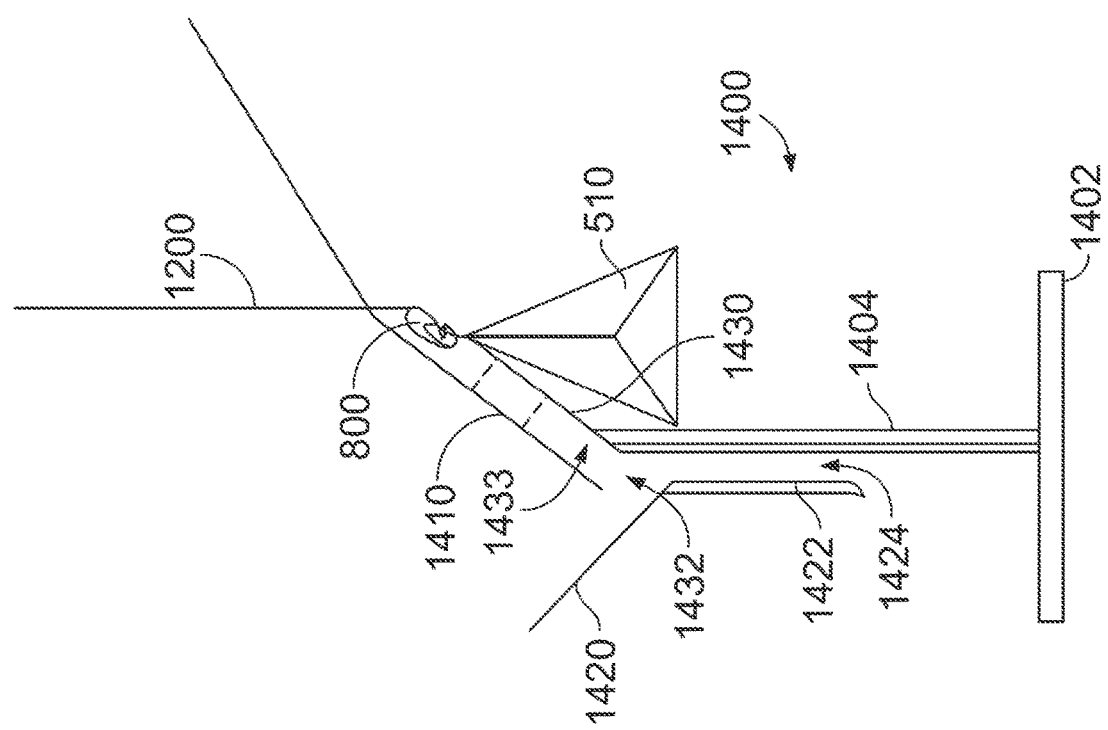

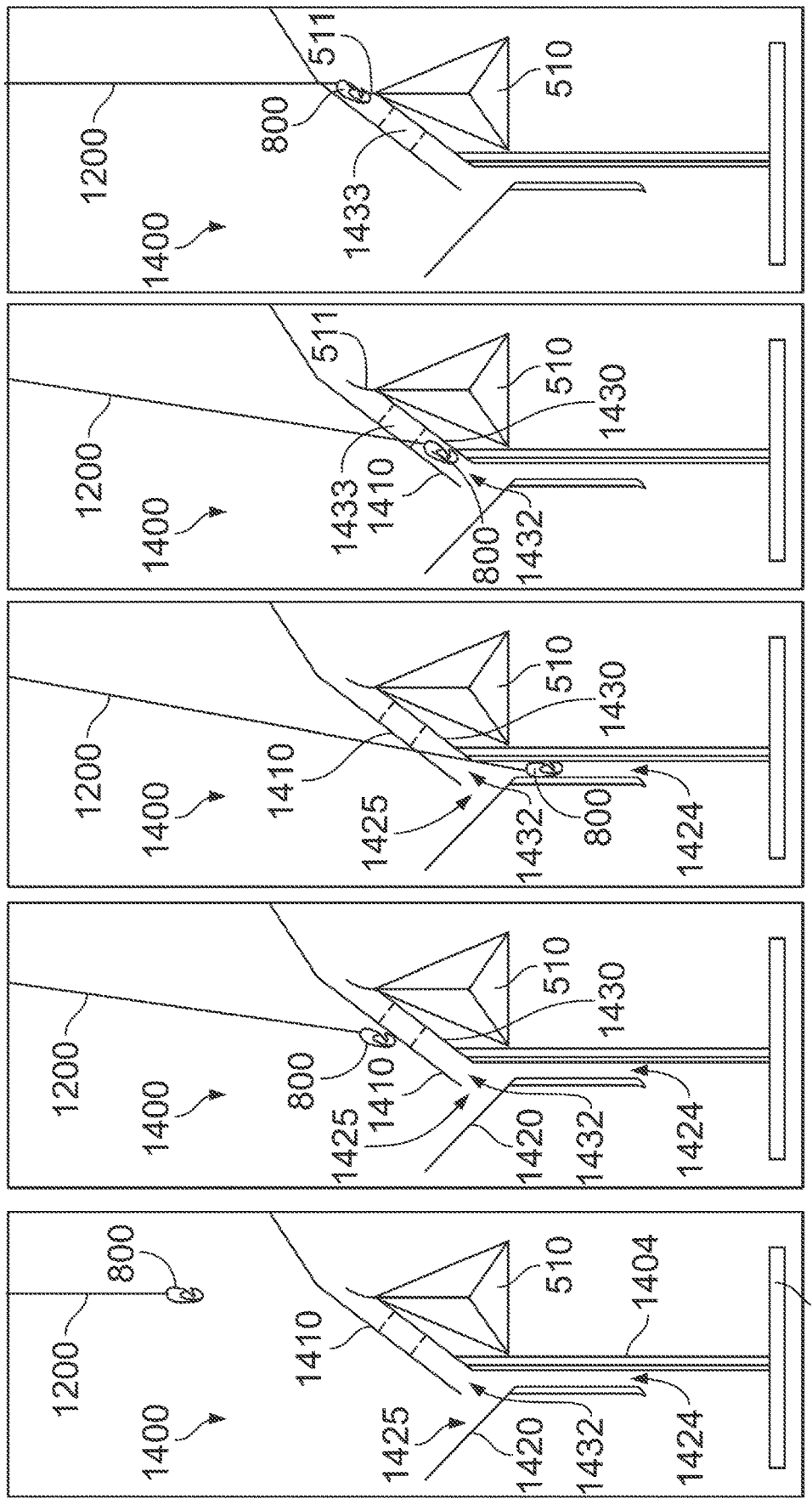

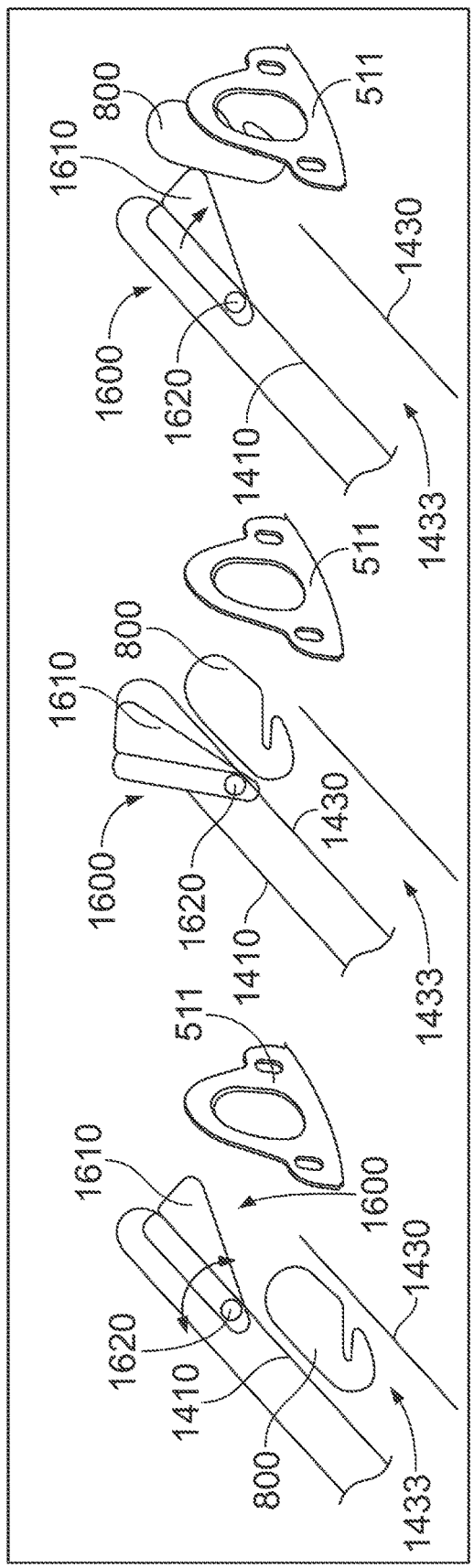
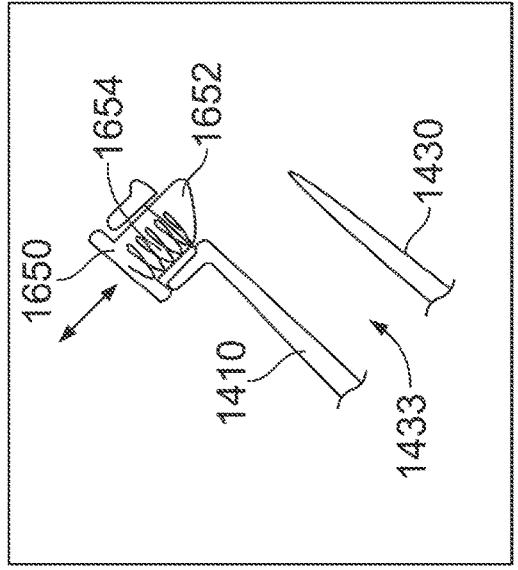
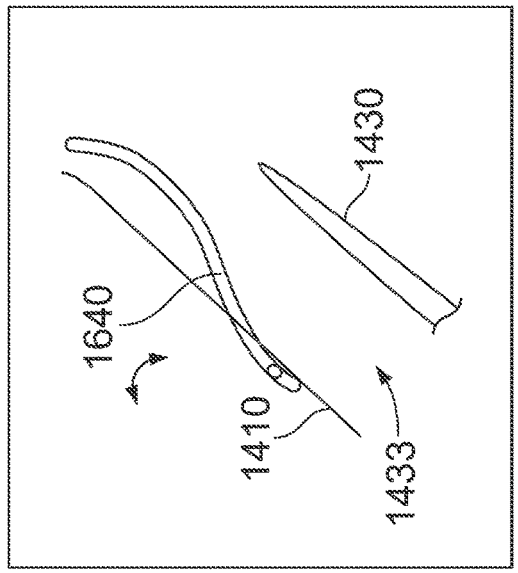
FIG. 27A
FIG. 27B
FIG. 27C

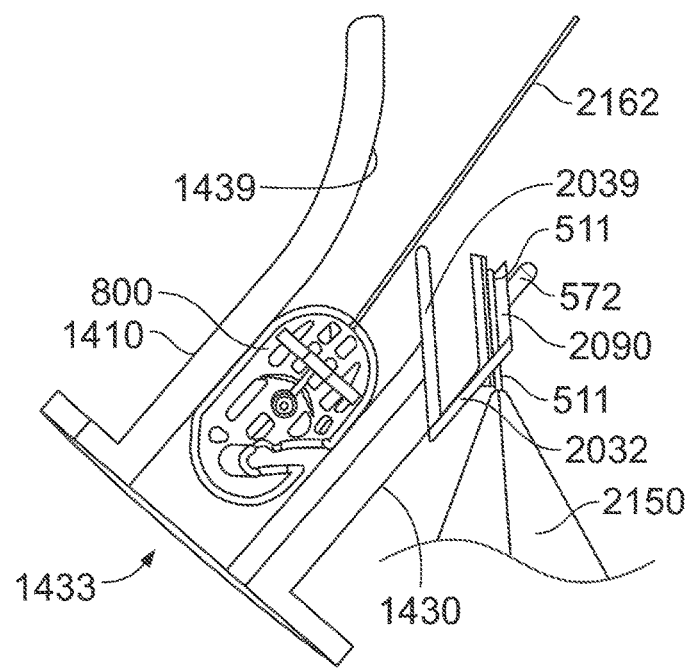
FIG. 46A
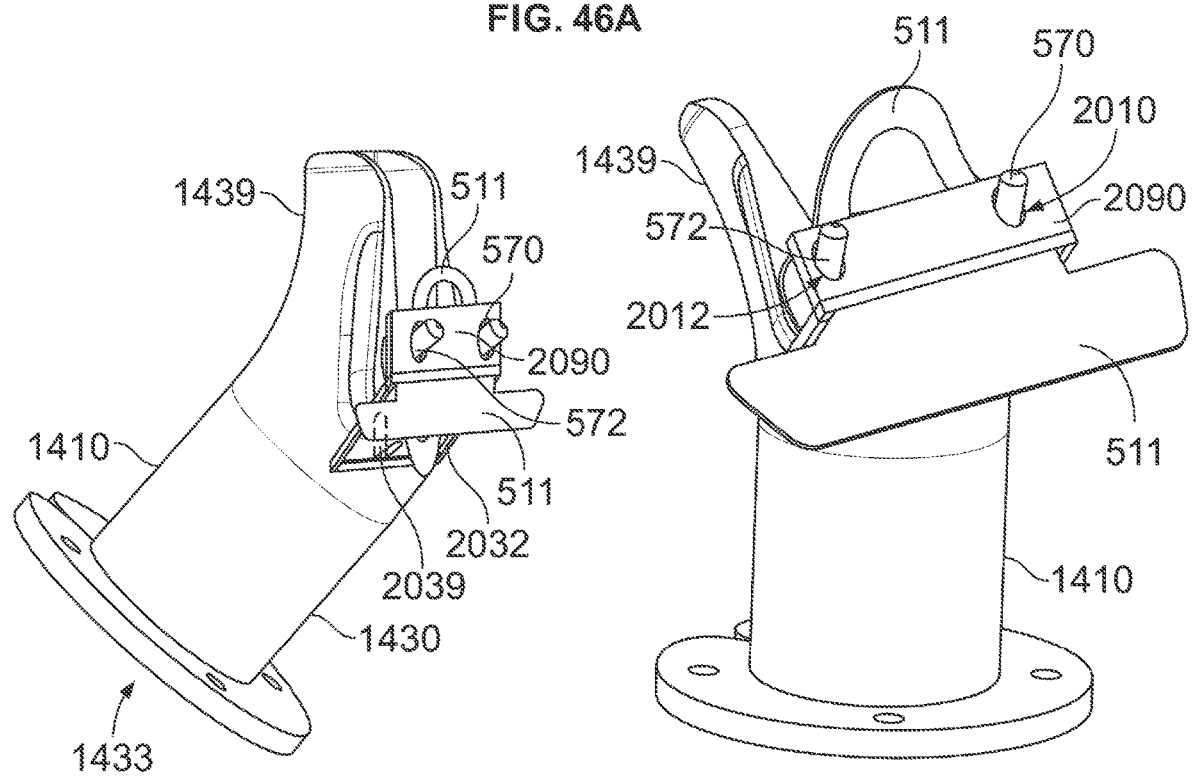
FIG. 46B
FIG. 46C

PAYLOAD RETRIEVAL APPARATUS WITH INTERNAL UNLOCKING FEATURE AND SECURITY FEATURES FOR USE WITH A UAV

CROSS REFERENCE TO RELATED APPLICATIONS

This application claims priority to U.S. Provisional Patent Application No. 63/477,869, filed Dec. 30, 2022, the contents of which are incorporated by reference.

BACKGROUND

An uncrewed vehicle, which may also be referred to as an autonomous vehicle, is a vehicle capable of travel without a physically-present human operator. An uncrewed vehicle may operate in a remote-control mode, in an autonomous mode, or in a partially autonomous mode.

An uncrewed aerial vehicle (UAV) may be used to deliver a payload to, or retrieve a payload from, an individual or business. The term "uncrewed aerial vehicle" is synonymous and interchangeable with the term "unmanned aerial vehicle" which has often been used. In some operations, once the UAV arrives at a retrieval site, the UAV may land or remain in a hover position. At this point, a person at the retrieval site may secure the payload to the UAV at an end of a tether attached to a winch mechanism positioned with the UAV, or to the UAV itself. For example, the payload may have a handle that may be secured to a device at the end of the winch, or a handle that may be secured within the UAV. However, this scenario has a number of drawbacks. In particular, if the UAV is late for arrival at the retrieval site, the person designated for securing the payload to be retrieved by the UAV may have to wait a period of time before the UAV arrives, resulting in undesirable waiting time. Similarly, if the UAV arrives and the person designated to secure the payload to be retrieved to the UAV is delayed or fails to show up, the UAV may have to wait in a hover mode or on the ground until the designated person arrives to secure the payload to the UAV, resulting in undesirable delay and expenditure of energy by the UAV as the UAV waits for the designated person to arrive, and also resulting in undesirable delay in the subsequent delivery of the payload at a delivery site.

As a result, it would be desirable to provide for the automated pickup of a payload by the UAV, where the UAV may automatically pick up the payload without the need for a designated person to secure the payload to the UAV at the retrieval site. Such automated pickup of the payload by the UAV would advantageously eliminate the need for a designated person to secure the payload to the UAV and eliminate potential delays associated with the late arrival of the UAV or designated person at the retrieval site.

In addition, it would be desirable to provide for increased security for a payload and its contents positioned on a payload retrieval apparatus as the payload awaits retrieval by a UAV.

SUMMARY

The present embodiments are directed to a payload retrieval apparatus. A payload is positioned on a payload holder in an autoloader assembly ready for retrieval by a UAV. A locking feature is used to lock the payload and its contents to prevent theft or tampering with the payload or its contents as the payload awaits retrieval by a UAV. In some embodiments, an unlocking feature is included wherein a payload retriever traveling through a channel of the payload retrieval apparatus releases the locking feature to allow for retrieval of the payload by the payload retriever when the payload retriever exits the channel In one aspect, a payload retrieval apparatus is provided having a base; an autoloader assembly mounted to the base including: a payload holder configured to hold a payload for retrieval by an uncrewed aerial vehicle (UAV), a channel coupled to the payload holder and configured to direct a payload retriever suspended from the UAV to the payload holder, the channel having a tether slot adapted for receiving a tether having a first end attached to the UAV and a second end attached to the payload retriever, wherein the channel is adapted to receive the payload retriever, and the tether slot of the channel allows for passage of the tether during movement of the payload retriever through the channel; and a locking feature configured to lock access to the payload on the payload holder, the locking feature including a locking member that has a movable end, wherein the locking member has a first position in which the movable end extends through a wall of the channel into an interior of the channel for engagement by the payload retriever as it moves through the channel, wherein when the payload retriever contacts the movable end of the locking member, the movable end moves outwardly thereby moving the locking member to a second position and unlocking the payload on the payload holder; wherein the payload holder is positioned such that when the payload retriever exits the channel, the payload retriever engages a handle of the payload and removes the payload from the payload holder.

In another aspect, a method is provided including (i) providing a payload retrieval apparatus having a base; an autoloader assembly mounted to the base including: a payload holder configured to hold a payload for retrieval by an uncrewed aerial vehicle (UAV), a channel coupled to the payload holder and configured to direct a payload retriever suspended from the UAV to the payload holder, the channel having a tether slot adapted for receiving a tether having a first end attached to the UAV and a second end attached to the payload retriever, wherein the channel is adapted to receive the payload retriever, and the tether slot of the channel allows for passage of the tether during movement of the payload retriever through the channel; and a locking feature configured to lock access to the payload on the payload holder, the locking feature including a locking member that has a movable end, wherein the locking member has a first position in which the movable end extends through a wall of the channel into an interior of the channel for engagement by the payload retriever as it moves through the channel, wherein when the payload retriever contacts the movable end of the locking member, the movable end moves outwardly thereby moving the locking member to a second position and unlocking the payload on the payload holder; and wherein the payload holder is positioned such that when the payload retriever exits the channel, the payload retriever engages a handle of the payload and removes the payload from the payload holder; and (ii) causing the payload to pass through the channel and engage the movable end of the locking member to unlock access to the payload holder and payload.

In yet a further aspect, a payload retrieval apparatus is provided having a base; an autoloader assembly mounted to the base including: a payload holder configured to hold a payload for retrieval by an uncrewed aerial vehicle (UAV), a channel coupled to the payload holder and configured to direct a payload retriever suspended from the UAV to the payload holder, the channel having a tether slot adapted for receiving a tether having a first end attached to the UAV and a second end attached to the payload retriever, wherein the channel is adapted to receive the payload retriever, and the tether slot of the channel allows for passage of the tether during movement of the payload retriever through the channel; and a locking feature configured to lock access to the payload on the payload holder; and wherein the payload holder is positioned such that when the payload retriever exits the channel, the payload retriever engages a handle of the payload and removes the payload from the payload holder.

In another aspect, a method is provided including (i) providing a base; an autoloader assembly mounted to the base including: a payload holder configured to hold a payload for retrieval by an uncrewed aerial vehicle (UAV), a channel coupled to the payload holder and configured to direct a payload retriever suspended from the UAV to the payload holder, the channel having a tether slot adapted for receiving a tether having a first end attached to the UAV and a second end attached to the payload retriever, wherein the channel is adapted to receive the payload retriever, and the tether slot of the channel allows for passage of the tether during movement of the payload retriever through the channel; and a locking feature configured to lock access to the payload on the payload holder; and wherein the payload holder is positioned such that when the payload retriever exits the channel, the payload retriever engages a handle of the payload and removes the payload from the payload holder; and (ii) unlocking the locking feature to provide access to the payload holder and payload for payload retrieval by the payload retriever.

In another aspect, a payload retrieval apparatus is provided including a base; an autoloader assembly mounted to the base including: a payload holder configured to hold a payload for retrieval by an uncrewed aerial vehicle (UAV), a channel coupled to the payload holder and configured to direct a payload retriever suspended from the UAV to the payload holder, the channel having a tether slot adapted for receiving a tether having a first end attached to the UAV and a second end attached to the payload retriever, wherein the channel is adapted to receive the payload retriever, and the tether slot of the channel allows for passage of the tether during movement of the payload retriever through the channel; and a locking feature configured to lock access to the payload on the payload holder, the locking feature including a switch disposed along the channel and configured to be activated by the payload retriever as it moves through the channel, wherein when the payload retriever activates the switch, the locking member unlocks the payload on the payload holder; and wherein the payload holder is positioned such that when the payload retriever exits the channel, the payload retriever engages a handle of the payload and removes the payload from the payload holder.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 3 is a simplified block diagram illustrating a UAV system, according to an example embodiment.

FIG. 4A shows a side view of a payload delivery apparatus with a payload secured to a UAV, according to an example embodiment.

FIG. 4B shows a side view of the payload delivery apparatus shown in FIG. 4A lowering the payload to a delivery location.

FIG. 4C shows a side view of the payload delivery apparatus shown in FIGS. 4A and 4B after delivering the payload to the delivery location.

FIG. 6A is a perspective view of payload coupling apparatus 800, according to an example embodiment.

FIG. 6B is a side view of payload coupling apparatus 800 shown in FIG. 6A.

FIG. 6C is a front view of payload coupling apparatus 800 shown in FIGS. 6A and 6B.

FIG. 7 is a perspective view of payload coupling apparatus 800 shown in FIGS. 6A-6C, prior to insertion into a payload coupling apparatus receptacle positioned in the fuselage of a UAV.

FIG. 8 is another perspective view of payload coupling apparatus 800 shown in FIGS. 6A-6C, prior to insertion into a payload coupling apparatus receptacle positioned in the fuselage of a UAV.

FIG. 19 is a perspective view of channel 1050 of the payload retrieval apparatus 1000 shown in FIGS. 14-16 with a payload retriever 800 positioned therein.

FIG. 20 is a perspective view of channel 1050 of the payload retrieval apparatus 1000 shown in FIGS. 14-16 with a payload retriever 800".

FIG. 21A is a cross-sectional view of channel 1050, according to an example embodiment.

FIG. 21B is a side view of channel 1050 having a spring 1059 biased against end 1057 thereof.

FIG. 22 is a side view of payload retrieval apparatus 1400.

FIG. 23 is a top view of payload retrieval apparatus 1400.

FIGS. 24A-E illustrate a sequence of steps used to automatically pick up payload 510.

FIG. 27A shows perspective views of rotational spring loaded pusher 1600.

FIG. 27B shows a side view of leaf spring 1640.

FIG. 27C shows a side view of linear spring plunger 1650.

FIG. 46A is a side view of payload retriever 800 passing through tether channel passage 1433 towards locking member 2039.

FIG. 46B is a perspective view of locking strap 2090 positioned over handle 511 and pins 570 and 572.

FIG. 46C is another perspective view of locking strap 2090 positioned over handle 511 and pins 570 and 572.

DETAILED DESCRIPTION

Exemplary methods and systems are described herein. It should be understood that the word "exemplary" is used herein to mean "serving as an example, instance, or illustration." Any implementation or feature described herein as "exemplary" or "illustrative" is not necessarily to be construed as preferred or advantageous over other implementations or features. In the figures, similar symbols typically identify similar components, unless context dictates otherwise. The example implementations described herein are not meant to be limiting. It will be readily understood that the aspects of the present disclosure, as generally described herein, and illustrated in the figures, can be arranged, substituted, combined, separated, and designed in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

The present embodiments are related to the use of UAVs that are used to carry a payload to be delivered or retrieved. As examples, UAVs may be used to deliver or retrieve a payload to or from an individual or business. In operation the payload to be delivered is secured to the UAV and the UAV is then flown to the desired delivery site. The payload may be secured beneath the UAV, positioned within the UAV, or positioned partially within the UAV, as the UAV flies to the delivery site. Once the UAV arrives at the delivery site, the UAV may land to deliver the payload, or may be operated in a hover mode while the payload is dropped or lowered from the UAV towards the delivery site using a tether and a winch mechanism positioned within the UAV.

Herein, the terms "uncrewed aerial vehicle" and "UAV" refer to any autonomous or semi-autonomous vehicle that is capable of performing some functions without a physically present human pilot.

A UAV can take various forms. For example, a UAV may take the form of a fixed-wing aircraft, a glider aircraft, a tail-sitter aircraft, a jet aircraft, a ducted fan aircraft, a lighter-than-air dirigible such as a blimp or steerable balloon, a rotorcraft such as a helicopter or multicopter, and/or an ornithopter, among other possibilities. Further, the terms "drone," "unmanned aerial vehicle system" (UAVS), or "unmanned aerial system" (UAS) may also be used to refer to a UAV.

Figure 1A:
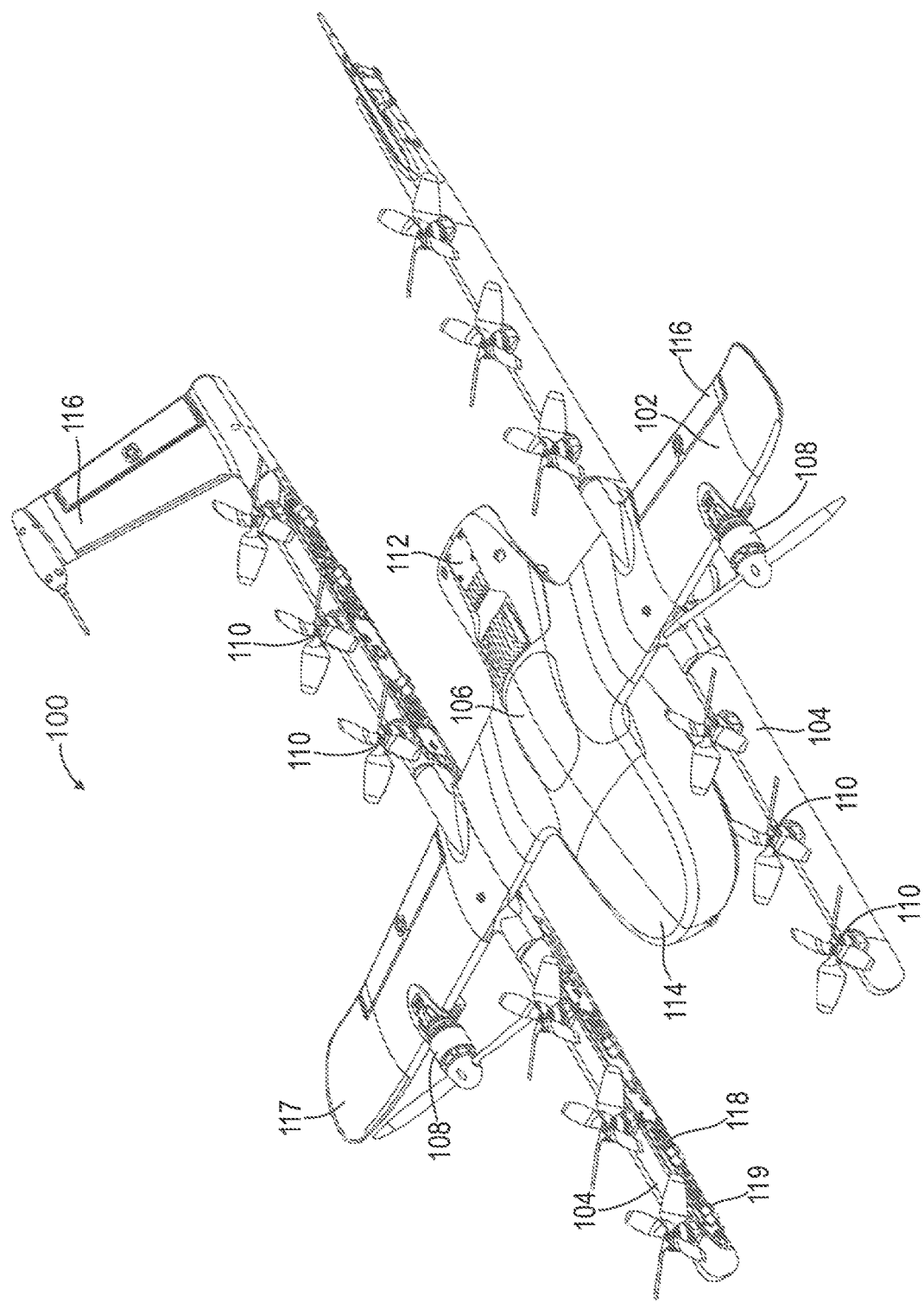
FIG. 1A is a simplified illustration of an unmanned aerial vehicle 100, according to an example embodiment.

FIG. 1A is an isometric view of an example UAV 100. UAV 100 includes wing 102, booms 104, and a fuselage 106. Wings 102 may be stationary and may generate lift based on the wing shape and the UAV's forward airspeed. For instance, the two wings 102 may have an airfoil-shaped cross section to produce an aerodynamic force on UAV 100. In some embodiments, wing 102 may carry horizontal propulsion units 108, and booms 104 may carry vertical propulsion units 110. In operation, power for the propulsion units may be provided from a battery compartment 112 of fuselage 106. In some embodiments, fuselage 106 also includes an avionics compartment 114, an additional battery compartment (not shown) and/or a delivery unit (not shown, e.g., a winch system) for handling the payload. In some embodiments, fuselage 106 is modular, and two or more compartments (e.g., battery compartment 112, avionics compartment 114, other payload and delivery compartments) are detachable from each other and securable to each other (e.g., mechanically, magnetically, or otherwise) to contiguously form at least a portion of fuselage 106.

In some embodiments, booms 104 terminate in rudders 116 for improved yaw control of UAV 100. Further, wings 102 may terminate in wing tips 117 for improved control of lift of the UAV.

In the illustrated configuration, UAV 100 includes a structural frame. The structural frame may be referred to as a "structural H-frame" or an "H-frame" (not shown) of the UAV. The H-frame may include, within wings 102, a wing spar (not shown) and, within booms 104, boom carriers (not shown). In some embodiments the wing spar and the boom carriers may be made of carbon fiber, hard plastic, aluminum, light metal alloys, or other materials. The wing spar and the boom carriers may be connected with clamps. The wing spar may include pre-drilled holes for horizontal propulsion units 108, and the boom carriers may include pre-drilled holes for vertical propulsion units 110.

In some embodiments, fuselage 106 may be removably attached to the H-frame (e.g., attached to the wing spar by clamps, configured with grooves, protrusions or other features to mate with corresponding H-frame features, etc.). In other embodiments, fuselage 106 similarly may be removably attached to wings 102. The removable attachment of fuselage 106 may improve quality and or modularity of UAV 100. For example, electrical/mechanical components and/or subsystems of fuselage 106 may be tested separately from, and before being attached to, the H-frame. Similarly, printed circuit boards (PCBs) 118 may be tested separately from, and before being attached to, the boom carriers, therefore eliminating defective parts/subassemblies prior to completing the UAV. For example, components of fuselage 106 (e.g., avionics, battery unit, delivery units, an additional battery compartment, etc.) may be electrically tested before fuselage 106 is mounted to the H-frame. Furthermore, the motors and the electronics of PCBs 118 may also be electrically tested before the final assembly. Generally, the identification of the defective parts and subassemblies early in the assembly process lowers the overall cost and lead time of the UAV. Furthermore, different types/models of fuselage 106 may be attached to the H-frame, therefore improving the modularity of the design. Such modularity allows these various parts of UAV 100 to be upgraded without a substantial overhaul to the manufacturing process.

In some embodiments, a wing shell and boom shells may be attached to the H-frame by adhesive elements (e.g., adhesive tape, double-sided adhesive tape, glue, etc.). Therefore, multiple shells may be attached to the H-frame instead of having a monolithic body sprayed onto the H-frame. In some embodiments, the presence of the multiple shells reduces the stresses induced by the coefficient of thermal expansion of the structural frame of the UAV. As a result, the UAV may have better dimensional accuracy and/or improved reliability.

Moreover, in at least some embodiments, the same H-frame may be used with the wing shell and/or boom shells having different size and/or design, therefore improving the modularity and versatility of the UAV designs. The wing shell and/or the boom shells may be made of relatively light polymers (e.g., closed cell foam) covered by the harder, but relatively thin, plastic skins.

The power and/or control signals from fuselage 106 may be routed to PCBs 118 through cables running through fuselage 106, wings 102, and booms 104. In the illustrated embodiment, UAV 100 has four PCBs, but other numbers of PCBs are also possible. For example, UAV 100 may include two PCBs, one per the boom. The PCBs carry electronic components 119 including, for example, power converters, controllers, memory, passive components, etc. In operation, propulsion units 108 and 110 of UAV 100 are electrically connected to the PCBs.

Many variations on the illustrated UAV are possible. For instance, fixed-wing UAVs may include more or fewer rotor units (vertical or horizontal), and/or may utilize a ducted fan or multiple ducted fans for propulsion. Further, UAVs with more wings (e.g., an "x-wing" configuration with four wings), are also possible. Although FIG. 1 illustrates two wings 102, two booms 104, two horizontal propulsion units 108, and six vertical propulsion units 110 per boom 104, it should be appreciated that other variants of UAV 100 may be implemented with more or less of these components. For example, UAV 100 may include four wings 102, four booms 104, and more or less propulsion units (horizontal or vertical).

Figure 1B:
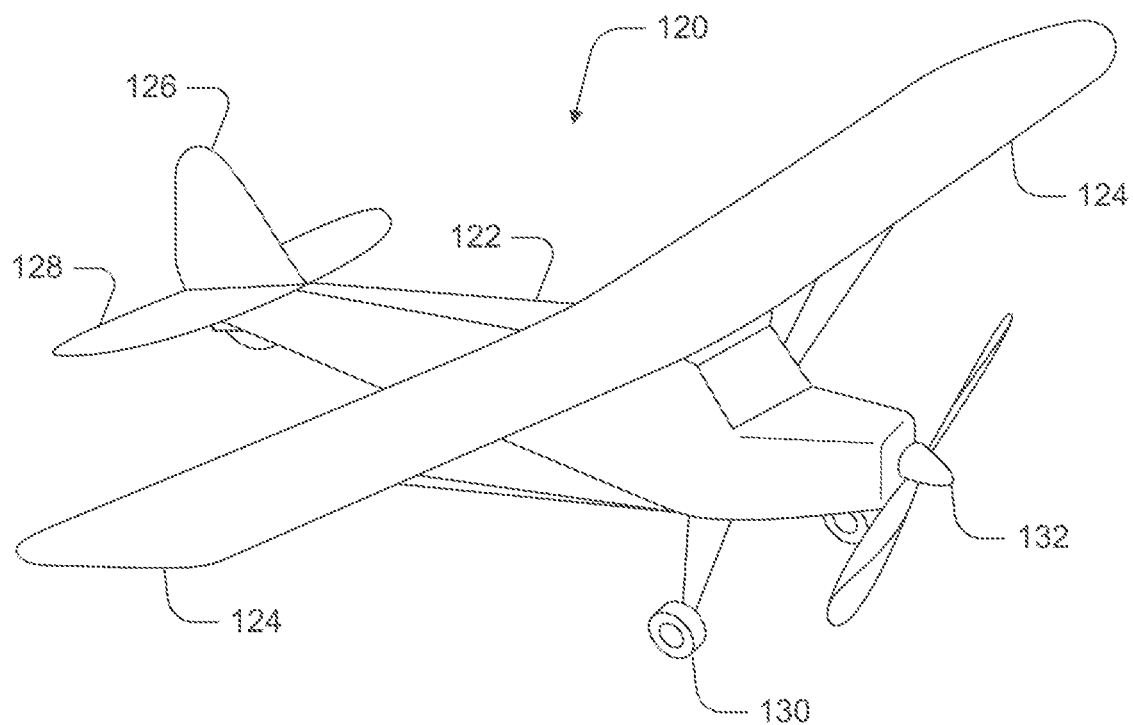
FIG. 1B is a simplified illustration of an unmanned aerial vehicle 120, according to an example embodiment.

Similarly, FIG. 1B shows another example of a fixed-wing UAV 120. The fixed-wing UAV 120 includes a fuselage 122, two wings 124 with an airfoil-shaped cross section to provide lift for the UAV 120, a vertical stabilizer 126 (or fin) to stabilize the plane's yaw (turn left or right), a horizontal stabilizer 128 (also referred to as an elevator or tailplane) to stabilize pitch (tilt up or down), landing gear 130, and a propulsion unit 132, which can include a motor, shaft, and propeller.

Figure 1C:
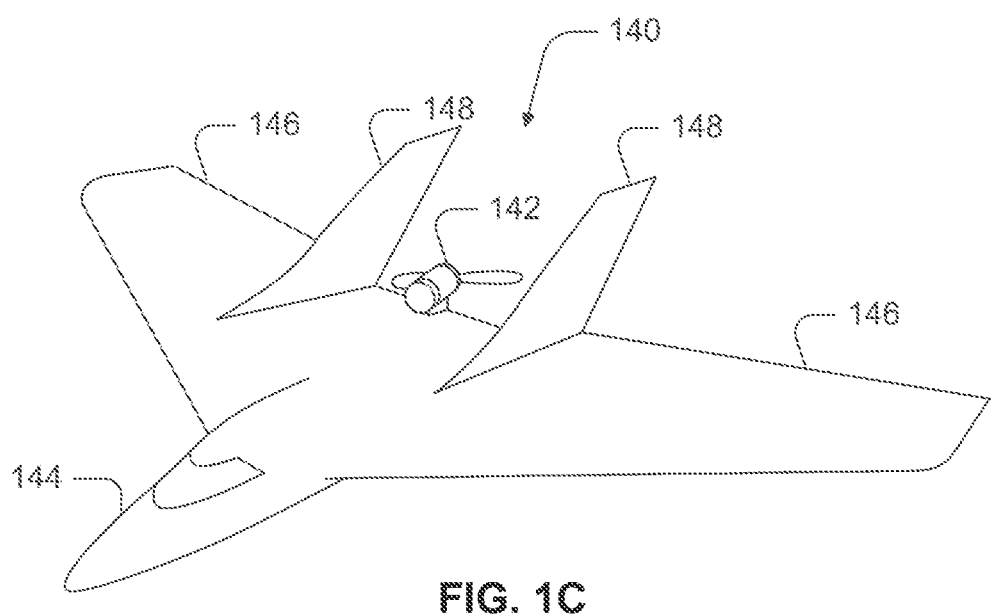
FIG. 1C is a simplified illustration of an unmanned aerial vehicle 140, according to an example embodiment.

FIG. 1C shows an example of a UAV 140 with a propeller in a pusher configuration. The term "pusher" refers to the fact that a propulsion unit 142 is mounted at the back of the UAV and "pushes" the vehicle forward, in contrast to the propulsion unit being mounted at the front of the UAV. Similar to the description provided for FIGS. 1A and 1B, FIG. 1C depicts common structures used in a pusher plane, including a fuselage 144, two wings 146, vertical stabilizers 148, and the propulsion unit 142, which can include a motor, shaft, and propeller.

Figure 1D:
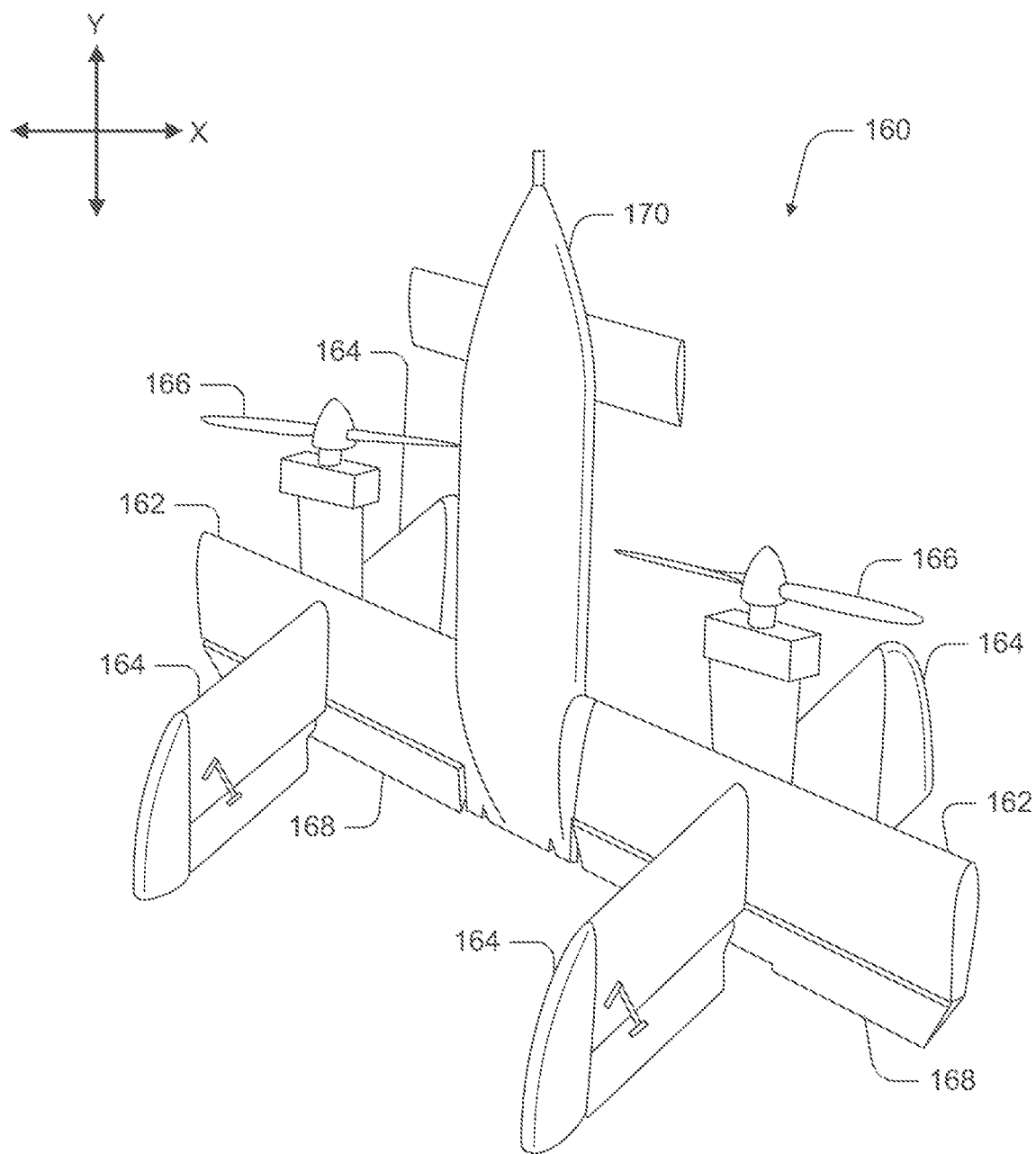
FIG. 1D is a simplified illustration of an unmanned aerial vehicle 160, according to an example embodiment.

FIG. 1D shows an example of a tail-sitter UAV 160. In the illustrated example, the tail-sitter UAV 160 has fixed wings 162 to provide lift and allow the UAV 160 to glide horizontally (e.g., along the x-axis, in a position that is approximately perpendicular to the position shown in FIG. 1D). However, the fixed wings 162 also allow the tail-sitter UAV 160 to take off and land vertically on its own.

For example, at a launch site, the tail-sitter UAV 160 may be positioned vertically (as shown) with its fins 164 and/or wings 162 resting on the ground and stabilizing the UAV 160 in the vertical position. The tail-sitter UAV 160 may then take off by operating its propellers 166 to generate an upward thrust (e.g., a thrust that is generally along the y-axis). Once at a suitable altitude, the tail-sitter UAV 160 may use its flaps 168 to reorient itself in a horizontal position, such that its fuselage 170 is closer to being aligned with the x-axis than the y-axis. Positioned horizontally, the propellers 166 may provide forward thrust so that the tail-sitter UAV 160 can fly in a similar manner as a typical airplane.

Many variations on the illustrated fixed-wing UAVs are possible. For instance, fixed-wing UAVs may include more or fewer propellers, and/or may utilize a ducted fan or multiple ducted fans for propulsion. Further, UAVs with more wings (e.g., an "x-wing" configuration with four wings), with fewer wings, or even with no wings, are also possible.

Figure 1E:
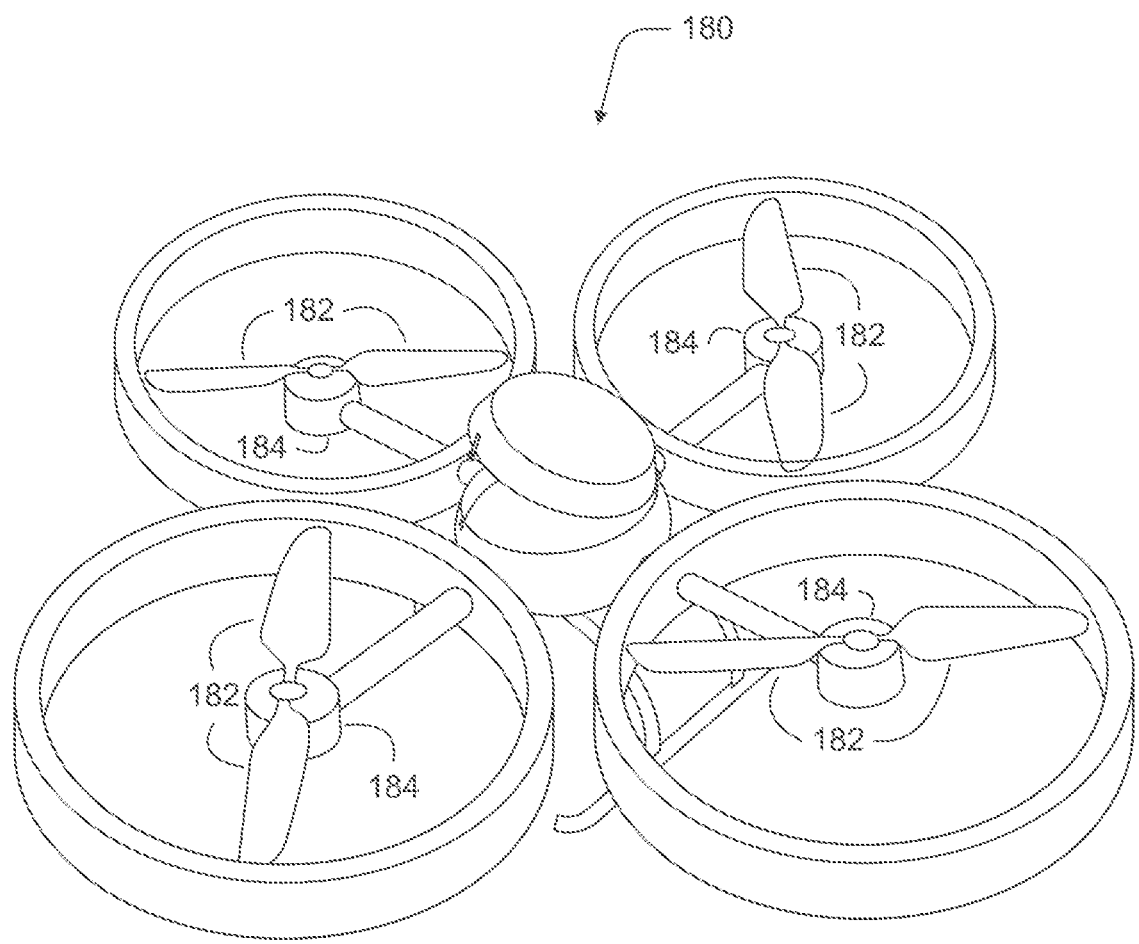
FIG. 1E is a simplified illustration of an unmanned aerial vehicle 180, according to an example embodiment.

As noted above, some embodiments may involve other types of UAVs, in addition to or in the alternative to fixed-wing UAVs. For instance, FIG. 1E shows an example of a rotorcraft that is commonly referred to as a multicopter 180. The multicopter 180 may also be referred to as a quadcopter, as it includes four rotors 182. It should be understood that example embodiments may involve a rotorcraft with more or fewer rotors than the multicopter 180. For example, a helicopter typically has two rotors. Other examples with three or more rotors are possible as well.

Herein, the term "multicopter" refers to any rotorcraft having more than two rotors, and the term "helicopter" refers to rotorcraft having two rotors.

Referring to the multicopter 180 in greater detail, the four rotors 182 provide propulsion and maneuverability for the multicopter 180. More specifically, each rotor 182 includes blades that are attached to a motor 184. Configured as such, the rotors 182 may allow the multicopter 180 to take off and land vertically, to maneuver in any direction, and/or to hover. Further, the pitch of the blades may be adjusted as a group and/or differentially, and may allow the multicopter 180 to control its pitch, roll, yaw, and/or altitude.

It should be understood that references herein to an "uncrewed" aerial vehicle or UAV can apply equally to autonomous and semi-autonomous aerial vehicles. In an autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator could control high level navigation decisions for a UAV, such as by specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

More generally, it should be understood that the example UAVs described herein are not intended to be limiting. Example embodiments may relate to, be implemented within, or take the form of any type of unmanned aerial vehicle.

Figure 2:
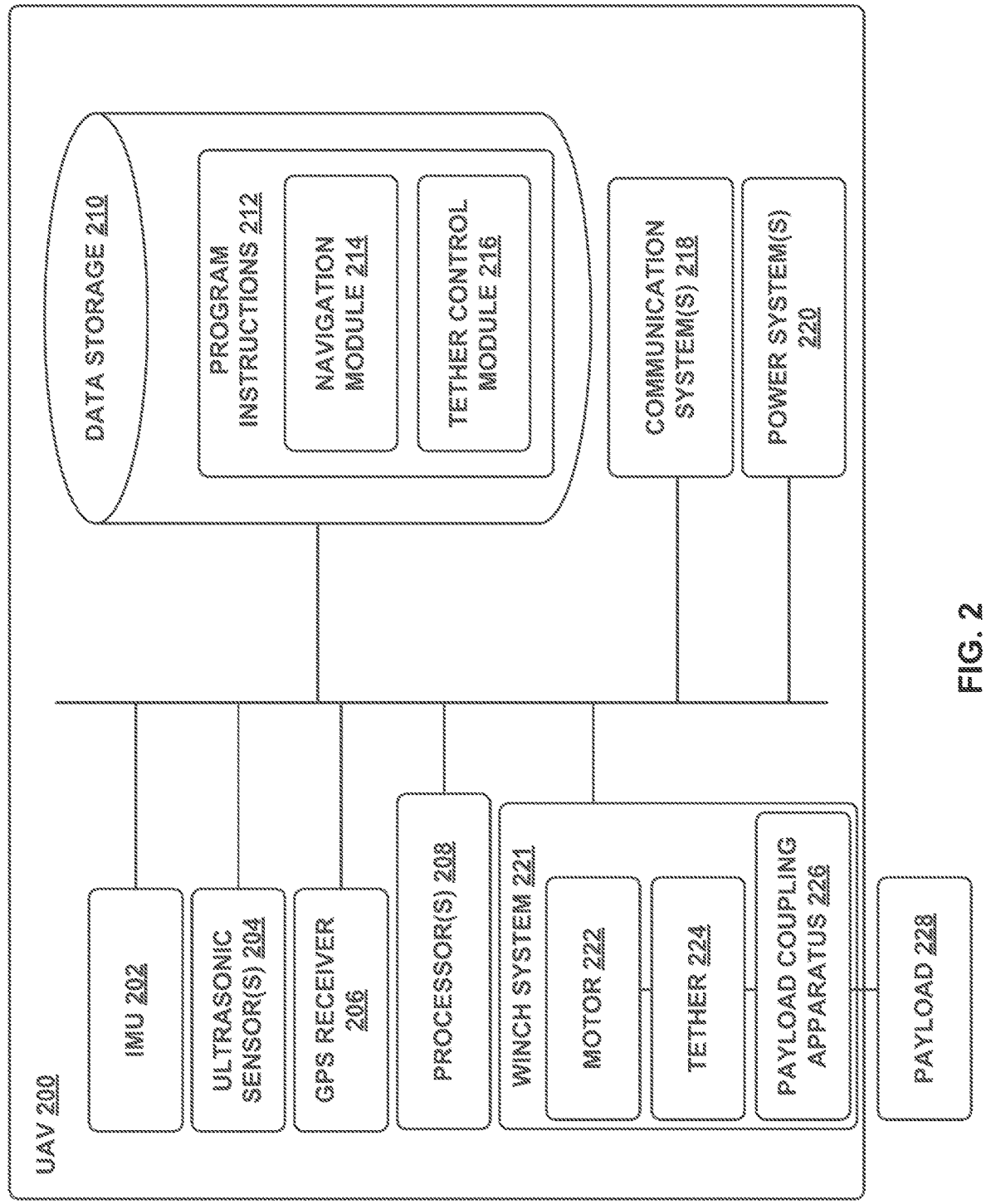
FIG. 2 is a simplified block diagram illustrating components of an unmanned aerial vehicle 200, according to an example embodiment.

FIG. 2 is a simplified block diagram illustrating components of a UAV 200, according to an example embodiment. UAV 200 may take the form of, or be similar in form to, one of the UAVs 100, 120, 140, 160, and 180 described in reference to FIGS. 1A-1E. However, UAV 200 may also take other forms.

UAV 200 may include various types of sensors, and may include a computing system configured to provide the functionality described herein. In the illustrated embodiment, the sensors of UAV 200 include an inertial measurement unit (IMU) 202, ultrasonic sensor(s) 204, and a GPS 206, among other possible sensors and sensing systems.

In the illustrated embodiment, UAV 200 also includes one or more processors 208. A processor 208 may be a general-purpose processor or a special purpose processor (e.g., digital signal processors, application specific integrated circuits, etc.). The one or more processors 208 can be configured to execute computer-readable program instructions 212 that are stored in the data storage 210 and are executable to provide the functionality of a UAV described herein.

The data storage 210 may include or take the form of one or more computer-readable storage media that can be read or accessed by at least one processor 208. The one or more computer-readable storage media can include volatile and/or non-volatile storage components, such as optical, magnetic, organic or other memory or disc storage, which can be integrated in whole or in part with at least one of the one or more processors 208. In some embodiments, the data storage 210 can be implemented using a single physical device (e.g., one optical, magnetic, organic or other memory or disc storage unit), while in other embodiments, the data storage 210 can be implemented using two or more physical devices.

As noted, the data storage 210 can include computer-readable program instructions 212 and perhaps additional data, such as diagnostic data of the UAV 200. As such, the data storage 210 may include program instructions 212 to perform or facilitate some or all of the UAV functionality described herein. For instance, in the illustrated embodiment, program instructions 212 include a navigation module 214 and a tether control module 216.

In an illustrative embodiment, IMU 202 may include both an accelerometer and a gyroscope, which may be used together to determine an orientation of the UAV 200. In particular, the accelerometer can measure the orientation of the vehicle with respect to earth, while the gyroscope measures the rate of rotation around an axis. IMUs are commercially available in low-cost, low-power packages. For instance, an IMU 202 may take the form of or include a miniaturized MicroElectroMechanical System (MEMS) or a NanoElectroMechanical System (NEMS). Other types of IMUs may also be utilized.

An IMU 202 may include other sensors, in addition to accelerometers and gyroscopes, which may help to better determine position and/or help to increase autonomy of the UAV 200. Two examples of such sensors are magnetometers and pressure sensors. In some embodiments, a UAV may include a low-power, digital 3-axis magnetometer, which can be used to realize an orientation independent electronic compass for accurate heading information. However, other types of magnetometers may be utilized as well. Other examples are also possible. Further, note that a UAV could include some or all of the above-described inertia sensors as separate components from an IMU.

UAV 200 may also include a pressure sensor or barometer, which can be used to determine the altitude of the UAV 200. Alternatively, other sensors, such as sonic altimeters or radar altimeters, can be used to provide an indication of altitude, which may help to improve the accuracy of and/or prevent drift of an IMU.

In a further aspect, UAV 200 may include one or more sensors that allow the UAV to sense objects in the environment. For instance, in the illustrated embodiment, UAV 200 includes ultrasonic sensor(s) 204. Ultrasonic sensor(s) 204 can determine the distance to an object by generating sound waves and determining the time interval between transmission of the wave and receiving the corresponding echo off an object. A typical application of an ultrasonic sensor for unmanned vehicles or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LADAR) system, and/or an infrared or forward-looking infrared (FLIR) system, among other possibilities.

In some embodiments, UAV 200 may also include one or more imaging system(s). For example, one or more still and/or video cameras may be utilized by UAV 200 to capture image data from the UAV's environment. As a specific example, charge-coupled device (CCD) cameras or complementary metal-oxide-semiconductor (CMOS) cameras can be used with unmanned vehicles. Such imaging sensor(s) have numerous possible applications, such as obstacle avoidance, localization techniques, ground tracking for more accurate navigation (e.g., by applying optical flow techniques to images), video feedback, and/or image recognition and processing, among other possibilities.

UAV 200 may also include a GPS receiver 206. The GPS receiver 206 may be configured to provide data that is typical of well-known GPS systems, such as the GPS coordinates of the UAV 200. Such GPS data may be utilized by the UAV 200 for various functions. As such, the UAV may use its GPS receiver 206 to help navigate to the caller's location, as indicated, at least in part, by the GPS coordinates provided by their mobile device. Other examples are also possible.

The navigation module 214 may provide functionality that allows the UAV 200 to, e.g., move about its environment and reach a desired location. To do so, the navigation module 214 may control the altitude and/or direction of flight by controlling the mechanical features of the UAV that affect flight (e.g., its rudder(s), elevator(s), aileron(s), and/or the speed of its propeller(s)).

In order to navigate the UAV 200 to a target location (e.g., a delivery location), the navigation module 214 may implement various navigation techniques, such as map-based navigation and localization-based navigation, for instance. With map-based navigation, the UAV 200 may be provided with a map of its environment, which may then be used to navigate to a particular location on the map. With localization-based navigation, the UAV 200 may be capable of navigating in an unknown environment using localization. Localization-based navigation may involve the UAV 200 building its own map of its environment and calculating its position within the map and/or the position of objects in the environment. For example, as a UAV 200 moves throughout its environment, the UAV 200 may continuously use localization to update its map of the environment. This continuous mapping process may be referred to as simultaneous localization and mapping (SLAM). Other navigation techniques may also be utilized.

In some embodiments, the navigation module 214 may navigate using a technique that relies on waypoints. In particular, waypoints are sets of coordinates that identify points in physical space. For instance, an air-navigation waypoint may be defined by a certain latitude, longitude, and altitude. Accordingly, navigation module 214 may cause UAV 200 to move from waypoint to waypoint, in order to ultimately travel to a final destination (e.g., a final waypoint in a sequence of waypoints).

In a further aspect, the navigation module 214 and/or other components and systems of the UAV 200 may be configured for "localization" to more precisely navigate to the scene of a target location. More specifically, it may be desirable in certain situations for a UAV to be within a threshold distance of the target location where a payload 228 is being delivered by a UAV (e.g., within a few feet of the target destination). To this end, a UAV may use a two-tiered approach in which it uses a more-general location-determination technique to navigate to a general area that is associated with the target location, and then use a more-refined location-determination technique to identify and/or navigate to the target location within the general area.

For example, the UAV 200 may navigate to the general area of a target destination where a payload 228 is being delivered using waypoints and/or map-based navigation. The UAV may then switch to a mode in which it utilizes a localization process to locate and travel to a more specific location. For instance, if the UAV 200 is to deliver a payload to a user's home, the UAV 200 may need to be substantially close to the target location in order to avoid delivery of the payload to undesired areas (e.g., onto a roof, into a pool, onto a neighbor's property, etc.). However, a GPS signal may only get the UAV 200 so far (e.g., within a block of the user's home). A more precise location-determination technique may then be used to find the specific target location.

Various types of location-determination techniques may be used to accomplish localization of the target delivery location once the UAV 200 has navigated to the general area of the target delivery location. For instance, the UAV 200 may be equipped with one or more sensory systems, such as, for example, ultrasonic sensors 204, infrared sensors (not shown), and/or other sensors, which may provide input that the navigation module 214 utilizes to navigate autonomously or semi-autonomously to the specific target location.

As another example, once the UAV 200 reaches the general area of the target delivery location (or of a moving subject such as a person or their mobile device), the UAV 200 may switch to a "fly-by-wire" mode where it is controlled, at least in part, by a remote operator, who can navigate the UAV 200 to the specific target location. To this end, sensory data from the UAV 200 may be sent to the remote operator to assist them in navigating the UAV 200 to the specific location.

As yet another example, the UAV 200 may include a module that is able to signal to a passer-by for assistance in either reaching the specific target delivery location; for example, the UAV 200 may display a visual message requesting such assistance in a graphic display, play an audio message or tone through speakers to indicate the need for such assistance, among other possibilities. Such a visual or audio message might indicate that assistance is needed in delivering the UAV 200 to a particular person or a particular location, and might provide information to assist the passer-by in delivering the UAV 200 to the person or location (e.g., a description or picture of the person or location, and/or the person or location's name), among other possibilities. Such a feature can be useful in a scenario in which the UAV is unable to use sensory functions or another location-determination technique to reach the specific target location. However, this feature is not limited to such scenarios.

In some embodiments, once the UAV 200 arrives at the general area of a target delivery location, the UAV 200 may utilize a beacon from a user's remote device (e.g., the user's mobile phone) to locate the person. Such a beacon may take various forms. As an example, consider the scenario where a remote device, such as the mobile phone of a person who requested a UAV delivery, is able to send out directional signals (e.g., via an RF signal, a light signal and/or an audio signal). In this scenario, the UAV 200 may be configured to navigate by "sourcing" such directional signals—in other words, by determining where the signal is strongest and navigating accordingly. As another example, a mobile device can emit a frequency, either in the human range or outside the human range, and the UAV 200 can listen for that frequency and navigate accordingly. As a related example, if the UAV 200 is listening for spoken commands, then the UAV 200 could utilize spoken statements, such as "I'm over here!" to source the specific location of the person requesting delivery of a payload.

In an alternative arrangement, a navigation module may be implemented at a remote computing device, which communicates wirelessly with the UAV 200. The remote computing device may receive data indicating the operational state of the UAV 200, sensor data from the UAV 200 that allows it to assess the environmental conditions being experienced by the UAV 200, and/or location information for the UAV 200. Provided with such information, the remote computing device may determine altitudinal and/or directional adjustments that should be made by the UAV 200 and/or may determine how the UAV 200 should adjust its mechanical features (e.g., its rudder(s), elevator(s), aileron(s), and/or the speed of its propeller(s)) in order to effectuate such movements. The remote computing system may then communicate such adjustments to the UAV 200 so it can move in the determined manner.

In a further aspect, the UAV 200 includes one or more communication systems 218. The communications systems 218 may include one or more wireless interfaces and/or one or more wireline interfaces, which allow the UAV 200 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In some embodiments, a UAV 200 may include communication systems 218 that allow for both short-range communication and long-range communication. For example, the UAV 200 may be configured for short-range communications using Bluetooth and for long-range communications under a CDMA protocol. In such an embodiment, the UAV 200 may be configured to function as a "hot spot;" or in other words, as a gateway or proxy between a remote support device and one or more data networks, such as a cellular network and/or the Internet. Configured as such, the UAV 200 may facilitate data communications that the remote support device would otherwise be unable to perform by itself.

For example, the UAV 200 may provide a WiFi connection to a remote device, and serve as a proxy or gateway to a cellular service provider's data network, which the UAV might connect to under an LTE or a 3G protocol, for instance. The UAV 200 could also serve as a proxy or gateway to a high-altitude balloon network, a satellite network, or a combination of these networks, among others, which a remote device might not be able to otherwise access.

In a further aspect, the UAV 200 may include power system(s) 220. The power system 220 may include one or more batteries for providing power to the UAV 200. In one example, the one or more batteries may be rechargeable and each battery may be recharged via a wired connection between the battery and a power supply and/or via a wireless charging system, such as an inductive charging system that applies an external time-varying magnetic field to an internal battery.

In a further aspect, the power systems 220 of UAV 200 a power interface for electronically coupling to an external AC power source, and an AC/DC converter coupled to the power interface and operable to convert alternating current to direct current that charges the UAV's battery or batteries. For instance, the power interface may include a power jack or other electric coupling for connecting to a 110V, 120V, 220V, or 240V AC power source. Such a power system may facilitate a recipient-assisted recharging process, where a recipient can connect the UAV to a standard power source at a delivery location, such as the recipient's home or office. Additionally or alternatively, power systems 220 could include an inductive charging interface, such that recipient-assisted recharging can be accomplished wirelessly via an inductive charging system installed or otherwise available at the delivery location.

The UAV 200 may employ various systems and configurations in order to transport and deliver a payload 228. In some implementations, the payload 228 of a given UAV 200 may include or take the form of a "package" designed to transport various goods to a target delivery location. For example, the UAV 200 can include a compartment, in which an item or items may be transported. Such a package may contain one or more food items, purchased goods, medical items, or any other object(s) having a size and weight suitable to be transported between two locations by the UAV. In some embodiments, a payload 228 may simply be the one or more items that are being delivered (e.g., without any package housing the items). And, in some embodiments, the items being delivered, the container or package in which the items are transported, and/or other components may all be considered to be part of the payload.

In some embodiments, the payload 228 may be attached to the UAV and located substantially outside of the UAV during some or all of a flight by the UAV. For example, the package may be tethered or otherwise releasably attached below the UAV during flight to a target location. In an embodiment where a package carries goods below the UAV, the package may include various features that protect its contents from the environment, reduce aerodynamic drag on the system, and prevent the contents of the package from shifting during UAV flight.

For instance, when the payload 228 takes the form of a package for transporting items, the package may include an outer shell constructed of water-resistant cardboard, plastic, or any other lightweight and water-resistant material. Further, in order to reduce drag, the package may feature smooth surfaces with a pointed front that reduces the frontal cross-sectional area. Further, the sides of the package may taper from a wide bottom to a narrow top, which allows the package to serve as a narrow pylon that reduces interference effects on the wing(s) of the UAV. This may move some of the frontal area and volume of the package away from the wing(s) of the UAV, thereby preventing the reduction of lift on the wing(s) caused by the package. Yet further, in some embodiments, the outer shell of the package may be constructed from a single sheet of material in order to reduce air gaps or extra material, both of which may increase drag on the system. Additionally or alternatively, the package may include a stabilizer to dampen package flutter. This reduction in flutter may allow the package to have a less rigid connection to the UAV and may cause the contents of the package to shift less during flight.

In order to deliver the payload, the UAV may include a tether system 221, which may be controlled by the tether control module 216 in order to lower the payload 228 to the ground while the UAV hovers above. The tether system 221 may include a tether, which is couplable to a payload 228 (e.g., a package). The tether may be wound on a spool that is coupled to a motor of the UAV (although passive implementations, without a motor, are also possible). The motor may be a DC motor (e.g., a servo motor) that can be actively controlled by a speed controller, although other motor configurations are possible. In some embodiments, the tether control module 216 can control the speed controller to cause the motor to rotate the spool, thereby unwinding or retracting the tether and lowering or raising the payload coupling apparatus. In practice, a speed controller may output a desired operating rate (e.g., a desired RPM) for the spool, which may correspond to the speed at which the tether system should lower the payload towards the ground. The motor may then rotate the spool so that it maintains the desired operating rate (or within some allowable range of operating rates).

In order to control the motor via a speed controller, the tether control module 216 may receive data from a speed sensor (e.g., an encoder) configured to convert a mechanical position to a representative analog or digital signal. In particular, the speed sensor may include a rotary encoder that may provide information related to rotary position (and/or rotary movement) of a shaft of the motor or the spool coupled to the motor, among other possibilities. Moreover, the speed sensor may take the form of an absolute encoder and/or an incremental encoder, among others. So in an example implementation, as the motor causes rotation of the spool, a rotary encoder may be used to measure this rotation. In doing so, the rotary encoder may be used to convert a rotary position to an analog or digital electronic signal used by the tether control module 216 to determine the amount of rotation of the spool from a fixed reference angle and/or to an analog or digital electronic signal that is representative of a new rotary position, among other options. Other examples are also possible.

In some embodiments, a payload coupling component (e.g., a hook or another type of coupling component) can be configured to secure the payload 228 while being lowered from the UAV by the tether. The coupling apparatus or component can be further configured to release the payload 228 upon reaching ground level via electrical or electromechanical features of the coupling component. The payload coupling component can then be retracted to the UAV by reeling in the tether using the motor.

In some implementations, the payload 228 may be passively released once it is lowered to the ground. For example, a payload coupling component may provide a passive release mechanism, such as one or more swing arms adapted to retract into and extend from a housing. An extended swing arm may form a hook on which the payload 228 may be attached. Upon lowering the release mechanism and the payload 228 to the ground via a tether, a gravitational force as well as a downward inertial force on the release mechanism may cause the payload 228 to detach from the hook allowing the release mechanism to be raised upwards toward the UAV. The release mechanism may further include a spring mechanism that biases the swing arm to retract into the housing when there are no other external forces on the swing arm. For instance, a spring may exert a force on the swing arm that pushes or pulls the swing arm toward the housing such that the swing arm retracts into the housing once the weight of the payload 228 no longer forces the swing arm to extend from the housing. Retracting the swing arm into the housing may reduce the likelihood of the release mechanism snagging the payload 228 or other nearby objects when raising the release mechanism toward the UAV upon delivery of the payload 228.

In another implementation, a payload coupling component may include a hook feature that passively releases the payload when the payload contacts the ground. For example, the payload coupling component may take the form of or include a hook feature that is sized and shaped to interact with a corresponding attachment feature (e.g., a handle or hole) on a payload taking the form of a container or tote. The hook may be inserted into the handle or hole of the payload container, such that the weight of the payload keeps the payload container secured to the hook feature during flight. However, the hook feature and payload container may be designed such that when the container contacts the ground and is supported from below, the hook feature slides out of the container's attachment feature, thereby passively releasing the payload container. Other passive release configurations are also possible.

Active payload release mechanisms are also possible. For example, sensors such as a barometric pressure based altimeter and/or accelerometers may help to detect the position of the release mechanism (and the payload) relative to the ground. Data from the sensors can be communicated back to the UAV and/or a control system over a wireless link and used to help in determining when the release mechanism has reached ground level (e.g., by detecting a measurement with the accelerometer that is characteristic of ground impact). In other examples, the UAV may determine that the payload has reached the ground based on a weight sensor detecting a threshold low downward force on the tether and/or based on a threshold low measurement of power drawn by the winch when lowering the payload.

Other systems and techniques for delivering a payload, in addition or in the alternative to a tethered delivery system are also possible. For example, a UAV 200 could include an air-bag drop system or a parachute drop system. Alternatively, a UAV 200 carrying a payload could simply land on the ground at a delivery location. Other examples are also possible.

In some arrangements, a UAV may not include a tether system 221. For example, a UAV could include an internal compartment or bay in which the UAV could hold items during transport. Such a compartment could be configured as a top-loading, side-loading, and/or bottom-loading chamber. The UAV may include electrical and/or mechanical means (e.g., doors) that allow the interior compartment in the UAV to be opened and closed. Accordingly, the UAV may open the compartment in various circumstances, such as: (a) when picking up an item for delivery at an item source location, such that the item can be placed in the UAV for delivery, (b) upon arriving at a delivery location, such that the recipient can place an item for return into the UAV, and/or (c) in other circumstances. Further, it is also contemplated that other non-tethered mechanisms for securing payload items to a UAV are also possible, such as various fasteners for securing items to the UAV housing, among other possibilities. Yet further, a UAV may include an internal compartment for transporting items and/or other non-tethered mechanisms for securing payload items, in addition or in the alternative to a tether system 221.

The UAV 200 can include a package identification device 230 that can be used to identify payload 228. Within examples, the package identification device 230 can be arranged on a surface of the UAV 200 that has a direct view of the payload 228. For instance, the package identification device 230 can be arranged on a surface of a payload compartment (see, e.g., compartments 506 and 604 in FIGS. 5 and 6, respectively). Other arrangements are possible.

Within examples, the package identification device 230 can be a sensor or a scanner that employs various technologies to interact with the payload 228 in order to identify the payload 228. For instance, the package identification device 230 can employ one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Additionally and/or alternatively, the package identification device 230 can employ various scanning technologies such as a 1-D or 2-D barcode scanner. Additionally and/or alternatively, the package identification device 230 can employ various image-capturing technologies such as cameras. Additionally and/or alternatively, the package identification device 230 can employ various text recognition software that can read identifying text (e.g., printed or handwritten) on the package.

UAV systems may be implemented in order to provide various UAV-related services. In particular, UAVs may be provided at a number of different launch sites that may be in communication with regional and/or central control systems. Such a distributed UAV system may allow UAVs to be quickly deployed to provide services across a large geographic area (e.g., that is much larger than the flight range of any single UAV). For example, UAVs capable of carrying payloads may be distributed at a number of launch sites across a large geographic area (possibly even throughout an entire country, or even worldwide), in order to provide on-demand transport of various items to locations throughout the geographic area. FIG. 3A is a simplified block diagram illustrating a distributed UAV system 300, according to an example embodiment.

In the illustrative UAV system 300 shown in FIG. 3, an access system 302 may allow for interaction with, control of, and/or utilization of a network of UAVs 304. In some embodiments, an access system 302 may be a computing system that allows for human-controlled dispatch of UAVs 304. As such, the control system may include or otherwise provide a user interface through which a user can access and/or control the UAVs 304.

In some embodiments, dispatch of the UAVs 304 may additionally or alternatively be accomplished via one or more automated processes. For instance, the access system 302 may dispatch one of the UAVs 304 to transport a payload to a target location, and the UAV may autonomously navigate to the target location by utilizing various on-board sensors, such as a GPS receiver and/or other various navigational sensors.

Further, the access system 302 may provide for remote operation of a UAV. For instance, the access system 302 may allow an operator to control the flight of a UAV via its user interface. As a specific example, an operator may use the access system 302 to dispatch a UAV 304 to a target location. The UAV 304 may then autonomously navigate to the general area of the target location. At this point, the operator may use the access system 302 to take control of the UAV 304 and navigate the UAV to the target location (e.g., to a particular person to whom a payload is being transported). Other examples of remote operation of a UAV are also possible.

In an illustrative embodiment, the UAVs 304 may take various forms. For example, each of the UAVs 304 may be a UAV such as those illustrated in FIGS. 1A-1E. However, UAV system 300 may also utilize other types of UAVs without departing from the scope of the invention. In some implementations, all of the UAVs 304 may be of the same or a similar configuration. However, in other implementations, the UAVs 304 may include a number of different types of UAVs. For instance, the UAVs 304 may include a number of types of UAVs, with each type of UAV being configured for a different type or types of payload delivery capabilities.

The UAV system 300 may further include a remote device 306, which may take various forms. Generally, the remote device 306 may be any device through which a direct or indirect request to dispatch a UAV can be made. (Note that an indirect request may involve any communication that may be responded to by dispatching a UAV, such as requesting a package delivery). In an example embodiment, the remote device 306 may be a mobile phone, tablet computer, laptop computer, personal computer, or any network-connected computing device. Further, in some instances, the remote device 306 may not be a computing device. As an example, a standard telephone, which allows for communication via plain old telephone service (POTS), may serve as the remote device 306. Other types of remote devices are also possible.

Further, the remote device 306 may be configured to communicate with access system 302 via one or more types of communication network(s) 308. For example, the remote device 306 may communicate with the access system 302 (or a human operator of the access system 302) by communicating over a POTS network, a cellular network, and/or a data network such as the Internet. Other types of networks may also be utilized.

In some embodiments, the remote device 306 may be configured to allow a user to request delivery of one or more items to a desired location. For example, a user could request UAV delivery of a package to their home via their mobile phone, tablet, or laptop. As another example, a user could request dynamic delivery to wherever they are located at the time of delivery. To provide such dynamic delivery, the UAV system 300 may receive location information (e.g., GPS coordinates, etc.) from the user's mobile phone, or any other device on the user's person, such that a UAV can navigate to the user's location (as indicated by their mobile phone).

In an illustrative arrangement, the central dispatch system 310 may be a server or group of servers, which is configured to receive dispatch messages requests and/or dispatch instructions from the access system 302. Such dispatch messages may request or instruct the central dispatch system 310 to coordinate the deployment of UAVs to various target locations. The central dispatch system 310 may be further configured to route such requests or instructions to one or more local dispatch systems 312. To provide such functionality, the central dispatch system 310 may communicate with the access system 302 via a data network, such as the Internet or a private network that is established for communications between access systems and automated dispatch systems.

In the illustrated configuration, the central dispatch system 310 may be configured to coordinate the dispatch of UAVs 304 from a number of different local dispatch systems 312. As such, the central dispatch system 310 may keep track of which UAVs 304 are located at which local dispatch systems 312, which UAVs 304 are currently available for deployment, and/or which services or operations each of the UAVs 304 is configured for (in the event that a UAV fleet includes multiple types of UAVs configured for different services and/or operations). Additionally or alternatively, each local dispatch system 312 may be configured to track which of its associated UAVs 304 are currently available for deployment and/or are currently in the midst of item transport.

In some cases, when the central dispatch system 310 receives a request for UAV-related service (e.g., transport of an item) from the access system 302, the central dispatch system 310 may select a specific UAV 304 to dispatch. The central dispatch system 310 may accordingly instruct the local dispatch system 312 that is associated with the selected UAV to dispatch the selected UAV. The local dispatch system 312 may then operate its associated deployment system 314 to launch the selected UAV. In other cases, the central dispatch system 310 may forward a request for a UAV-related service to a local dispatch system 312 that is near the location where the support is requested and leave the selection of a particular UAV 304 to the local dispatch system 312.

In an example configuration, the local dispatch system 312 may be implemented as a computing system at the same location as the deployment system(s) 314 that it controls. For example, the local dispatch system 312 may be implemented by a computing system installed at a building, such as a warehouse, where the deployment system(s) 314 and UAV(s) 304 that are associated with the particular local dispatch system 312 are also located. In other embodiments, the local dispatch system 312 may be implemented at a location that is remote to its associated deployment system(s) 314 and UAV(s) 304.

Numerous variations on and alternatives to the illustrated configuration of the UAV system 300 are possible. For example, in some embodiments, a user of the remote device 306 could request delivery of a package directly from the central dispatch system 310. To do so, an application may be implemented on the remote device 306 that allows the user to provide information regarding a requested delivery, and generate and send a data message to request that the UAV system 300 provide the delivery. In such an embodiment, the central dispatch system 310 may include automated functionality to handle requests that are generated by such an application, evaluate such requests, and, if appropriate, coordinate with an appropriate local dispatch system 312 to deploy a UAV.

Further, some or all of the functionality that is attributed herein to the central dispatch system 310, the local dispatch system(s) 312, the access system 302, and/or the deployment system(s) 314 may be combined in a single system, implemented in a more complex system, and/or redistributed among the central dispatch system 310, the local dispatch system(s) 312, the access system 302, and/or the deployment system(s) 314 in various ways.

Yet further, while each local dispatch system 312 is shown as having two associated deployment systems 314, a given local dispatch system 312 may alternatively have more or fewer associated deployment systems 314. Similarly, while the central dispatch system 310 is shown as being in communication with two local dispatch systems 312, the central dispatch system 310 may alternatively be in communication with more or fewer local dispatch systems 312.

In a further aspect, the deployment systems 314 may take various forms. In general, the deployment systems 314 may take the form of or include systems for physically launching one or more of the UAVs 304. Such launch systems may include features that provide for an automated UAV launch and/or features that allow for a human-assisted UAV launch. Further, the deployment systems 314 may each be configured to launch one particular UAV 304, or to launch multiple UAVs 304.

The deployment systems 314 may further be configured to provide additional functions, including for example, diagnostic-related functions such as verifying system functionality of the UAV, verifying functionality of devices that are housed within a UAV (e.g., a payload delivery apparatus), and/or maintaining devices or other items that are housed in the UAV (e.g., by monitoring a status of a payload such as its temperature, weight, etc.).

In some embodiments, the deployment systems 314 and their corresponding UAVs 304 (and possibly associated local dispatch systems 312) may be strategically distributed throughout an area such as a city. For example, the deployment systems 314 may be strategically distributed such that each deployment system 314 is proximate to one or more payload pickup locations (e.g., near a restaurant, store, or warehouse). However, the deployment systems 314 (and possibly the local dispatch systems 312) may be distributed in other ways, depending upon the particular implementation. As an additional example, kiosks that allow users to transport packages via UAVs may be installed in various locations. Such kiosks may include UAV launch systems, and may allow a user to provide their package for loading onto a UAV and pay for UAV shipping services, among other possibilities. Other examples are also possible.

In a further aspect, the UAV system 300 may include or have access to a user-account database 316. The user-account database 316 may include data for a number of user accounts, and which are each associated with one or more persons. For a given user account, the user-account database 316 may include data related to or useful in providing UAV-related services. Typically, the user data associated with each user account is optionally provided by an associated user and/or is collected with the associated user's permission.

Further, in some embodiments, a person may be required to register for a user account with the UAV system 300, if they wish to be provided with UAV-related services by the UAVs 304 from UAV system 300. As such, the user-account database 316 may include authorization information for a given user account (e.g., a username and password), and/or other information that may be used to authorize access to a user account.

In some embodiments, a person may associate one or more of their devices with their user account, such that they can access the services of UAV system 300. For example, when a person uses an associated mobile phone, e.g., to place a call to an operator of the access system 302 or send a message requesting a UAV-related service to a dispatch system, the phone may be identified via a unique device identification number, and the call or message may then be attributed to the associated user account. Other examples are also possible.

FIGS. 4A, 4B, and 4C show a UAV 400 that includes a payload delivery system 410 (could also be referred to as a payload delivery apparatus), according to an example embodiment. As shown, payload delivery system 410 for UAV 400 includes a tether 402 coupled to a spool 404, a payload latch 406, and a payload 408 coupled to the tether 402 via a payload coupling apparatus 412. The payload latch 406 can function to alternately secure payload 408 and release the payload 408 upon delivery. For instance, as shown, the payload latch 406 may take the form of one or more pins that can engage the payload coupling apparatus 412 (e.g., by sliding into one or more receiving slots in the payload coupling apparatus 412). Inserting the pins of the payload latch 406 into the payload coupling apparatus 412 may secure the payload coupling apparatus 412 within a receptacle 414 on the underside of the UAV 400, thereby preventing the payload 408 from being lowered from the UAV 400. In some embodiments, the payload latch 406 may be arranged to engage the spool 404 or the payload 408 rather than the payload coupling apparatus 412 in order to prevent the payload 408 from lowering. In other embodiments, the UAV 400 may not include the payload latch 406, and the payload delivery apparatus may be coupled directly to the UAV 400.

In some embodiments, the spool 404 can function to unwind the tether 402 such that the payload 408 can be lowered to the ground with the tether 402 and the payload coupling apparatus 412 from UAV 400. The payload 408 may itself be an item for delivery, and may be housed within (or otherwise incorporate) a parcel, container, or other structure that is configured to interface with the payload latch 406. In practice, the payload delivery system 410 of UAV 400 may function to autonomously lower payload 408 to the ground in a controlled manner to facilitate delivery of the payload 408 on the ground while the UAV 400 hovers above.

As shown in FIG. 4A, the payload latch 406 may be in a closed position (e.g., pins engaging the payload coupling apparatus 412) to hold the payload 408 against or close to the bottom of the UAV 400, or even partially or completely inside the UAV 400, during flight from a launch site to a target location 420. The target location 420 may be a point in space directly above a desired delivery location. Then, when the UAV 400 reaches the target location 420, the UAV's control system (e.g., the tether control module 216 of FIG. 2) may toggle the payload latch 406 to an open position (e.g., disengaging the pins from the payload coupling apparatus 412), thereby allowing the payload 408 to be lowered from the UAV 400. The control system may further operate the spool 404 (e.g., by controlling the motor 222 of FIG. 2) such that the payload 408, secured to the tether 402 by a payload coupling apparatus 412, is lowered to the ground, as shown in FIG. 4B.

Once the payload 408 reaches the ground, the control system may continue operating the spool 404 to lower the tether 402, causing over-run of the tether 402. During over-run of the tether 402, the payload coupling apparatus 412 may continue to lower as the payload 408 remains stationary on the ground. The downward momentum and/or gravitational forces on the payload coupling apparatus 412 may cause the payload 408 to detach from the payload coupling apparatus 412 (e.g., by sliding off a hook of the payload coupling apparatus 412). After releasing payload 408, the control system may operate the spool 404 to retract the tether 402 and the payload coupling apparatus 412 toward the UAV 400. Once the payload coupling apparatus reaches or nears the UAV 400, the control system may operate the spool 404 to pull the payload coupling apparatus 412 into the receptacle 414, and the control system may toggle the payload latch 406 to the closed position, as shown in FIG. 4C.

In some embodiments, when lowering the payload 408 from the UAV 400, the control system may detect when the payload 408 and/or the payload coupling apparatus 412 has been lowered to be at or near the ground based on an unwound length of the tether 402 from the spool 404. Similar techniques may be used to determine when the payload coupling apparatus 412 is at or near the UAV 400 when retracting the tether 402. As noted above, the UAV 400 may include an encoder for providing data indicative of the rotation of the spool 404. Based on data from the encoder, the control system may determine how many rotations the spool 404 has undergone and, based on the number of rotations, determine a length of the tether 402 that is unwound from the spool 404. For instance, the control system may determine an unwound length of the tether 402 by multiplying the number of rotations of the spool 404 by the circumference of the tether 402 wrapped around the spool 404. In some embodiments, such as when the spool 404 is narrow or when the tether 402 has a large diameter, the circumference of the tether 402 on the spool 404 may vary as the tether 402 winds or unwinds from the tether, and so the control system may be configured to account for these variations when determining the unwound tether length.

In other embodiments, the control system may use various types of data, and various techniques, to determine when the payload 408 and/or payload coupling apparatus 412 have lowered to be at or near the ground. Further, the data that is used to determine when the payload 408 is at or near the ground may be provided by sensors on UAV 400, sensors on the payload coupling apparatus 412, and/or other data sources that provide data to the control system.

In some embodiments, the control system itself may be situated on the payload coupling apparatus 412 and/or on the UAV 400. For example, the payload coupling apparatus 412 may include logic module(s) implemented via hardware, software, and/or firmware that cause the UAV 400 to function as described herein, and the UAV 400 may include logic module(s) that communicate with the payload coupling apparatus 412 to cause the UAV 400 to perform functions described herein.

Figure 5A:
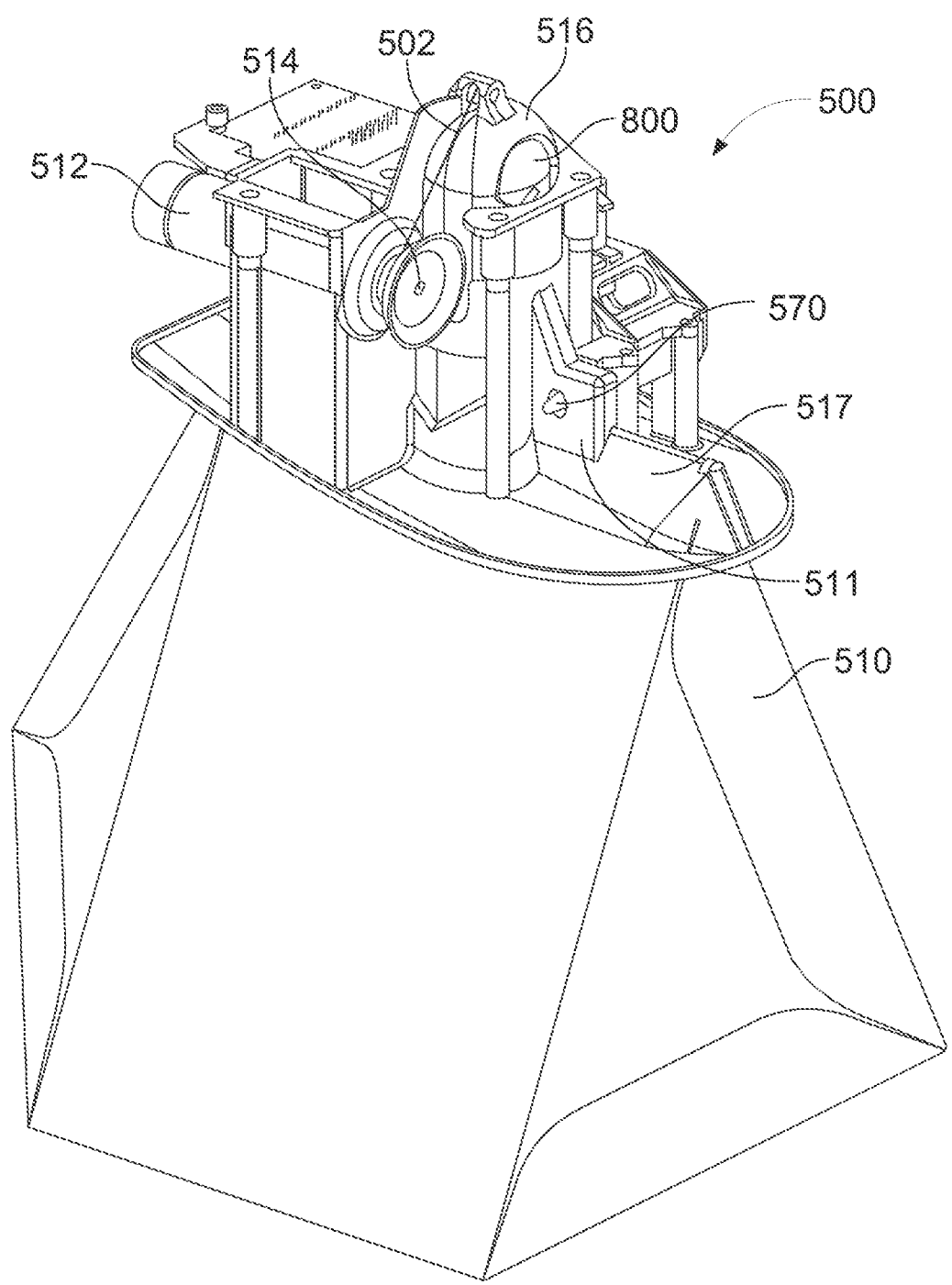
FIG. 5A shows a perspective view of a payload delivery apparatus 500 including payload 510, according to an example embodiment.

FIG. 5A shows a perspective view of a payload delivery apparatus 500 including payload 510, according to an example embodiment. The payload delivery apparatus 500 is positioned within a fuselage of a UAV (not shown) and includes a winch 514 powered by motor 512, and a tether 502 spooled onto winch 514. The tether 502 is attached to a payload coupling apparatus or payload retriever 800 positioned within a payload coupling apparatus receptacle 516 positioned within the fuselage of the UAV (not shown). A payload 510 is secured to the payload coupling apparatus 800. In this embodiment a top portion 517 of payload 510 is secured within the fuselage of the UAV. A locking pin 570 is shown extending through handle 511 attached to payload 510 to positively secure the payload beneath the UAV during high speed flight.

Figure 5B:
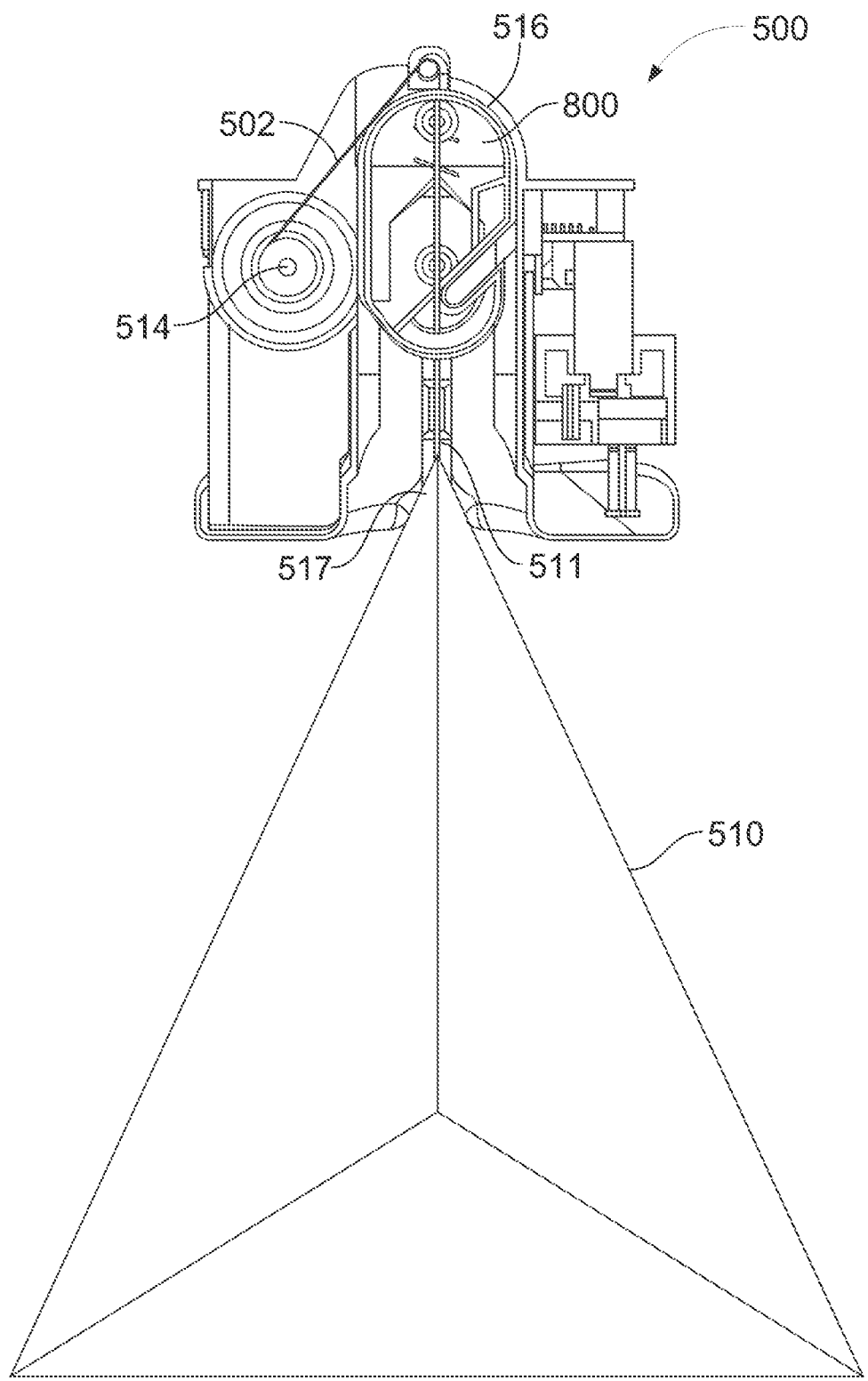
FIG. 5B is a cross-sectional side view of payload delivery apparatus 500 and payload 510 shown in FIG. 5A.

FIG. 5B is a cross-sectional side view of payload delivery apparatus 500 and payload 510 shown in FIG. 5A. In this view, the payload coupling apparatus is shown tightly positioned with the payload coupling apparatus receptacle 516. Tether 502 extends from winch 514 and is attached to the top of payload coupling apparatus 800. Top portion 517 of payload 510 is shown positioned within the fuselage of the UAV (not shown) along with handle 511.

Figure 5C:
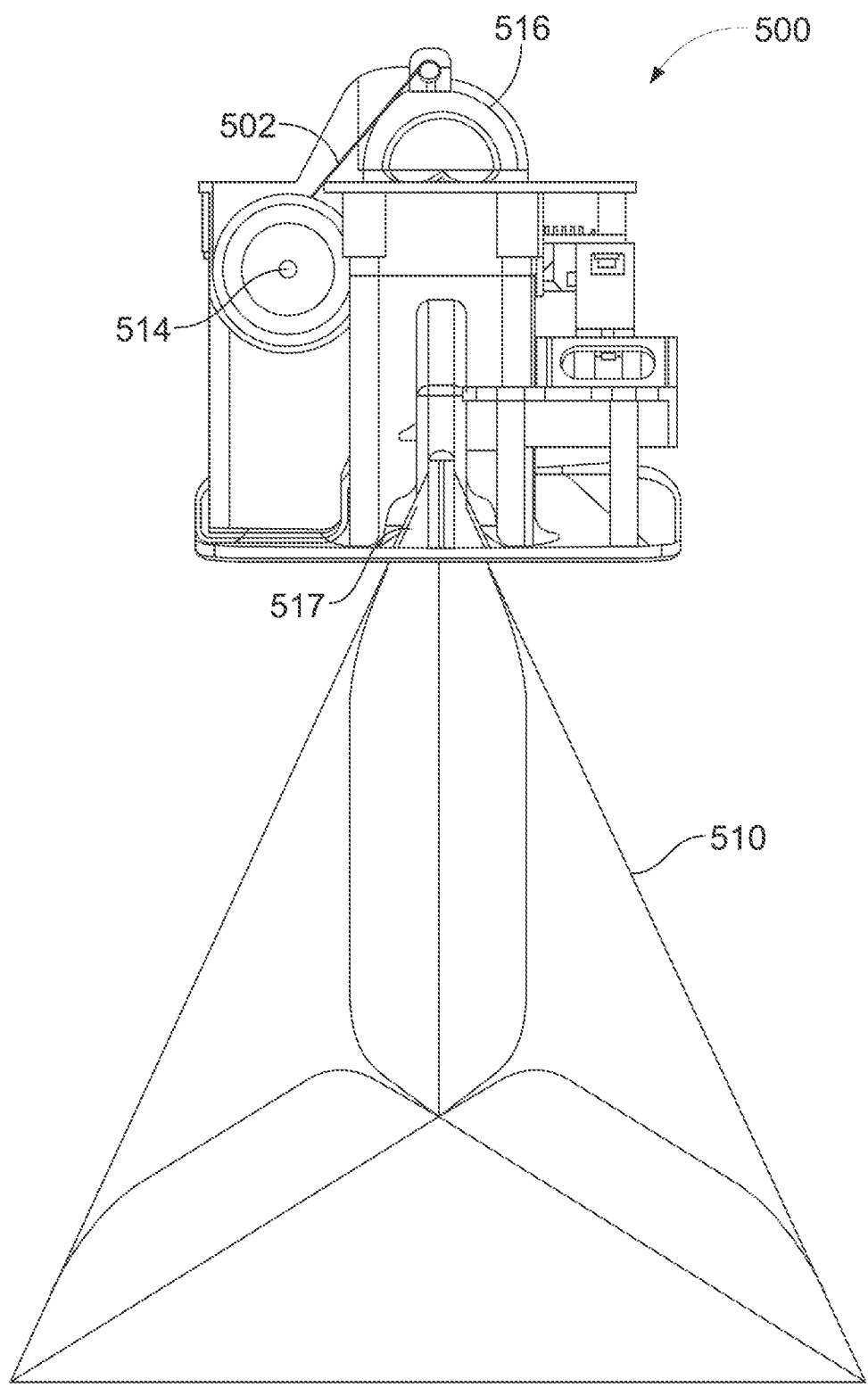
FIG. 5C is a side view of payload delivery apparatus 500 and payload 510 shown in FIGS. 5A and 5B.

FIG. 5C is a side view of payload delivery apparatus 500 and payload 510 shown in FIGS. 5A and 5B. The top portion 517 of payload 510 is shown positioned within the fuselage of the UAV. Winch 514 has been used to wind in tether 502 to position the payload coupling apparatus within payload coupling apparatus receptacle 516. FIGS. 5A-C disclose payload 510 taking the shape of an aerodynamic hexagonally-shaped tote, where the base and side walls are six-sided hexagons and the tote includes generally pointed front and rear surfaces formed at the intersections of the side walls and base of the tote providing an aerodynamic shape.

FIG. 6A is a perspective view of payload coupling apparatus 800, which may also be referred to as a payload retriever, according to an example embodiment. Payload coupling apparatus 800 includes tether mounting point 802, and a slot 808 to position a handle of a payload handle in. Lower lip, or hook, 806 is positioned beneath slot 808. Also included is an outer protrusion 804 having helical cam surfaces 804a and 804b that are adapted to mate with corresponding cam mating surfaces within a payload coupling apparatus receptacle positioned with a fuselage of a UAV.

FIG. 6B is a side view of payload coupling apparatus 800 shown in FIG. 6A. Slot 808 is shown positioned above lower lip, or hook, 806. As shown lower lip or hook 806 has an outer surface 806a that is undercut such that it does not extend as far outwardly as an outer surface above slot 805 so that the lower lip or hook 806 will not reengage with the handle of the payload after it has been decoupled, or will not get engaged with power lines or tree branches during retrieval to the UAV.

FIG. 6C is a front view of payload coupling apparatus 800 shown in FIGS. 6A and 6B. Lower lip or hook 806 is shown positioned beneath slot 808 that is adapted for securing a handle of a payload.

FIG. 7 is a perspective view of payload coupling apparatus 800 shown in FIGS. 6A-6C, prior to insertion into a payload coupling apparatus receptacle 516 positioned in the fuselage 550 of a UAV. As noted previously, payload coupling apparatus 800 includes a slot 808 positioned above lower lip or hook 806, adapted to receive a handle of a payload. The fuselage 550 of the payload delivery system 500 includes a payload coupling apparatus receptacle 516 positioned within the fuselage 550 of the UAV. The payload coupling apparatus 800 includes an outer protrusion 810 have helical cammed surfaces 810a and 810b that meet in a rounded apex. The helical cammed surfaces 810a and 810b are adapted to mate with surfaces 530a and 530b of an inward protrusion 530 positioned within the payload coupling apparatus receptacle 516 positioned within fuselage 550 of the UAV. Also included is a longitudinal recessed restraint slot 540 positioned within the fuselage 550 of the UAV that is adapted to receive and restrain a top portion of a payload (not shown). As the payload coupling apparatus 800 is pulled into to the payload coupling apparatus receptacle 516, the cammed surfaces 810a and 810b of outer protrusion 810 engage with the cammed surfaces 530a and 530b within the payload coupling apparatus receptacle 516 and the payload coupling apparatus 800 is rotated into a desired alignment within the fuselage 550 of the UAV.

FIG. 8 is another perspective view of an opposite side of payload coupling apparatus 800 shown in FIGS. 6A-6C, prior to insertion into a payload coupling apparatus receptacle 516 positioned in the fuselage 550 of a UAV. As shown, payload coupling apparatus 800 include a lower lip or hook 806. An outer protrusion 804 is shown extending outwardly from the payload coupling apparatus having helical cammed surfaces 804a and 804b adapted to engage and mate with cammed surfaces 530a and 530b of inner protrusion 530 positioned within payload coupling apparatus receptacle 516 positioned within fuselage 550 of payload delivery system 500. It should be noted that the cammed surfaces 804a and 804b meet at a sharp apex, which is asymmetrical with the rounded or blunt apex of cammed surfaces 810a and 810b shown in FIG. 7. In this manner, the rounded or blunt apex of cammed surfaces 810a and 810b prevent possible jamming of the payload coupling apparatus 800 as the cammed surfaces engage the cammed surfaces 530a and 530b positioned within the payload coupling apparatus receptacle 516 positioned within fuselage 550 of the UAV. In particular, cammed surfaces 804a and 804b are positioned slightly higher than the rounded or blunt apex of cammed surfaces 810a and 810b. As a result, the sharper tip of cammed surfaces 804a and 804b engages the cammed surfaces 530a and 530b within the payload coupling apparatus receptacle 516 positioned within the fuselage 550 of payload delivery system 500, thereby initiating rotation of the payload coupling apparatus 800 slightly before the rounded or blunt apex of cammed surfaces 810a and 810b engage the corresponding cammed surfaces within the payload coupling apparatus receptacle 516. In this manner, the case where both apexes (or tips) of the cammed surfaces on the payload coupling apparatus end up on the same side of the receiving cams within the payload coupling apparatus receptacle is prevented. This scenario results in a prevention of the jamming of the payload coupling apparatus within the receptacle.

Figure 9:
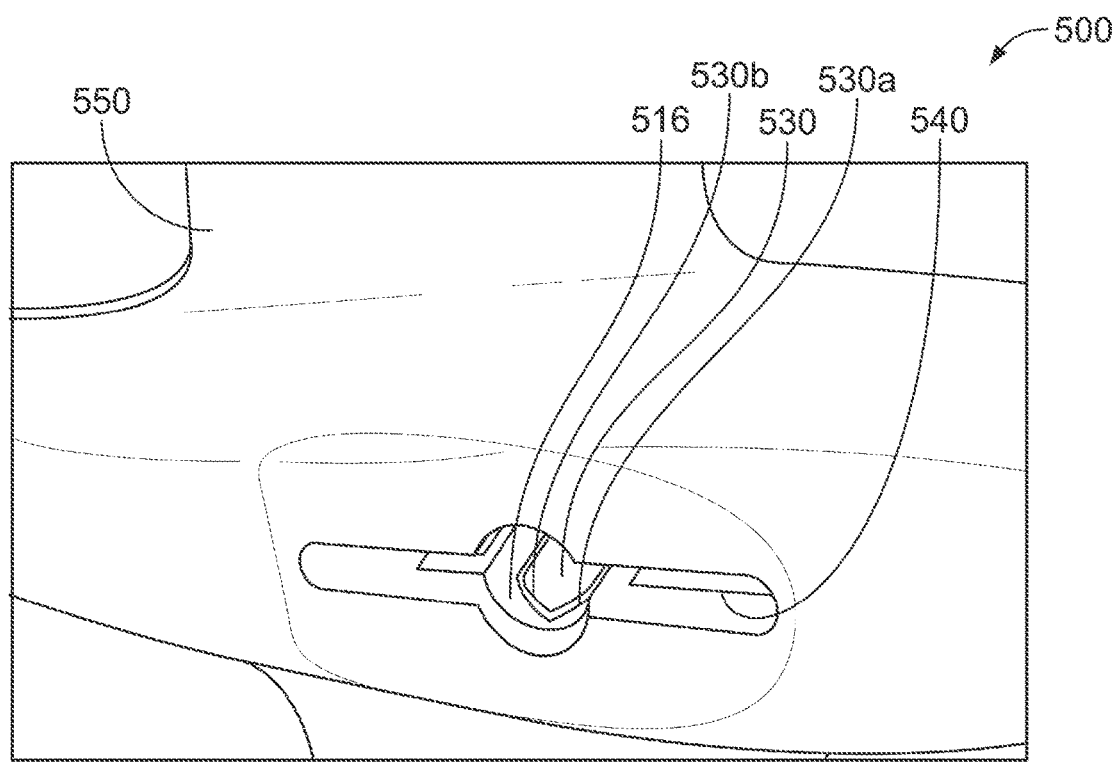
FIG. 9 shows a perspective view of a recessed restraint slot and payload coupling apparatus receptacle positioned in a fuselage of a UAV.

FIG. 9 shows a perspective view of a recessed restraint slot and payload coupling apparatus receptacle positioned in a fuselage of a UAV. In particular, payload delivery system 500 includes a fuselage 550 having a payload coupling apparatus receptacle 516 therein that includes inward protrusion 530 having cammed surfaces 530a and 530b that are adapted to mate with corresponding cammed surfaces on a payload coupling apparatus (not shown). Also included is a longitudinally extending recessed restrained slot 540 into which a top portion of a payload is adapted to be positioned and secured within the fuselage 550.

Figure 10A:
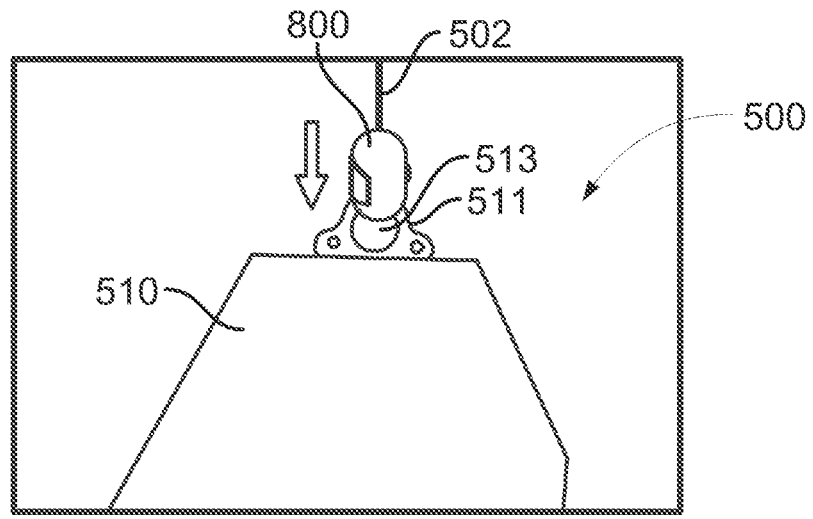
FIG. 10A shows a side view of a payload delivery apparatus 500 with a handle 511 of payload 510 secured within a payload coupling apparatus 800 as the payload 510 moves downwardly prior to touching down for delivery.

FIG. 10A shows a side view of a payload delivery apparatus 500 with a handle 511 of payload 510 secured within a payload coupling apparatus 800 as the payload 510 moves downwardly prior to touching down for delivery. Prior to payload touchdown, the handle 511 of payload 510 includes a hole 513 through which a lower lip or hook of payload coupling apparatus 800 extends. The handle sits within a slot of the payload coupling apparatus 800 that is suspended from tether 502 of payload delivery system 500 during descent of the payload 510 to a landing site.

Figure 10B:
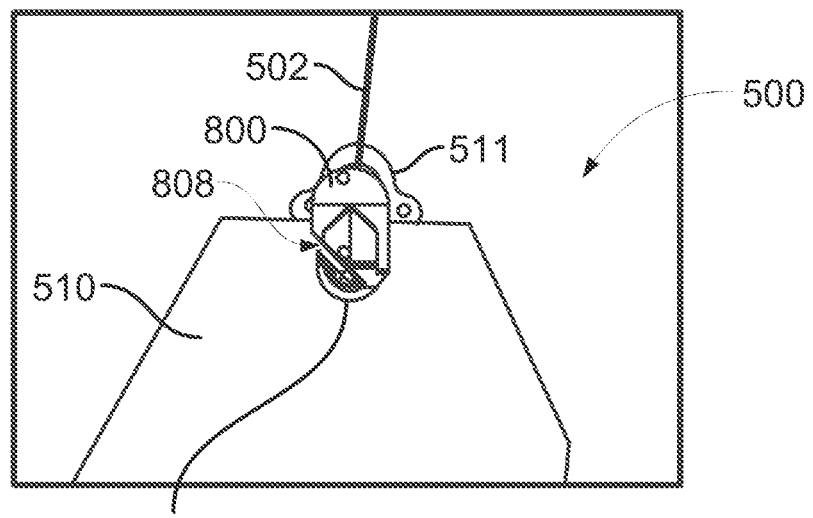
FIG. 10B shows a side view of payload delivery apparatus 500 after payload 510 has landed on the ground showing payload coupling apparatus 800 decoupled from handle 511 of payload 510.

FIG. 10B shows a side view of payload delivery apparatus 500 after payload 510 has landed on the ground showing payload coupling apparatus 800 decoupled from handle 511 of payload 510. Once the payload 510 touches the ground, the payload coupling apparatus 800 continues to move downwardly (as the winch further unwinds) through inertia or gravity and decouples the lower lip or hook 808 of the payload coupling apparatus 800 from handle 511 of payload 510. The payload coupling apparatus 800 remains suspended from tether 502, and can be winched back up to the payload coupling receptacle of the UAV.

Figure 10C:
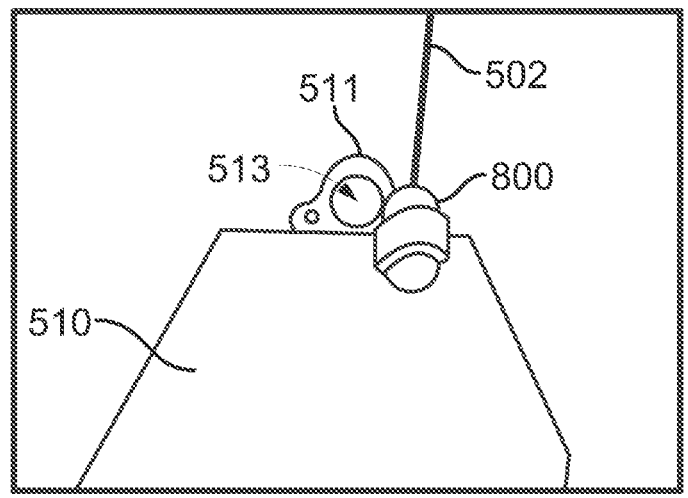
FIG. 10C shows a side view of payload delivery apparatus 500 with payload coupling apparatus 800 moving away from handle 511 of payload 510.

FIG. 10C shows a side view of payload delivery apparatus 500 with payload coupling apparatus 800 moving away from handle 511 of payload 510. Here the payload coupling apparatus 800 is completely separated from the hole 513 of handle 511 of payload 510. Tether 502 may be used to winch the payload coupling apparatus back to the payload coupling apparatus receptacle positioned in the fuselage of the UAV.

Figure 11A:
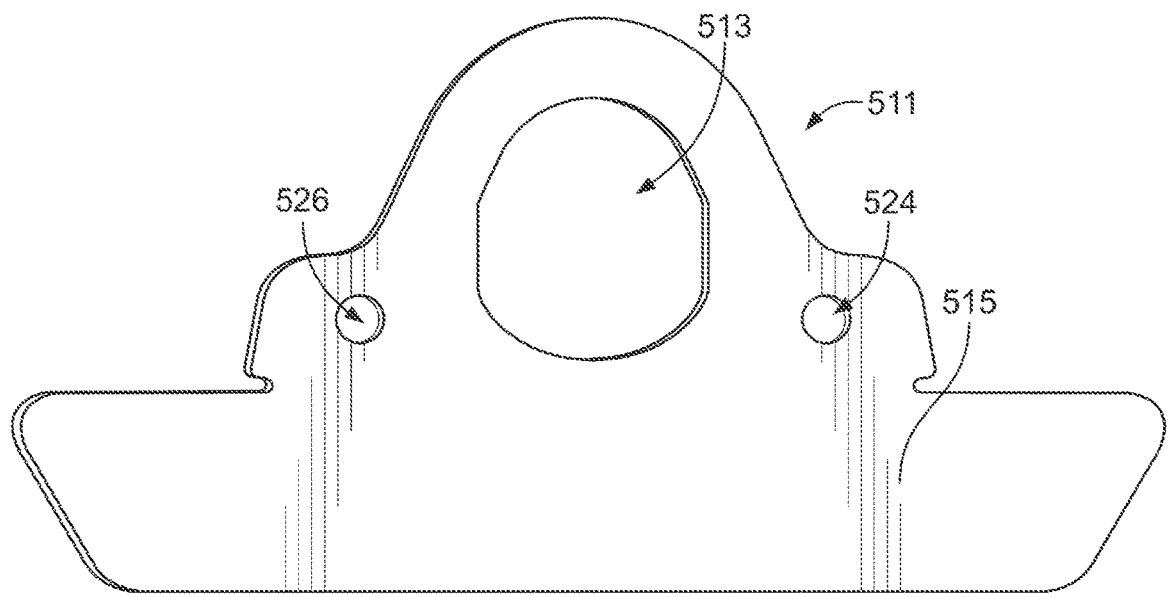
FIG. 11A is a side view of handle 511 of payload 510 having openings 524 and 526 adapted to receive pins positioned on a payload holder, according to an example embodiment.

FIG. 11A is a side view of handle 511 of payload 510. The handle 511 includes an aperture 513 through which the lower lip or hook of a payload coupling apparatus extends through to suspend the payload during delivery, or for retrieval. The handle 511 includes a lower portion 515 that is secured to the top portion of a payload. Also included are holes 524 and 526 through which locking pins positioned within the fuselage of a UAV, may extend to secure the handle and payload in a secure position during high speed forward flight to a delivery location. In addition, holes 524 and 526 are also designed for pins of a payload holder to extend therethrough to hold the payload in position for retrieval on a payload retrieval apparatus. The handle may be comprised of a thin, flexible plastic material that is flexible and provides sufficient strength to suspend the payload beneath a UAV during forward flight to a delivery site, and during delivery and/or retrieval of a payload. In practice, the handle may be bent to position the handle within a slot of a payload coupling apparatus. The handle 511 also has sufficient strength to withstand the torque during rotation of the payload coupling apparatus into the desired orientation within the payload coupling apparatus receptacle, and rotation of the top portion of the payload into position with the recessed restraint slot.

Figure 11B:
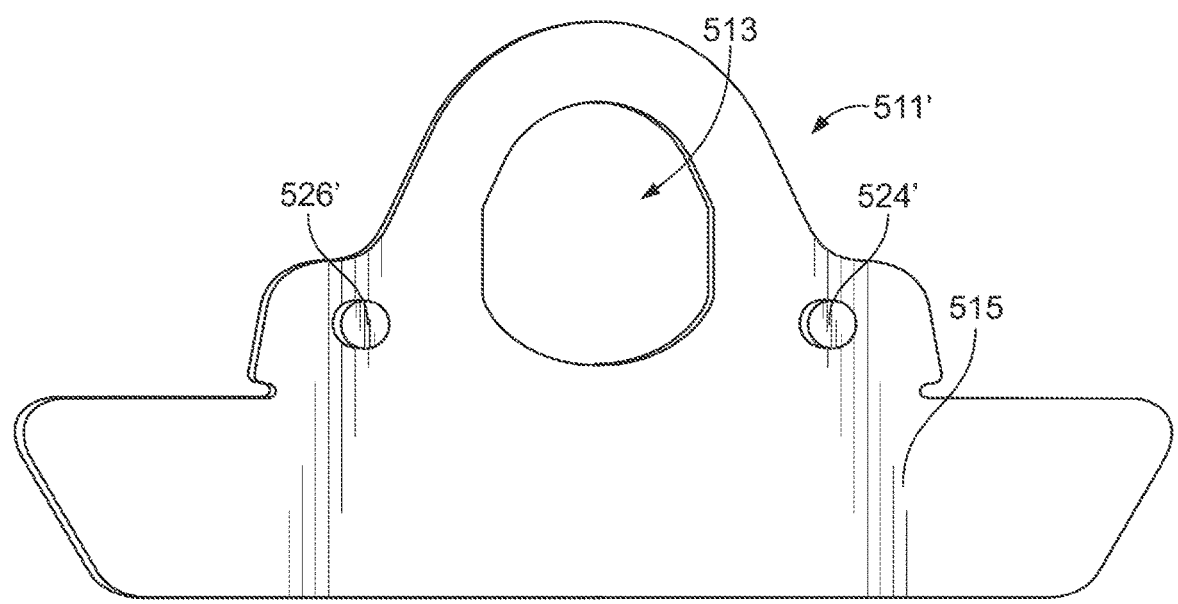
FIG. 11B is a side view of handle 511' of a payload having magnets 524' and 526' positioned thereon for magnetic engagement with a payload holder, according to an example embodiment.

FIG. 11B is a side view of handle 511' of payload 510. The handle 511' includes an aperture 513 through which the lower lip or hook of a payload coupling apparatus extends through to suspend the payload during delivery, or for retrieval. The handle 511' includes a lower portion 515 that is secured to the top portion of a payload. Also included are magnets 524' and 526' adapted for magnetic engagement with corresponding magnets (or a metal) of a payload holder to secure the payload to the payload holder in position for retrieval on a payload retrieval apparatus. In some examples, magnets 524' and 526' are provided on a handle (e.g., handle 511 or 511') in place of holes 524 and 526. In other examples, magnets 524' and 526' are provided in addition to holes 524 and 526.

Figure 12:
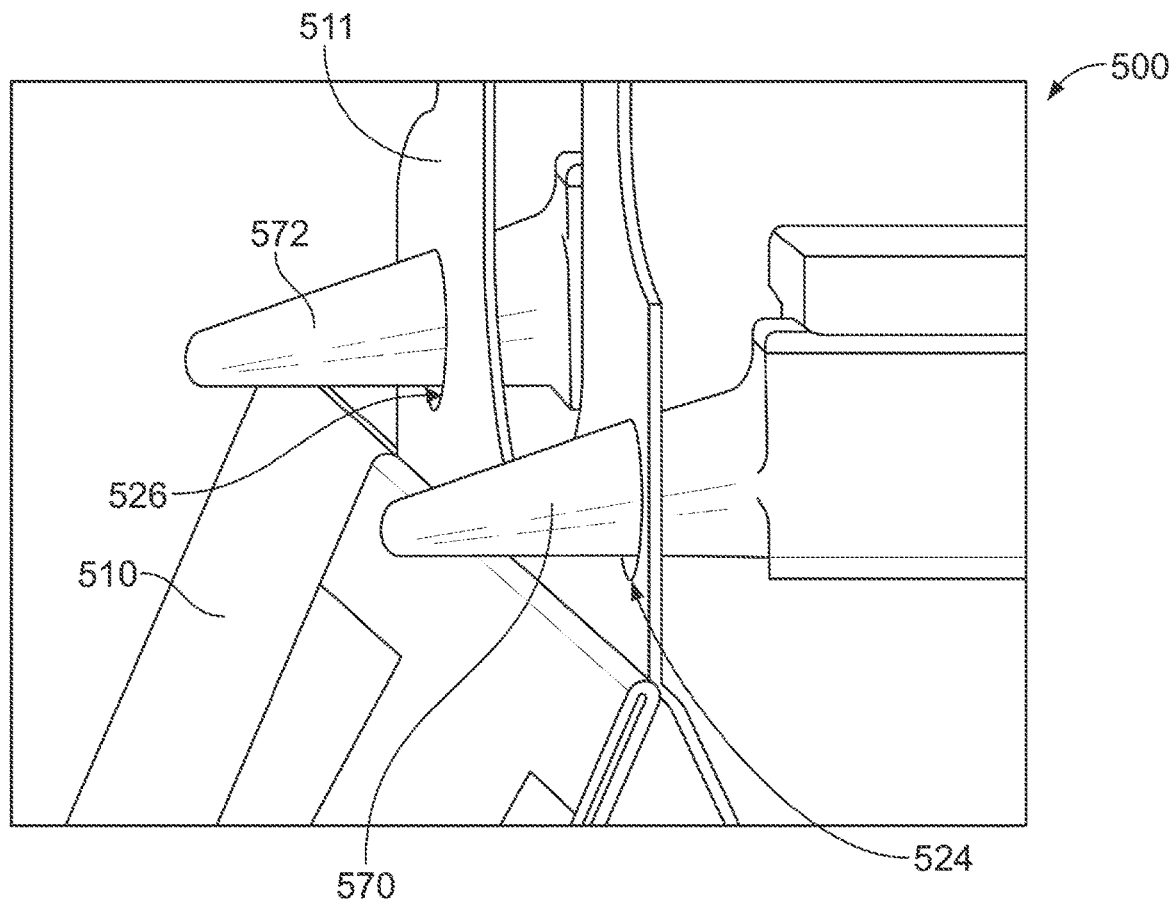
FIG. 12 shows a pair of locking pins 570, 572 extending through holes 524 and 526 in handle 511 of payload 510 to secure the handle 511 and top of payload 510 within the fuselage of a UAV, or to secure the handle 511 to a payload holder on a payload retrieval apparatus.

FIG. 12 shows a pair of pins 570, 572 extending through holes 524 and 526 in handle 511 of payload 510 to secure the handle 511 and top portion of payload 510 within the fuselage of a UAV, or to secure payload 510 to a payload holder of a payload retrieval apparatus. In this manner, the handle 511 and payload 510 may be secured within the fuselage of a UAV, or to a payload holder of a payload retrieval apparatus. In this embodiment, the pins 570 and 572 have a conical shape so that they pull the package up slightly or at least remove any downward slack present. In some embodiments the pins 570 and 572 may completely plug the holes 524 and 526 of the handle 511 of payload 510, to provide a secure attachment of the handle and top portion of the payload within the fuselage of the UAV, or to secure the payload to a payload retrieval apparatus. Although the pins are shown as conical, in other applications they may have other geometries, such as a cylindrical geometry.

Figure 13B:
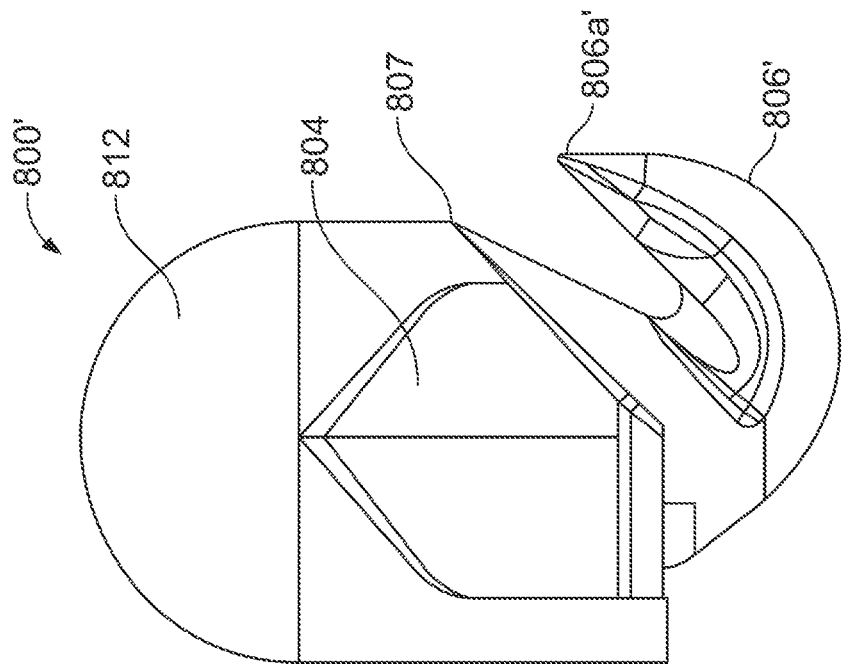
FIG. 13B is a side view of payload coupling apparatus 800' after lip 806' has been moved outwardly to facilitate engagement with a handle of a payload.
Figure 13A:
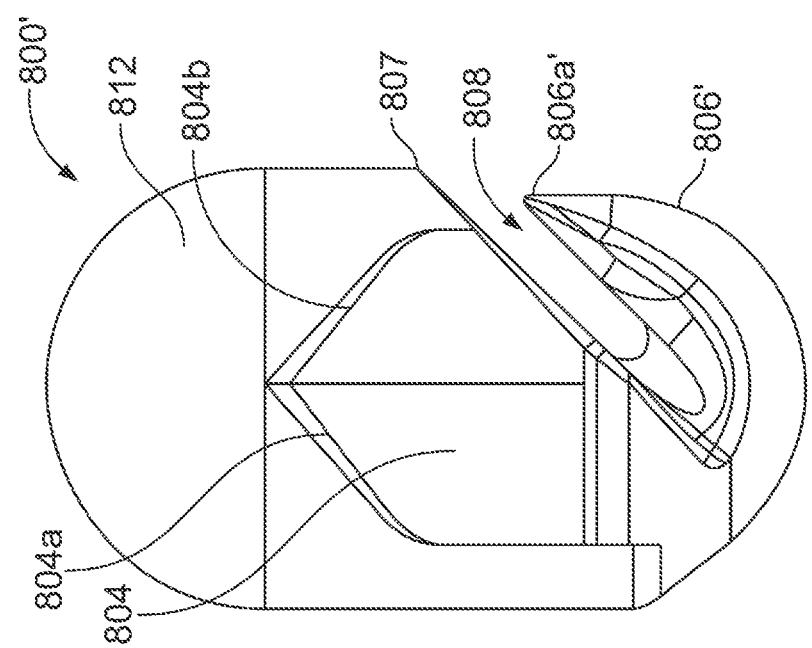
FIG. 13A is a side view of payload coupling apparatus 800' with a slot 808 positioned above lip 806', according to an example embodiment.

FIGS. 13A and 13B show various views of payload coupling apparatus or payload retriever 800' which is a variation of payload coupling apparatus 800 described above. Payload coupling apparatus 800' includes the same exterior features as payload coupling apparatus 800. However, in payload coupling apparatus 800', lower lip or hook 806' is extendable and retractable. As shown in FIG. 13A, payload coupling 800' is in a retracted state where end 806a' of lip or hook 806' is positioned inwardly from outer wall 807 of capsule housing 805. In FIG. 13B, payload coupling apparatus 800' is in an extended state where end 806a' of lip or hook 806' has been moved outwardly from capsule housing 805 such that the end 806a of the lip or hook 806' is positioned outwardly from outer wall 807 of capsule housing 805. Lip of hook 806' may be moved outwardly via cams or protrusions within channel 1050, or by a spring-loaded portion of channel 1050, or other mechanisms. In the extended state shown in FIG. 13B, the hook or lip 806' is in position to easily extend through the aperture 513 in handle 511 of payload 510, such that the handle 511 is positioned within slot 808 of payload coupling apparatus 800' and retrieval of the payload and removal from the payload holder of the payload retrieval apparatus can be achieved. Once the payload 510 is removed from the payload holder the hook or lip 806' may be moved back to its retracted state as shown in FIG. 13A.

Figure 13C:
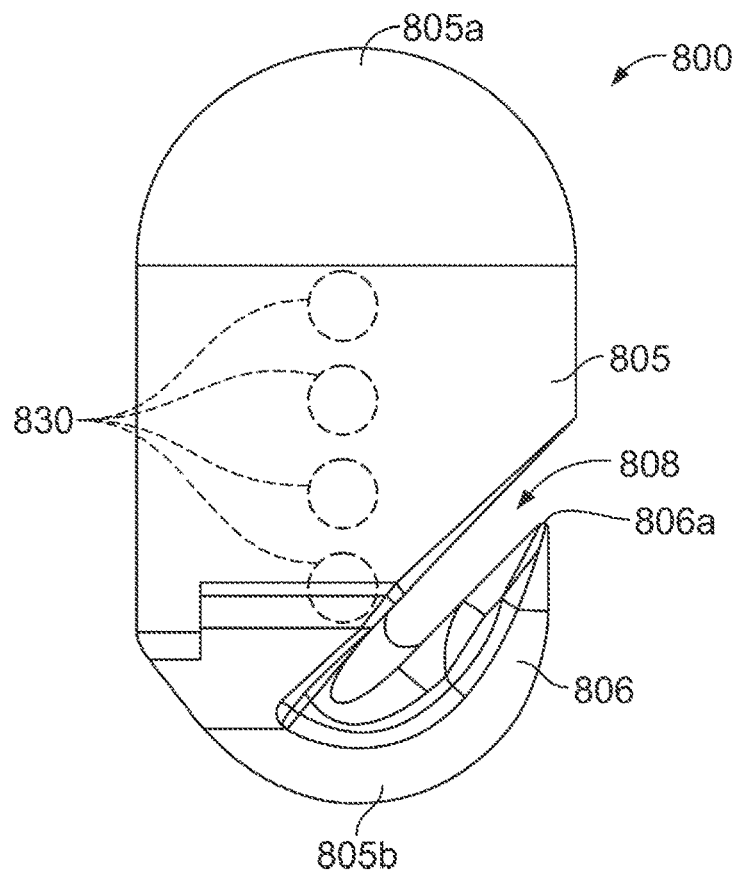
FIG. 13C is a side view of payload coupling apparatus 800 having a plurality of magnets 830 positioned thereon, according to an example embodiment.

FIG. 13C is a side view of payload coupling apparatus 800" which in this illustrative embodiment is the similar to payload coupling apparatus 800 shown in FIGS. 6A-6C, but instead includes a plurality of magnets 830 positioned thereon. The plurality of magnets 830 are adapted to magnetically engage a plurality of magnets 1060 (or a metal) positioned within the channel 1050 of a payload retrieval apparatus 1000 as shown in FIG. 20 below to orient the payload coupling apparatus 800" within the channel 1050 of payload retrieval apparatus 1000 so that the hook or lip 806a is in proper position to extend through aperture 513 of handle 511 of payload 510 to effect removal of payload 510 from the payload holder of payload retrieval apparatus 1000.

Figure 13D:
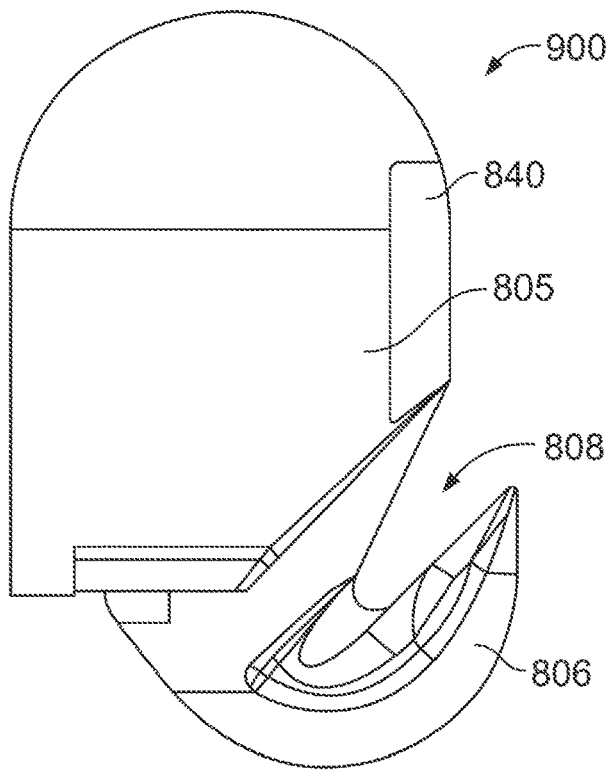
FIG. 13D is a side view of payload coupling apparatus 900 having a weighted side 840, according to an example embodiment.

FIG. 13D is a side view of payload coupling apparatus 900 which in this illustrative embodiment is similar to payload coupling apparatus 800" shown in FIG. 6C, but instead includes a weighted side 840. The weighted side 840 serves to orient the payload coupling apparatus 900 within the channel 1050 of payload retrieval apparatus 1000 so that the hook or lip 806a is in proper position to extend through aperture 513 of handle 511 of payload 510 to effect removal of payload 510 from the payload holder of payload retrieval apparatus 1000.

In each of the payload coupling apparatuses 800, 800', 800", and 900 described above, the upper and lower ends are rounded, or hemispherically shaped, to prevent the payload coupling apparatus from snagging during descent from, or retrieval to, the fuselage of a UAV. Furthermore, each of payload coupling apparatuses 800, 800", and 900 may have a retractable and extendable hook or lip as is shown in FIGS. 13A and 13B with regard to payload coupling apparatus 800'.

In addition, as illustrated in FIG. 9, the payload delivery system may automatically align the top portion of the payload during winch up, orienting it for minimum drag along the aircraft's longitudinal axis. This alignment enables high speed forward flight after pick up. The alignment is accomplished through the shape of the payload hook and receptacle. In the payload coupling apparatus 800, the lower lip or hook 806 has cam features around its perimeter which always orient it in a defined direction when it engages into the cam features inside the receptacle of the fuselage of the UAV. The tips of the cam shapes on both sides of the capsule are asymmetric to prevent jamming in the 90 degree orientation. In this regard, helical cam surfaces may meet at an apex on one side of the payload coupling mechanism, and helical cam surfaces may meet at a rounded apex on the other side of the payload coupling mechanism. The hook is specifically designed so that the package hangs in the centerline of the hook, enabling alignment in both directions from 90 degrees.

Payload coupling apparatuses 800, 800', 800", and 900 include a hook 806 (or 806') formed beneath a slot 808 such that the hook also releases the payload passively and automatically when the payload touches the ground upon delivery. This is accomplished through the shape and angle of the hook slot and the corresponding handle on the payload. The hook slides off the handle easily when the payload touches down due to the mass of the capsule and also the inertia wanting to continue moving the capsule downward past the payload. The end of the hook is designed to be recessed slightly from the body of the capsule, which prevents the hook from accidentally re-attaching to the handle. After successful release, the hook gets winched back up into the aircraft.

Figure 14:
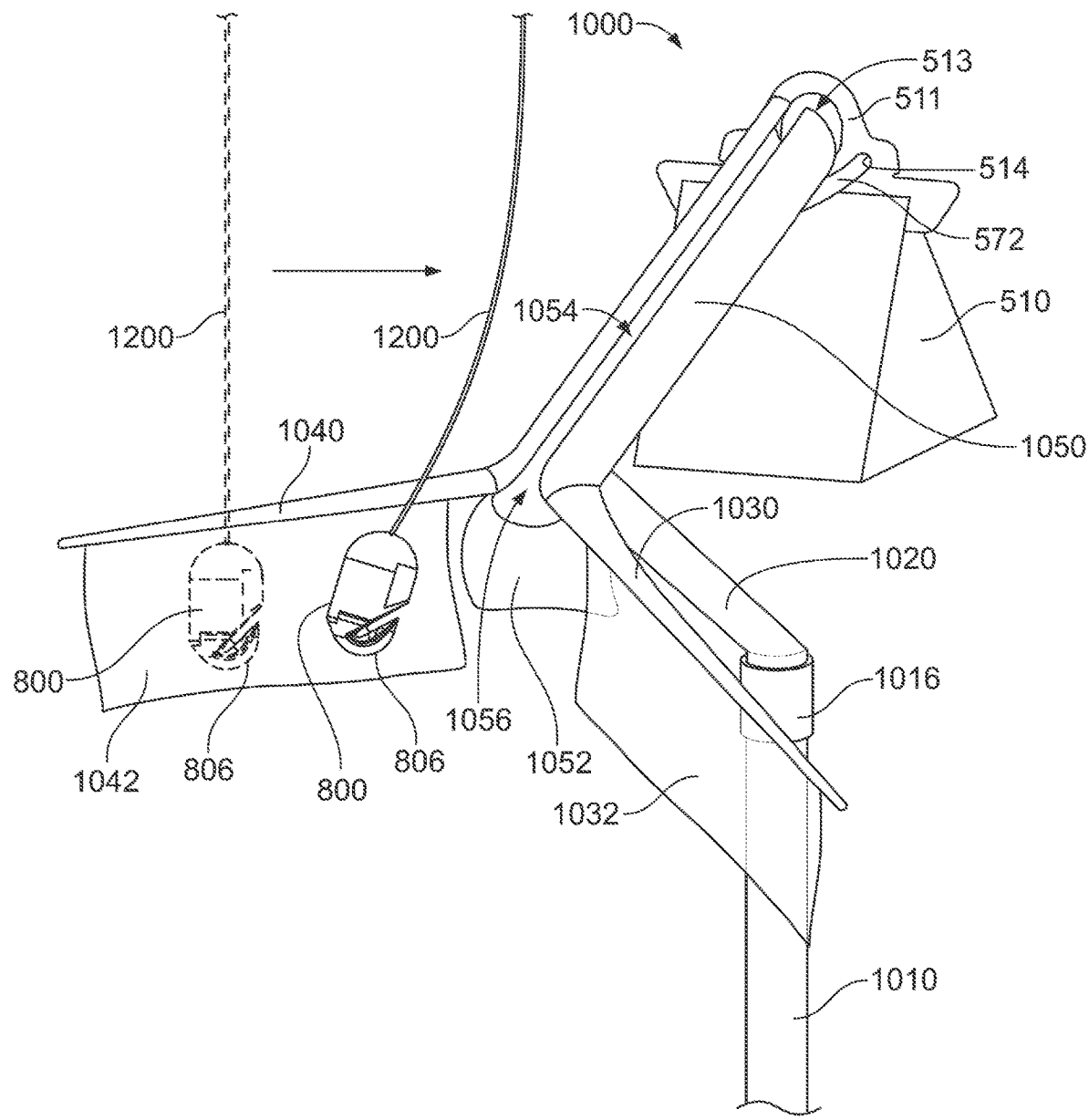
FIG. 14 is a perspective view of payload retrieval apparatus 1000 having a payload 510 positioned thereon, according to an example embodiment.
Figure 15:
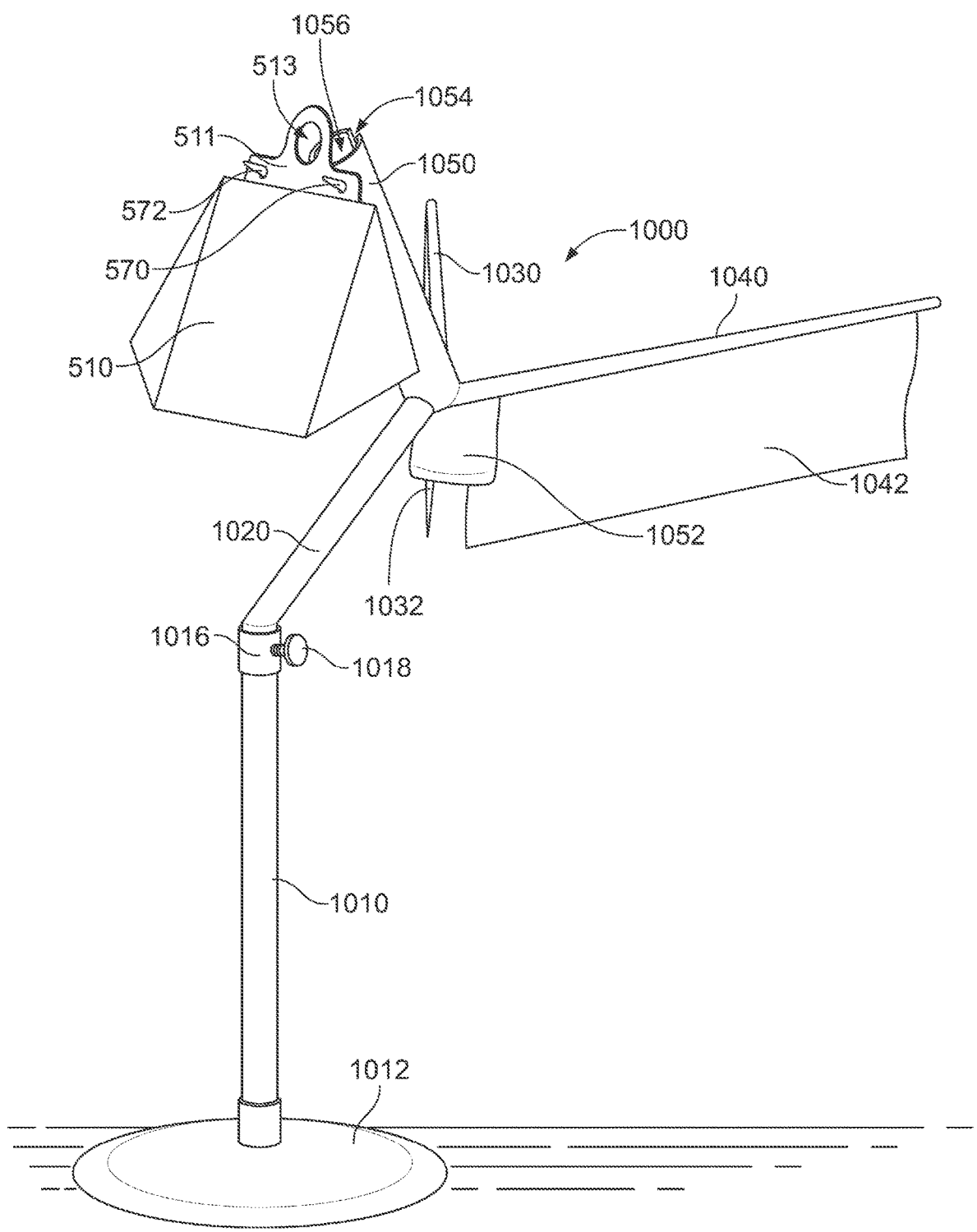
FIG. 15 is another perspective view of payload retrieval apparatus 1000 and payload 510 shown in FIG. 14.
Figure 16:
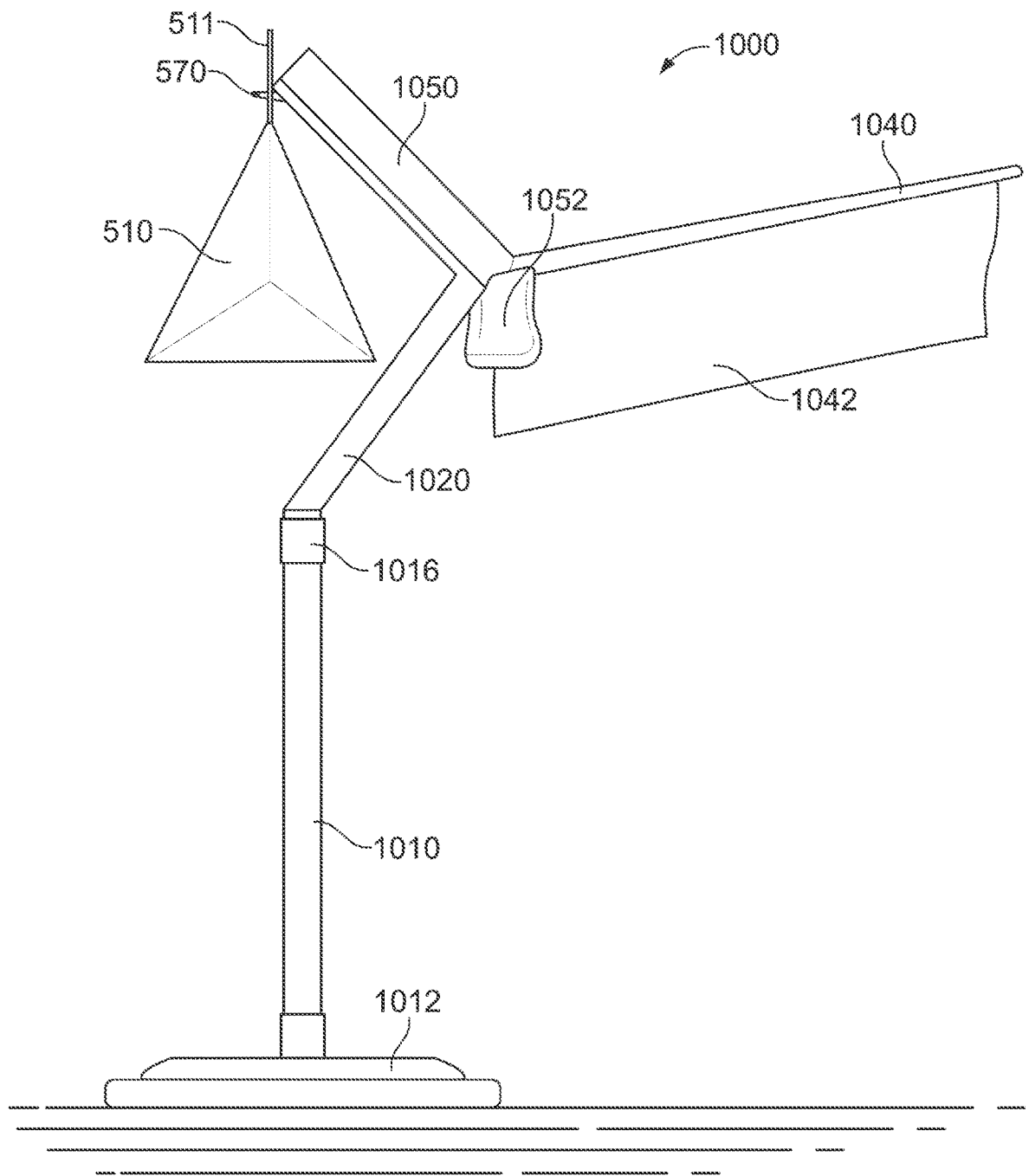
FIG. 16 is a further perspective view of payload retrieval apparatus 1000 and payload 510 shown in FIGS. 14 and 15.

FIGS. 14-16 are perspective views of payload retrieval apparatus 1000 having a payload 510 positioned thereon, according to an example embodiment. The payload retrieval apparatus 1000 may be a non-permanent structure placed at a payload retrieval site. The apparatus includes an extending member 1010 that may be secured to a base or stand 1012 at a lower end of the extending member 1010. Alternately, the extending member 1010 may have a lower end that may be positioned within a corresponding hole in the ground or hole in an apparatus positioned on the ground. The payload retrieval apparatus 1000 may be readily folded up, like an umbrella stand, to provide for ease of transport. In addition, because of its non-permanent configuration, payload retrieval apparatus 1000 may not require any type permitting, which may not be the case for a permanent device used for UAV loading and unloading.

An angled extender 1020 may be attached at an upper end of the extending member 1010, and adapter 1016 may be used to adjust the height or angle of the angled extender 1020, and having a threaded set screw with knob 1018 to set the angled extender 1020 into a desired position. The angled extender 1020 is shown with an upper end secured to a channel 1050. A first end of the channel may have a first extension or tether engager 1040 that extends in a first direction from a lower end of the channel 1050 and a second extension or tether engager 1030 that extends in a second direction from the lower end of the channel 1050. A second end of the channel 1050 may have a payload holder 570, 572 positioned near or thereon that is adapted to secure a payload 510 to the second end of the channel 1050.

A shield 1042 is shown extending from the first tether engager 1040, and another shield 1032 is shown extending from the second tether engager 1030. Shield 1042 and 1032 may be made of a fabric material, or other material such as rubber or plastic. A shield 1052 is also shown extending from the first end of channel 1050. Shields 1042, 1032, and 1052 serve to prevent a payload retriever 800 extending from an end of a tether 1200 attached to a UAV from wrapping around the tether engagers 1040 and 1032 or other components of payload retrieval apparatus 1000 when the payload retriever comes into contact with tether engagers 1040 or 1030 during a payload retrieval operation.

Channel 1050 includes a tether slot 1054 extending from a first end to a second end of the channel 1050, and the tether slot 1054 allows for a payload retriever to be positioned within the channel 1050 attached to a tether which extends through the tether slot 1054. A payload holder is shown that is a pair of pins 570, 572 that extend through openings in handle 511 of payload 510 to suspend payload 510 in position adjacent the second end of the channel 1050 ready to be retrieved by a payload retriever attached to a tether suspended from a UAV.

Figure 17:
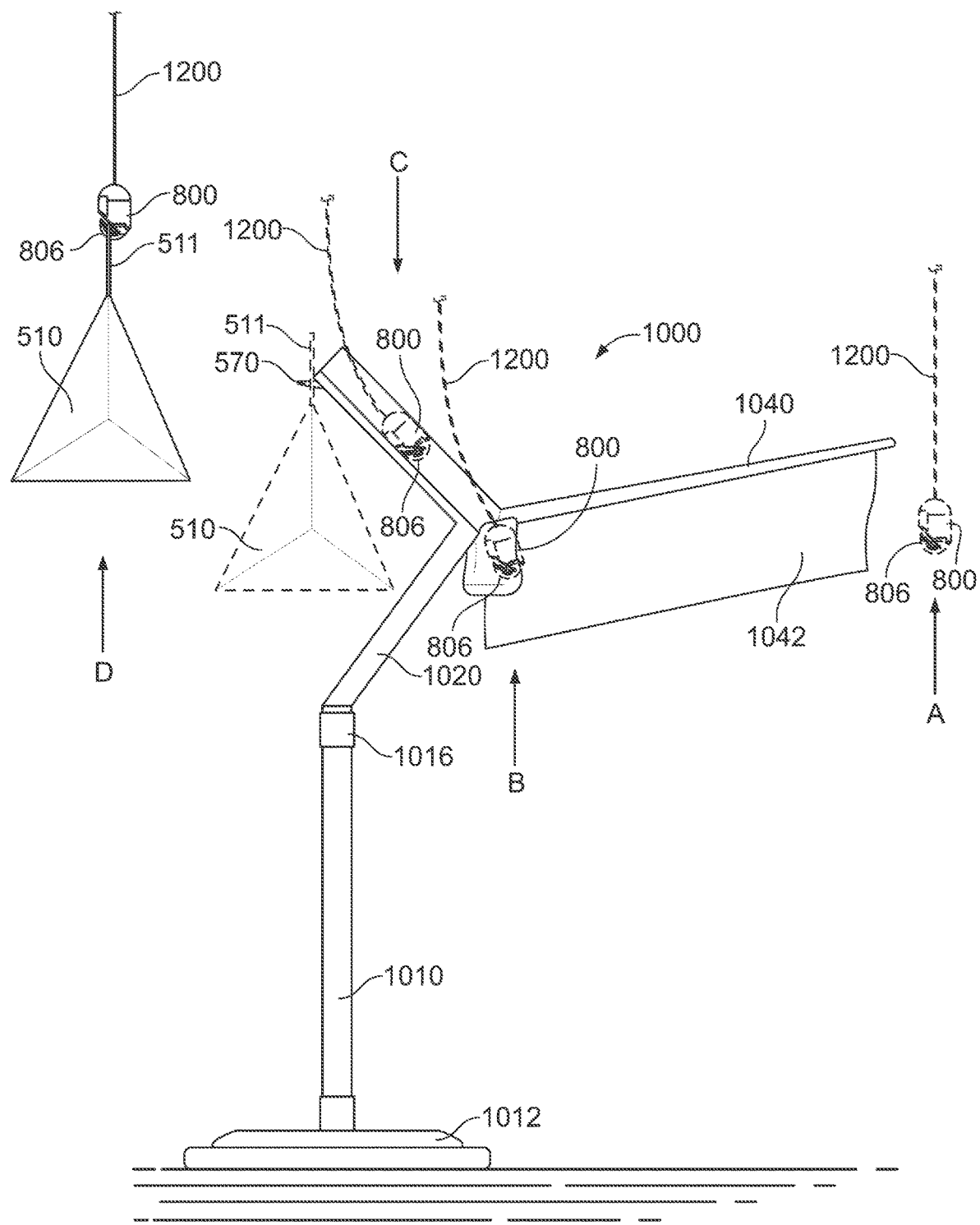
FIG. 17 shows a sequence of steps A-D performed in the retrieval of payload 510 from payload retrieval apparatus 1000 shown in FIGS. 14-16.

To provide for automatic retrieval of payload 510 with a payload retriever suspended from a UAV with a tether, payload 510 is secured to the payload holder 570, 572 on the second end of the channel 1050 at the payload retrieval site. A UAV arrives at the payload retrieval site with a tether 1200 extending downwardly from the UAV and with the payload retriever 800 positioned on the end of the tether, as shown in FIGS. 14 and 17. The UAV approaches the payload retrieval apparatus 1000, and as it nears the payload retrieval apparatus 1000, the tether 1200 comes into contact with the first or second extension (tether engager) 1040, 1030. As the UAV moves forward, or the UAV is moved upwardly, or the payload retriever is winched upwardly to the UAV while the UAV is hovering in place (or any combination thereof), the tether slides inwardly along the first or second extension 1040, 1030 where it is directed towards the first end of the channel 1050. With further forward or upward movement of the UAV, or upward winching of the payload retriever, the tether 1200 moves through the tether slot 1054 of channel 1050 and eventually the payload retriever 800 attached to the tether 1200 is pulled into the channel 1050 by the tether. The payload retriever 800 is pulled through the channel 1050 where it engages, and secures, the payload 510 secured to the payload holder 570, 572. The payload retriever 800 then pulls the payload 510 free from the payload holder 570, 572. Once the payload 510 is free from the payload holder 570, 572, the payload 510 may be winched upwardly into secure engagement with the UAV, and the UAV may continue on to a delivery site where the payload 510 may be delivered by the UAV.

FIG. 17 shows a sequence of steps A-D performed in the retrieval of payload 510 from payload retrieval apparatus 1000, shown in FIGS. 14-16. A payload retriever, shown in FIG. 17 as payload coupling apparatus 800 having a hook or lip 806 positioned beneath slot 808, is attached to an end of tether 1200 which is in turn attached to a UAV. At point A in the sequence of steps shown from right to left, payload retriever 800 is shown suspended at the end of tether 1200 at a position below the height of tether engagers 1040 and 1030. Payload retriever 800 and tether 1200 move towards the payload retrieval apparatus 1000, where tether 1200 contacts tether engager 1040 or tether engager 1030, and tether 1200 and payload retriever 800 move towards channel 1050 until payload retriever 800 is positioned just outside of channel 1050 shown at point B in the sequence. With further forward or upward movement of the UAV, or upward winching of payload retriever 800 (or any combination thereof), tether 1200 extends through tether slot 1054 of channel 1050 and payload retriever 800 is positioned within channel 1050 as shown at point C of the sequence. With further forward or upward movement of the UAV, or upward winching of the payload retriever 800 (or any combination thereof), payload retriever 800 exits channel 1050 and hook or lip 806 of payload retriever 800 engages handle 511 of payload 510 and removes payload 510 from payload holder 570, 572 positioned on the end of the channel 1050. After removal of payload 510 from payload holder 570, 572 of payload retrieval apparatus 1000, at point D of the sequence, payload 510 is suspended from tether 1200 with handle 511 of payload 510 positioned in slot 808 above hook or lip 806 of payload retriever 800, where payload 510 may be winched up to the UAV and flown for subsequent delivery at a payload delivery site.

Figure 18:
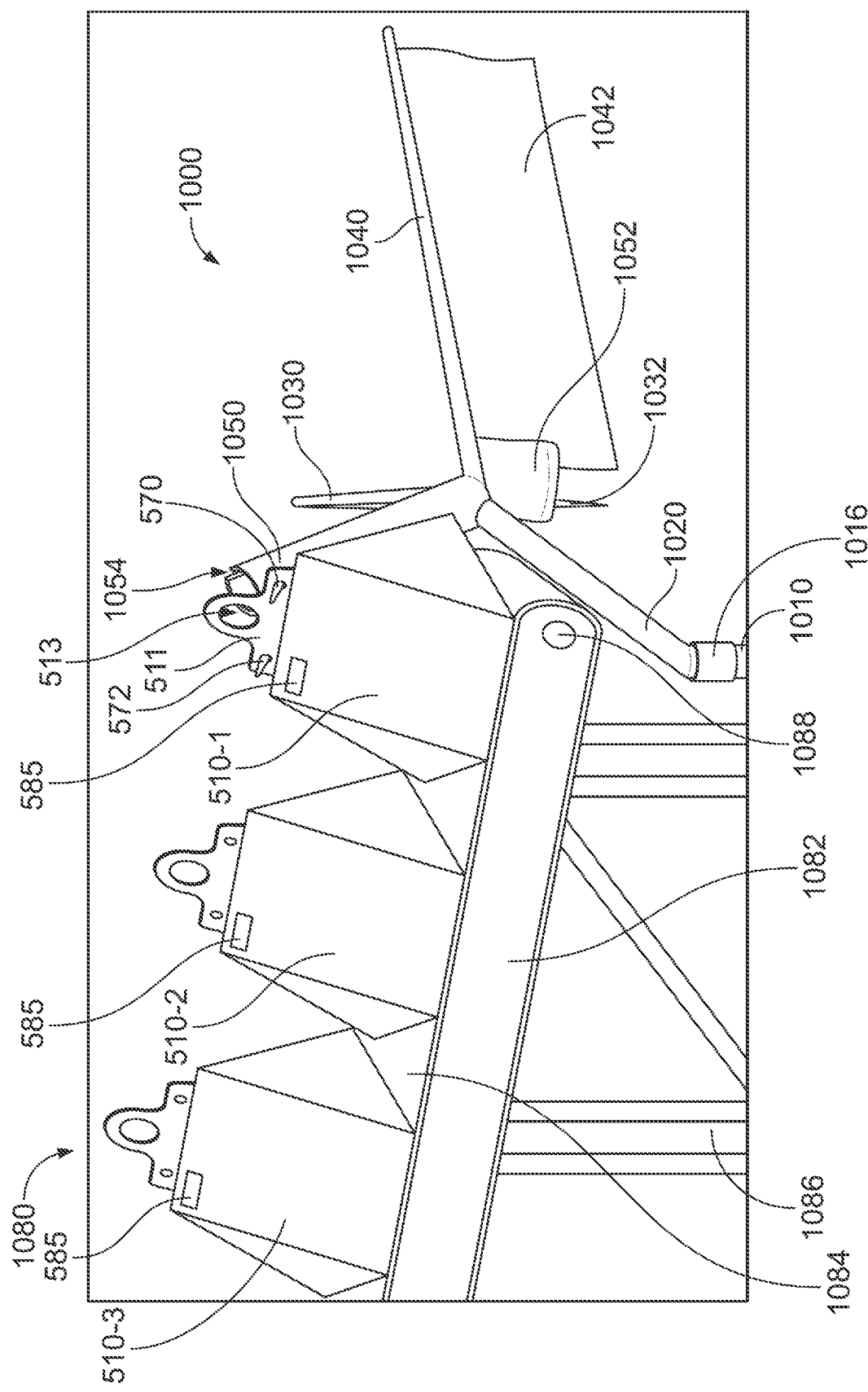
FIG. 18 is a perspective view of payload retrieval apparatus 1000 shown in FIGS. 14-17 with a payload loading apparatus 1080 having a plurality of payloads positioned thereon, according to an example embodiment.

FIG. 18 is a perspective view of payload retrieval apparatus 1000 shown in FIGS. 14-17 with a payload loading apparatus 1080 having a plurality of payloads 510-2 and 510-3 positioned thereon, according to an example embodiment. Payload loading apparatus 1080 includes a platform 1082 positioned on platform base 1086 having an upper surface 1084 that downwardly slopes towards payload retrieval apparatus 1000. Payload loading apparatus 1080 allows for automatic loading of a subsequent payload positioned on upper surface 1084 of payload loading apparatus 1080 onto payload retrieval apparatus 1000 after a payload positioned on the payload holder has been retrieved. In particular, once payload 510-1 has been removed from payload holder 570, 572 of payload retrieval apparatus 1000, subsequent payload 510-2 slides down the upper surface 1084 of the payload loading apparatus 1080 and is secured to payload holder 570, 572 of payload retrieval apparatus 1000. Payload loading apparatus 1080 may include one or more rollers 1088 that provide for the downward movement of upper surface 1084, like a conveyor belt.

As shown in FIG. 18, the handle 511 of payload 510-1 has openings 524 and 526 (see FIG. 11A) through which pins 570, 572 extend to hold payload 510-1 in position for retrieval. However, handle 511 may also include magnets 524' and 526' (see FIG. 11B) that are adapted to magnetically engage corresponding magnets or a metal positioned on the payload holder of the payload retrieval apparatus 1000. With a magnetic handle, the magnets 524' and 526' on the handle 511 move into engagement with the payload holder to hold subsequent payload 510-2 into position for subsequent retrieval as illustrated in the sequence of steps at points A-D shown in FIG. 17. In addition, payloads 510-1 through 510-3 may include fiducials 585 that may take the form of an RFID tag or bar code to identify the contents of the payload and delivery site information and/or delivery instructions. As a result, using payload loading apparatus 1080 in conjunction with payload retrieval apparatus 1000, a plurality of payloads may be retrieved from payload apparatus 1000 without the need for a person to reload subsequent payloads for retrieval, providing for further automated payload retrieval.

In order for the hook or lip 806 of the payload retriever 800 (shown in FIGS. 6A-C) to engage the handle 511 of payload 510 to effect removal and retrieval of the payload 510 from the payload retrieval apparatus 1000, the hook or lip 806 should be positioned downwardly when it exits the channel 1050 in the embodiment shown (different orientations are possible in alternate embodiments). As illustrated in FIG. 19, to ensure that the slot hook or lip 806 of the payload retriever 800 is in a proper orientation as the payload retriever 800 exits the channel 1050 and engages the handle 511 of the payload 510, the payload retriever 800 may be provided with exterior cams 804 or slots that correspond to cams or slots 1058, 1059 positioned on an interior surface of the channel 1050. The interaction of the cams 804 or slots on the payload retriever 800 and cams or slots 1058, 1059 on the interior of the channel 1050 properly orient the payload retriever 800 within the channel 1050 such that hook or lip 806 beneath the slot 808 of the payload retriever 800 is in proper position to extend through the aperture 513 on the handle 511 of the payload 510 to remove the payload 510 from the payload holder 570, 572.

FIG. 19 is a perspective view of channel 1050 of the payload retrieval apparatus 1000 shown in FIGS. 14-16 with a payload retriever 800 positioned therein. Channel 1050 includes a tether slot 1054 through which tether 1200 extends when tether 1200 draws payload retriever 800 into the interior of channel 1050. The interior of channel 1050 includes cams or slots 1058, 1059 which cooperate with cams 804 or slots on the payload retriever 800 to properly orient the hook or lip 806 and slot 808 in a downward facing position within the channel 1050. Thus, the interaction of cams or slots 1058, 1059 on the interior of channel 1050 with cams 804 or slots on the payload retriever 800 provides a desired orientation of the payload retriever 800 at the point that payload retriever 800 exits the channel 1050 and engages handle 511 of payload 510 to remove the payload 510 from the payload holder 570, 572.

Alternately, or in addition to cams 804, the payload retriever 800" may have one or more magnets 830 positioned thereon as shown in FIGS. 13C and 20 that cooperate with one or more magnets 1060, or a metal, positioned on an interior of the channel 1050 and magnetic interaction is used to properly orient the payload retriever 800" within the channel 1050 during the process of payload retrieval.

FIG. 20 is a perspective view of channel 1050 of the payload retrieval apparatus 1000 shown in FIGS. 14-16 with a payload retriever 800" positioned therein. Channel 1050 includes a tether slot 1054 through which tether 1200 extends when tether 1200 draws payload retriever 800" into the interior 1056 of channel 1050. The interior 1056 of channel 1050 includes a plurality of magnets 1060 which magnetically engage with magnets 830, or a metal, on the payload retriever 800" to properly orient the hook or lip 806 and slot 808 in a downward facing position within the channel 1050. Thus, the interaction of magnets 1060 on the interior 1056 of channel 1050 with magnets 830 or simply a metal on the payload retriever 800" provides a desired orientation of the payload retriever 800" at the point that payload retriever 800" exits the channel 1050 and engages handle 511 of payload 510 to remove the payload 510 from the payload holder 570, 572. Alternatively, or in addition, a metal strip or plurality of metal pieces could be positioned within the channel 1050 to provide for magnetic engagement with the magnets 830 on the payload retriever 800". Similarly, one or more magnets may be positioned on the interior of channel 1050 that magnetically engage a metal positioned on a payload retriever.

In addition, the payload retriever could be weighted to have an offset center of gravity (see payload retriever 900 shown in FIG. 13D) such that the hook 806 and slot 808 of the payload retriever 900 are positioned properly (with the "heavy" portion of the capsule on a lower side) to engage the handle 511 of the payload 510 and effect removal of the payload 510 from the payload holder 570, 572. The weighted side 840 of payload retriever 900 helps to insure that the hook or lip 806 and slot 808 are positioned downwardly within the channel 1050 so as to be in position for the hook or lip 806 to extend through aperture 513 in handle 511 of payload 510 during the retrieval process. It will be appreciated that the use of cams, magnets, and a weighted side could all be used separately, or used in combination in whole or in part, to provide for a desired orientation of the payload retriever within the channel to effect removal of the payload from the payload retrieval apparatus 1000.

As shown in FIG. 21A, the channel 1050 may also have an interior that tapers downwardly, or decreases in size, as the channel 1050 extends from the first end where the payload retriever enters the interior 1056 of channel 1050 to the second end where the payload retriever exits the channel 1050 to further facilitate the proper orientation of the payload retriever within the channel. In addition, as shown in FIG. 21B, the second end of the channel 1050 could be spring loaded with a spring 1061 exerting a force against outer surface 1057 of channel 1050, or operate as a leaf spring, to also facilitate the proper orientation of the payload retriever (or extension or the hook or lip of the payload retriever) at the point of payload retrieval.

Not only does the payload retrieval apparatus 1000 described above provide for automatic payload retrieval without the need for human involvement, but the UAV advantageously is not required to land for the payload 510 to be loaded onto the UAV at the payload retrieval site. Thus, the UAV may simply fly into position near the payload retrieval apparatus 1000 and maneuver itself to position the tether 1200 between the first and second tether engagers 1040, 1030, which may be aided by the use of fiducials (which could take the form of an RFID tag or bar code) positioned on or near the payload retrieval apparatus 1000 and/or an onboard camera system positioned on the UAV. Once in position, the UAV may then move forward or upward, or the payload retriever may be winched up towards the UAV (or any combination thereof) to pull the payload retriever through the channel 1050 and into engagement with the handle 511 of the payload 510 and effect removal of the payload 510. In some payload retrieval sites, landing the UAV may be difficult or impractical, and also may engage with objects or personnel when landing. Accordingly, allowing for payload retrieval without requiring the UAV to land provides significant advantages over conventional payload retrieval methods.

FIG. 22 is a side view of payload retrieval apparatus 1400, which includes a base 1402 and an upwardly extending member 1404. Also included is a first sloped surface 1410 and a second sloped surface 1420. A first channel 1433 is defined between first sloped surface 1410 and surface 1430 and is positioned above upwardly extending member 1404. An opening 1432 is provided into first channel 1433. A payload 510 is positioned at an end of first channel 1433. A second channel 1424 is provided having a wall 1422 extending downwardly from second sloped surface 1420. First and second sloped surfaces 1410 and 1420 provide a funneling system for a payload retrieval 800 attached to a tether 1200 and serves to funnel payload retrieval 800 towards opening 1432 in first channel 1433.

FIG. 23 is a top view of payload retrieval apparatus 1400. Sloped surfaces 1460 and 1462 are provided with a tether slot 1450 positioned therebetween. Opening 1432 to channel 1433 is shown with payload 510 positioned beneath sloped surfaces 1460 and 1462.

FIGS. 24A-E illustrate a sequence of steps used to automatically pick up payload 510. In FIG. 24A, payload retriever 800 attached to tether 1200 is shown descending towards the funneling system formed by first sloped surface 1410 and second sloped surface 1420. FIG. 24B illustrates payload retriever 800 landing on first sloped surface 1410. The payload retriever will then slide down first sloped surface towards opening 1425 between first sloped surface 1410 and second sloped surface 1420. FIG. 24C illustrates payload retriever 800 after it has slid down first sloped surface 1410, through opening 1425 and into second channel 1424. While positioned in second channel 1424, payload retriever 800 is positioned for entry through opening 1432 into first channel 1433. In FIG. 24D, payload retriever 800 has been winched upwardly into first channel 1433, where it is positioned to move further upwardly to secure handle 511 of payload 510. In FIG. 24E, payload retriever 800 has moved further upwardly to secure payload retriever 800 to handle 511 of payload 510, where payload 510 can be removed from the end of the first channel 1433 and winched up to a UAV for transport.

Figure 25A:
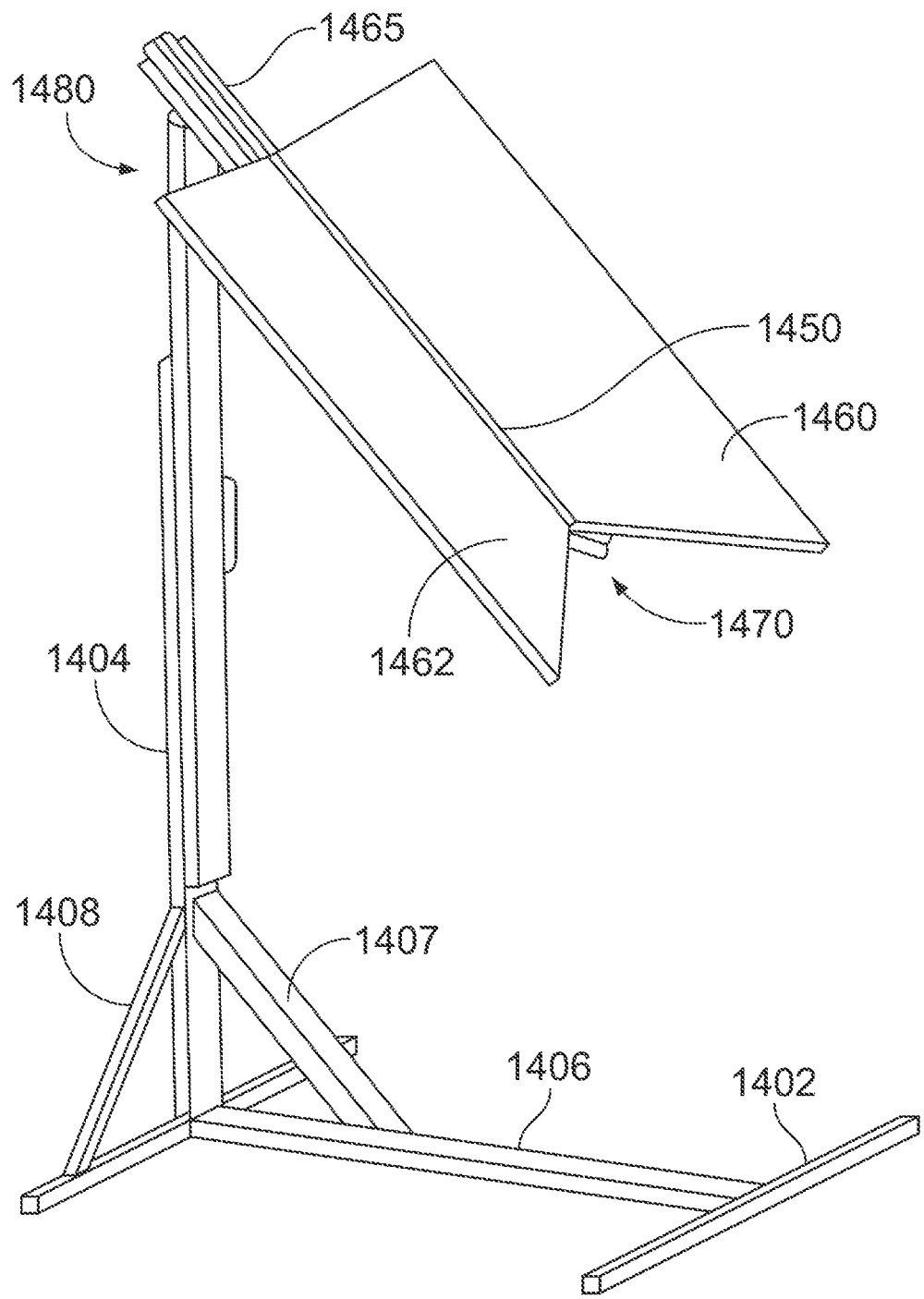
FIG. 25A is a perspective view of payload retrieval apparatus 1480.

FIG. 25A is a perspective view of payload retrieval apparatus 1480. Payload retrieval apparatus 1480 includes a base 1402 with a cross member 1406 and truss members 1407 and 1408. Upwardly extending member 1404 is attached to base 1402. A first sloped surface 1460 is positioned adjacent to second sloped surface 1462 are attached to member 1465 (attached to upwardly extending member 1404) with a tether slot 1450 positioned therebetween. Opening 1470 extends towards a channel positioned on member 1465, or beneath the first and second sloped surfaces 1460 and 1462, which is adapted to receive payload retriever 800. First and second sloped surfaces 1460 and 1462 serve as a funneling system to funnel a payload retriever 800 downwardly towards opening 1470, where a tether 1200 may move the payload retriever 800 into position to extend through opening 1470 into a channel positioned on member 1465, or beneath the first and second sloped surfaces 1460 and 1462, and tether 1200 extends through the tether slot 1450 to draw the payload retriever 800 towards a payload for automated payload retrieval. The payload retriever 800 may land anywhere on either of the first or second sloped surfaces 1460, 1462, and will funnel down until it slides off of the sloped surfaces, where the tether 1200 may be drawn through tether slot 1450 to draw the payload retriever 800 into engagement with the handle 511 of payload 510. First and second sloped surfaces 1460 and 1462 provide a V-shaped funneling system that is downwardly sloped towards opening 1470. It will be appreciated that the sloped surfaces in payload retrieval apparatus 1400 and 1480 may have other configurations and geometries to provide a funneling system for the payload retriever 800. The surfaces may be hard or soft, or even made of netting to reduce wind load. Furthermore, the surfaces are not required to be flat, but could be rounded or concave as well.

In addition, the first and second sloped surfaces 1460 and 1462 are downwardly sloped towards opening 1470 to a channel. The bottoms of the first and second sloped surfaces are also positioned at an angle towards opening 1470. In applications where the payload retriever does not land on either of sloped surfaces 1460 or 1462, the tether 1200 descend in front of opening 1470 and may be drawn towards opening 1470 along the angled lower surfaces of the first and second sloped surfaces 1460 and 1462. The tether 1200 may be drawn, or simply slide, down the angled lower surfaces until the tether 1200 is in front of the tether slot 1450. At this point, the tether 1200 may be drawn through the tether slot 1450, thereby drawing the payload retriever 800 into the channel. It should also be noted that first and second sloped surfaces 1460 and 1462 not only serve to provide a funneling system to funnel the payload retriever 800 towards opening 1470, but also serve to block wind from blowing the payload retriever 800 out of position.

Figure 25B:
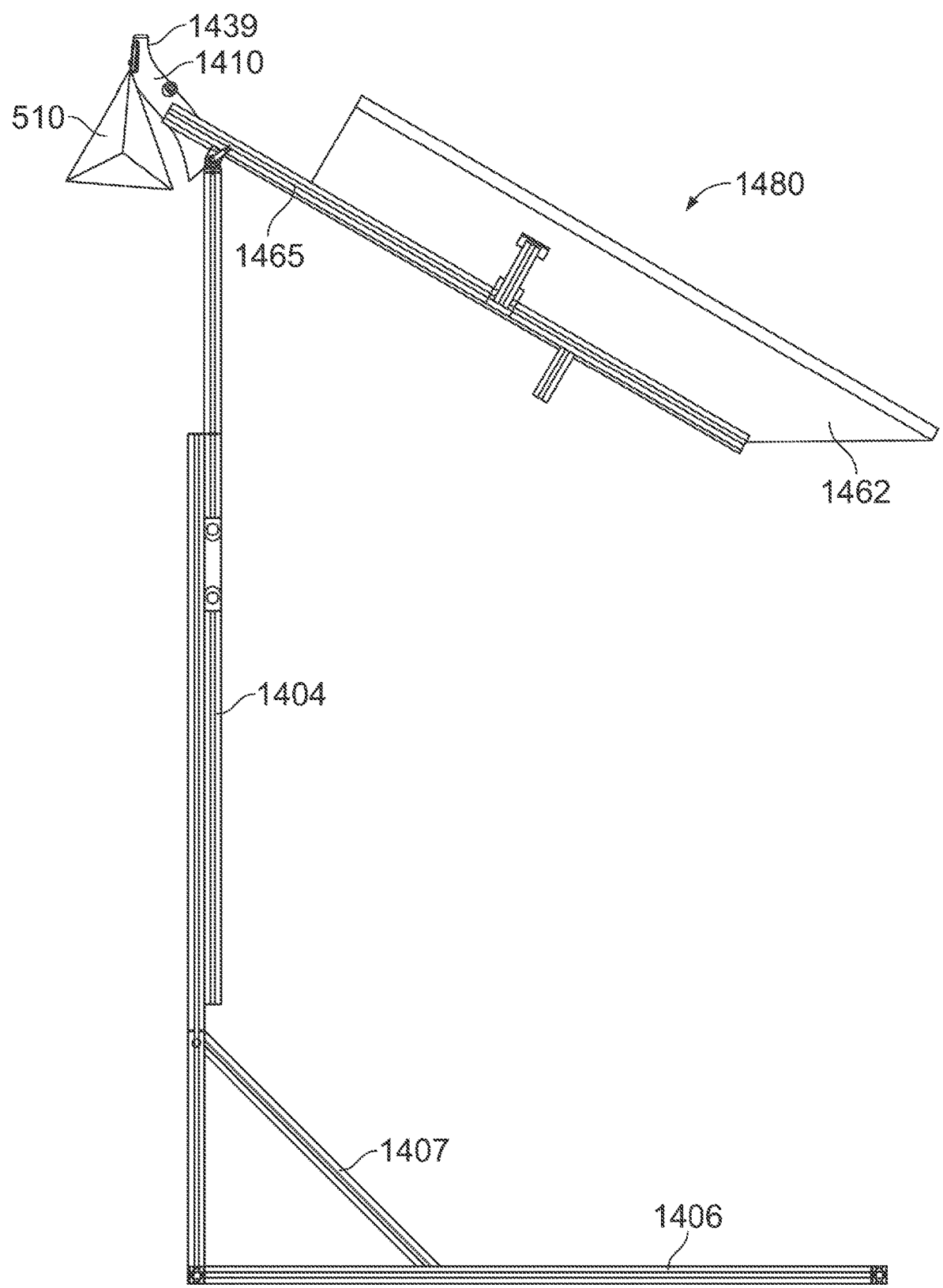
FIG. 25B is a side view of payload retrieval apparatus 1480.

FIG. 25B is a side view of payload retriever apparatus 1480, and includes cross member 1406, truss 1407, and upwardly extending member 1404. Member 1465 extends from upwardly extending member 1404 with second sloped surface 1462 positioned thereon. A channel with a curved portion 1439 is positioned on an end of member 1465, with a payload 510 positioned on curved portion 1439 of the channel. Although the channel is positioned beyond second sloped surface 1462, the channel could also extend beneath second sloped surface 1462.

Figure 25C:
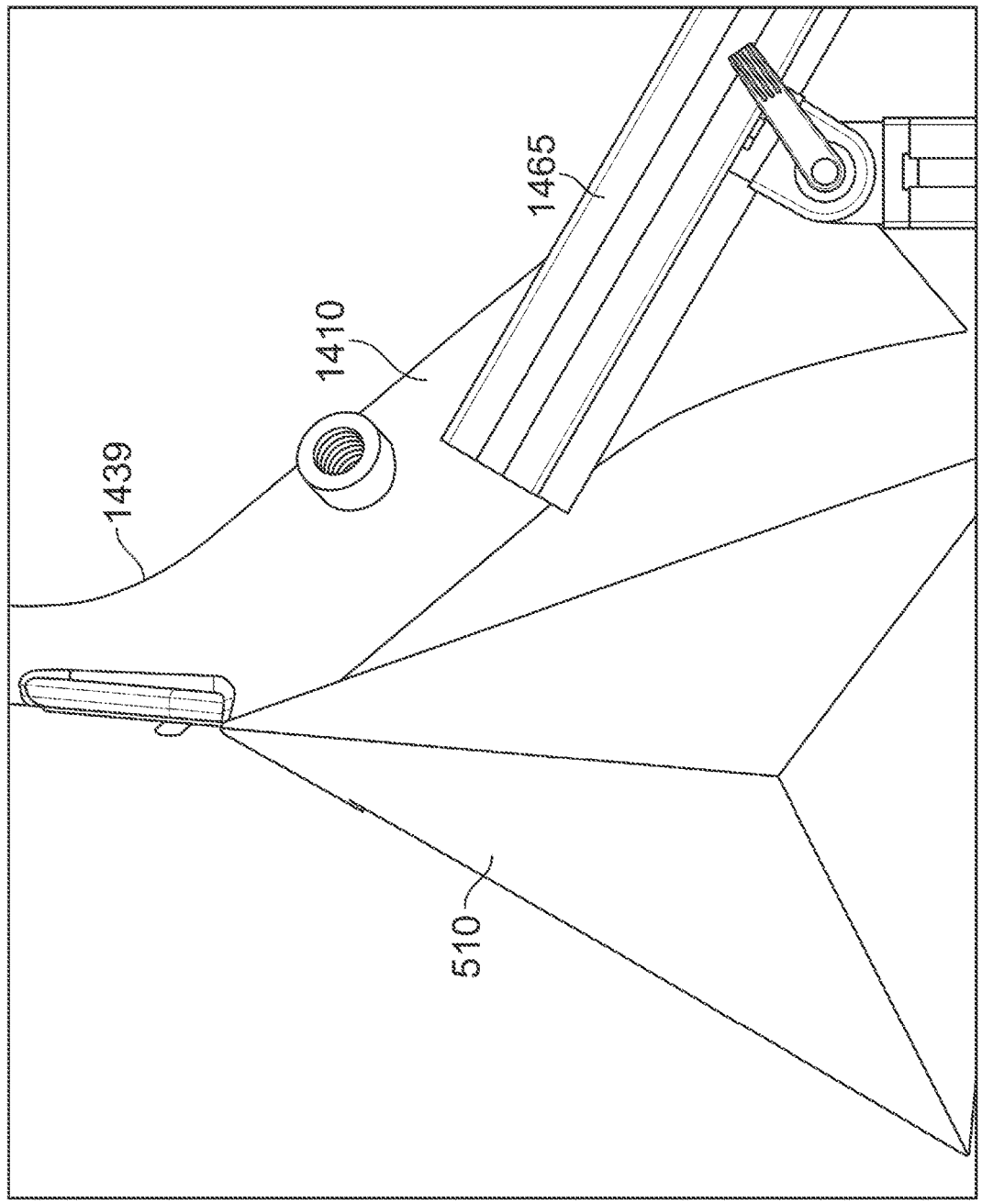
FIG. 25C is a side view of an end of payload retrieval apparatus 1480 with payload 510 positioned on curved portion 1439.

FIG. 25C is a side view of an end of the payload retrieval apparatus 1480. A channel is shown extending from member 1465 with a payload 510 positioned on curved portion 1439.

Figure 25D:
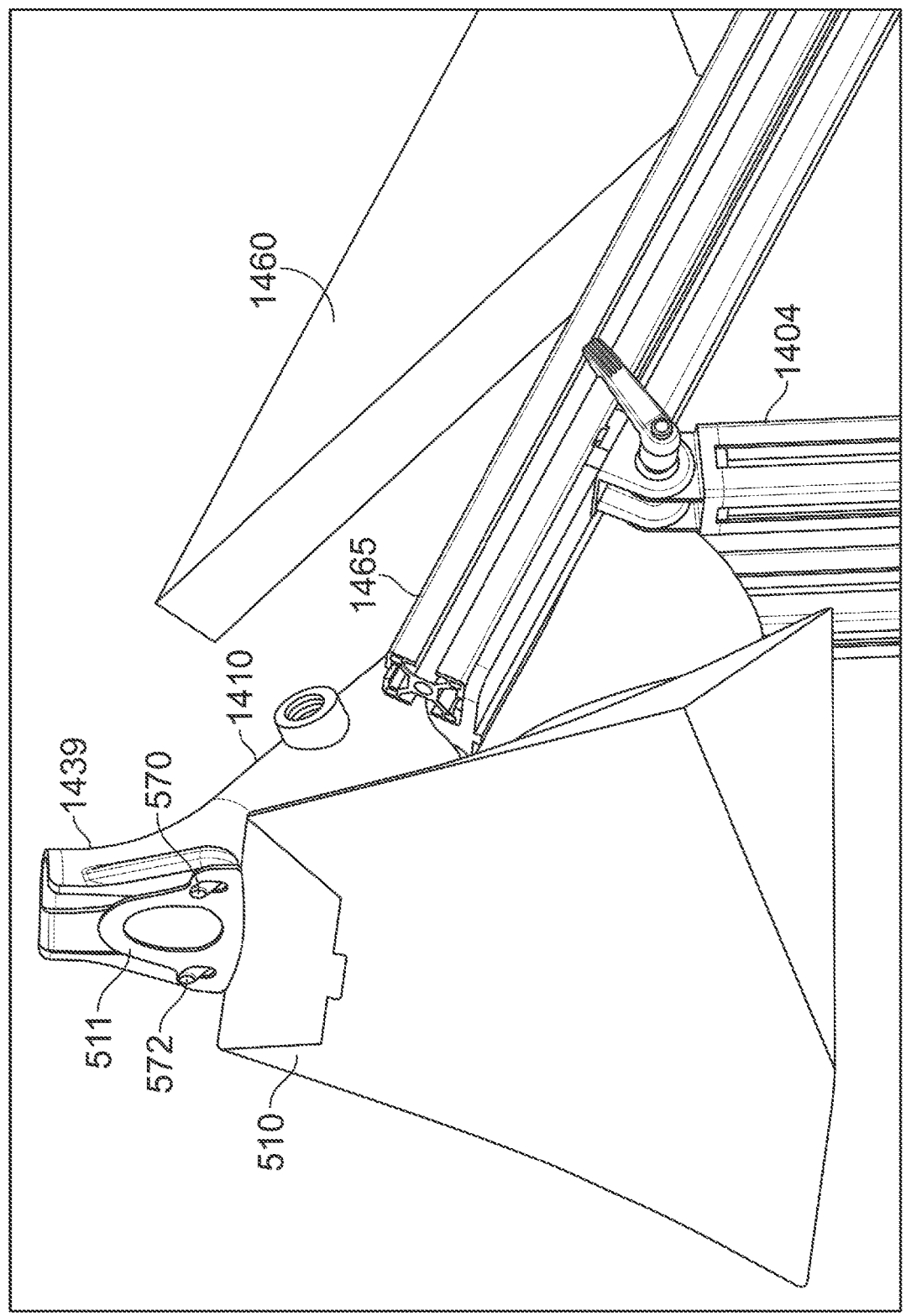
FIG. 25D is a perspective view of an end of payload retrieval apparatus 1480 with payload 510 positioned on curved portion 1439.

FIG. 25D is a perspective view of an end of the payload retrieval apparatus 1480. A channel with a curved portion 1439 is positioned on an end of member 1465, with a payload 510 positioned on curved portion 1439 of the channel. Handle 511 of payload 510 is positioned on pins 570 and 572 extending from curved portion 1439 of the channel.

Figure 25E:
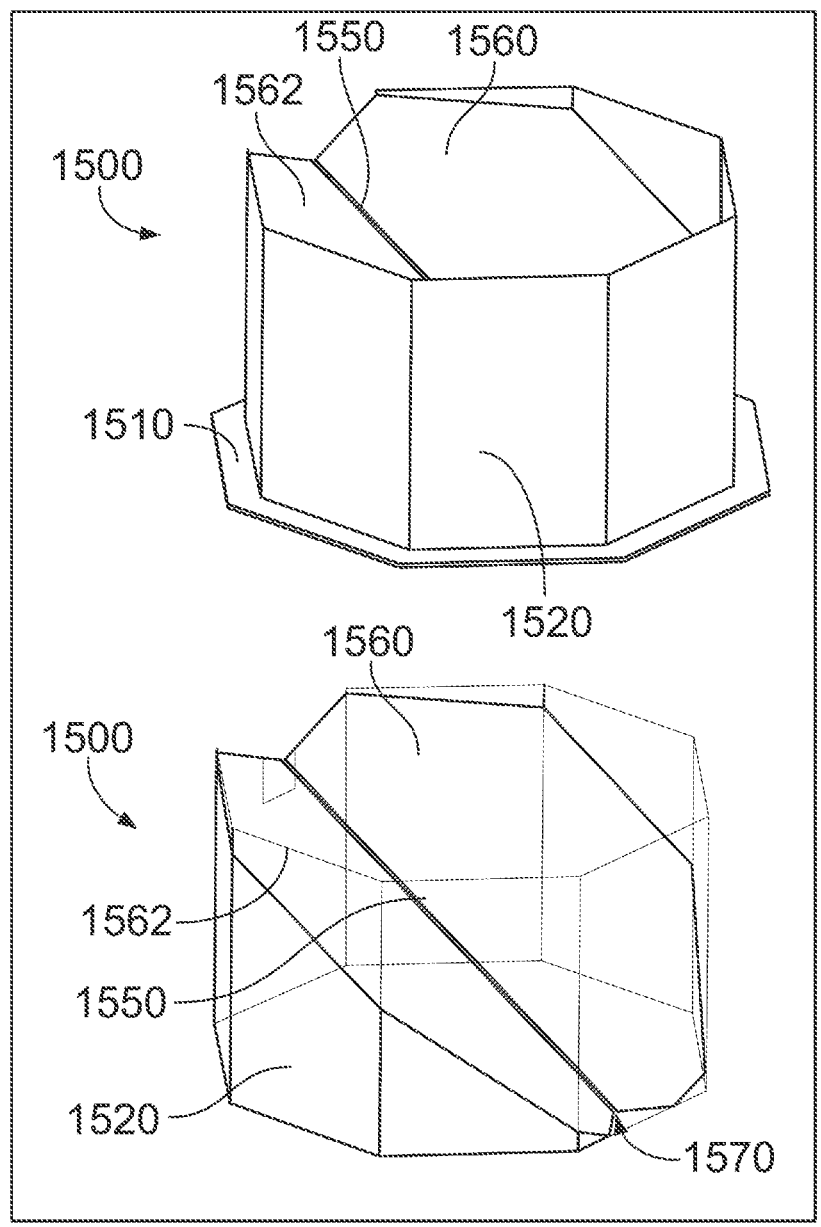
FIG. 25E shows a perspective view of payload retrieval apparatus 1500.

FIG. 25E shows perspective views of payload retrieval apparatus 1500. Payload retrieval apparatus 1500 includes a base 1510 and upwardly extending side walls 1520. A first sloped surface 1560 is positioned adjacent second sloped surface 1562 are positioned within side walls 1520 with a tether slot 1550 positioned therebetween. Opening 1570 extends towards a channel positioned beneath or near the first and second sloped surfaces 1560 and 1562 which is adapted to receive payload retriever 800. First and second sloped surfaces 1560 and 1562 serve as a funneling system to funnel a payload retriever 800 downwardly towards opening 1570, where a tether 1200 may move the payload retriever 800 into position to extend through opening 1570 into a channel beneath or near the first and second sloped surfaces 1560 and 1562, and tether 1200 extends through the tether slot 1550 to draw the payload retriever 800 towards a payload for automated payload retrieval.

Figure 26:
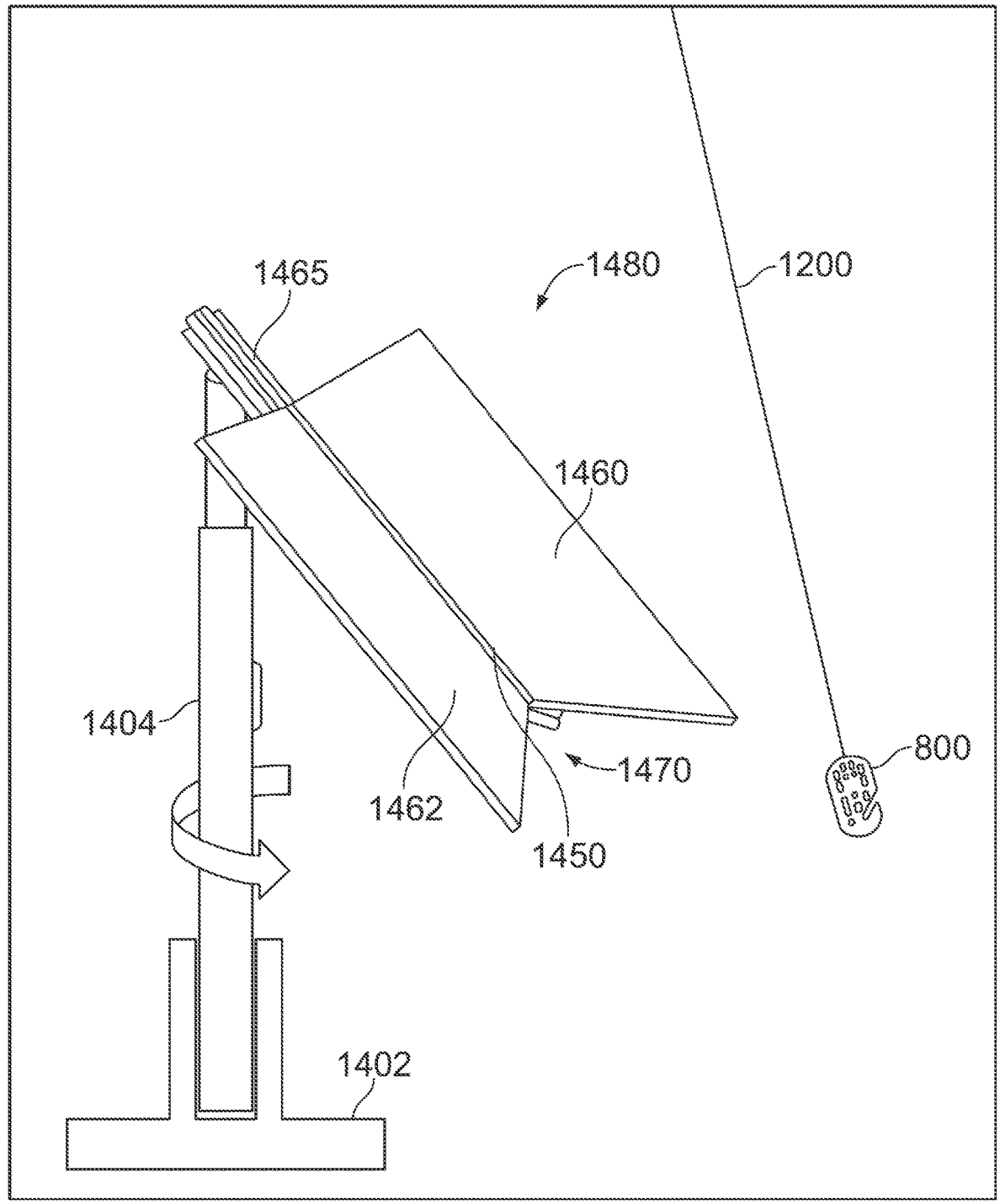
FIG. 26 is a perspective view of payload retrieval apparatus 1480.

FIG. 26 is a perspective view of payload retrieval apparatus 1480. Member 1465 is rotatable with respect to upwardly extending member 1404 to allow the first and second sloped panels 1460 and 1462 to rotate with the wind such that the stand 1480 is positioned into the wind to reduce the impact of wind on payload retrieval apparatus 1480. As with a non-rotatable payload retrieval apparatus, first and second sloped surfaces 1460 and 1462 not only serve to provide a funneling system to funnel the payload retriever 800 towards opening 1470, but also serve to block wind from blowing the payload retriever 800 out of position.

FIG. 27A shows perspective views of rotational spring loaded pusher 1600. Rotational spring loaded push 1600 is positioned near the end of channel 1433 formed between edges 1410 and 1430, with edge 1430 having a shorter length than edge 1410. As the payload retriever 800 exits the channel 1433, the spring loaded pusher 1600, rotatable about pivot point 1620, includes a cam 1610 that initially comes into contact with a top surface of payload retriever 800. As payload retriever 800 exits channel 1433, the spring loaded cam 1610 pushes against a bottom of the payload retriever 800, to force lip 806 of payload retriever 800 forward into engagement with handle 511 of payload 510.

FIG. 27B shows a side view of leaf spring 1640. Leaf spring 1640 operates in a similar manner to rotational spring loaded pusher 1600. As payload retriever 800 exits channel 1433, the leaf spring 1640 pushes against a bottom of the payload retriever 800, to force lip 806 of payload retriever 800 forward into engagement with handle 511 of payload 510. The leaf spring 1640 may be a separate metal spring, or molded-in plastic tabs that deform to impart a spring force on the payload retriever 800.

FIG. 27C shows a side view of linear spring plunger 1650. Linear plunger 1650 includes spring 1654 and protrusion 1652. Linear spring plunger 1650 operates in a similar manner to rotational spring loaded pusher 1600 and leaf spring 1640. As payload retriever 800 exits channel 1433, the protrusion 1652 of linear spring plunger 1650 pushes against a bottom of the payload retriever 800, to force lip 806 of payload retriever 800 forward into engagement with handle 511 of payload 510.

Figure 28:
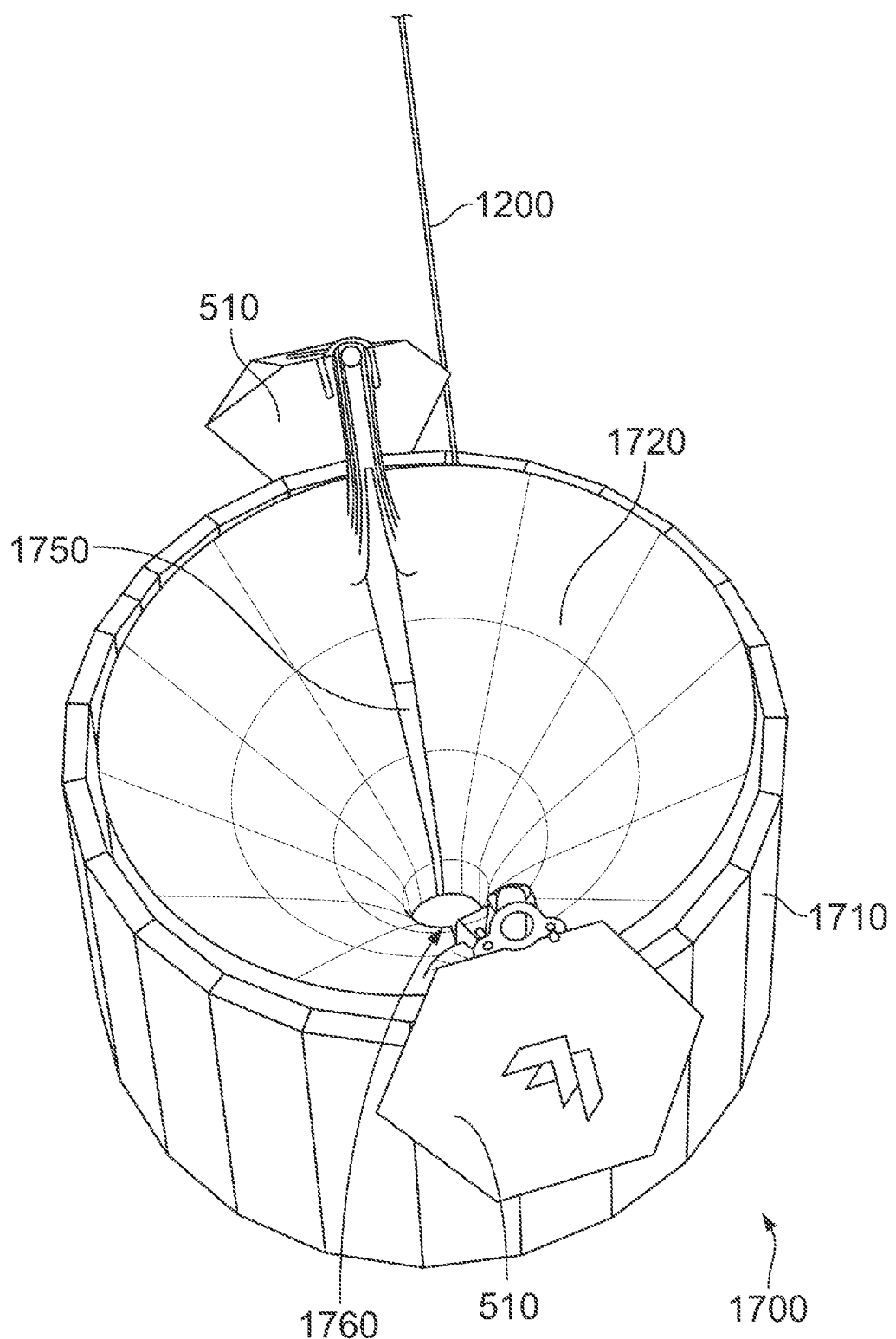
FIG. 28 is a perspective view of payload retrieval apparatus 1700.

FIG. 28 is a perspective view of payload retrieval apparatus 1700. Payload retrieval apparatus 1700 provides a bowl-shaped funneling system 1720. A payload retriever 800 descends onto the funneling system 1720 and slides down through lower opening 1760. The tether 1200 attached to the payload retriever is drawn through tether slot 1750 until payload retriever connects with handle 511 of payload 510 to secure the payload 510 to payload retriever 800 for removal of payload 510 from the payload retrieval apparatus 1700. Advantageously, payload retrieval apparatus 1700 may accommodate multiple payloads 510. As shown in FIG. 28, one payload 510 is positioned in a northern position and another payload 510 is shown in a southern position. A second tether slot may be provided for access to the southern payload 510 such that the payload retriever 800 may travel beneath tether slot 1750 to the northern payload 510, or beneath the second tether slot to pick up the southern payload 510. Additional payloads could also be provided on payload retrieval apparatus 1700. For example, eastern and western payloads could be included with corresponding eastern and western tether slots.

Figure 29A:
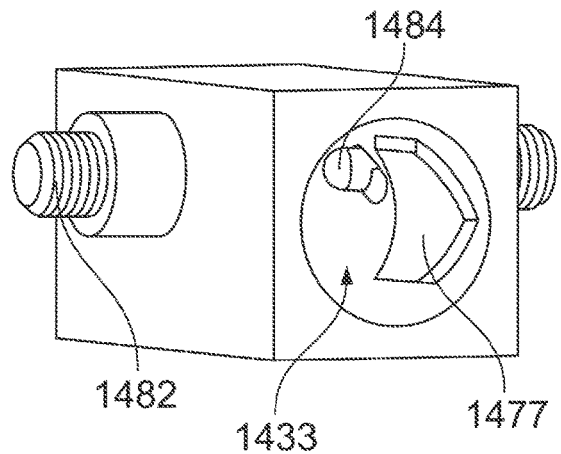
FIGS. 29A-B show perspective and side views of spring loaded plunger pin 1484.
Figure 29B:
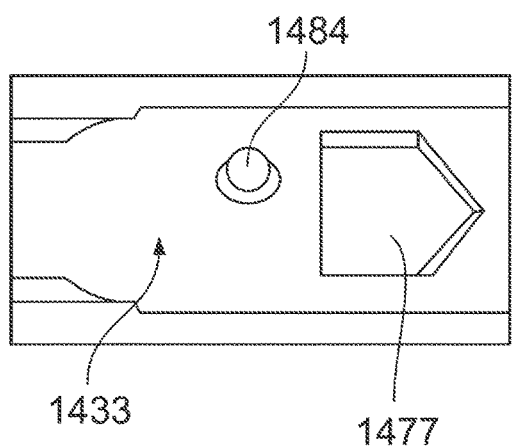

FIGS. 29A-B show perspective and side views of spring loaded plunger pin 1484. Spring loaded plunger 1484 extends into channel 1433, along with an oppositely disposed plunger pin (not shown). As a payload retriever 800 comes into contact with plunger pin 1484, the payload retriever 800 is rotated into a desired position such that the lip 806 of the payload retriever is properly positioned to engage with an opening in the handle 511 of the payload upon exiting the channel 1433.

Figure 30A:
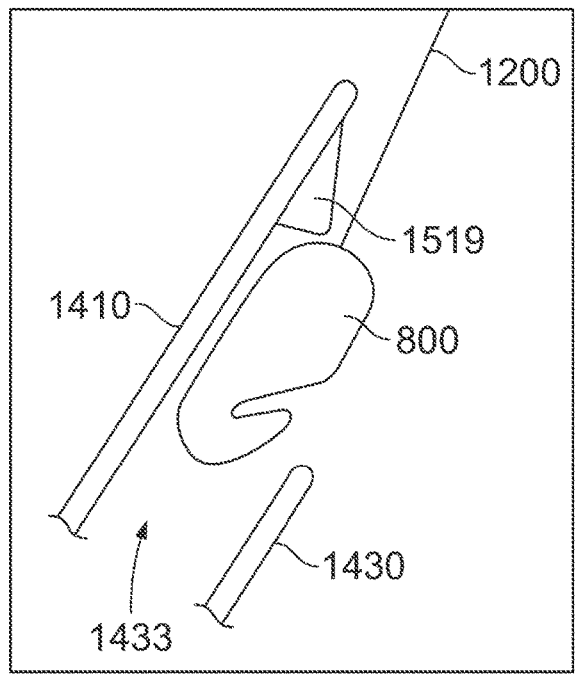
FIGS. 30A-B show side views of protrusions 1519.
Figure 30B:
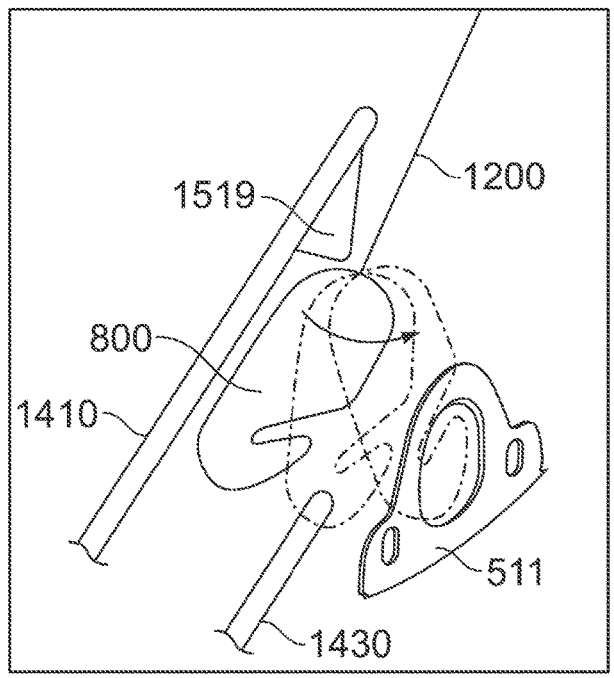

FIGS. 30A-B show side views of protrusions 1519. Protrusions 1519 operate in a similar manner to rotational spring loaded pusher 1600, leaf spring 1640, and linear spring plunger 1650 shown in FIGS. 27A-C. As payload retriever 800 exits channel 1433, the protrusions 1519 push against a bottom of the payload retriever 800, to force lip 806 of payload retriever 800 forward into engagement with handle 511 of payload 510.

Figure 31B:
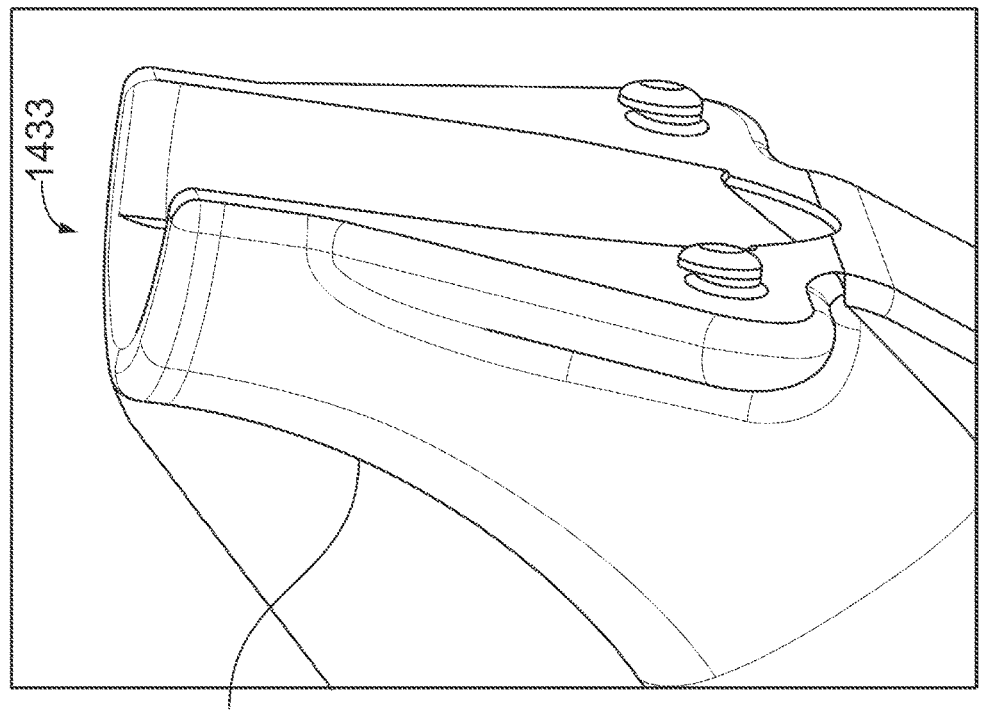
FIGS. 31A-B show side and perspective views of curved portion 1439.
Figure 31A:
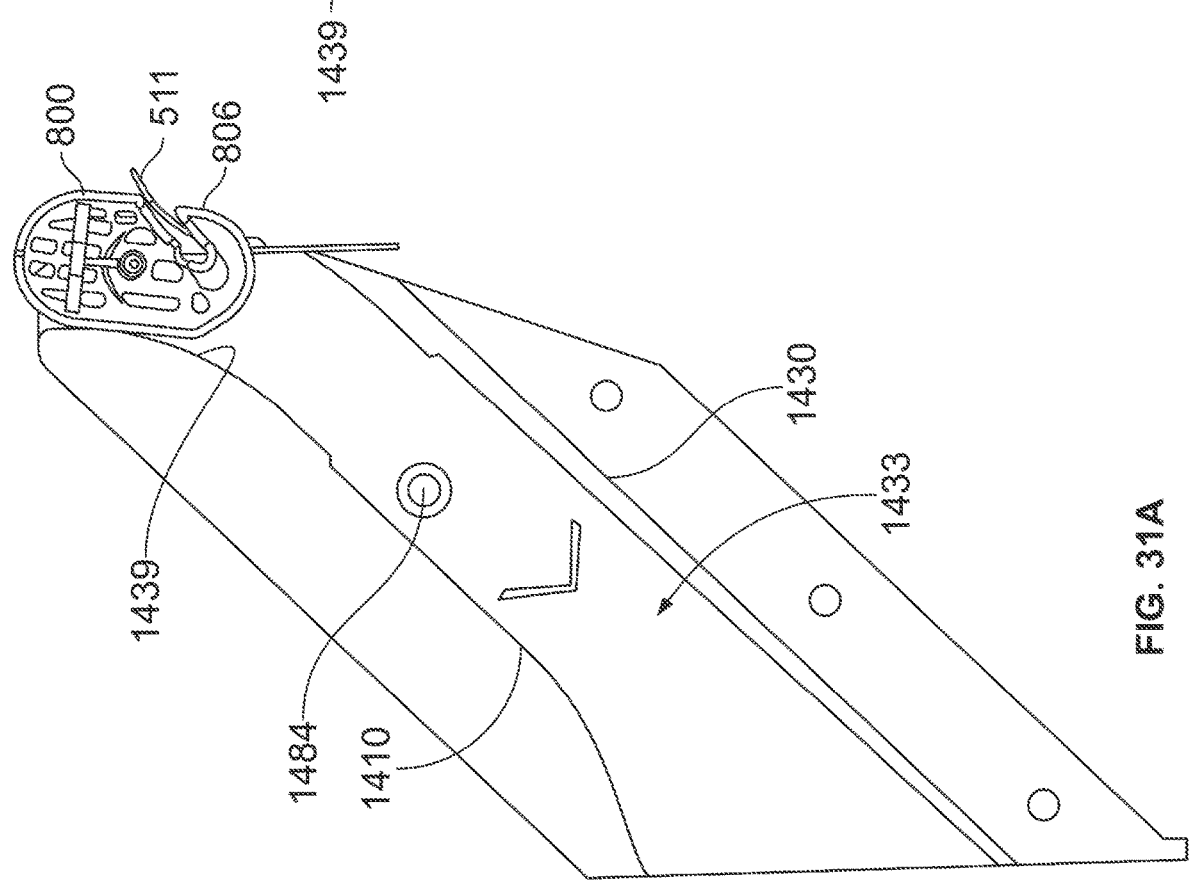
Figure 32A:
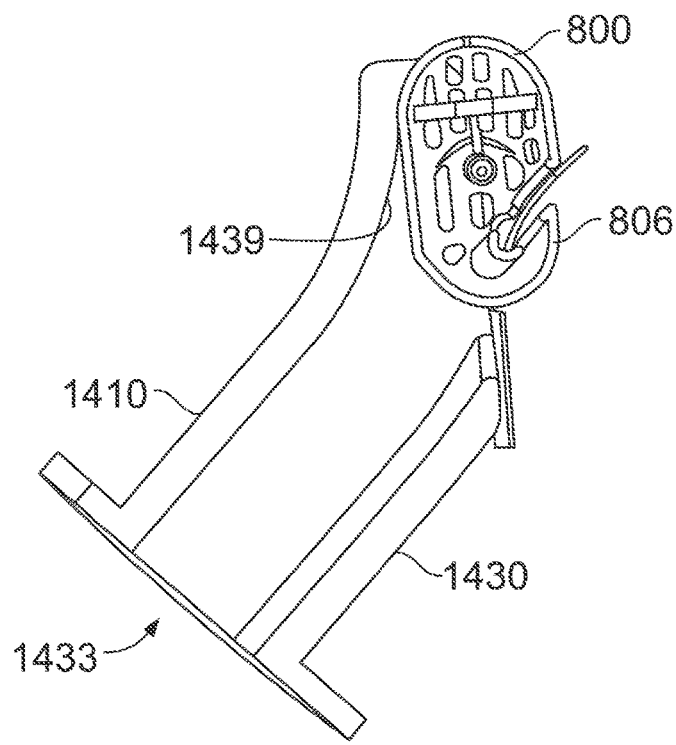
FIGS. 32A-C show side and perspective views of curved portion 1439.
Figure 32B:
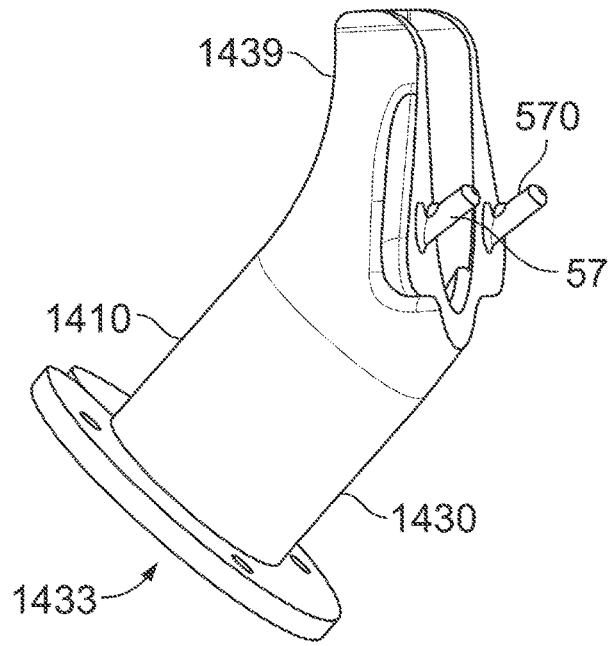
Figure 32C:
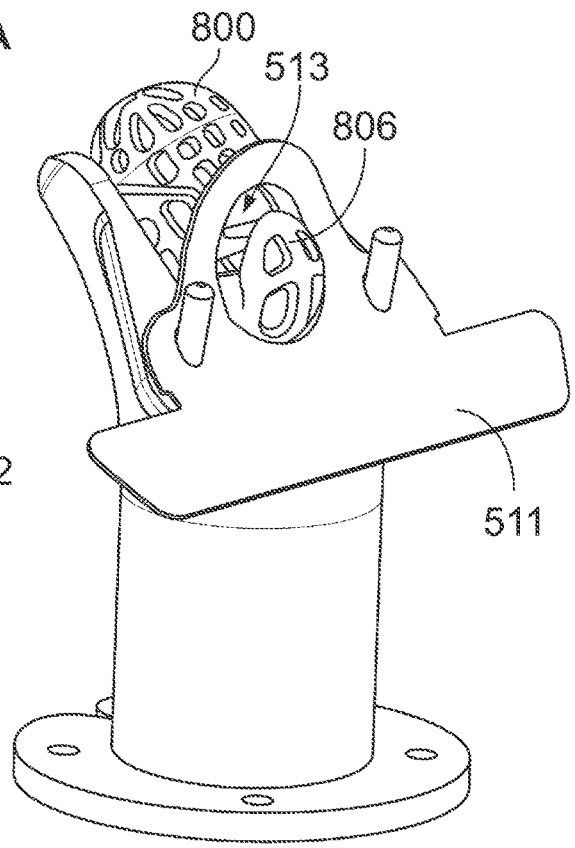
Figure 33B:
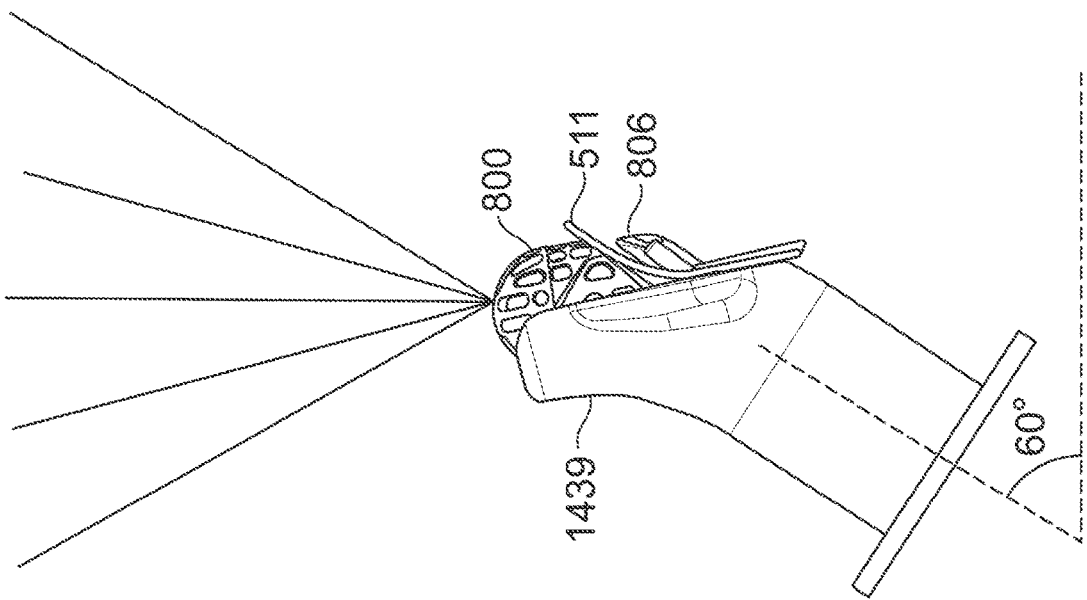
FIGS. 33A-B show perspective views of curved portion 1439.
Figure 33A:
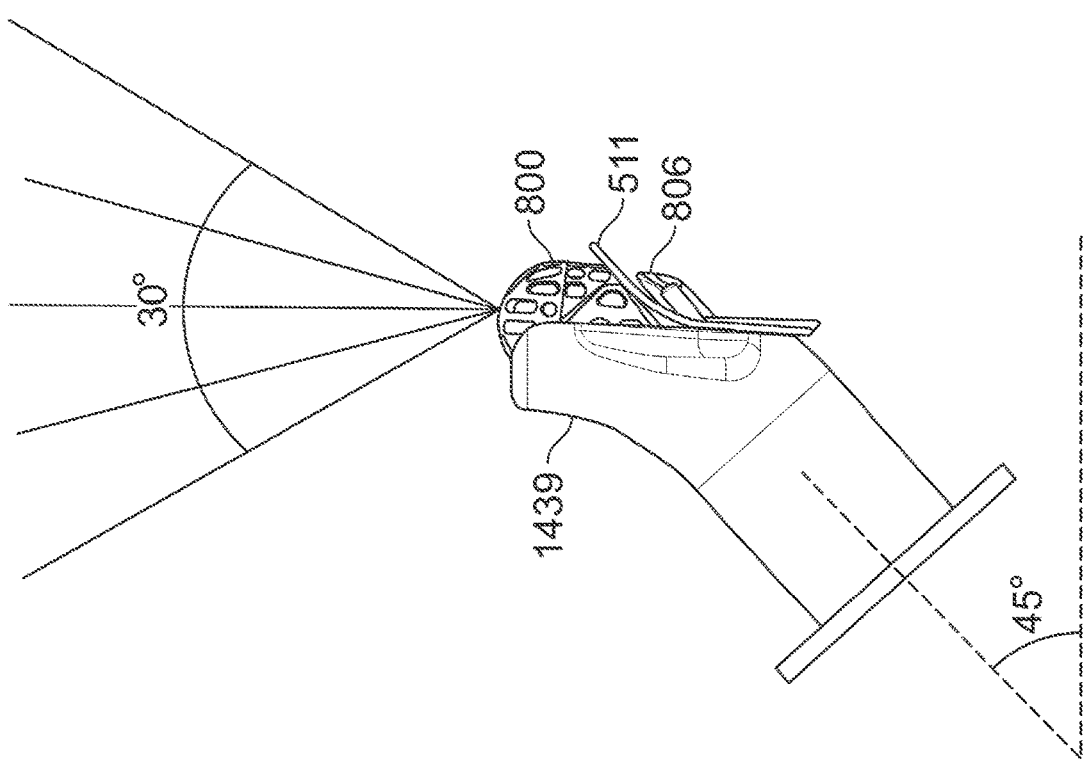
Figure 34A:
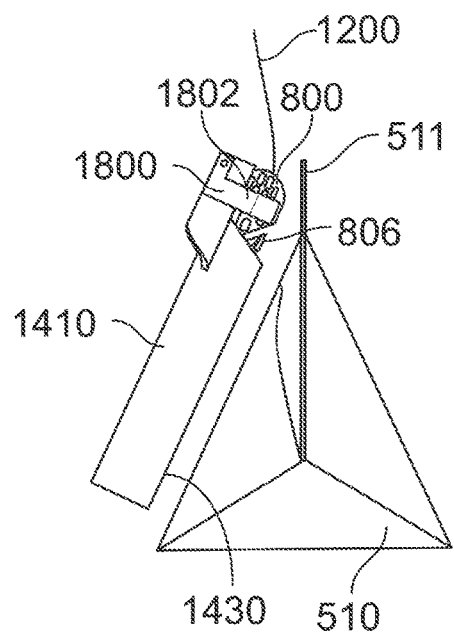
FIGS. 34A-E show various perspective views of pivoting carriage 1700.
Figure 34B:
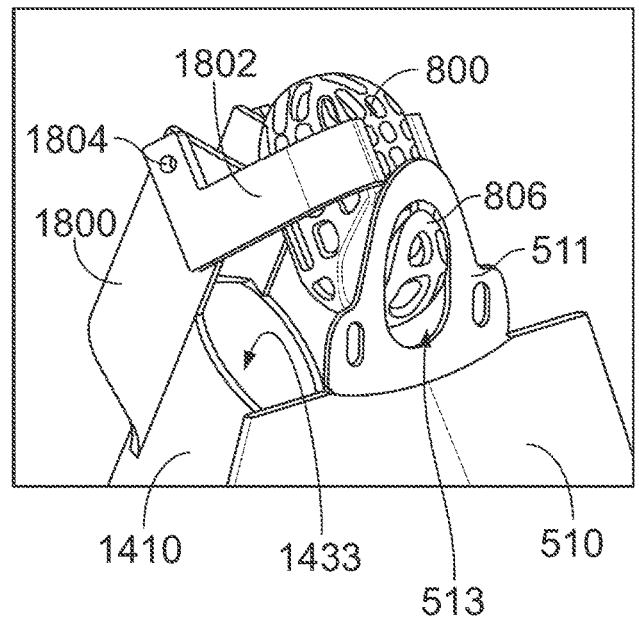
Figure 34C:
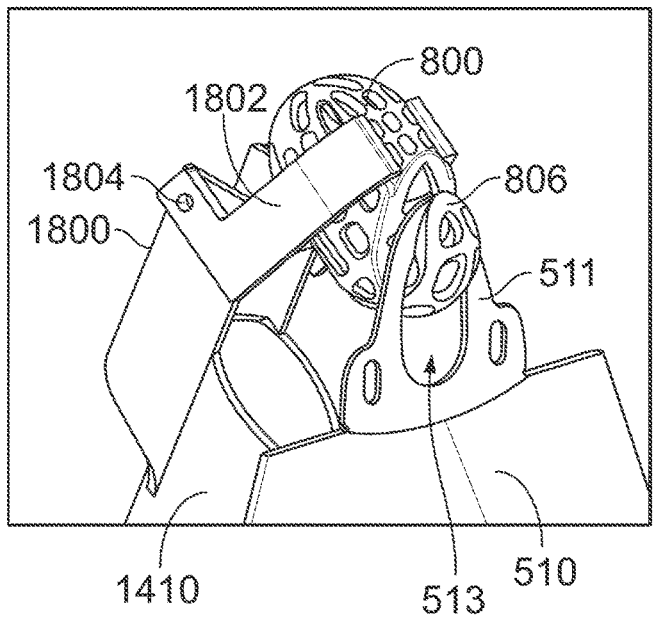
Figure 34D:
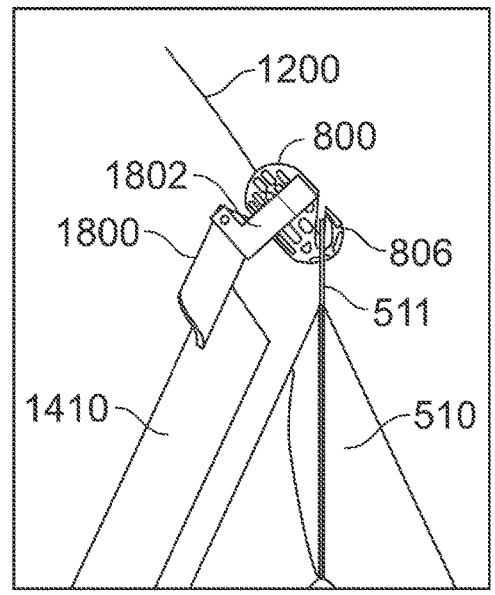
Figure 34E:
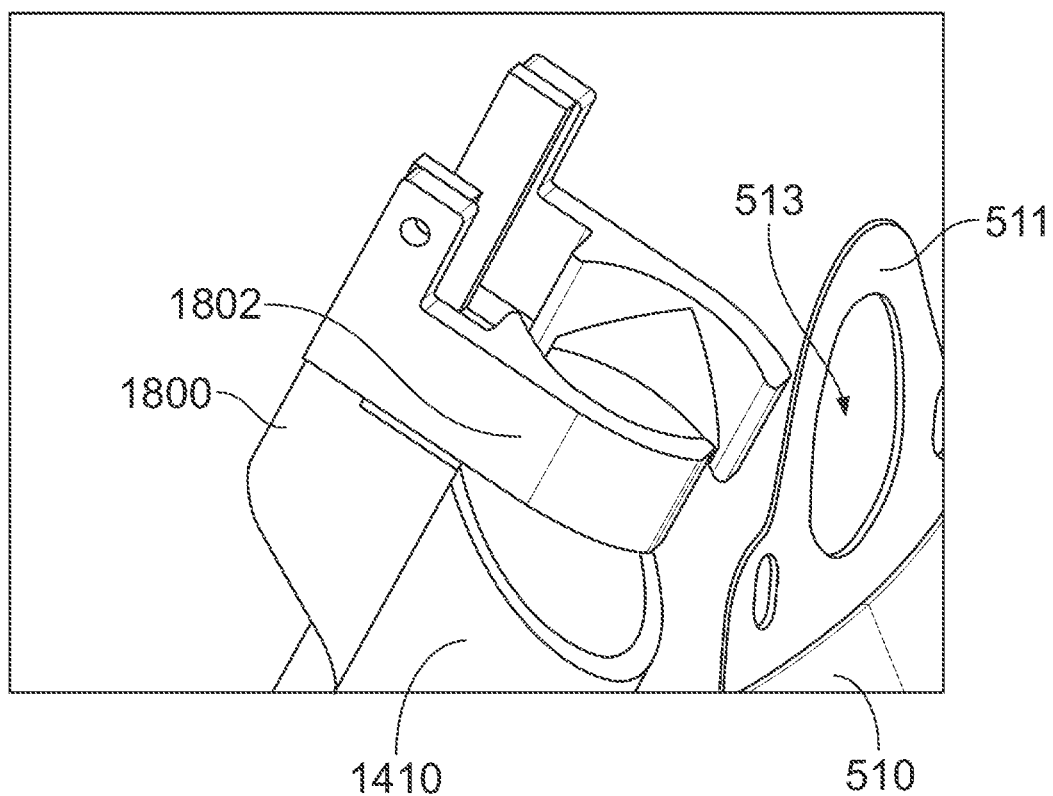

FIGS. 31A-B show side and perspective views of curved portion 1439, FIGS. 32A-C show side and perspective view of curved portion 1439, and FIGS. 33A-B show perspective views of curved portion 1439. Channel 1433 between edges 1410 and 1430 ends with a curved portion 1439. Payload retriever 800 initially travels through channel 1433 along a centerline of the channel. However, curved portion 1439 changes the angle of exit of payload retriever 800 from channel 1433. Curved portion 1439 provides significant advantages over an entirely straight channel. The curved portion 1439 at the end of the channel 1433 angles the payload retriever 800 upon exiting the channel 1433 to have the payload retriever 800 "lean back" such that the lip 806 of the payload retriever 800 extends towards the opening 513 in the handle 511 of the payload 510. The curved portion 1439 also allows for a top of the payload retriever 800 to contact the handle 511 such that a portion of the handle 511 over the opening 513 in the handle 511 contacts the payload retriever 800 and the portion over the opening 513 slides down the payload retriever 800 until the lip 806 of the payload retriever 800 extends into the opening 513 in the handle 511 of the payload 510.

In FIG. 32B, payload holder in the form of extending pins 570 and 572 is shown. In FIG. 32C, handle 511 of the payload 510 is shown positioned on extending pins 570 and 572. Lip 806 of payload retriever 800 is shown extending through opening 513 in handle 511. The handle 511 of the payload 510 itself may act as a spring upon entry of the lip 806 into the opening of the handle 511 of the payload 510 to rotate the payload retriever 800 into the proper position. For example, if the rotational position of the payload retriever 800 is off somewhat, then the handle 511 of the payload 510 itself may act to rotate the payload retriever 800 into its desired rotational position. FIGS. 33A and 33B illustrate that the angle of the channel may be altered, for example, between 45 and 60 degrees. The change in angle of the channel can also provide for the positioning of the lip 806 of the payload retriever 800 to be in an improved position for the lip 806 to extend into an opening 513 in the handle 511 of a payload 510. In particular, when the channel is at a 60 degree angle, the lip 806 of the payload retriever 800 extends further outwardly to extend through the opening in handle 511 of the payload 510.

FIGS. 34A-E show various perspective views of pivoting carriage 1800. Pivoting carriage 1800 includes payload retrieval holder 1802 that pivots about pivot 1804. Pivoting carriage 1800 uses payload retrieval holder 1802 to hold payload retriever 800. Payload retrieval holder 1802 pivots downwardly about pivot 1804 to place lip 806 of payload retriever 800 through opening 513 in handle 511 of payload 510. After the payload retriever 800 is secured to handle 511 of payload 510, the payload retriever 800 may be removed from the payload retriever holder 1802 to remove payload 510 from its position.

Figure 35:
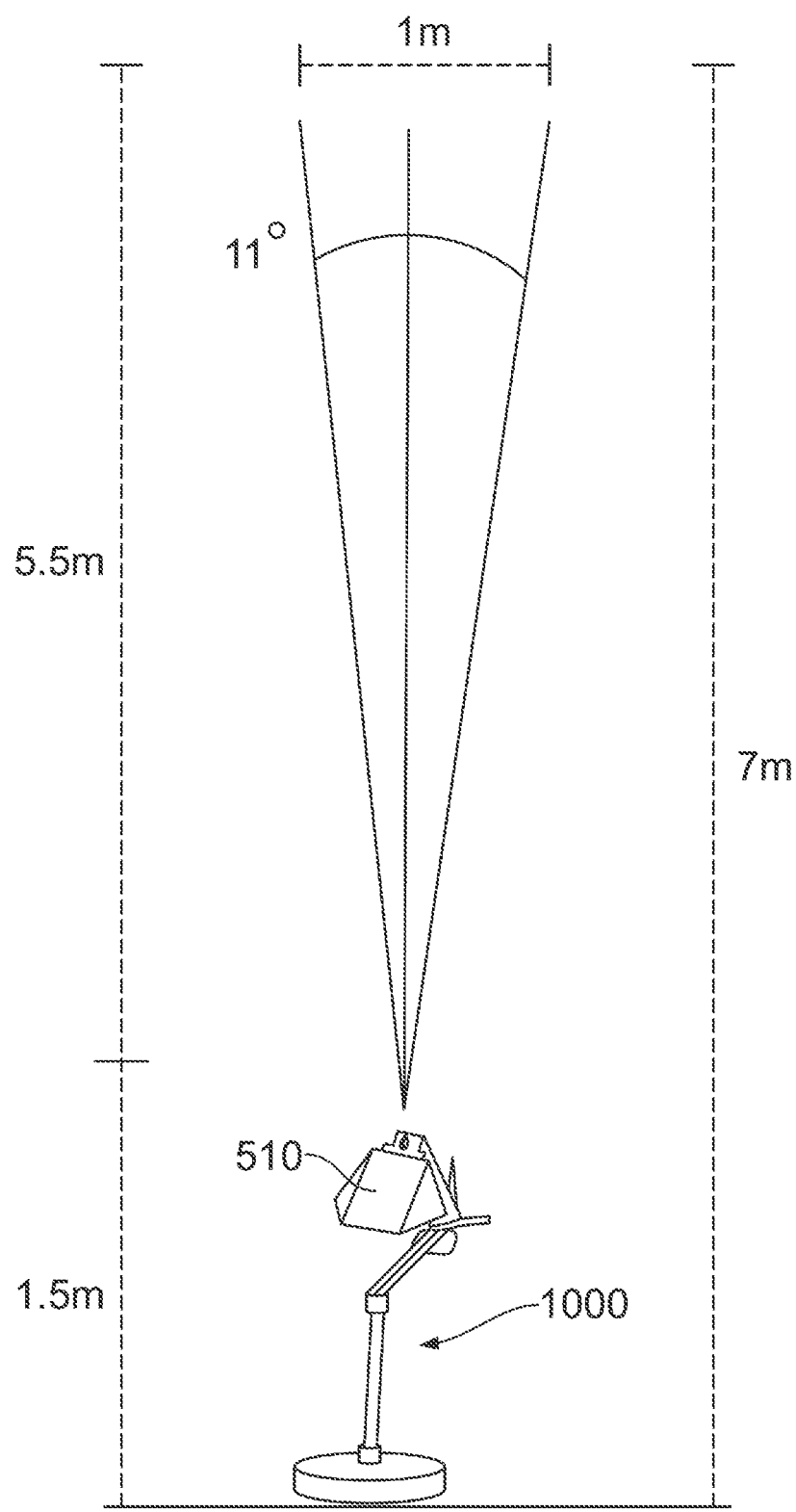
FIG. 35 shows a side view of payload retrieval apparatus 1000.
Figure 36:
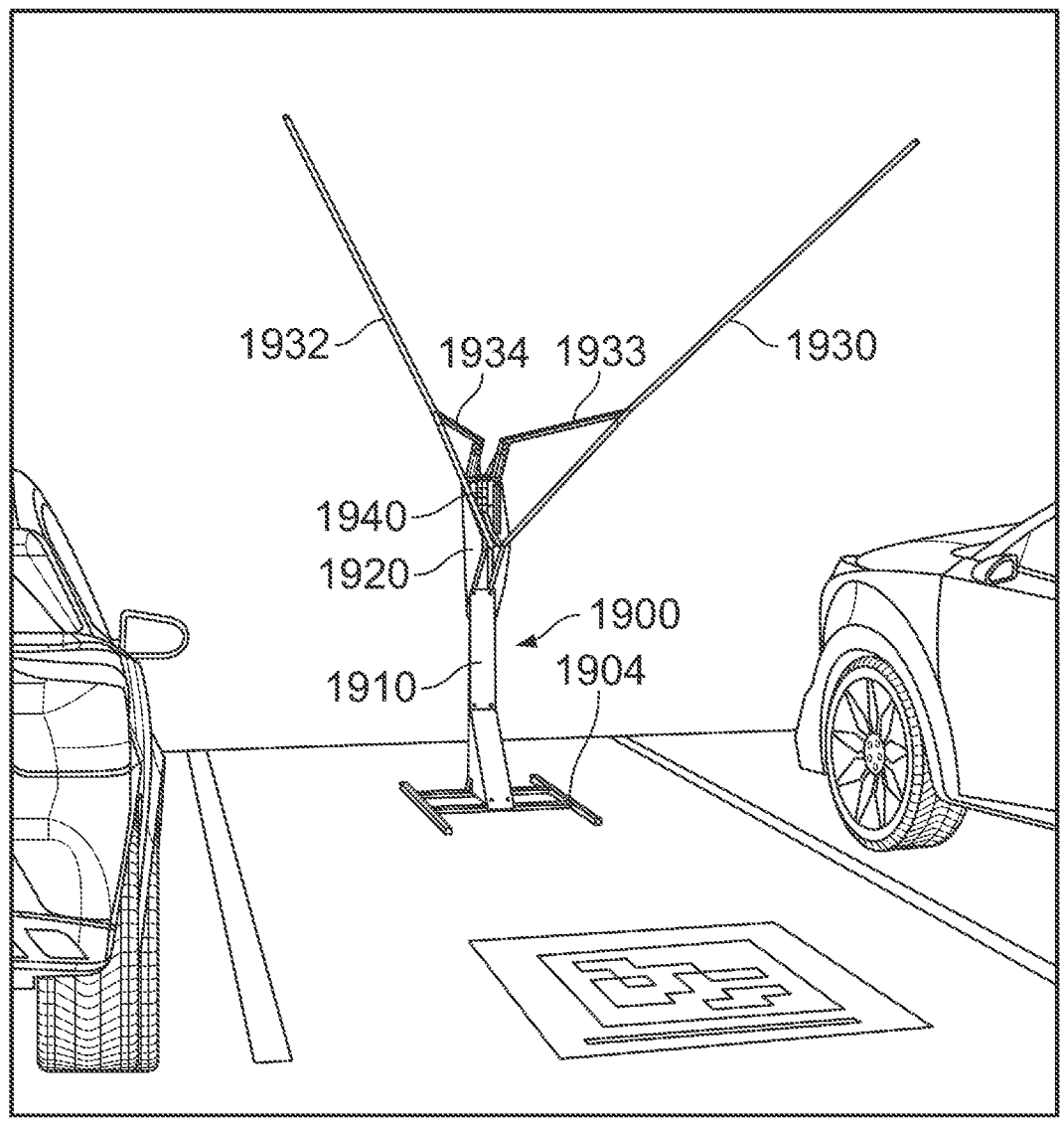
FIG. 36 shows a front view of payload retrieval apparatus 1900.
Figure 37:
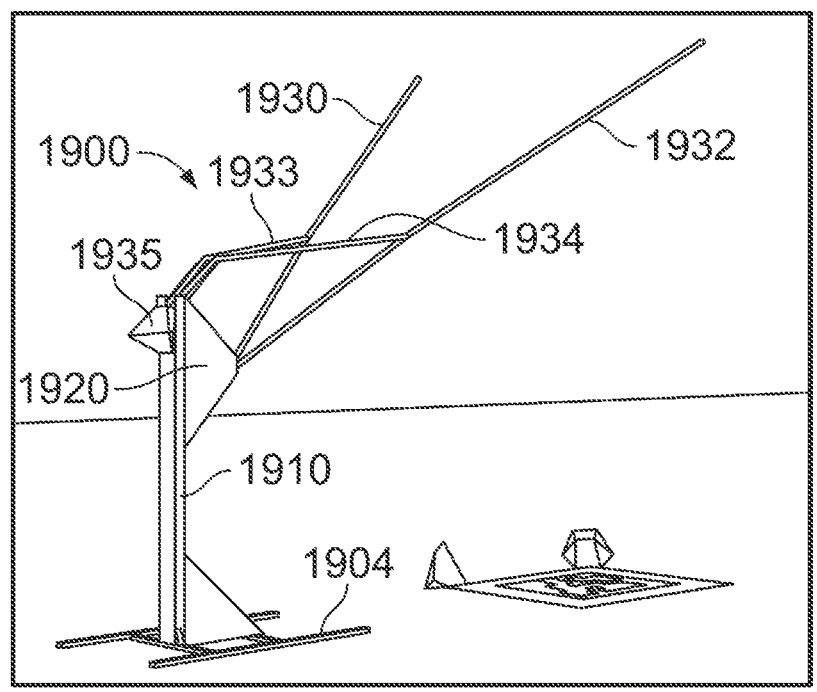
FIG. 37 shows a perspective side view of payload retrieval apparatus 1900.
Figure 38:
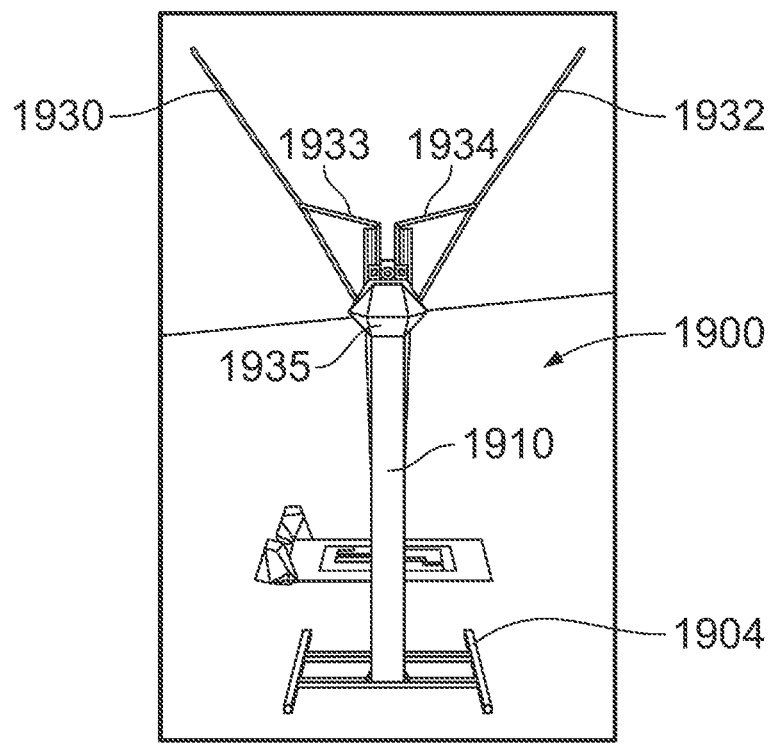
FIG. 38 shows a rear view of payload retrieval apparatus 1900.

FIG. 35 illustrates that a UAV positioned at 7 meters above the ground may be used to allow a payload retriever 800 to remove payload 510 from a payload retrieval apparatus such as payload retrieval apparatus 1000 shown in FIG. 35.

FIGS. 36-40D shows various views of payload retrieval apparatus 1900. Payload retrieval apparatus 1900 is used for automated payload pickup using a UAV. A payload 1935 is positioned on a payload holder on a rear end of payload retrieval apparatus 1900. Payload retrieval apparatus 1900 includes base 1904, upwardly extending member 1910, and a payload coupling apparatus channel 1940 housed within enclosure 1920. Payload retrieval apparatus 1900 also includes tether engagers 1930 and 1932 which are used to engage a tether attached to a payload coupling apparatus, whereafter the payload coupling apparatus is drawn into and through the payload coupling apparatus channel 1940 to pick up payload 1935. Tether engager 1930 includes member 1933 which provides mechanical support for tether engager 1930, and provides other functions. In the same manner, tether engager 1932 includes member 1934 which provides mechanical support for tether engager 1932, and provides other functions. Payload retrieval apparatus 1900 provides for automated pickup of payload 1935, and may operate in the same or a similar manner as payload retrieval apparatuses 1000 and 1480 described above.

Tether engager 1930 includes an upper guide member 1933 that is configured to help maintain the end of the tether in a substantially vertical orientation as the payload coupling apparatus is drawn through the payload coupling apparatus channel 1940. With the inclusion of upper guide member 1933, tether engager 1930 includes both an upper edge and a lower edge for guiding the tether as the payload coupling apparatus is received and drawn through the payload coupling apparatus channel 1940. The lower edge is formed by the primary member of tether engager 1930 and extends toward a receiving end of payload coupling apparatus channel 1940. Accordingly, the lower edge of tether engager 1930 directs a portion of the tether that is near the payload coupling apparatus to the receiving end of the channel 1940.

The upper guide member 1933, on the other hand, extends towards payload coupling apparatus channel 1940 at an elevated height compared to the lower edge formed by the primary member of tether engager 1930. This allows the upper guide member 1933 to engage a portion of the tether that is spaced from the payload coupling apparatus at a position that is elevated above the channel 1940. Accordingly, when the payload coupling apparatus is within the channel 1940, the direction of the portion of the tether that extends upward from the channel 1940 will be substantially vertical. Thus, even if the UAV is laterally offset from the position of the payload retrieval apparatus 1900, such that most of the length of the tether extending between the UAV and the payload retrieval apparatus 1900 is at substantial angle, the end portion of the tether that extends from the channel 1940 will maintain a substantially vertical orientation. With this end portion of the tether in a substantially vertical orientation, the tension on the tether as it is retracted can effectively pull the payload coupling apparatus through the payload coupling apparatus channel 1940.

Similar to tether engager 1930, tether engager 1932 also includes an upper guide member 1934 with a similar configuration that is operable to maintain an end portion of the tether in a substantially vertical orientation.

In addition to helping maintain the orientation of the tether, the upper guide members 1933, 1934 may also provide structural support to the respective tether engagers. For example, because of the inclusion of upper guide member 1933 in tether engager 1930, the tether engager 1930 is secured to upwardly extending member 1910 at two independent points. The primary member of tether engager 1930 is secured to the upwardly extending member 1910 at a lower position and the upper guide member 1932 is secured to the upwardly extending member 1910 at an upper position. Furthermore, a triangular frame is formed between the upwardly extending member 1910, the primary member of tether engager 1930, and the upper guide member 1932, which provides a strong support structure for tether engager 1930.

While tether engager 1930, as shown in FIGS. 36-40D, is formed as a frame, such that upper guide member 1933 is formed as a second pole or rod that extends at an angle from the primary member (or pole) of tether engager 1930, other configurations are possible. For example, in some embodiments, the tether engager may be formed by a similarly shaped structure with a continuous surface for guiding the tether. In such an embodiment, a lower edge of the tether engager may provide a lower guide, while an upper edge of the tether engager may form the upper guide member that maintains the substantially vertical orientation of the tether, as described above.

Figure 39:
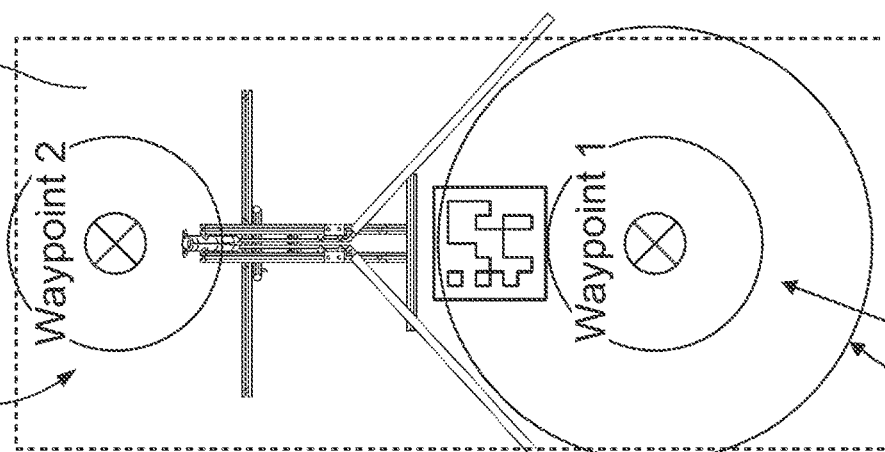
FIG. 39 shows a top view of payload retrieval apparatus 1900.
Figure 40A:
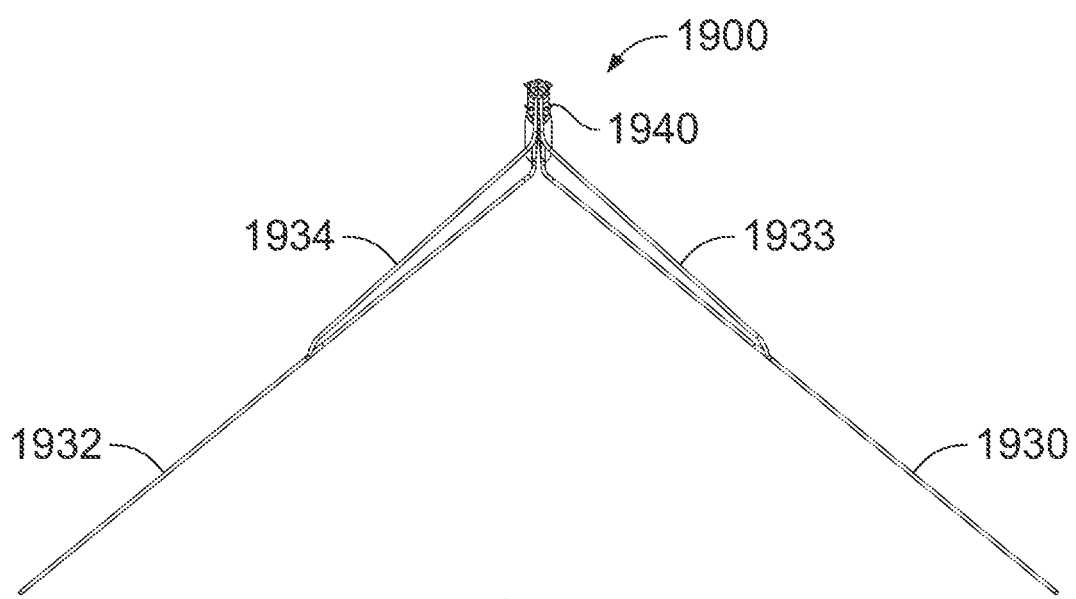
FIG. 40A shows a partial top view of payload retrieval apparatus 1900.
Figure 40B:
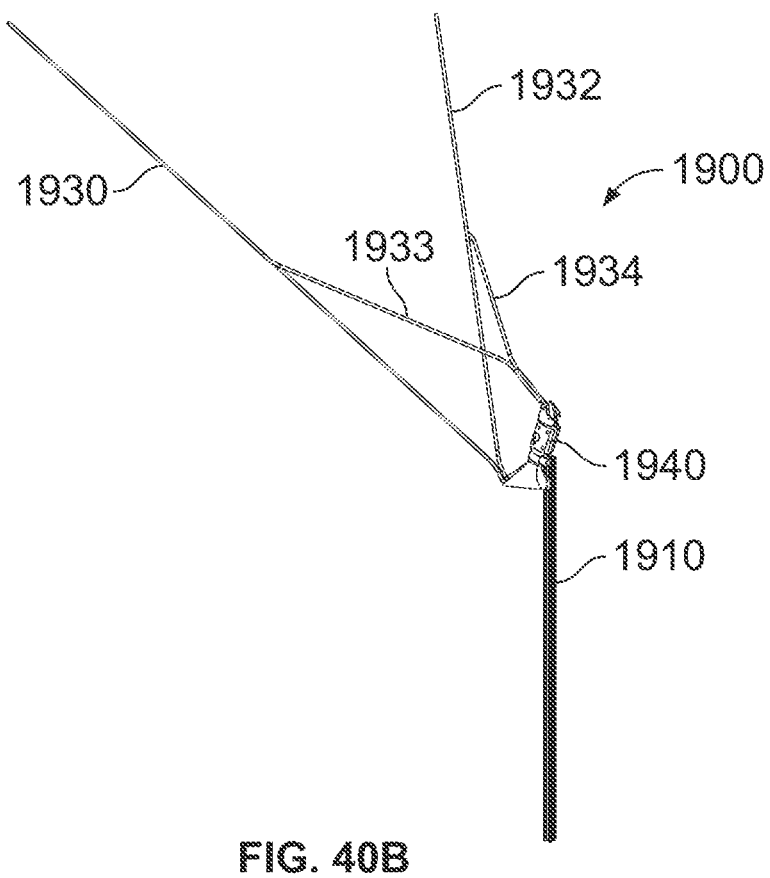
FIG. 40B shows a partial rear perspective view of payload retrieval apparatus 1900.
Figure 40C:
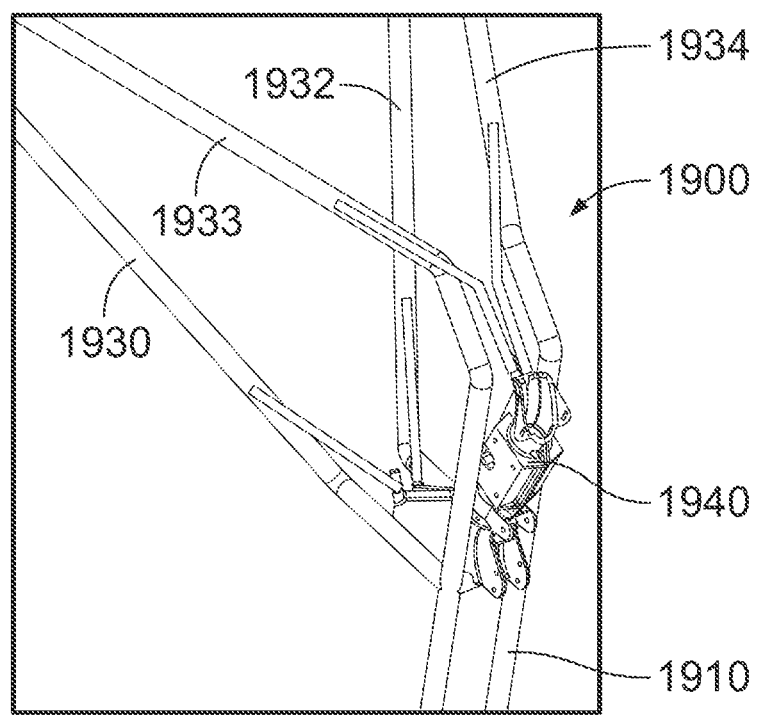
FIG. 40C shows a partial rear perspective view of payload retrieval apparatus 1900.
Figure 40D:
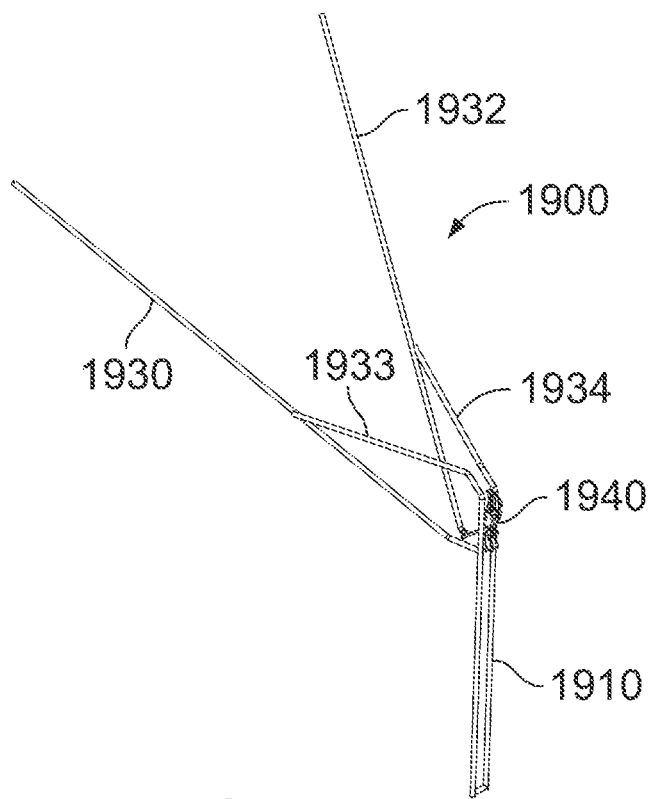
FIG. 40D shows a partial rear perspective view of payload retrieval apparatus 1900.

FIG. 39 illustrates that payload retrieval apparatus 1900 may advantageously be sized to span only a single parking space 1937.

Figure 41A:
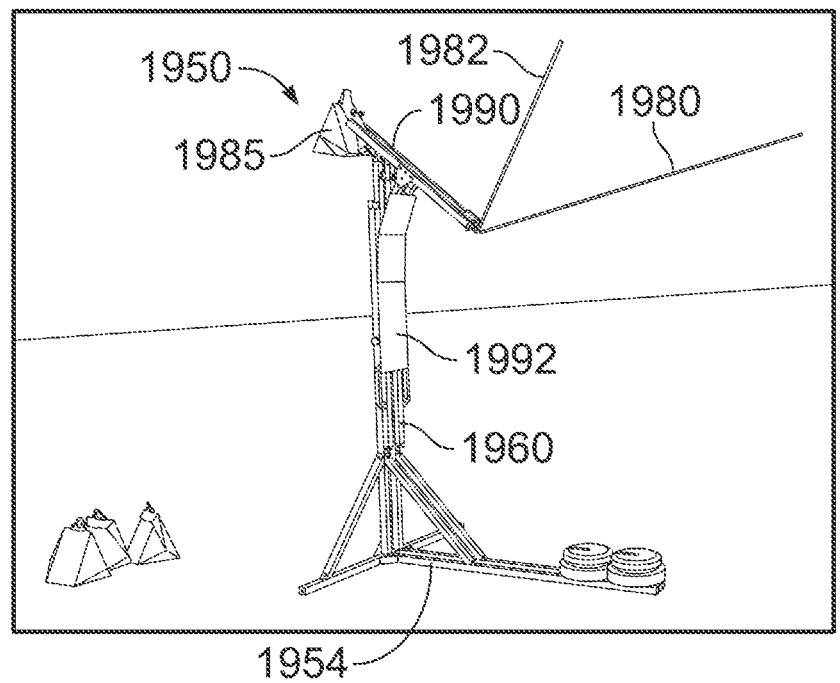
FIG. 41A shows a perspective view of payload retrieval apparatus 1950.
Figure 41B:
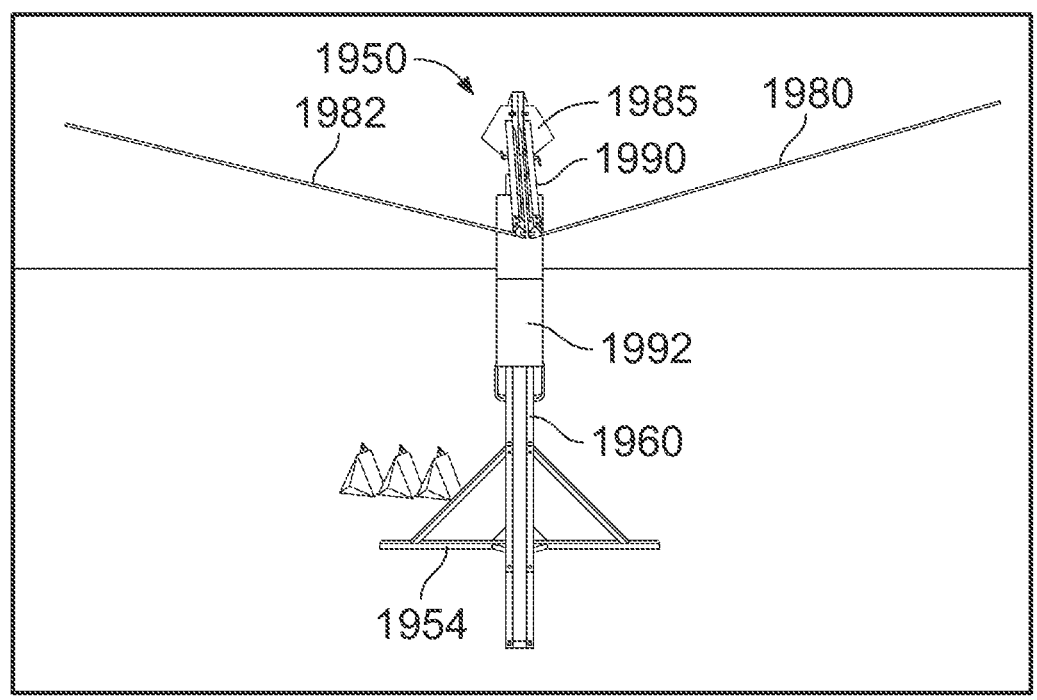
FIG. 41B shows a front view of payload retrieval apparatus 1950.
Figure 41C:
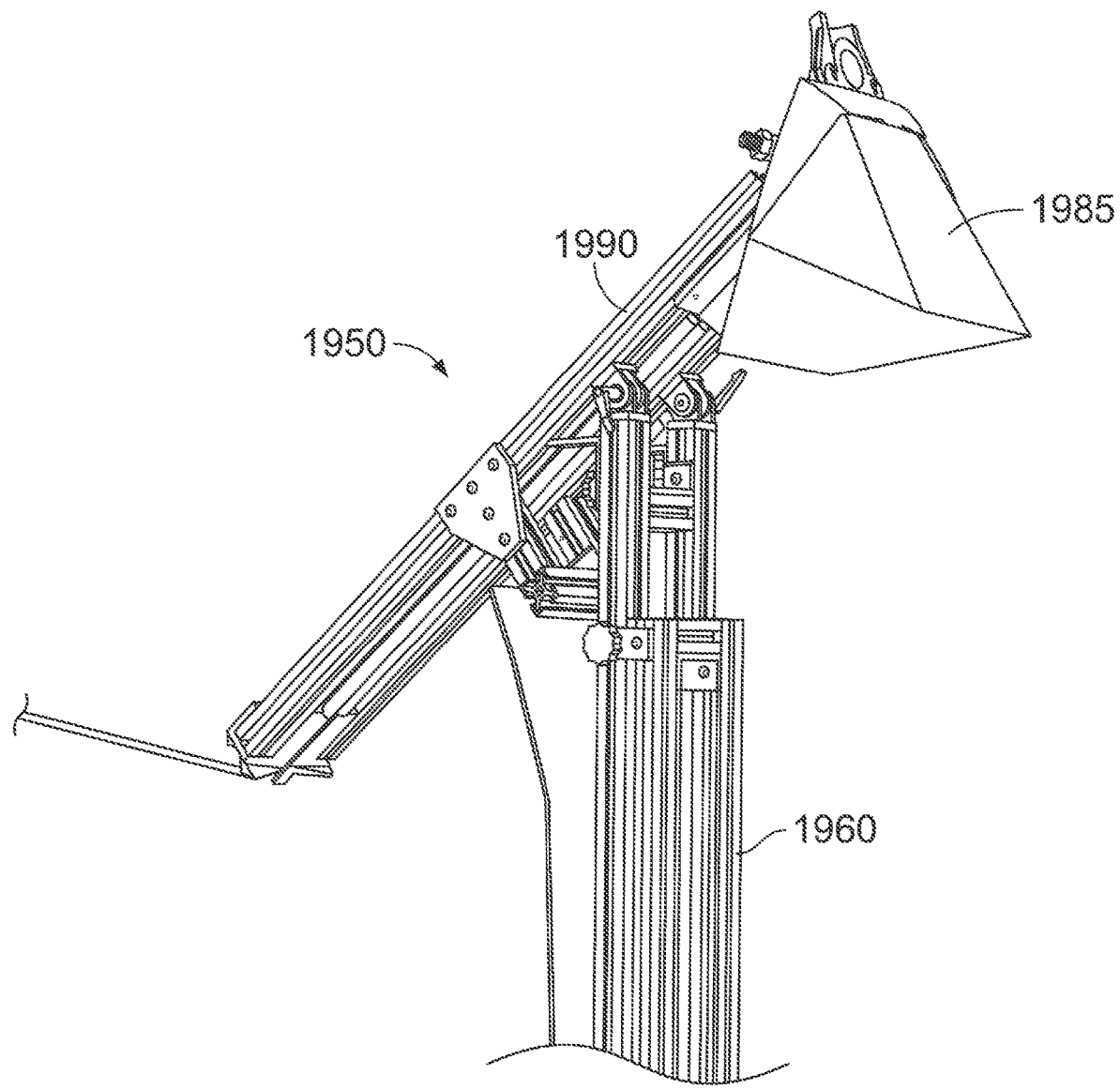
FIG. 41C shows a partial side view of payload retrieval apparatus 1950.

FIGS. 41A-C show various views of payload retrieval apparatus 1950. Payload retrieval apparatus 1950 operates in a manner similar to payload retrieval apparatus 1900. Payload retrieval apparatus 1950 includes base 1954, upwardly extending member 1960, and a payload coupling apparatus channel 1990. Payload retrieval apparatus 1950 also includes tether engagers 1980 and 1982 which are used to engage a tether attached to a payload coupling apparatus, whereafter the payload coupling apparatus is drawn into and through the payload coupling apparatus channel 1990 to pick up payload 1985. Payload coupling apparatus channel 1990 may include a guiding member with a tether slot which the payload coupling apparatus rides beneath until it is drawn into a curved portion of the payload coupling apparatus channel 1990 attached to the guiding member. Payload retrieval apparatus 1950 is shown with a shield 1992 which helps to prevent the payload coupling apparatus from getting tangled with the frame of the payload retrieval apparatus 1950. Payload retrieval apparatus 1950 provides for automated pickup of payload 1985, and may operate in the same manner as payload retrieval apparatuses 1000 and 1480 described above.

Figure 42:
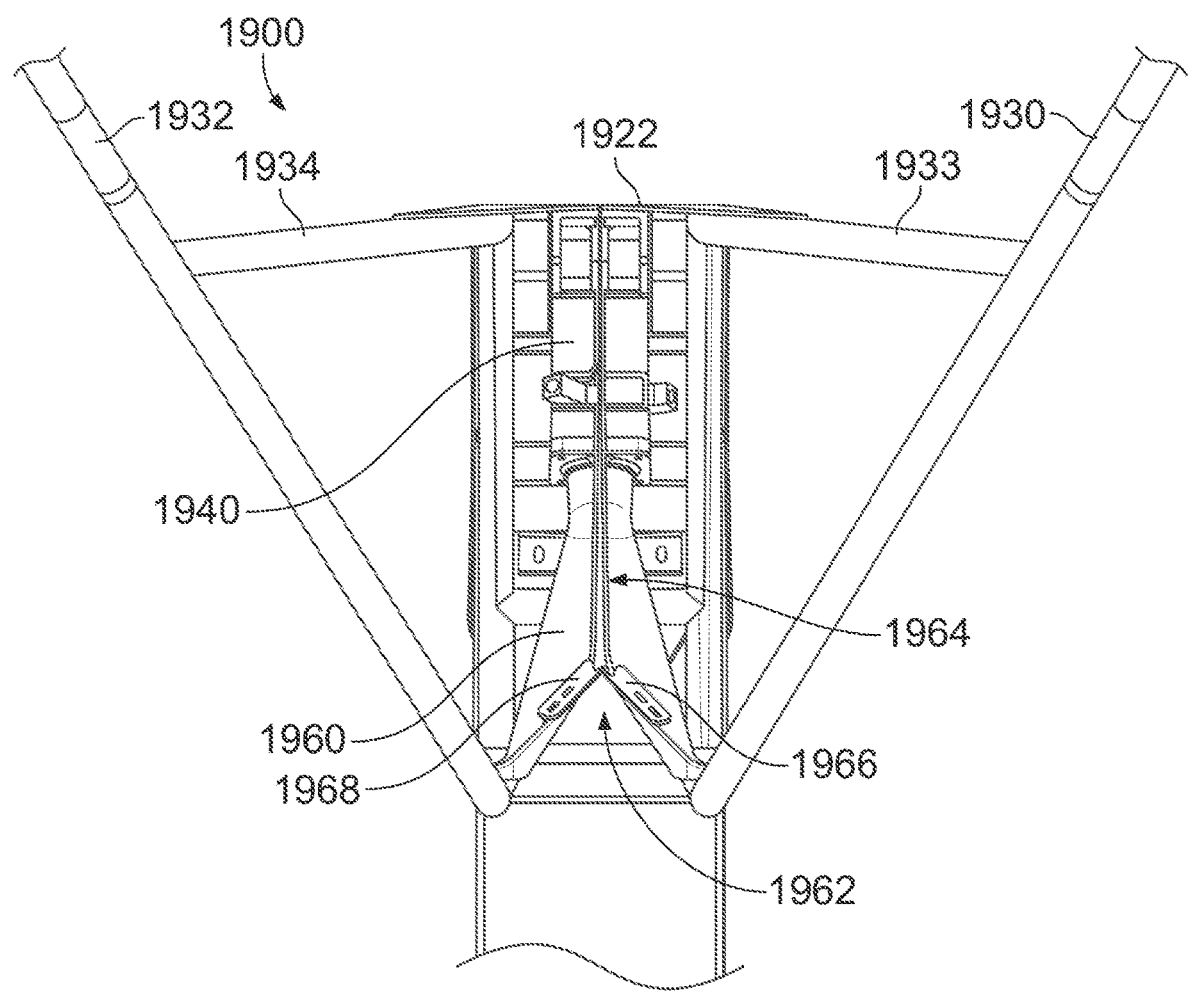
FIG. 42 is a close-up rear view of payload retrieval apparatus 1900.
Figure 43:
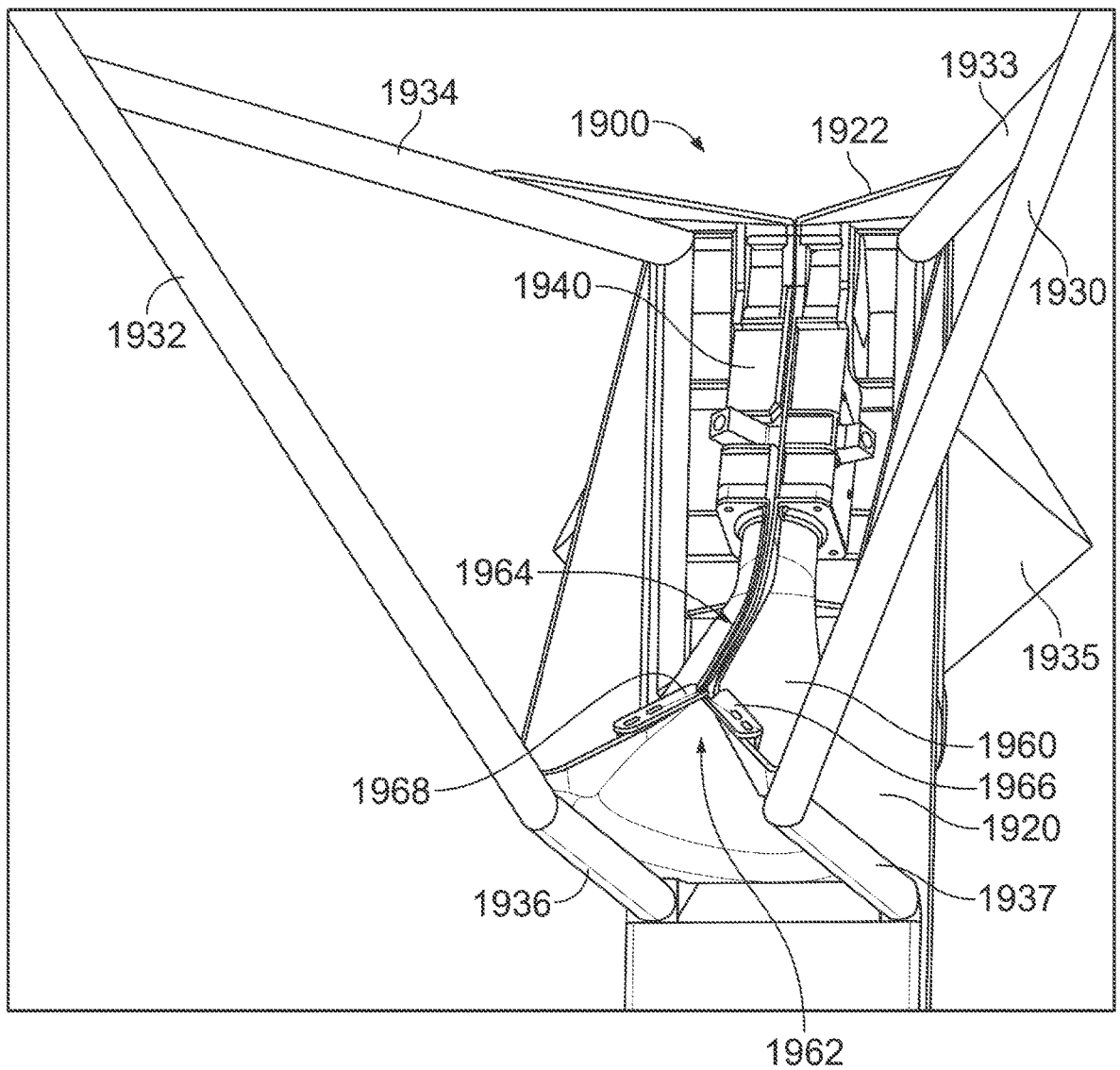
FIG. 43 is a close-up perspective rear view of payload retrieval apparatus 1900.
Figure 44:
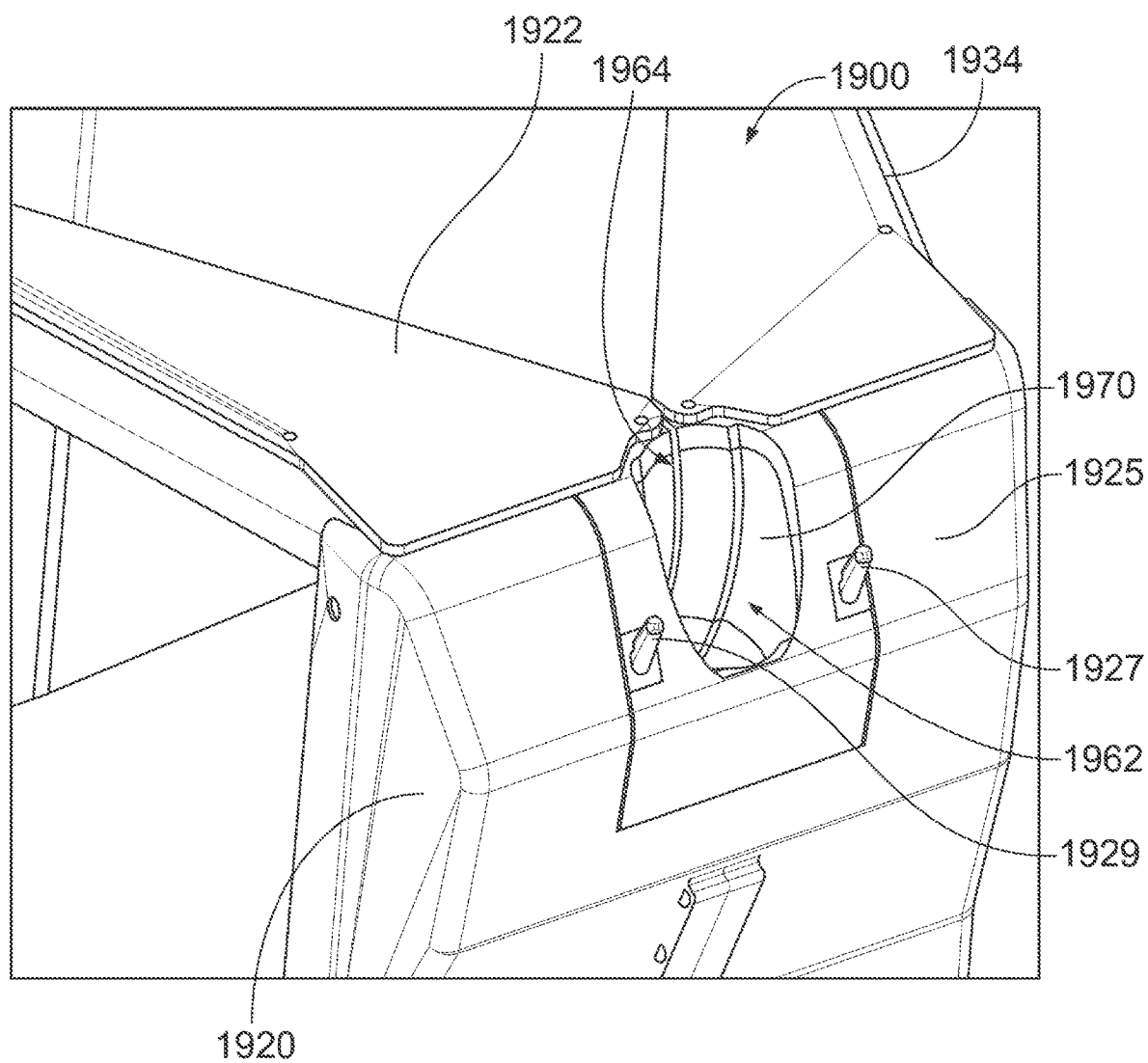
FIG. 44 is a close-up perspective front view of payload retrieval apparatus 1900.

FIG. 42 is a close-up rear view of payload retrieval apparatus 1900, and FIG. 43 is a close-up perspective rear view of payload retrieval apparatus 1900. A channel passage 1962 extends within channel 1960 and extends through to the front of payload retrieval apparatus 1900 as shown in FIG. 44. Channel 1960 includes a tether slot 1964 to allow for the passage of a tether attached to a payload retriever as the payload retriever passes through the channel 1960. On the rear side of payload retrieval apparatus 1900, channel 1960 has a funnel shape which narrows from an entry point as it extends towards the front of payload retrieval apparatus 1900.

FIG. 44 is a close-up perspective front view of payload retrieval apparatus 1900. A pair of pins 1927 and 1929 are positioned on payload holder wall 1925 at the exit of channel passage 1962, that are configured to extend through corresponding apertures in the handle of a payload as described in more detail above. Therefore, the pair of pins 1927 and 1929 serve as a payload holder to hold a payload that is in position to be retrieved by a payload retriever as the payload retriever exits channel portion 1970 through channel passage 1962. Payload retrieval apparatus 1900 includes side plates 1920 and top plate 1922 that serve to protect the channel 1960 from wind, debris, and other elements that could interfere with the proper operation of the channel. Top plate 1922 may also serve to guide a tether attached to a payload retriever through tether slot 1964 in channel 1960.

When a payload is positioned on a payload holder of a payload retrieval apparatus, there is a concern for the security of the payload. For example, an unattended payload could be subject to theft or tampering. Therefore, it would be desirable to provide security measures regarding the payload to prevent theft or tampering of the payload 2150 or its contents, to ensure that the payload delivery is completed as planned. One option is to secure the entire payload retrieval apparatus within a fenced area behind a locked gate to secure the payload to be retrieved. Alternatively, there are physical measures that can be taken on the payload retrieval apparatus itself that may be employed to secure the payload that are described below.

Figure 45A:
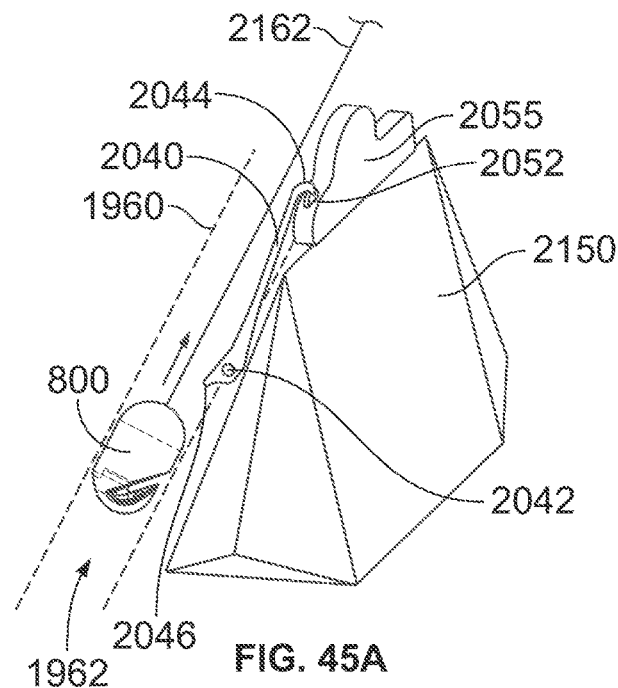
FIG. 45A is a perspective view of payload retriever 800 passing through tether channel passage 1962 of channel 1960 towards locking member 2040.

FIG. 45A is a perspective view of payload retriever 800 passing through channel passage 1962 of channel 1960 towards locking member 2040. Locking member 2040 is mounted on pivot 2042. A first end 2044 of locking member 2040 engages a latch 2052 on locking cover 2055 to lock locking strap 2055 into a locked position over handle 511 of payload 2150 and pins 570 and 572 of payload holder 2060. When positioned in the locked position shown in FIG. 45A, locking cover 2055 encloses the handle 511 and serves to prevent the theft of payload 2150, as well as prevent the opening of payload 2150 and any tampering with the contents within payload 2150.

Figure 45B:
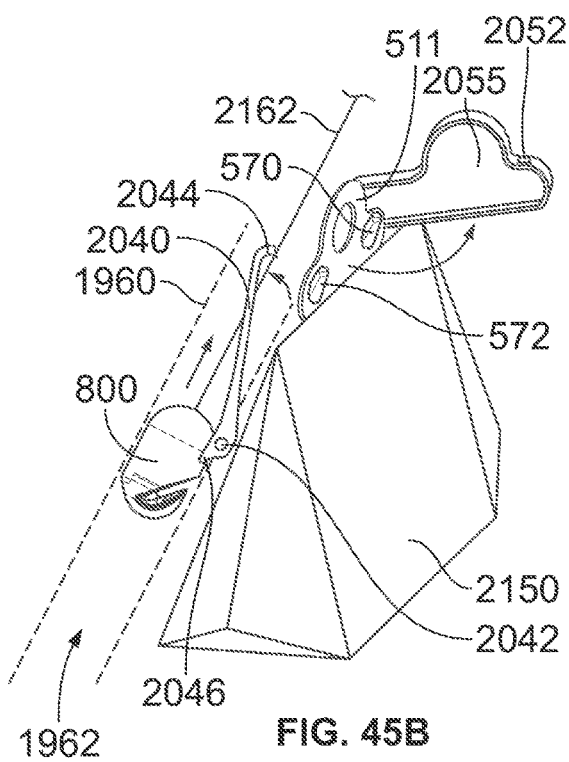
FIG. 45B is a perspective view of payload retriever 800 passing through tether channel passage 1964 of channel 1960 and a movable end of locking member 2040 to move locking member 2040 to an unlocked position where locking strap 2055 is moved away from the payload handle 511 of payload 2150.

FIG. 45B is a perspective view of a locking member 2040 having a second movable end 2046 extending through a wall of channel 1960 into an interior of channel 1960. Payload retriever 800 attached to tether 2162 is shown passing through channel passage 1962 of channel 1960 and over the movable second end 2046 of locking member 2040 to unlatch the first end 2044 of locking member 2040 from latch 2052 and move locking member 2040 to an unlocked position where locking cover 2055 is moved away from the payload handle 511 of payload 2150. As illustrated in FIG. 45B, in the unlocked position, the movable second end 2046 of locking member 2040 is depressed by payload retriever 800 as payload retriever 800 passes through the channel 1960 to unlatch the first end 2044 from latch 2052 on locking cover 2055. The locking member 2040 may be spring-biased such that the second movable end 2046 is biased towards the interior of channel 1960. In addition, locking cover 2055 may be spring-biased into the open position shown in FIG. 45B. The locking member 2040 thus acts as a switch to release the locking cover 2055 from the locked position as the payload retriever 800 passes through the channel passage 1962.

While the latch 2052 that holds the locking cover 2055 shut is illustrated as being on top of locking cover 2055, in some embodiments the latch may be positioned inside the locking cover 2055 so that the locking member 2040 is covered and cannot be unlatched from the outside.

Figure 45C:
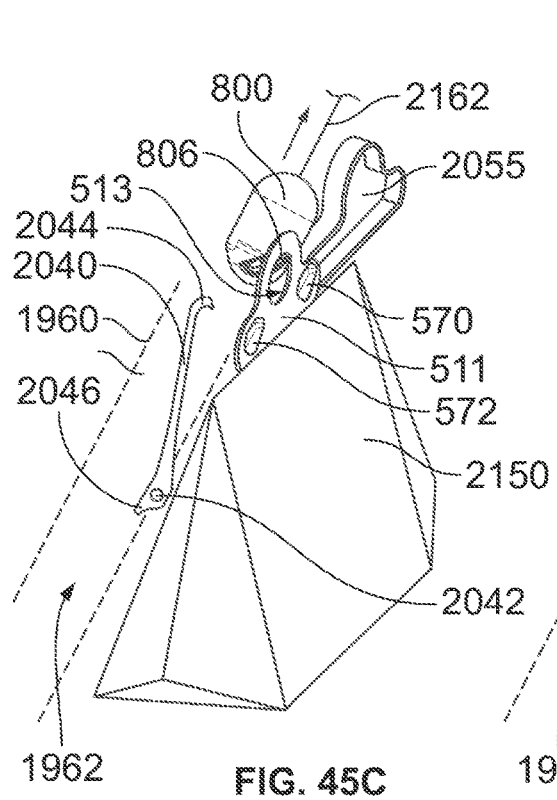
FIG. 45C is a perspective view of payload retriever 800 exiting the channel passage 1964 of channel 1960 and engaging handle 511 of payload 2150.
Figure 45D:
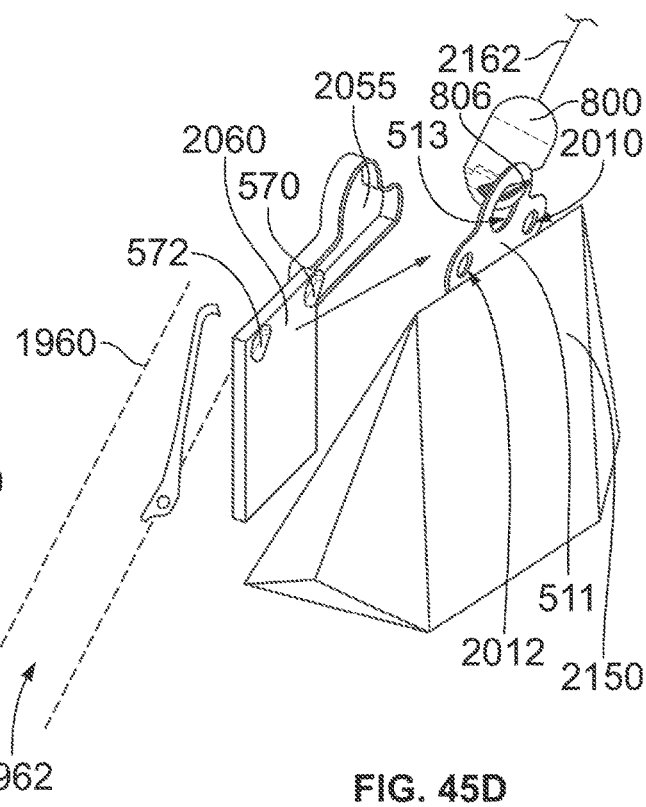
FIG. 45D is a perspective view of payload retriever 800 after removal of payload 2150 from pins 570 and 572.

FIG. 45C is a perspective view of payload retriever 800 exiting the channel passage 1962 of channel 1960 and engaging handle 511 of payload 2150. A lip 806 of payload retriever 800 extends through aperture 513 in handle 511 of payload 2150 to engage payload 2150. FIG. 45D is a perspective view of payload retriever 800 after removal of payload 2150 from pins 570 and 572 of payload holder 2060.

FIG. 46A is a side view of payload retriever 800 attached to tether 2162 passing through channel passage 1433 of channel 1410 towards locking member 2039. Locking member 2039 operates in a similar manner as locking member 2040 shown in FIGS. 45A-D. Locking member 2039 extends over a latch on locking strap 2090 to lock locking strap 2090 into a locked position over handle 511 of payload 2150 and pins 570 and 572. Locking strap 2090 operates in a similar manner as locking strap 2055 shown in FIGS. 45A-D, except that locking strap 2090 includes holes 2010 and 2012 through which pins 570 and 572 extend. When positioned in the locked position shown in FIG. 46A, locking strap 2090 serves to prevent the theft of payload 2150, as well as prevent the opening of payload 2150 and any tampering with the contents within payload 2150.

Figure 46D:
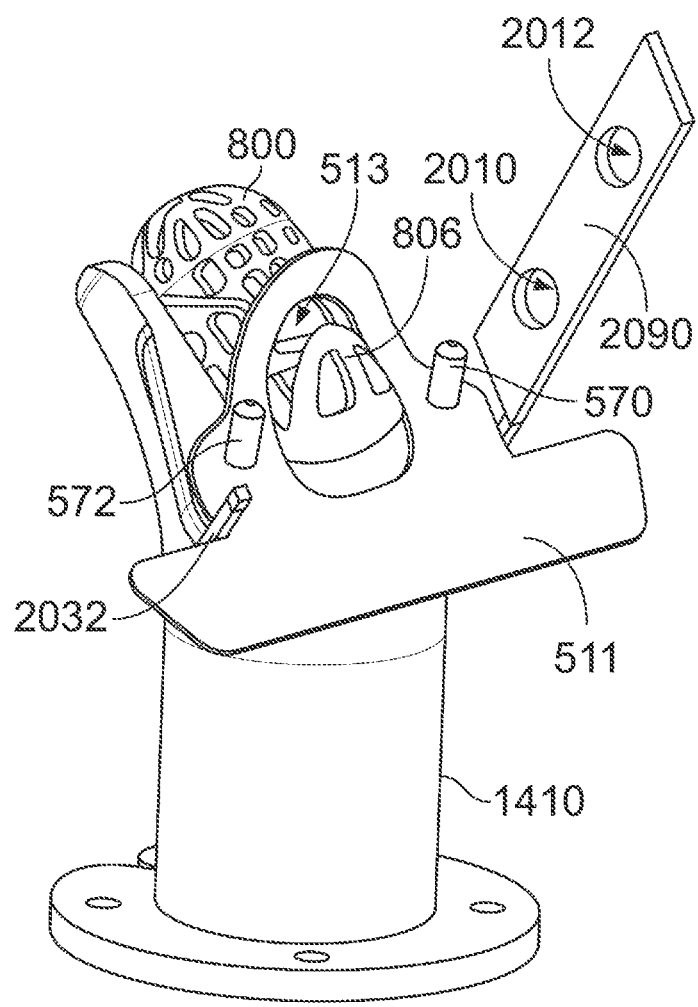
FIG. 46D is a perspective view of locking strap 2090 in an open position.

FIG. 46B is a perspective view of locking strap 2090 positioned over handle 511 and pins 570 and 572; and FIG. 46C is another perspective view of locking strap 2090 positioned over handle 511 and pins 570 and 572. In FIGS. 46B and 46C, payload retriever 800 attached to tether 2162 has not yet passed over the movable end of locking member 2039 such that locking strap 2090 is still in a locked position over handle 511 of payload 2150 and pins 570 and 572. FIG. 46D is a perspective view of locking strap 2090 in an open position after payload retrieval 800 has passed over and depressed the movable end of locking member 2039 to unlatch locking strap 2090 and moved locking strap 2090 into an unlocked and open position shown in FIG. 46D. The locking member 2039 may be spring-biased such that the movable end of locking member 2039 is biased towards the interior of channel 1410. In addition, locking strap 2090 may be spring-biased into the open position shown in FIG. 46D.

FIG. 46D is a perspective view of payload retriever 800 exiting the channel passage 1433 of channel 1410 and engaging handle 511 of payload 2150. A lip 806 of payload retriever 800 extends through aperture 513 in handle 511 of payload 2150 to engage payload 2150 to effectuate payload retrieval by payload retriever 800 attached to tether 2162 and suspended from a UAV.

Locking straps 2055 and 2090 described above are shown extending over handle 511 of payload 2150 and pins 570 and 572. However, a locking strap or door could be configured to extend over not only handle 511 of payload 2150 and pins 570 and 572, but also extend over the entire payload 2150. A locking strap or door extending over the entire payload 2150 could be operated in the same manner as locking straps 2055 and 2090 to unlock a locking strap or door configured to extend over the entire payload 2150.

Figure 47A:
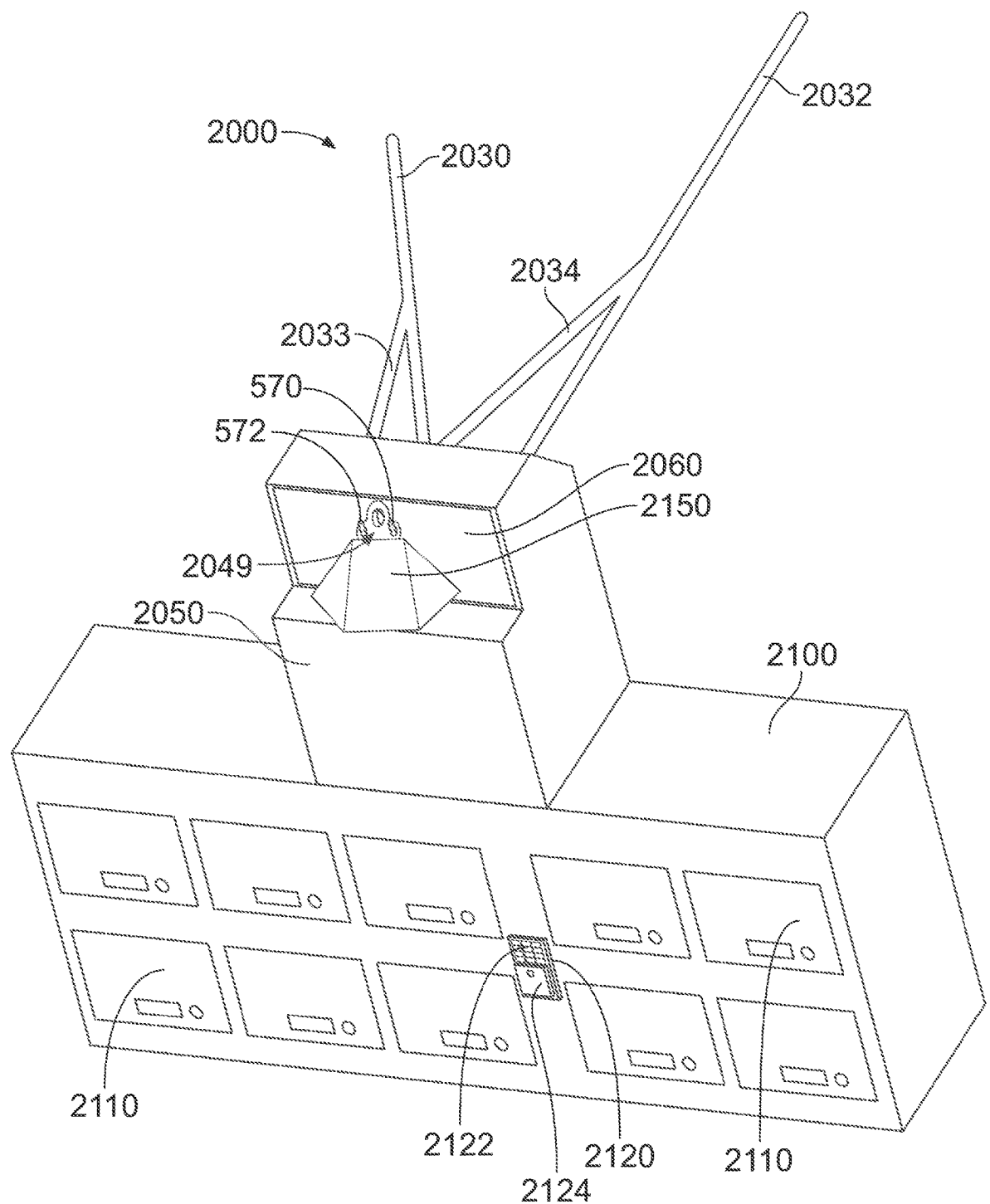
FIG. 47A is a perspective view of combination payload retrieval and package pickup apparatus 2000 with payload 2150 positioned on payload holder 2060.

FIG. 47A is a perspective view of combination payload retrieval and package pickup apparatus 2000. However, combination payload retrieval apparatus 2000 could also be configured in the same manner as payload retrieval apparatus 1900 described above, as well as the other payload retrieval apparatuses described above. Payload retrieval apparatus 2000 includes tether engagers 2030 and 2032 which are used to engage a tether 2160 attached to a payload retriever 2160, also referred to as payload retriever, shown in FIG. 47B and described above. Tether engager 2030 includes member 2033 which provides mechanical support for tether engager 2030, and provides other functions. In the same manner, tether engager 2032 includes member 2034 which provides mechanical support for tether engager 2032, and provides other functions.

Combination payload retrieval and package pickup apparatus 2000 also includes a package receptacle housing 2100 having package receptacles 2110 into which packages are received for subsequent package pickup, which can be driver pickup (by a driver in a vehicle) or curbside pickup (by a person picking up a package).

Combination payload retrieval and pickup apparatus 2000 includes an autoloader assembly mounted to a base, which may be, but is not required to be, package receptacle housing 2100. The autoloader assembly includes a payload holder 2060 configured to hold a payload 2150 for retrieval by a UAV, and also includes a channel coupled to the payload holder 2040 and configured to direct a payload retriever to the payload holder 2060, the channel having a tether slot adapted for receiving a tether having a first end attached to the UAV and a second end attached to a payload retriever, wherein the channel is adapted to receive the payload retriever suspended from the UAV, and the tether slot in the channel allows for passage of the tether during movement of the payload retriever through the channel, wherein when the payload retriever exits the channel, the payload retriever is configured to engage a handle of the first payload and remove the first payload from the payload holder. The details of the channel are described in more detail above in the description of payload retrieval apparatus 1900 in FIGS. 42-44 and elsewhere.

Figure 47B:
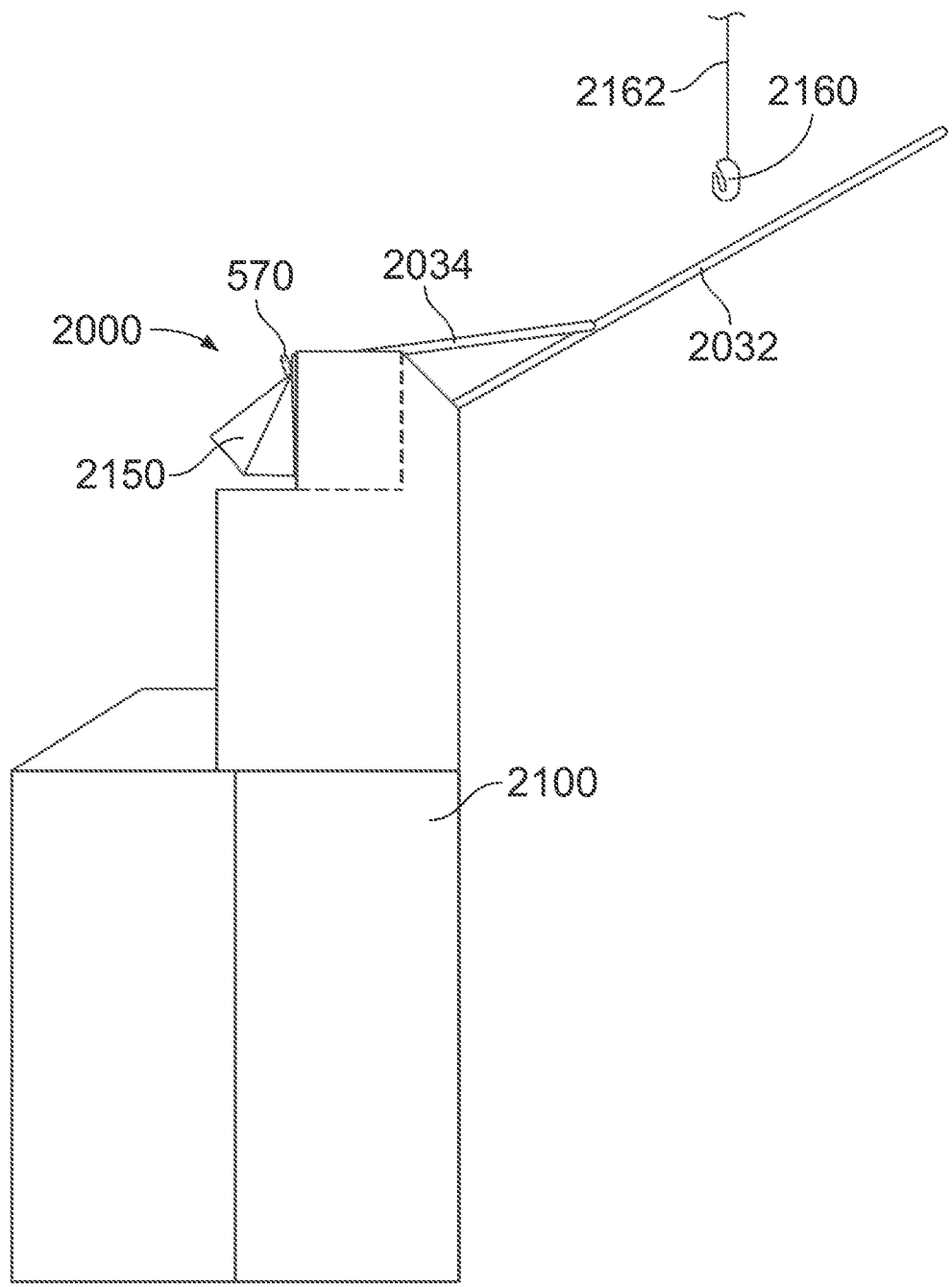
FIG. 47B is a side view of combination payload retrieval and package pickup apparatus 2000 shown in FIG. 47A.

An extending member 2050 is positioned above the package receptacle housing 2100 and extends to payload holder 2060 which is adapted to secure a handle 2049 of payload 2150 where payload 2150 is in position for retrieval by a payload retriever suspended from a tether from a UAV. A payload receiver platform 2062 is also positioned on package receptacle housing 2100 that is configured to receive a payload delivered from a UAV. Combination payload retriever and package pickup apparatus 2000 shown in FIG. 47A could also be provided without a package receptacle housing, such as payload retrieval apparatus 1900 described above. FIG. 47B is a side view of combination payload retrieval and package pickup apparatus 2000 with payload 2150 positioned on pins 570 and 572 on payload holder 2060.

Figure 47C:
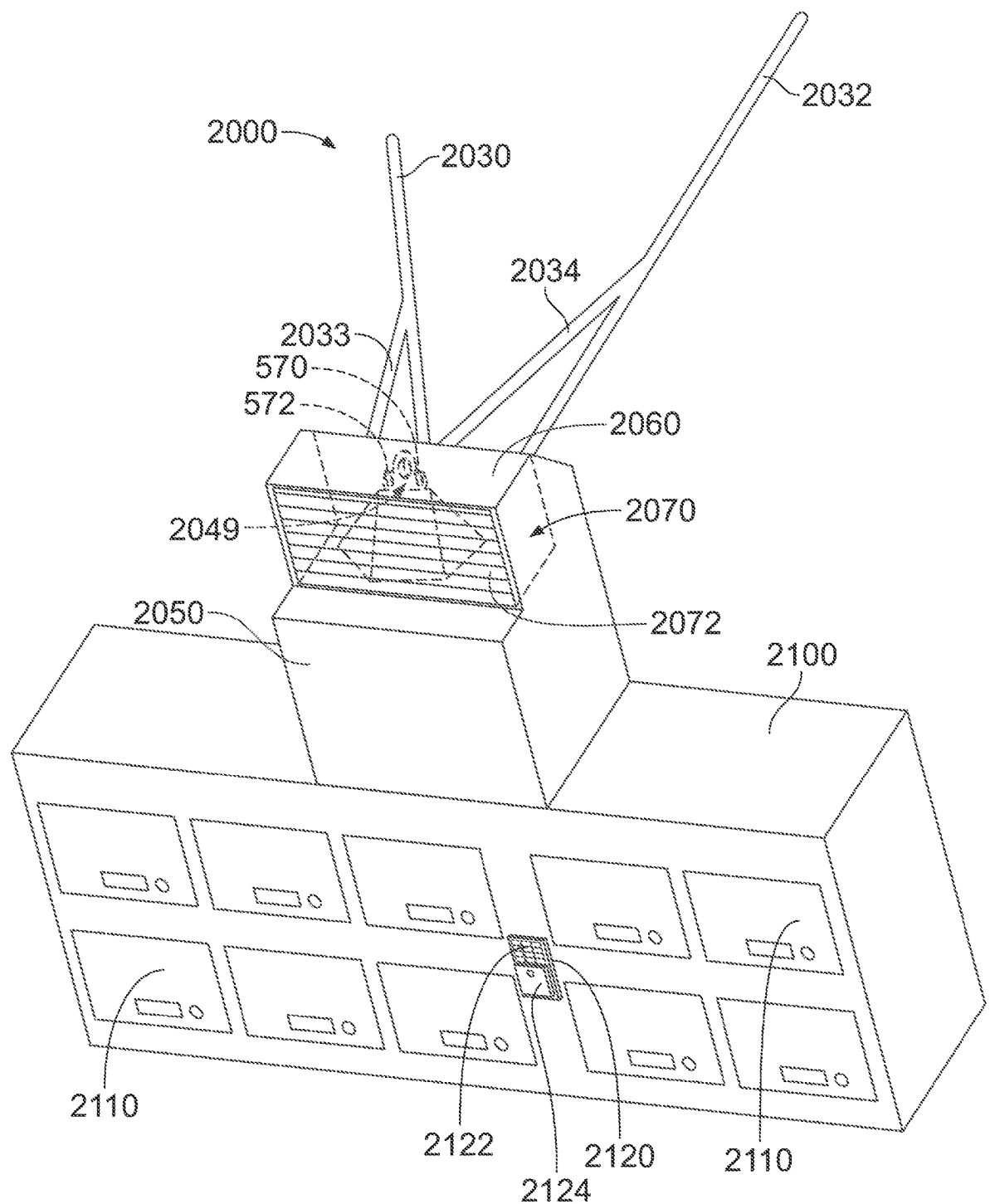
FIG. 47C is a perspective view of combination payload retrieval and package pickup apparatus 2000 after payload holder 2060 has been retracted into extending member 2050.
Figure 47D:
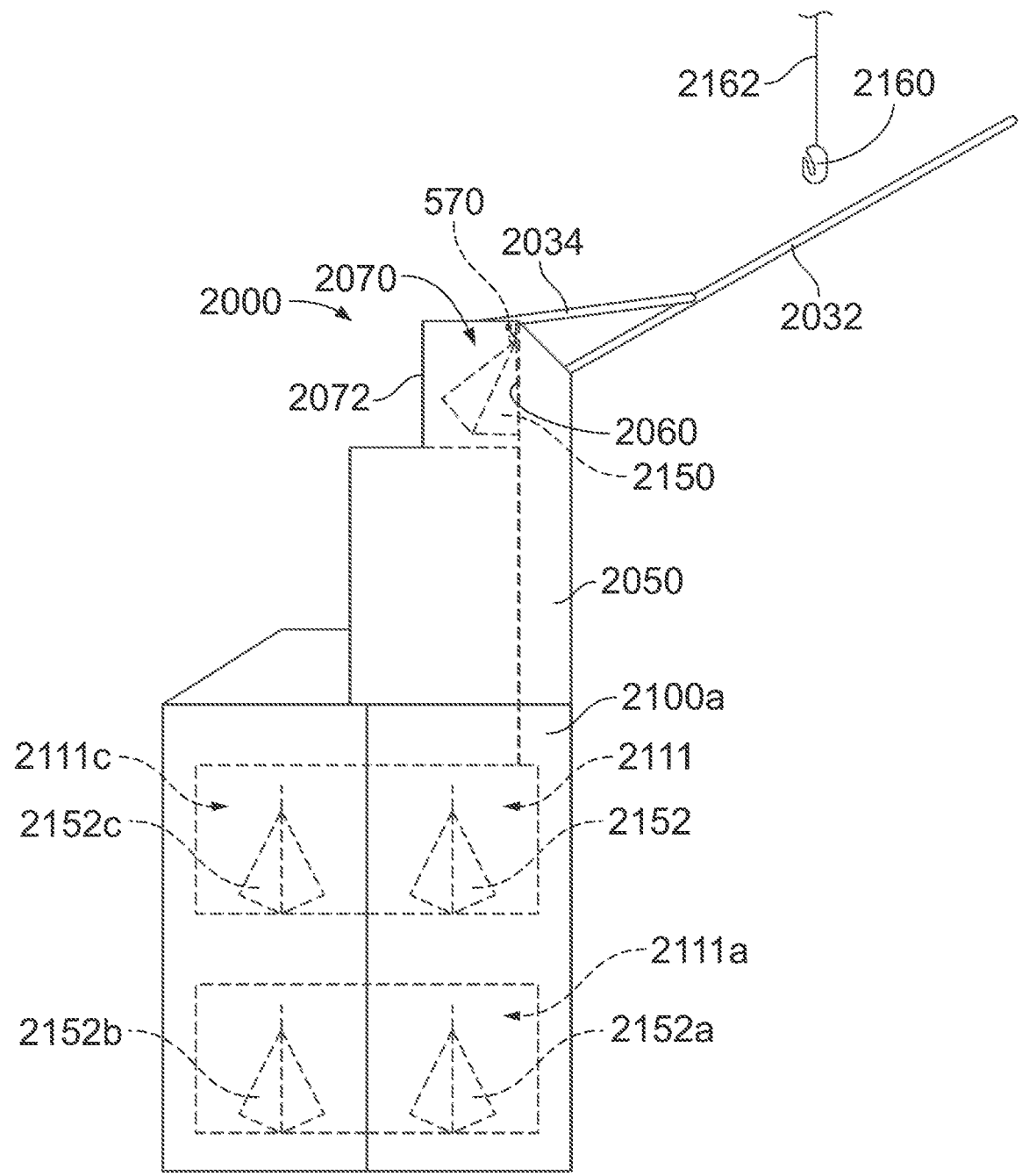
FIG. 47D is a side view of combination payload retrieval and package pickup apparatus 2000 shown in FIG. 47C.

FIG. 47C illustrates payload holder 2060, pins 570 and 572, and payload 2150 are shown after having been retracted into a slot or drawer 2070 within the extending member 2050. A door or sprung cover 2072 is shown after it has been closed over the slot or drawer 2070. Door or sprung cover 2072 may be locked to prevent access to payload 2150 and its contents behind the door or sprung cover 2072. FIG. 47D is a side view of payload 2150 positioned within the slot or drawer 2070 behind locked door or sprung cover 2072. Payload holder 2060 may be spring-loaded such that payload holder 2060 is biased into a forward position shown in FIGS. 47A and 47B. The payload holder 2060 may be latched within the extending member 2050 when the payload holder 2060 is in a retracted position as shown in FIGS. 47C and 47D. Further, door or sprung cover 2072 may be latched into the closed position shown in FIGS. 47C and 47D, and door or sprung cover 2072 may be spring-biased into the open position shown in FIGS. 47A and 47B.

The payload holder 2060 and door or sprung cover 2072 may be unlatched using a locking member 2039 or 2040 when a payload retriever passes through the channel and depresses a movable end of the locking member 2039 or 2040 to allow for retrieval of payload 2150 by the payload retriever suspended from a tether from a UAV.

In addition, instead of using a mechanical locking member 2039 or 2040 to unlatch locking straps 2055 and 2090, and unlatch payload holder 2060 and door 2072, a switch could be placed in the interior of channel 1960 which is tripped when the payload retriever passes over the switch and the switch sends a signal to unlatch the locking straps 2055 and 2090, or to unlatch payload holder 2060 and door 2072.

Furthermore, a locking member 2039 or 2040, or a switch within the interior of channel 1960 are not required to provide for the unlatching of locking straps 2055 or 2090, or payload holder 2060 or door 2072. Instead, the latches for those members could be unlatched using an electrical signal, WiFi, infrared, UAV proximity sensor or other sensor that is activated by a signal received from a tablet, phone, or computer. In this scenario, a servo actuated locking arm, locking coupler, cam latch, cam hook latch, hinge with an electrical switching function, etc. could also be used for the purpose of unlatching the locking straps 2055 or 2090, or payload holder 2060 or door 2072. In addition, each of these could also be unlatched manually. For example, if it is determined that the wrong payload is positioned on the payload holder, or an order is cancelled, the locking feature used to provide security for the payload may be unlocked manually to remove the payload from the payload holder. In this regard, a key could be used that extends into pivot 2042 of locking member 2040, where the key is operable to move the movable end 2046 and first end 2044 of locking member 2040 to unlatch locking strap 2055 and unlock the payload 2150 for payload retrieval, as an example.

Figure 48A:
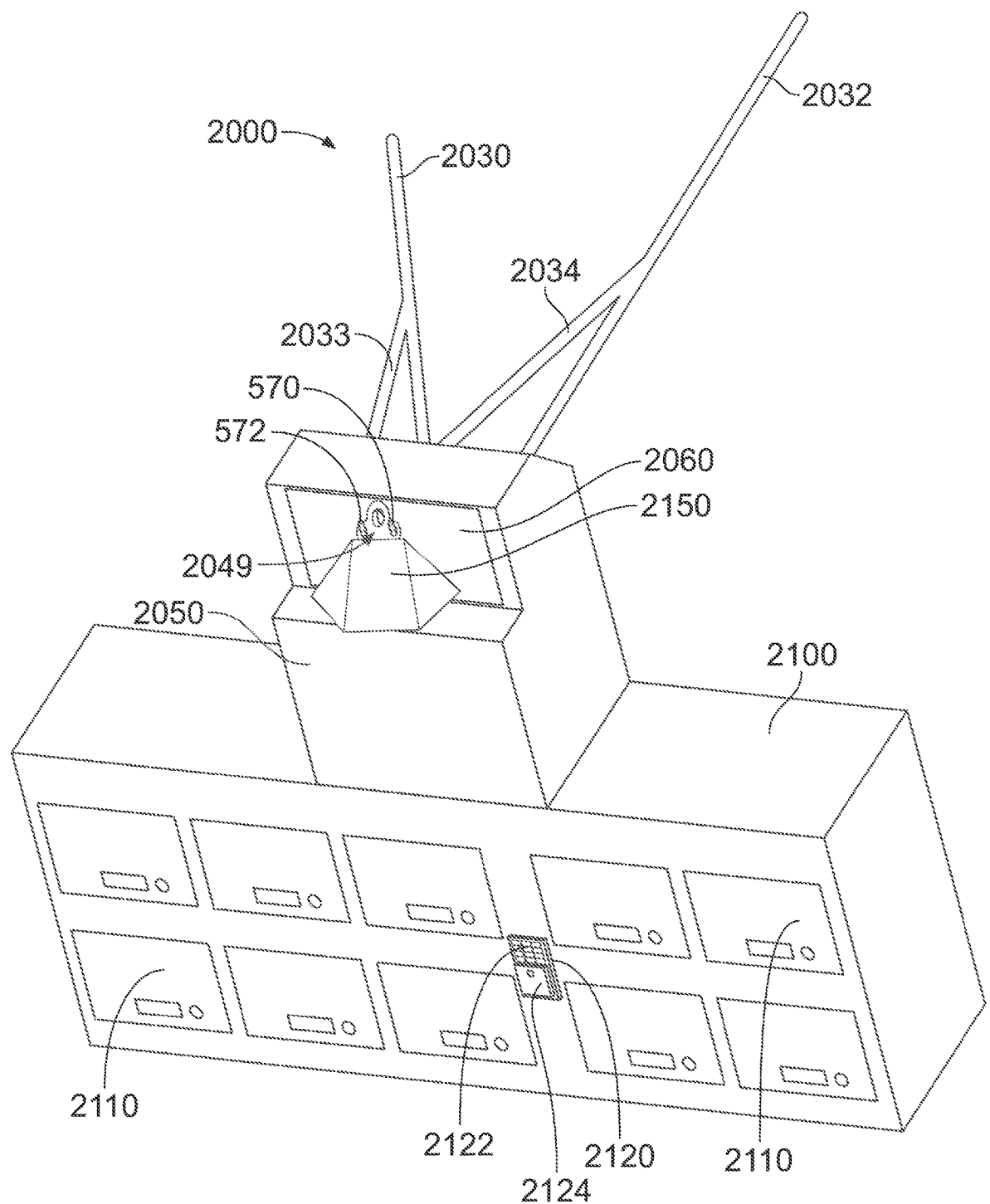
FIG. 48A is a perspective view of combination payload retrieval and package pickup apparatus 2000 with payload 2150 positioned on payload holder 2060.
Figure 48B:
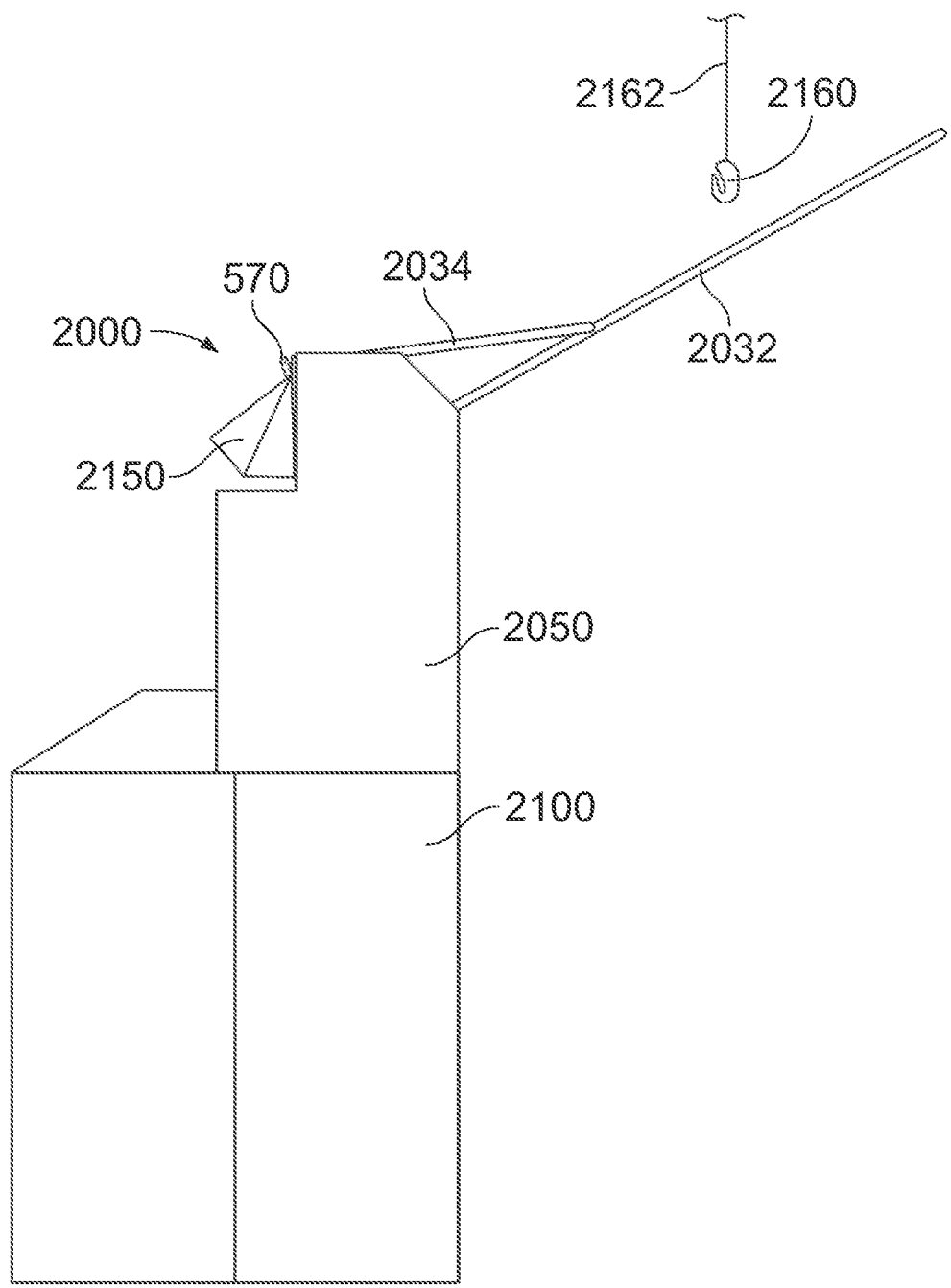
FIG. 48B is a side view of combination payload retrieval and package pickup apparatus 2000 shown in FIG. 48A.

FIG. 48A is a perspective view of combination payload retrieval and package pickup apparatus 2000 with payload 2150 positioned on pins 570 and 572 on payload holder 2060. The details of payload retrieval and package pickup 2000 is described above with respect to FIGS. 47A-47D and therefore will not be further described here. FIG. 48B is a side view of combination payload retrieval and package pickup apparatus 2000 with payload 2150 positioned on pins 570 and 572 on payload holder 2060. Payload holder 2060 is rotatable into the autoloader assembly that includes extending member 2050.

Figure 48C:
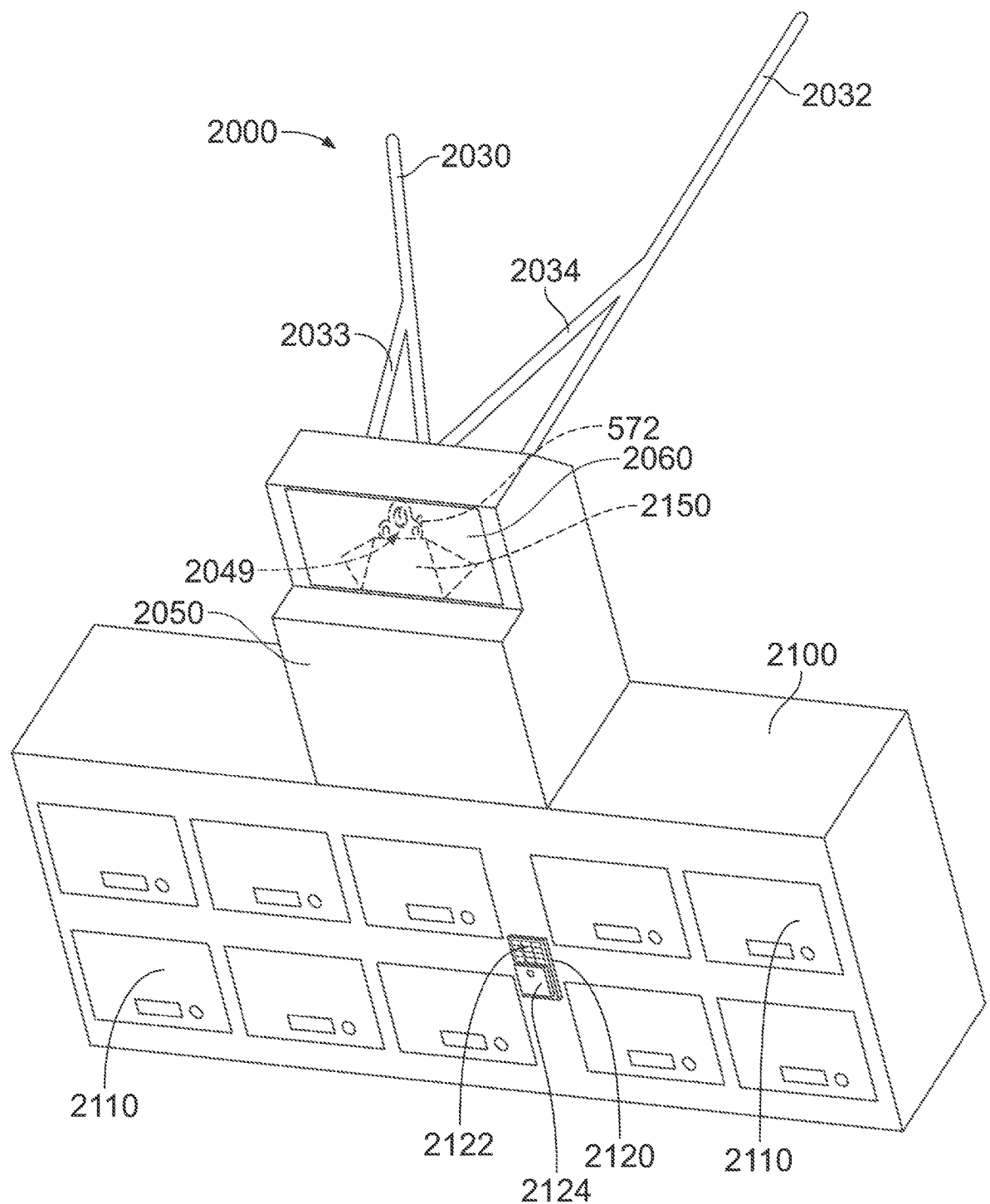
FIG. 48C is a perspective view of combination payload retrieval and package pickup apparatus 2000 after payload holder 2060 and payload 2150 have been rotated 180 degrees into extending member 2050.
Figure 48D:
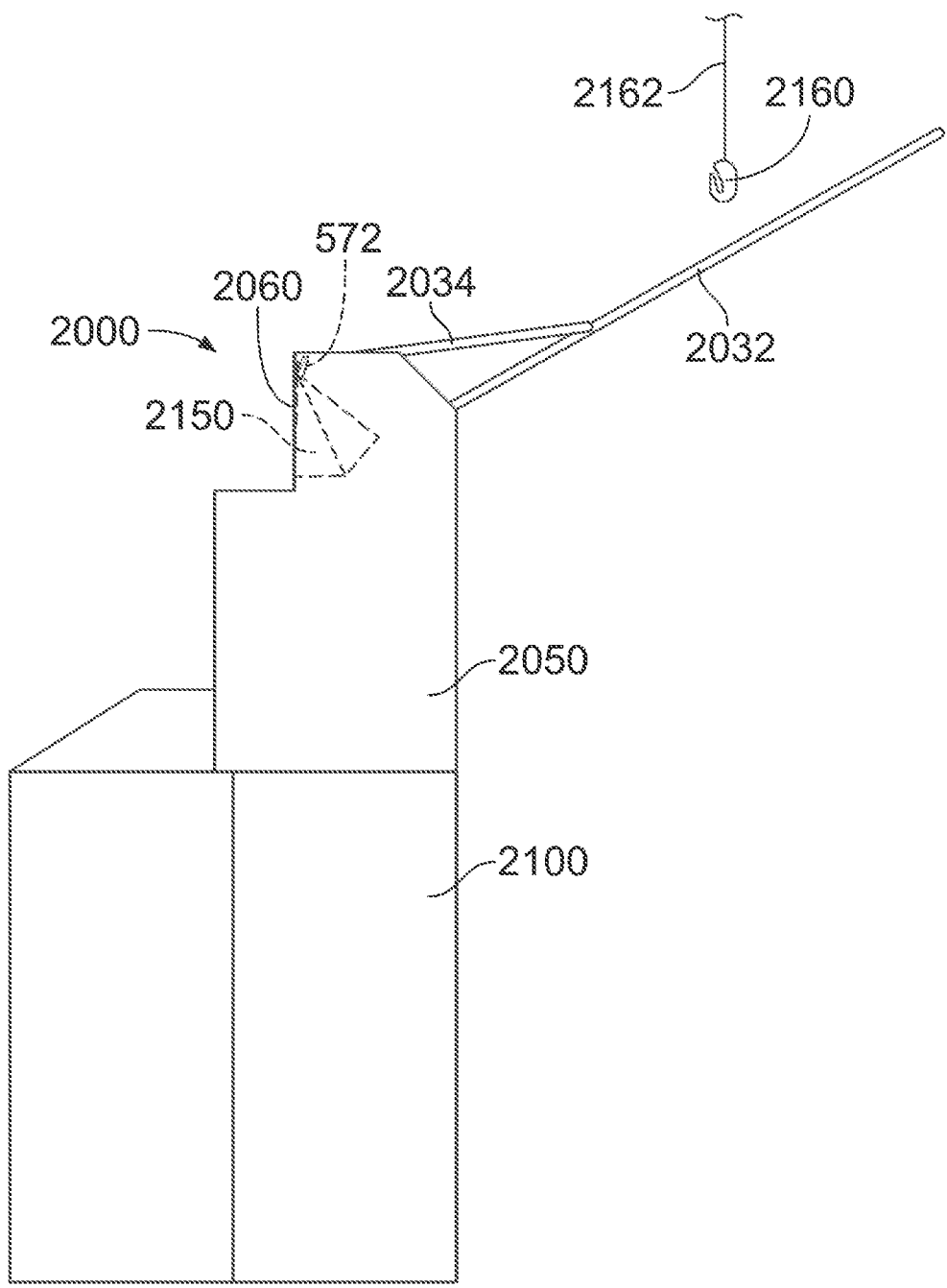
FIG. 48D is a side view of combination payload retrieval and package pickup apparatus 2000 shown in FIG. 48C.

FIG. 48C is a perspective view of combination payload retrieval and package pickup apparatus 2000 after payload holder 2060 has been rotated 180 degrees such that the payload 2150 is positioned within extending member 2050 of the autoloader assembly. FIG. 48D is a side view of combination payload retrieval and package pickup apparatus 2000 after payload holder 2060 has been rotated 180 degrees such that the payload 2150 is positioned within extending member 2050 of the autoloader assembly and latched into that position. After payload holder 2060 has been rotated 180 degrees such that the payload 2150 is positioned within extending member 2050 of the autoloader assembly, the payload 2150 is out of view and out of reach to prevent theft of payload 2150, or tampering with payload 2150 or its contents.

The payload holder 2060 may be unlatched using a locking member 2039 or 2040 when a payload retriever passes through the channel and depresses a movable end of the locking member 2039 or 2040 to unlock and unlatch payload holder 2060 to rotate payload 2150 back into an exposed position as shown in FIGS. 48A and 48B to allow for retrieval of payload 2150 by the payload retriever suspended from a tether from a UAV.

In addition, instead of using a mechanical locking member 2039 or 2040 to unlatch payload holder 2060 and rotate payload holder 180 degrees back into position for payload retrieval shown in FIGS. 48A and 48B, a switch could be placed in the interior of channel 1960 which is tripped when the payload retriever passes over the switch and the switch sends a signal to unlatch the payload holder 2060 and rotate payload 2150 back into an exposed position for payload retrieval.

Furthermore, a locking member 2039 or 2040, or a switch within the interior of channel 1960 are not required to provide for the unlatching of and rotation of payload holder 2060. Instead, the latch for payload holder 2060 could be unlatched using an electrical signal, WiFi, infrared, UAV proximity sensor or other sensor that is activated by a signal received from a tablet, phone, or computer. In this scenario, a servo actuated locking arm, locking coupler, cam latch, cam hook latch, hinge with an electrical switching function, etc. could also be used for the purpose of unlatching and rotating payload holder 2060.

In addition, payload holder 2060 could also be unlatched manually. For example, if it is determined that the wrong payload is positioned on the payload holder, or an order is cancelled, the locking feature used to provide security for the payload may be unlocked manually to remove the payload from the payload holder. In this regard, a key could be used that extends into pivot 2042 of locking member 2040, where the key is operable to move the movable end 2046 and first end 2044 of locking member 2040 to unlatch locking strap 2055 and unlock the payload 2150 for payload retrieval, as an example.

Figure 49A:
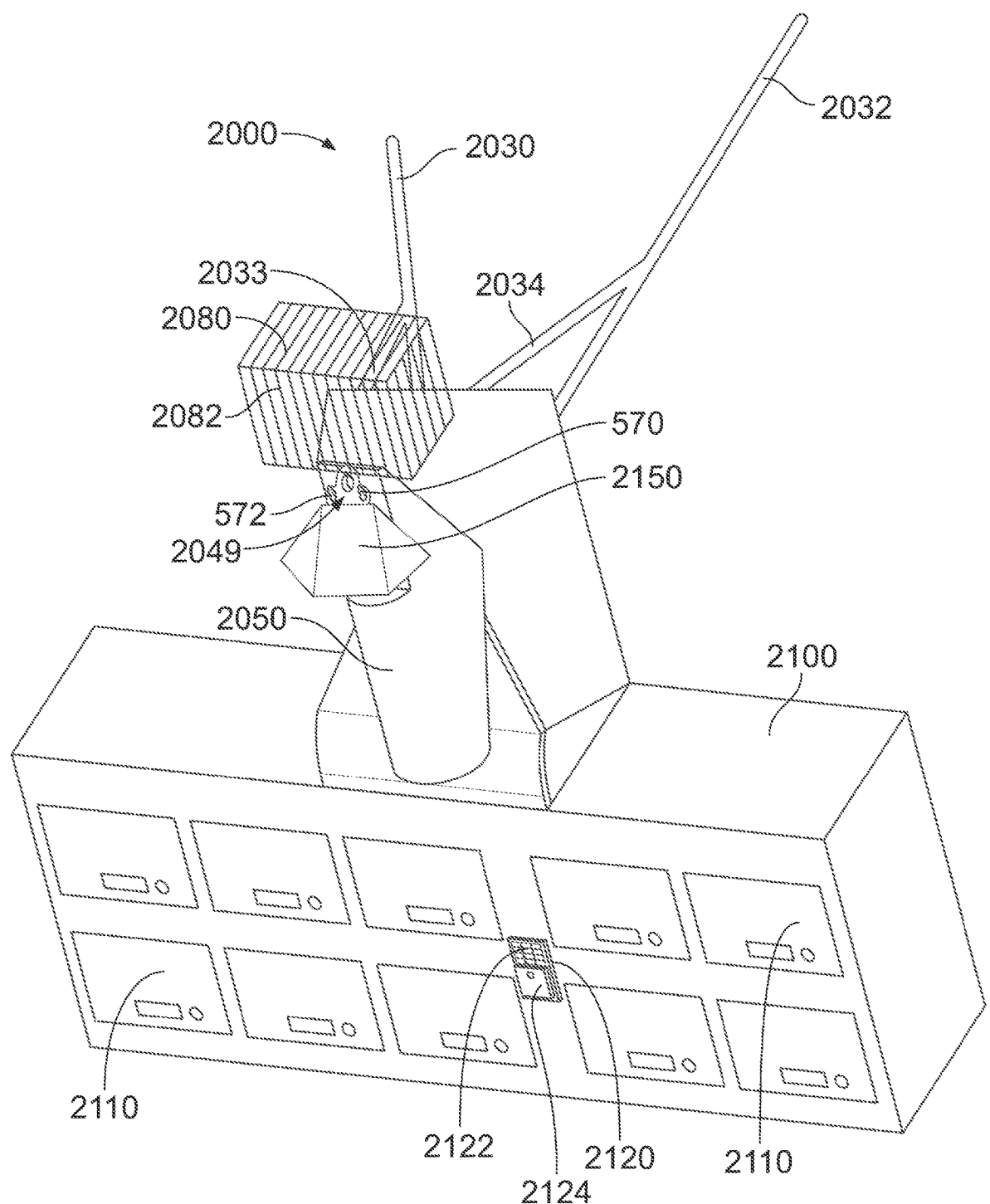
FIG. 49A is a perspective view of locking gate 2080 positioned above payload 2150.
Figure 49B:
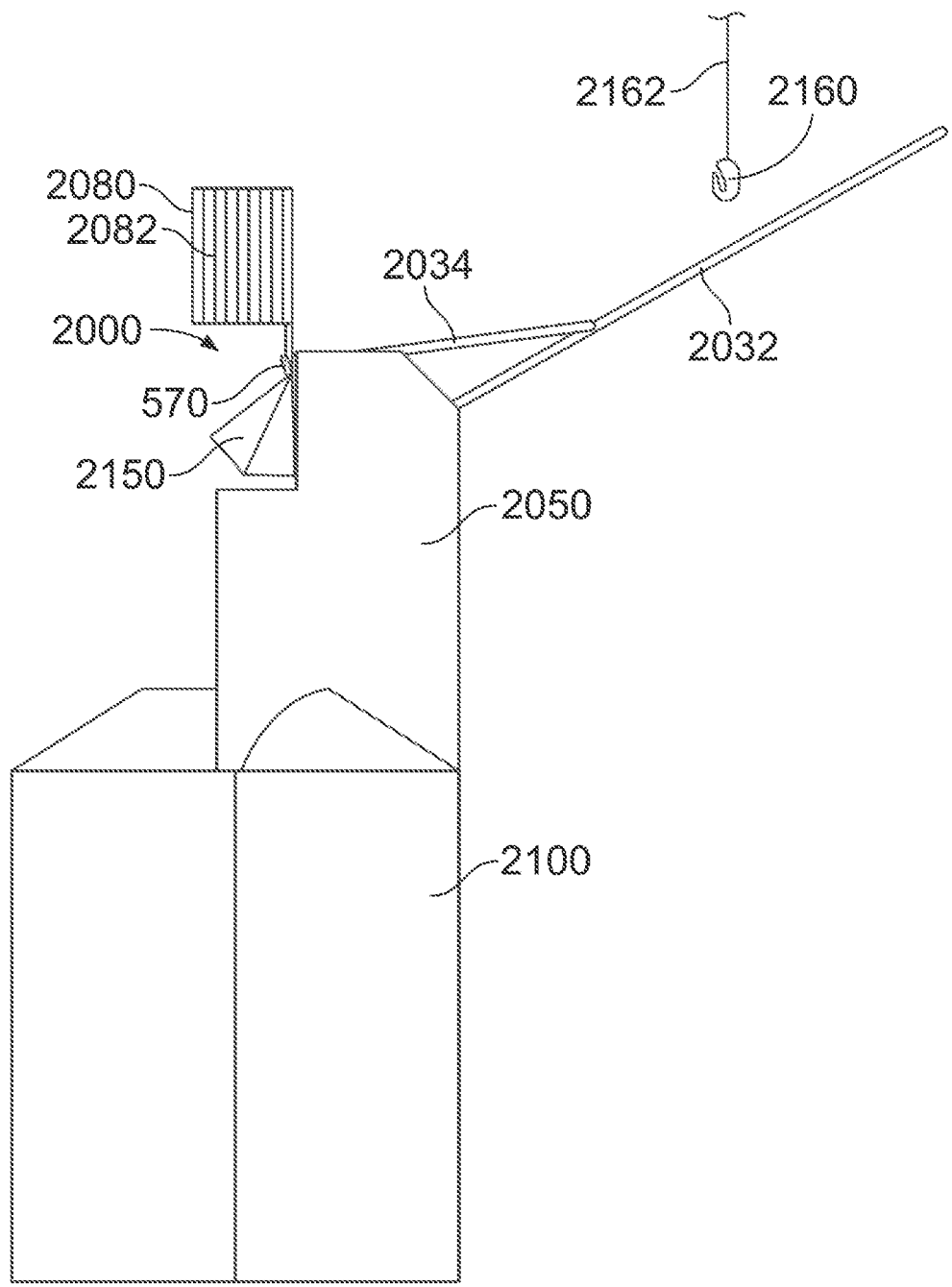
FIG. 49B is a side view of locking gate 2080 positioned above payload 2150.

FIG. 49A is a perspective view of locking gate 2080 having bars 2082 positioned above payload 2150; and FIG. 49B is a side view of locking gate 2080 positioned above payload 2150. Locking gate 2080 may also be positioned below payload 2150 where it may be raised into a position around the payload 2150 as shown in FIGS. 49C and 49D.

Figure 49C:
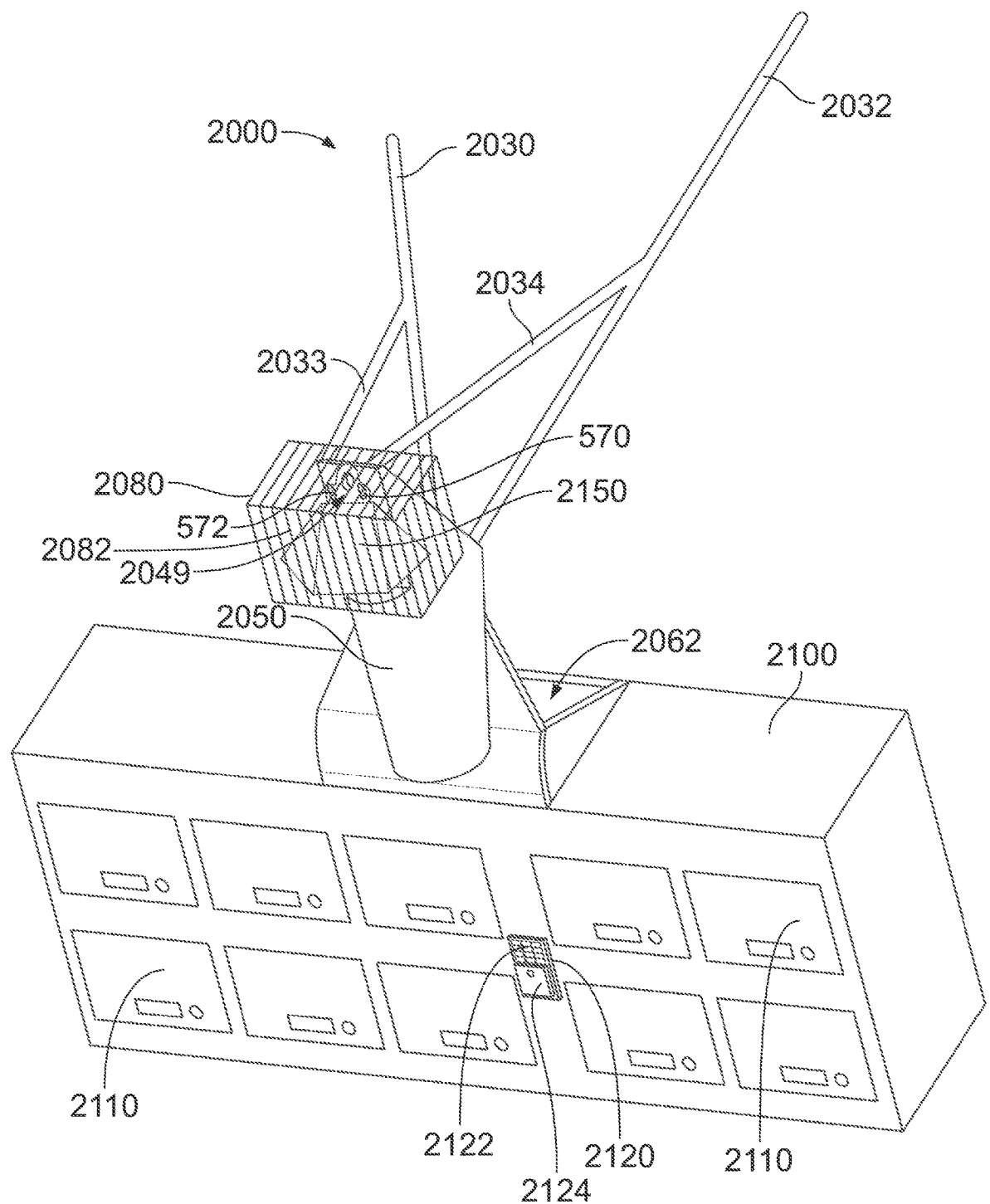
FIG. 49C is a perspective view of locking gate 2080 positioned around payload 2150.
Figure 49D:
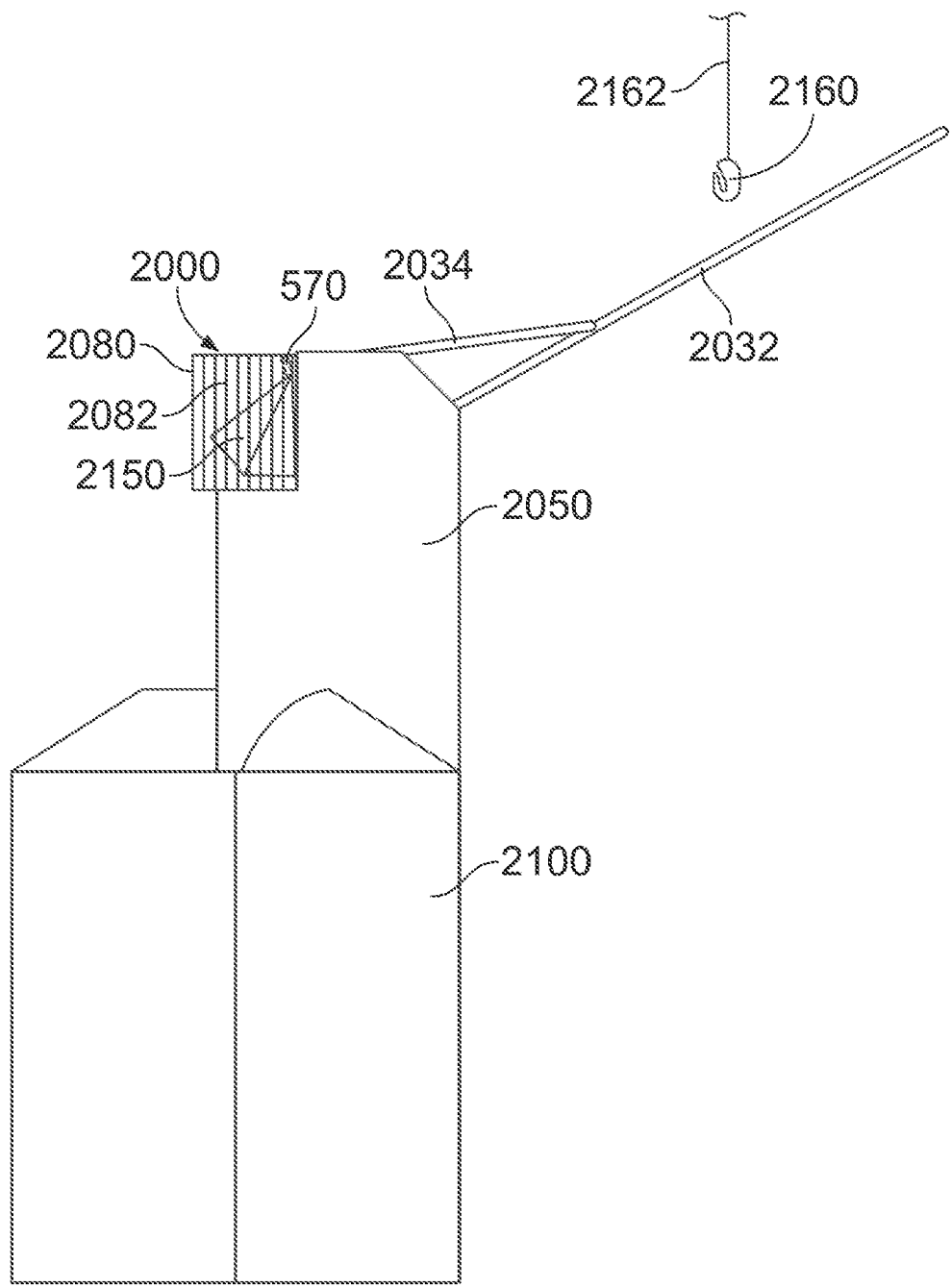
FIG. 49D is a side view of locking gate 2080 positioned around payload 2150.

FIG. 49C is a perspective view of locking gate 2080 after being moved downwardly into a position around payload 2150 and latched into position; and FIG. 49D is a side view of locking gate 2080 positioned around payload 2150. Locking gate 2080 may be a two-dimensional gate (i.e., a flat gate) or may be three-dimensional gate, also referred to as a cage. After gate 2080 has been moved into position around payload 2150 as shown in FIGS. 49C and 49D, the payload 2150 is secured within gate 2080 and out of reach to prevent theft of payload 2150, or tampering with payload 2150 or its contents.

In the same manner as payload holder 2060 may be unlatched and rotated as described above with respect to FIGS. 48A-D, gate 2080 may be unlatched using locking members 2039 or 2040, or a switch within payload channel 1960. Gate 2080 is spring-biased into a raised position. To release gate 2080 from a latched position around payload 2150 as shown in FIGS. 49C and 49D, gate 2080 may also be unlatched electronically or manually as described above regarding payload holder 2060.

Figure 50A:
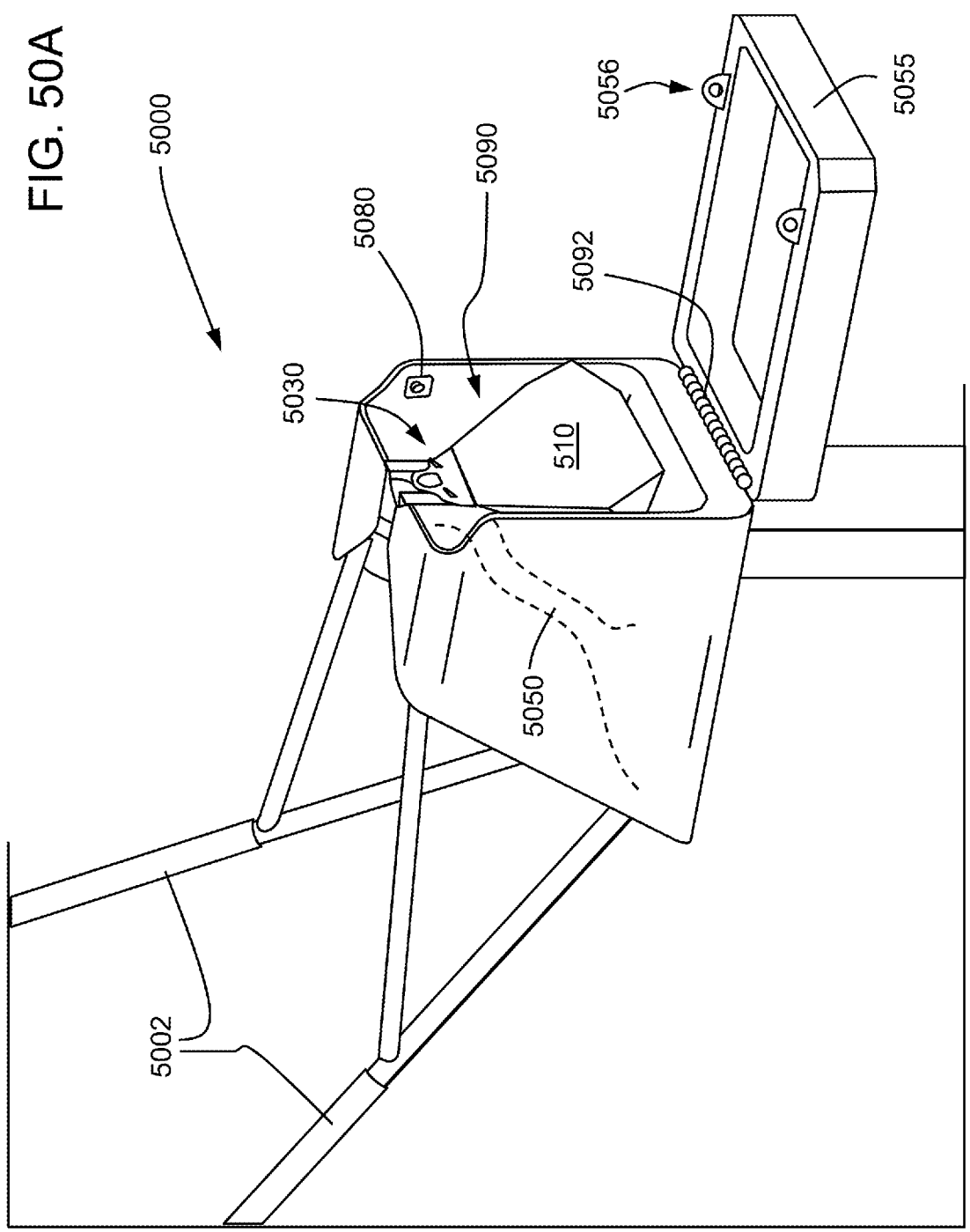
FIG. 50A is a perspective view of a portion of a payload retrieval apparatus 5000 in an open position.
Figure 50B:
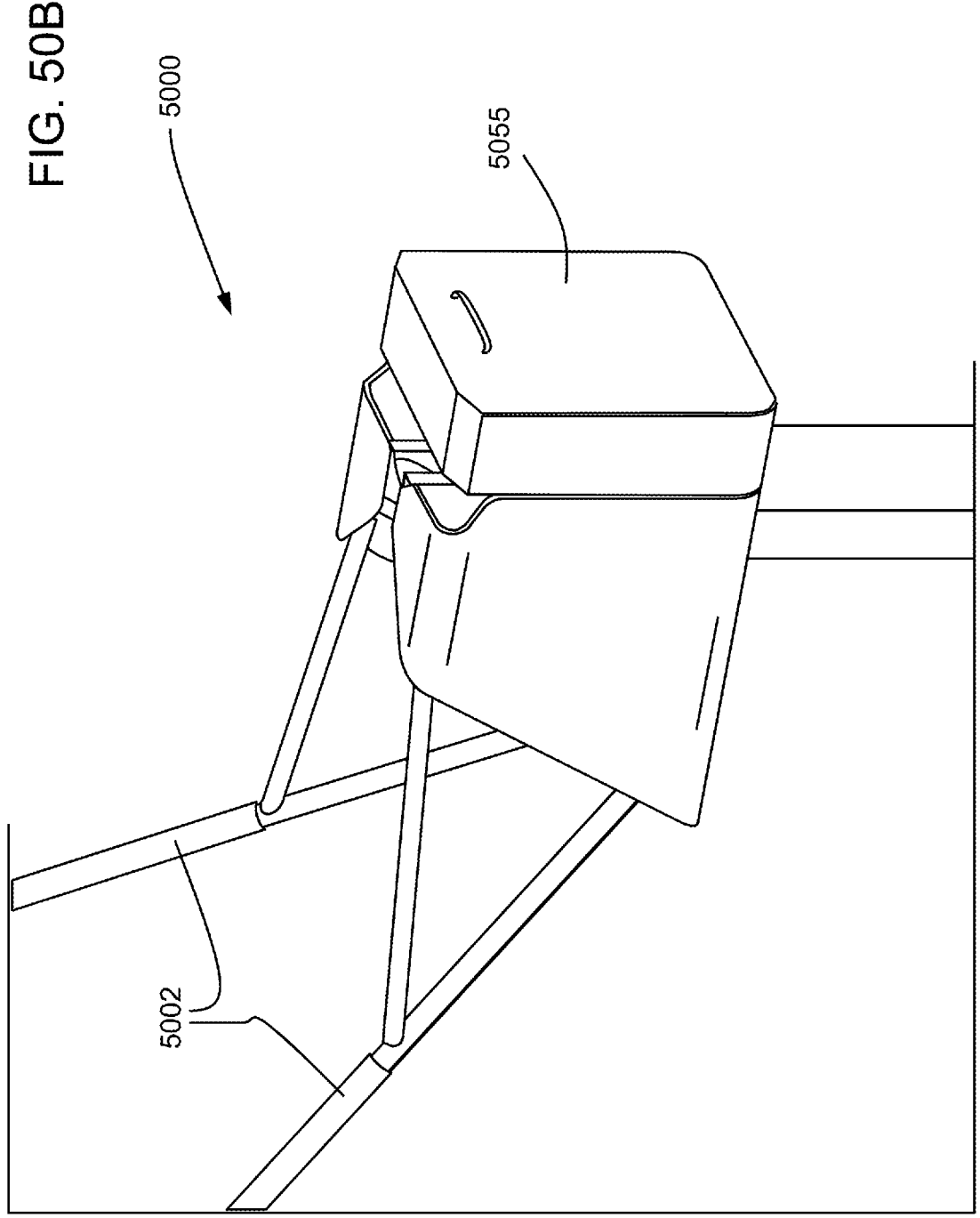
FIG. 50B is a perspective view of the payload retrieval apparatus 5000 in a closed position.

FIGS. 50A and 50B illustrate another embodiment of a payload retrieval apparatus 5000 with a security feature to protect a payload 510 that is loaded on the payload retrieval apparatus 5000. Similar to the other apparatuses, payload retrieval apparatus 5000 includes a payload holder 5030 and a channel 5050 configured to direct a payload retriever toward the payload. The payload retrieval apparatus also includes a pair of tether engagers 5002 configured to direct a tether toward an inlet end of the channel 5050.

The payload retrieval apparatus 5000 includes a payload bay 5090 that provides space for the payload 510 when it is mounted on the payload holder 5030. To secure the payload 510 within the payload bay 5090, the payload retrieval apparatus 5000 includes a latchable door 5055 that may enclose the payload bay 5090 as shown in FIG. 50B. By securing the entire payload 510 within the closed payload bay 5090, this security feature prevents both unauthorized removal of the payload from the payload holder, but also destruction of the payload container to retrieve the contents inside. The closed payload bay 5090 also prevents loading of an unauthorized payload onto the payload holder 5030, to prevent a UAV from accepting and delivering unauthorized objects.

The door 5055 of the payload bay 5090 is held in place by a latch 5080 that is received in a catch 5056 on the door 5055. The latch 5080 may be activated by a switch that is triggered as the payload retriever passes through the channel 5050. Accordingly, when the payload retriever passes through the channel 5050, the latch 5080 may be retracted and the door allowed to open. The payload 510 can then be removed from the payload holder 5030 as previously described.

In some embodiments, the door 5055 may be mounted by a spring loaded hinge 5092 that is configured to move the door 5055 into an open position. This allows the door 5055 to automatically open when a payload retriever passes through the channel 5050 and activates the switch to retract the latch 5080. With the door 5055 open the payload retriever can remove the payload 510 from the payload holder 5030 and be winched up to the UAV. Moreover, once the door 5055 is opened, a user will see that the payload retrieval apparatus 5000 is available for a new payload. The user can then load a new payload onto the payload holder 5030 and lift the door 5055 closed. Once the door 5055 is closed, the latch 5080 will hold it shut until the new payload is removed by another UAV.

Having the door remain open once the latch 5080 is retracted may be particularly advantageous if the payload retrieval apparatus is part of a group of apparatuses, so that the user can be immediately informed of which of the apparatuses are available for a new payload and which are currently occupied. Alternatively, rather than having the door be spring-loaded open, the door 5055 may be configured to fall open under the force of gravity without the need for a spring.

In other embodiments, the door 5055 may be spring loaded closed, so long as the UAV is able to remove the payload 510 from the payload bay 5090 when the door becomes unlatched, for example by tilting the door out of the way as the payload is winched upward on the tether. Biasing the door closed can help ensure that the door 5055 will be locked shut after a payload 510 is loaded onto the payload holder 5030.

Figure 51A:
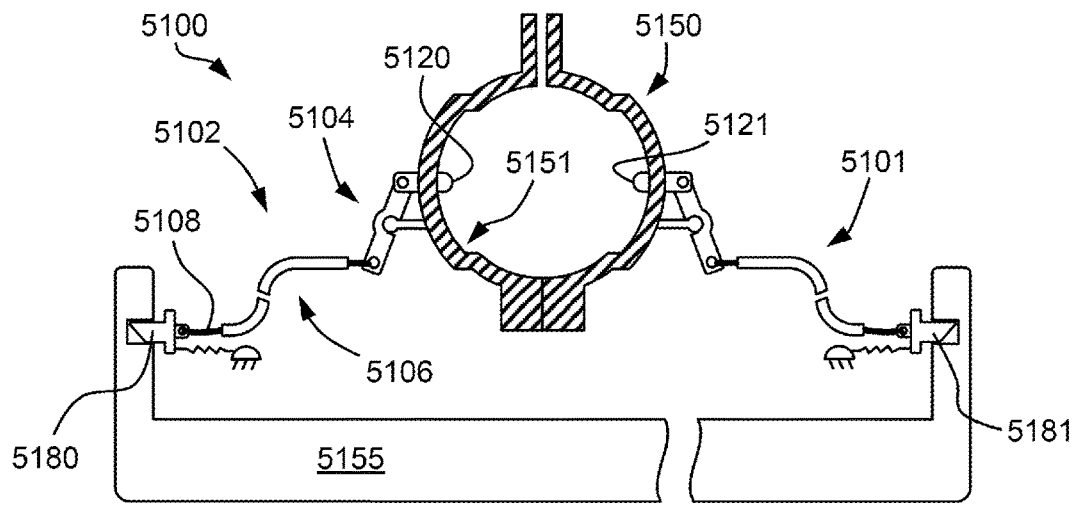
FIG. 51A is a cross-sectional top view of a mechanism 5100 for operating a latch.
Figure 51B:
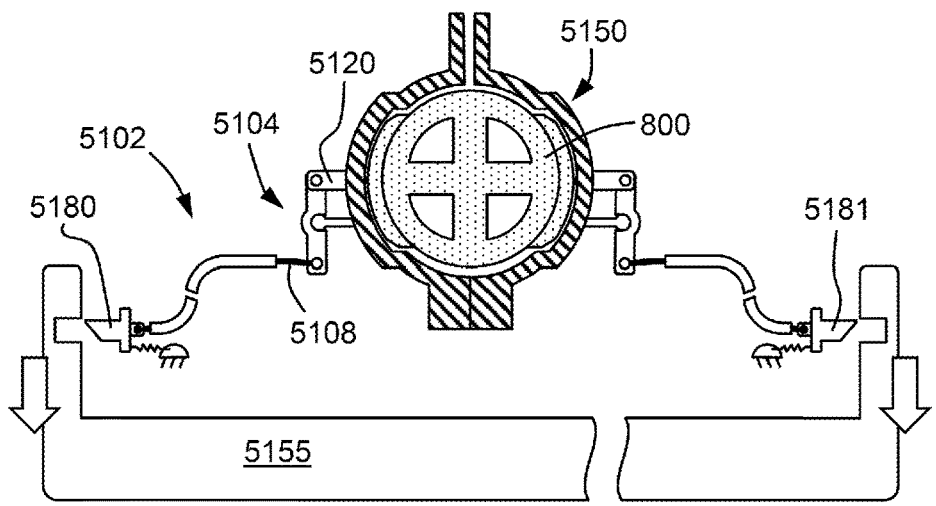
FIG. 51B is a cross-sectional top view of the mechanism 5100 being fully opened by a payload retriever 800.
Figure 51C:
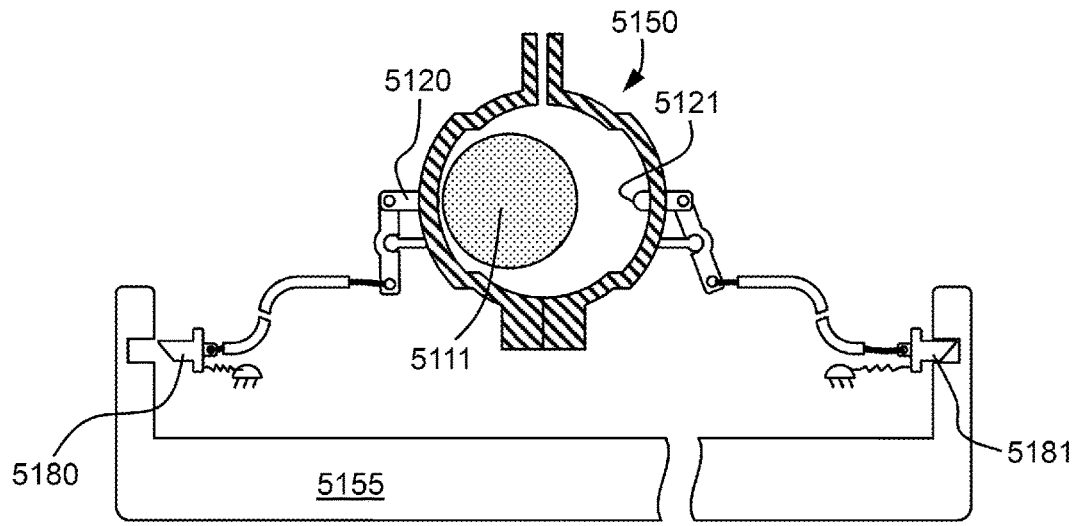
FIG. 51C is a cross-sectional top view of the mechanism 5100 being only partially operated by an object 5111.

The switch that operates to retract the latch 5080 may be configured similarly to the locking members described above. Alternatively, the switch may have another configuration. For example, FIGS. 51A-51C illustrate a mechanism 5100 for retracting a latch 5180 that holds a door 5155 closed, though a similar mechanism could be used for unlocking other locking structures. The mechanism 5100 includes a switch 5120 that is configured as a protrusion that extends into the channel 5150. The protrusion 5120 is coupled to the latch 5180 through an actuating linkage 5102 so that the depressing the protrusion 5120 causes the latch 5180 to retract, as shown in FIG. 51B. In the illustrated embodiment, the actuating linkage 5102 includes a pivoting lever 5104 and a Bowden cable 5106. As shown in FIG. 51B, when the protrusion 5120 is pushed out of the channel 5150 by a payload retriever 800, the protrusion 5120 rotates a lever which pulls the inner cable 5108 of the Bowden cable 5106. The opposite end of the inner cable 5108 is secured to the latch 5180 and retracts the latch 5180. As indicated by the two arrows, the door 5155 is then allowed to open.

In some embodiments, the switch 5120 may be positioned within a cavity 5151 of the channel 5150. This reduces the likelihood that the switch 5120 will be activated by objects other than the payload retriever 800, as the object is unlikely to have the appropriate shape to activate the switch 5120.

For additional security, the door 5155 in FIG. 51A is held in place by two latches 5180 and 5181. Each latch 5180, 5181 is independently operated by a respective protrusion 5120, 5121, and the second latch 5121 is coupled to the second protrusion 5121 by a separate actuating linkage

5101. Accordingly, the door 5155 is released only when both latches 5180, 5181 are retracted. This provides added security, as a very particular shape is likely needed to depress both protrusions 5120, 5121 at the same time. For example, FIG. 51C shows an object 5111 that is small enough to fit within the cavity 5151 of the channel 5150 and is depressing the protrusion 5120 to retract the latch 5180. However, the second protrusion 5121 is not depressed, and therefore the door 5155 remains shut. Of course, it is also possible to have the door held shut and released with a single activatable latch.

Figure 52A:
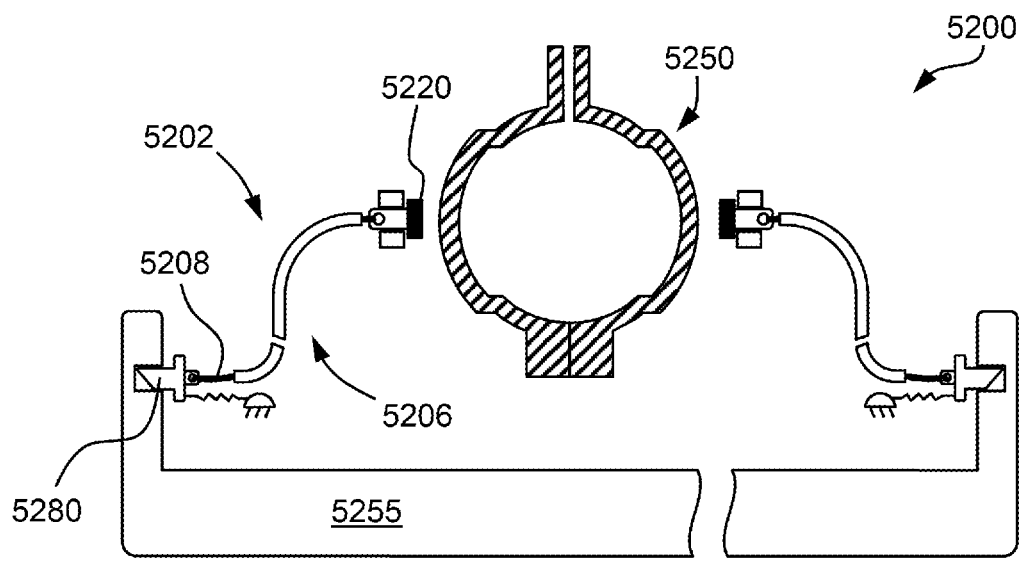
FIG. 52A is a cross-sectional top view of a mechanism 5200 for opening a latch.
Figure 52B:
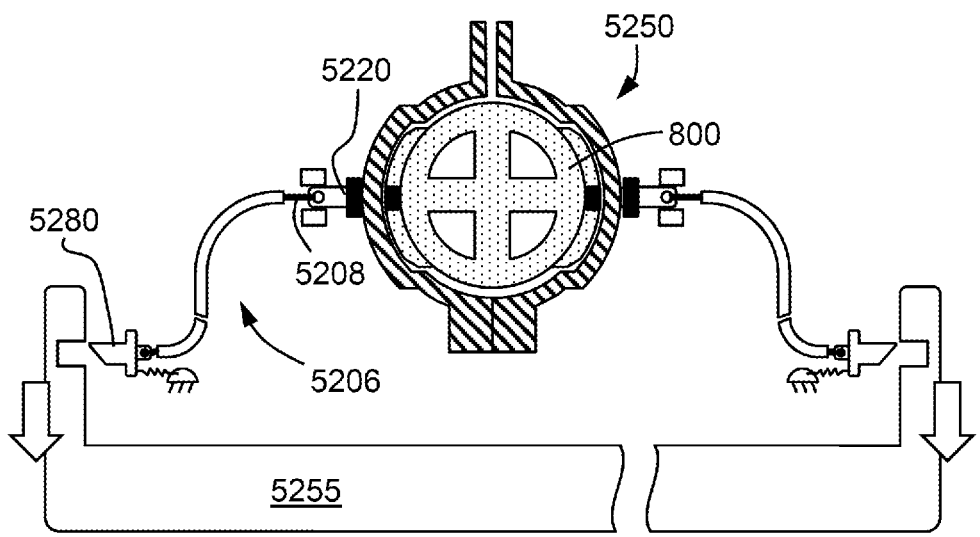
FIG. 52B is a cross-sectional top view of the mechanism 5200 being fully opened by a payload retriever 800.

While the switch that activates the locking system may physically extend into the channel, as shown in various embodiments described herein, in other embodiments, the switch may be positioned outside the channel but still be activated by a payload retriever passing through the channel. Such an embodiment is shown in FIGS. 52A and 52B. The mechanism 5200 of FIGS. 52A and 52B has a similar structure to mechanism 5100 of FIGS. 51A and 51B, and includes a spring loaded latch 5280 that holds a door 5255 shut. An actuating linkage 5202 including a Bowden cable 5206 pulls the latch 5280 to release the door 5255. However, rather than using a lever that is activated by depressing a protrusion when the payload retriever passes through the channel, the inner cable 5208 of the Bowden cable 5206 is pulled by a magnetic element 5220 that forms an activatable switch. As the payload retriever 800 moves through the channel, a component on the payload retriever 800 causes the magnetic element 5220 to be pulled toward the channel 5250 and activate the linkage 5201. The magnetic component on the payload retriever 800 may be another magnet or a ferromagnetic element. This configuration allows the switch to release a locked structure without placing any obstructions within the channel that may interfere with the passage of the payload retriever.

Figure 53:
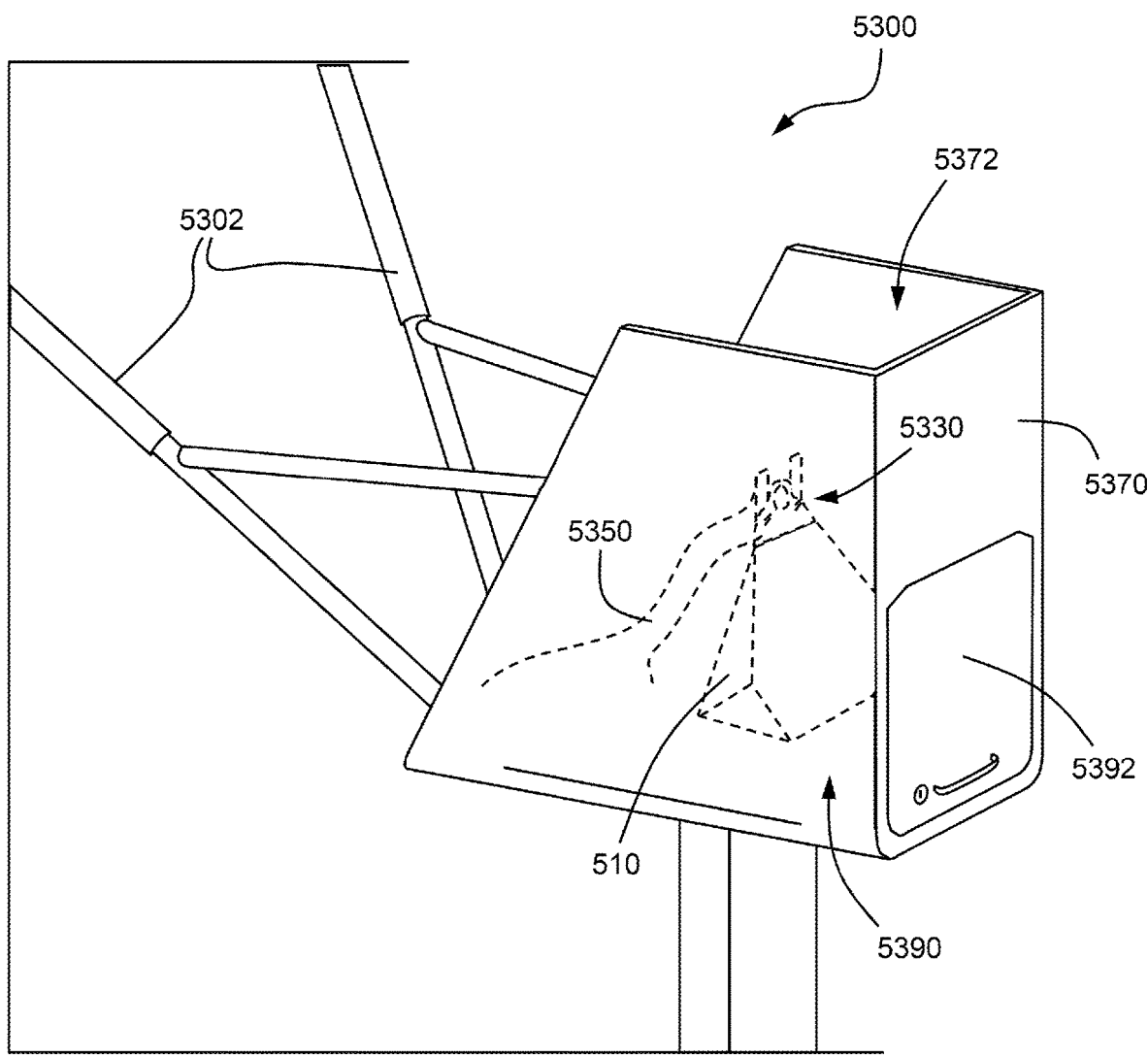
FIG. 53 is a perspective view of a portion of a payload retrieval apparatus 5300.

Another embodiment that can provide security without any interference of the retrieval of the payload is shown in FIG. 53. The payload retrieval apparatus 5300 shown in FIG. 53 includes a payload holder 5330 and a channel 5350 configured to direct a payload retriever toward the payload. The payload retrieval apparatus 5300 also includes a pair of tether engagers 5302 configured to direct a tether toward an inlet end of the channel 5350.

The payload retrieval apparatus 5300 includes a payload bay 5390 that is surrounded by a tall open-top enclosure 5370. The opening 5372 in the top of the enclosure 5370 allows the payload 510 to be lifted out of the enclosure 5370 after it is secured on the payload retriever. However, the walls of the enclosure 5370 are sufficiently tall that a person cannot easily reach the payload and remove it. The amount of security provided by such a configuration may depend on the distance between the edge of the opening and the payload. For example, the walls may be taller, angled outward, or spaced further from the payload to hinder access to the payload. For example, the edge of the top opening of the payload bay may be spaced at least 24 inches, at least 30 inches, or at least 36 inches from the payload holder 5330, e.g., from either pin of the payload holder. Additional security can also be provided by adding another wall between the tether engagers and the payload bay 5390. While the opening at the top of the illustrated enclosure 5370 is unobstructed, in other embodiments, the payload bay may include a door that closes the opening at the top of the enclosure. For example, the payload bay may be provided with a door that swings upward when the payload is removed from the payload retrieval apparatus. For further security, the door may be configured to only swing outward and may include a flap that closes the opening when the door swings outward. This allows a payload to be removed by traveling between the door and the flap when the door swings upward, but prevents a person from reaching into the payload bay.

To load a payload 510 on the payload holder 5330, the payload bay 5390 may include a door 5392 for accessing the interior of the payload bay 5390. The door 5392 may include a lock 5394 for limiting access to the payload holder 5330 and payload 510 only to authorized users.

Figure 54A:
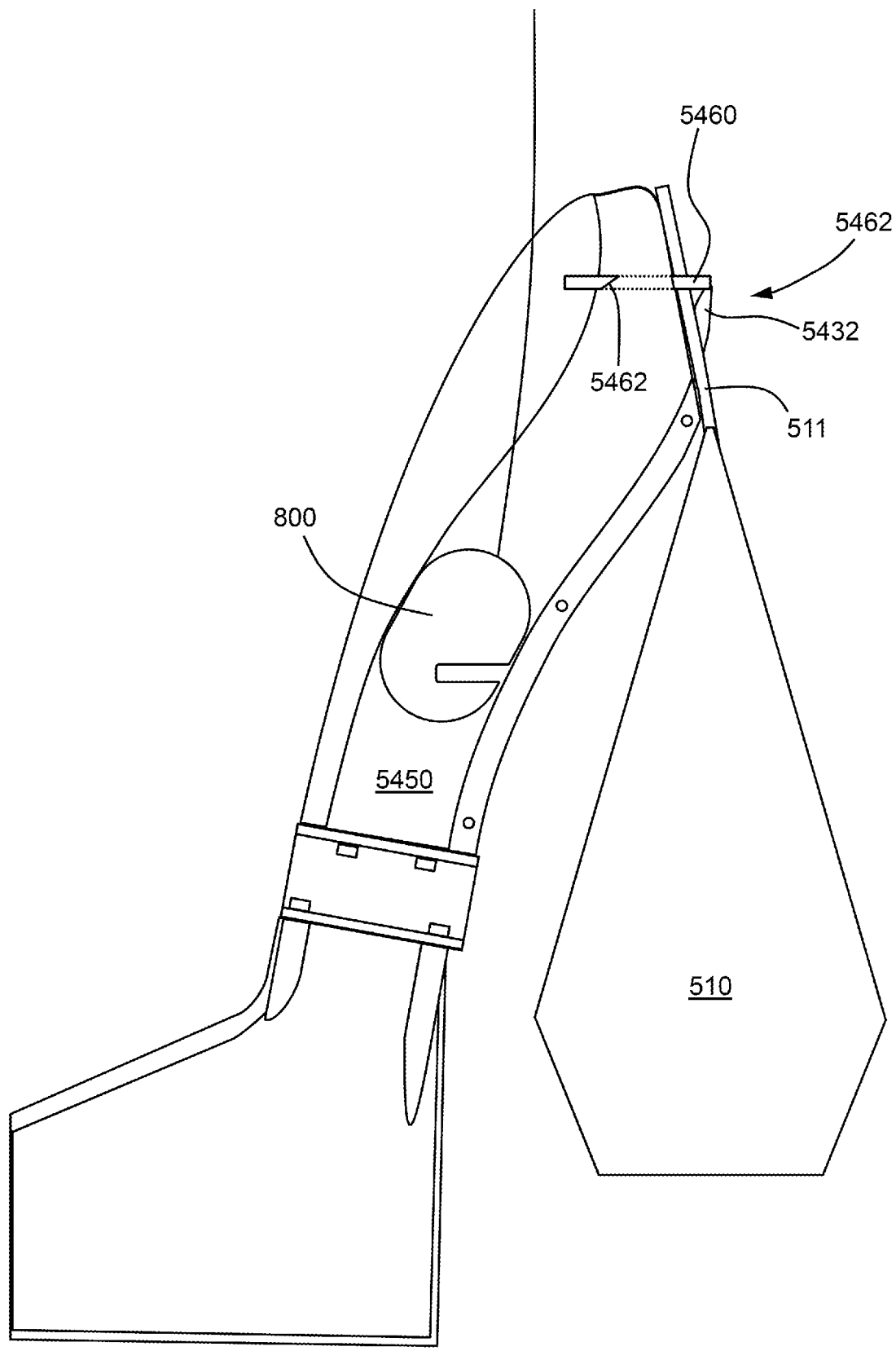
FIG. 54A is a cross-sectional side view of a locking bracket 5460 in a closed position.
Figure 54B:
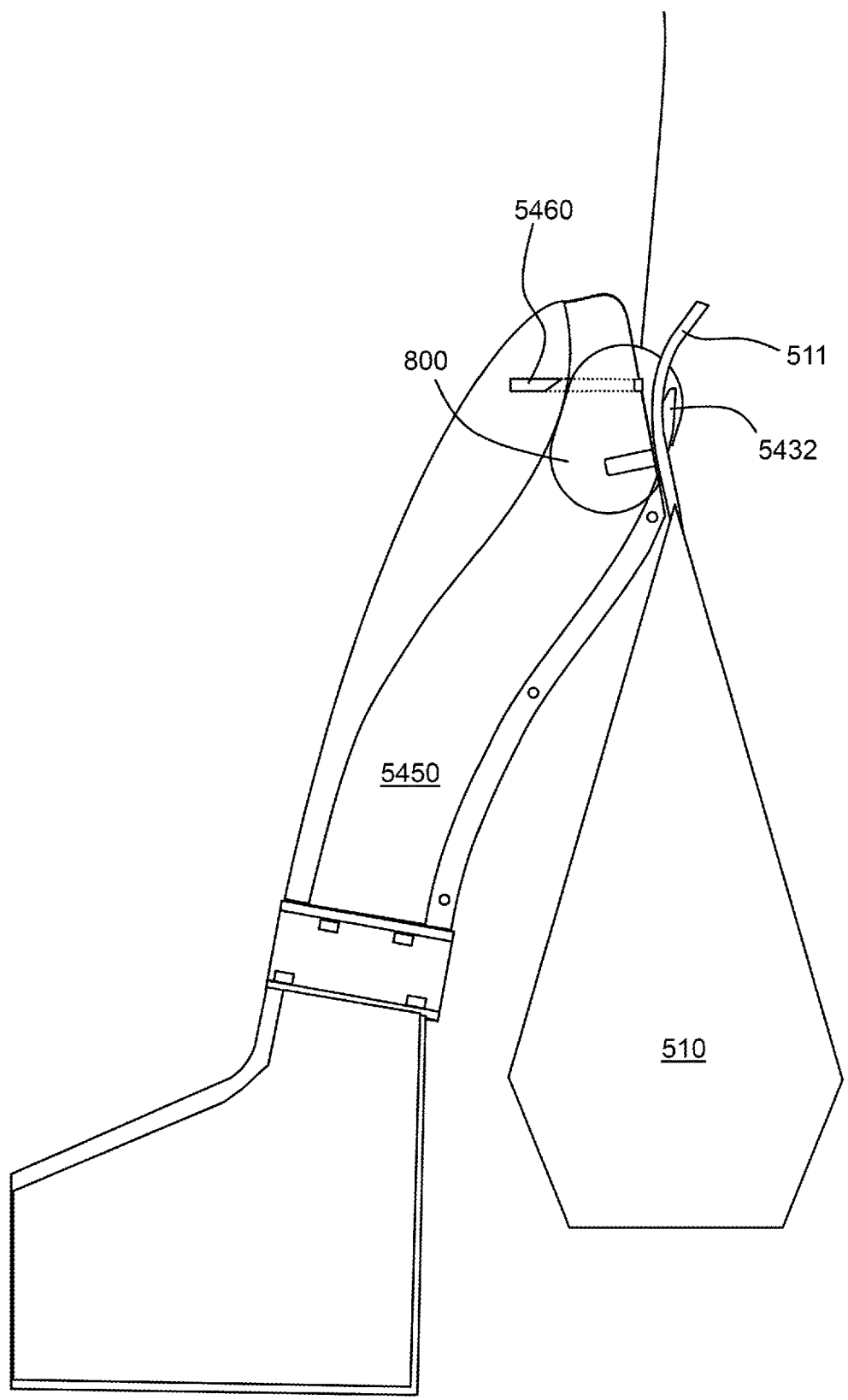
FIG. 54B is a cross-sectional side view of the locking bracket 5460 in an open position.

FIGS. 54A and 54B illustrate another embodiment of a locking element that secures the payload handle 511 of a payload 510 on a payload holder 5430. The payload holder 5430 includes two pins 5432 configured to hold the payload handle 511 in a manner similar to those described above. Once the payload handle 511 is on the pins 5432, a locking bracket 5460 may be slid to cover the top of the handle 511 and close off the opening above the pins 5432. Accordingly, the portion of the handle 511 that is above each pin 5432 is secured within a loop formed by the structure of the channel 5450, the pin 5432 and the locking bracket 5460.

In order to release the payload 510, the locking bracket 5460 may be activated to move to a release position, as shown in FIG. 54B, when a payload retriever 800 passes through the channel 5450. A portion of the locking bracket 5460 extends into the channel 5450 obstructing access through the channel 5450. However, this portion of the locking bracket 5460 includes an angled surface 5462 that faces the upstream end of the channel 5450. Accordingly, when the payload retriever 800 is drawn through the channel 5450, as shown in FIG. 54B, the payload retriever 800 engages the angled surface 5462 and pushes the locking bracket 5460 out of the channel 5450, thereby allowing the payload retriever to pass through the channel. As the locking bracket 5460 is slid out of the channel 5450 it is also moved back from the pins 5432, thereby clearing the opening above the pins 5432 and releasing the payload. As a result, the payload retriever 800 can pull the handle 511 off the pins 5432 and retrieve the payload 510.

Figure 55A:
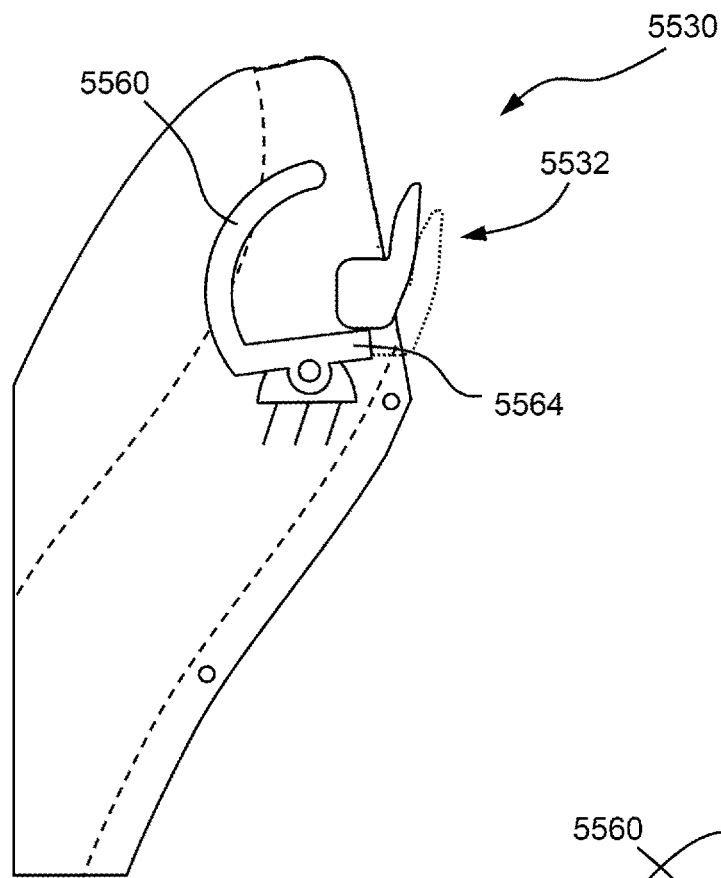
FIG. 55A is a cross-sectional side view of a locking bracket 5560 in an open position.
Figure 55B:
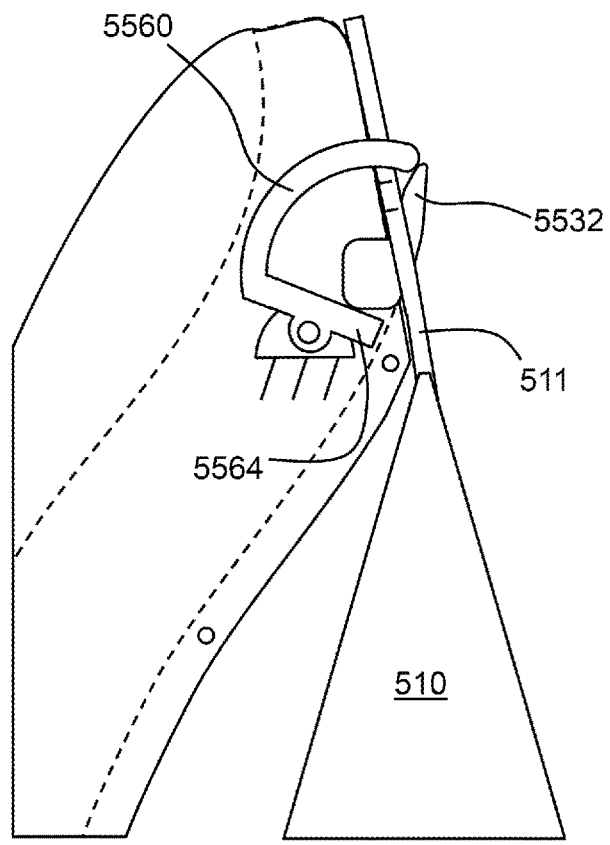
FIG. 55B is a cross-sectional side view of the locking bracket 5560 in a closed position.

FIGS. 55A and 55B illustrate another embodiment of a locking structure that includes a locking bracket 5560 that closes off the opening above the pins 5532 of the payload holder 5430. In this embodiment, the locking bracket 5560 is deployed and moved into a locking position upon loading the payload 510 onto the payload holder 5530. As shown in FIG. 55A, the pins 5532 are configured to move between an upper unloaded position and a lower loaded position. Upon placing a payload handle 511 onto the pins 5532, the pins 5532 can be pulled down into the loaded position and the weight of the payload 510 may hold the pins 5532 in the loaded position, as shown in FIG. 55B.

The moving pins 5532 are configured to cooperate with the locking bracket 5560 to move the locking bracket 5560 into the locked position when the payload 510 is loaded onto the pins 5532. In particular, the locking bracket 5560 rotatable about a fulcrum 5562 and includes a lever 5564 that is driven by one of the pins 5532. When the pin 5532 is moved to the lower position it pushes the lever 5564, thereby rotating the locking bracket 5560 to contact the top of the pins and close off the opening that holds the payload handle 511.

While the illustrated embodiment of a locking structure that is actuated by loading the payload includes a bracket that closes the opening above the pins, other locking structures, such as covers, doors and boxes may similarly be actuated by loading the payload onto the payload holder. For example, an embodiment of a locking structure that includes a cover, such as that shown in FIGS. 45A-45D, could be configured to swing closed upon loading the payload onto the payload holder.

Figure 56A:
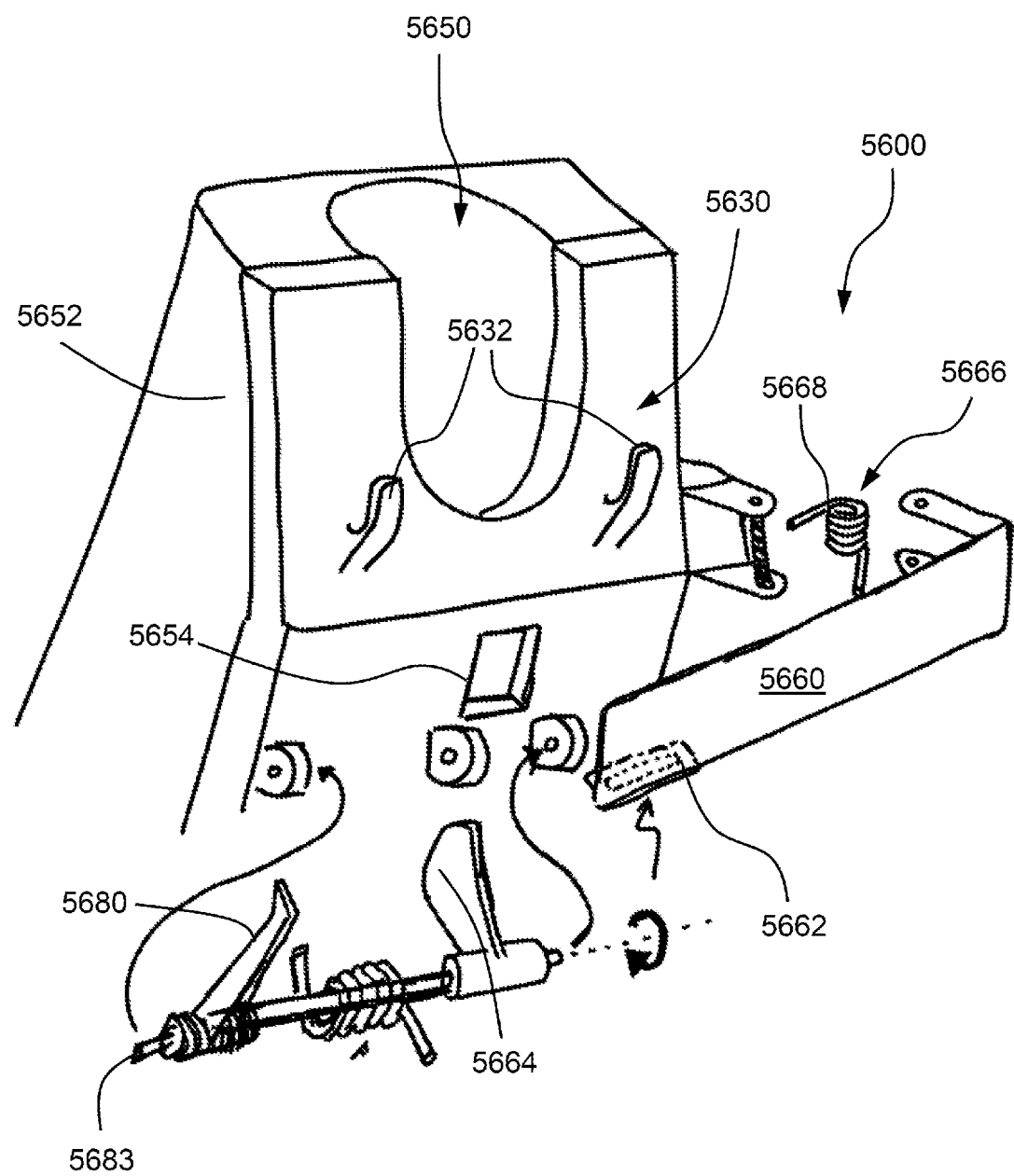
FIG. 56A is an exploded perspective view of a locking structure 5600 on a payload retrieval apparatus.
Figure 56B:
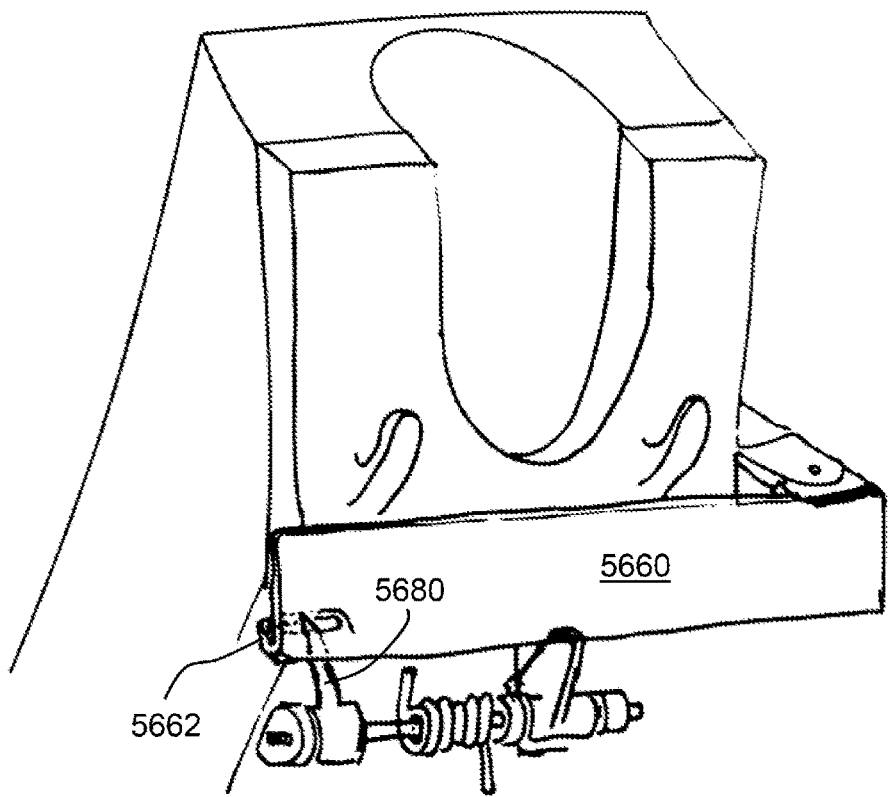
FIG. 56B is a perspective view of locking structure 5600 in a closed position.
Figure 56C:
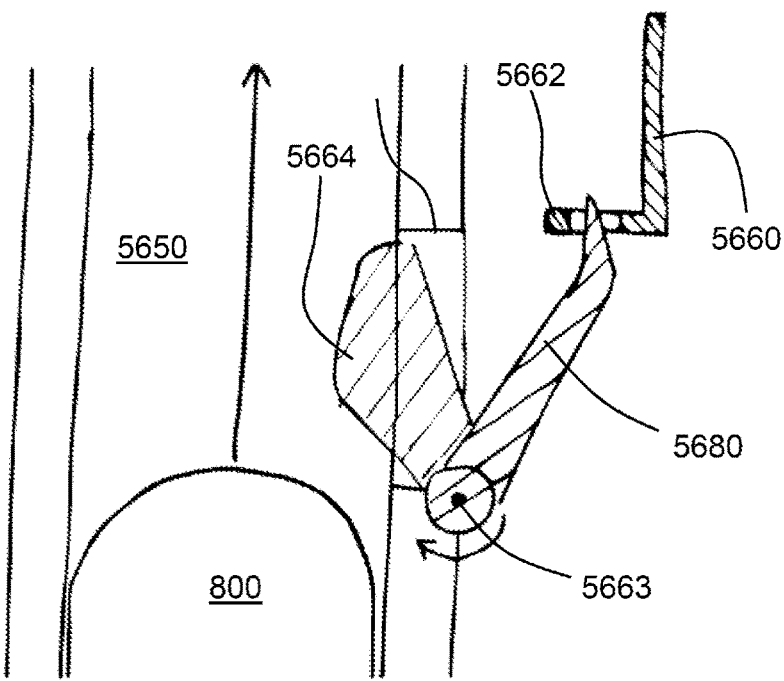
FIG. 56C is a cross-sectional side view of locking structure 5600 in a closed position.

FIGS. 56A-56C illustrate another embodiment of a locking structure 5600 that secures a payload onto a payload holder 5630 that is formed by a pair of pins 5632. Components of the locking structure 5600 are shown in an exploded view in FIG. 56A. The locking structure 5600 includes a locking bracket 5660 that closes next to the pins 5632 to prevent removal of a payload from the pins 5632. The locking bracket 5660 includes a catch 5662 that is held closed by a latch 5680. The latch 5680 is secured on a rotatable pin 5683 that is mounted on the channel structure 5652. The latch 5680 is removable from the catch 5662 when the pin 5683 is rotated. To enable rotation, an actuating bumper 5664 is also attached to the rotatable pin 5683 and extends through an aperture 5654 into the interior of the channel 5650. Accordingly, as a payload retriever passes through the channel 5650, the actuating bumper 5664 is pushed out of the channel 5650, which rotates the pin 5683, thereby releasing the latch 5680 from the catch 5662. Once the latch 5680 is released, the locking bracket 5660 can open, thereby releasing the payload from the pins 5632.

In order to open the locking bracket 5660, the locking bracket 5660 may be rotatably secured on a hinge 5666 so that it can swing out of the way when the payload is to be removed. To encourage the locking bracket 5660 to swing open after the latch 5680 is released, the locking bracket 5660 may be spring-loaded to an open position. In the illustrated embodiment, a torsion-spring 5668 is included in the hinge 5666 to urge the locking bracket 5660 open when it is not held by the latch 5680. However, in other embodiments, other spring mechanisms may be used to urge the locking bracket 5660 open, such as a leaf spring or spring wire that is deformed when the locking bracket 5660 is closed.

The rotatable pin 5683 is also spring-loaded toward a locked position, such that the force of the spring holds the latch 5680 in position to keep the locking bracket 5660 closed, as shown in FIG. 56B. A cross-sectional side view of the locking mechanism 5600 is shown in FIG. 56C. As shown, when a payload retriever 800 passes through the channel 5650, it will push the actuating bumper 5664 out of the channel 5650 thereby rotating pin 5683 and removing latch 5680 from the catch 5662 on locking bracket 5660. The torsion spring 5668 in hinge 5666 will then swing the locking bracket 5660 open, allowing a secured payload to be retrieved. As illustrated, the front side of the latch 5680 may be angled so that the locking bracket 5660 can be pushed into place until the latch 5680 passes into the catch 5662 and holds the locking bracket 5660 closed.

Figure 57A:
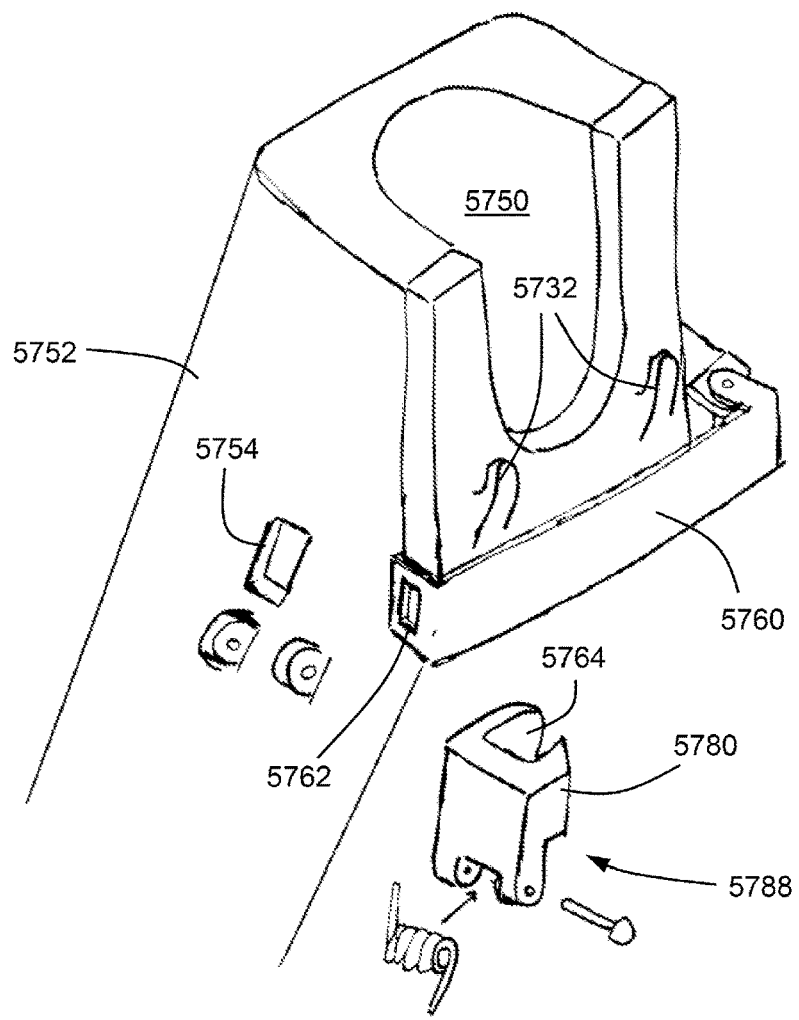
FIG. 57A is an exploded perspective view of another locking structure 5700 on a payload retrieval apparatus.
Figure 57B:
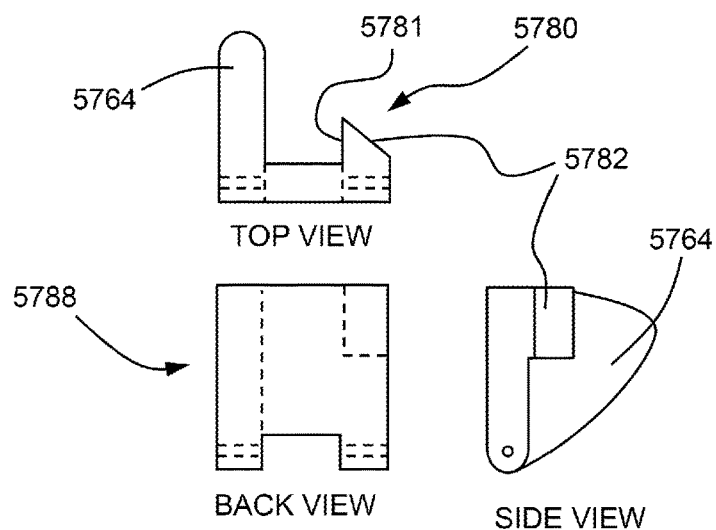
FIG. 57B shows top, back, and side views of a rotating component 5788 of locking structure 5700.

FIGS. 57A and 57B illustrate another embodiment of a locking structure 5700 that secures a payload onto a payload holder that is formed by a pair of pins 5732. The structure is similar to that of locking structure 5600 and includes a locking bracket 5760 that closes over a payload that is loaded on the pins 5732. Again, the locking bracket 5760 may be rotatable on a hinge 5766 that is spring loaded open. The locking bracket 5760 also includes a catch 5762 that holds the locking bracket 5760 closed by cooperating with a rotating component that includes a latch 5780. In contrast to the latch of structure 5600, latch 5780 is part of a rotating component 5788 that is positioned on the side of the channel structure 5652.

Top, back, and side views of the rotating component 5788 are shown in FIG. 56B. As shown, the latch 5780, which is configured to be inserted into the catch 5762, and includes a flat internal surface 5781. The rotating component 5788 that forms the latch 5780 is spring-loaded closed so that the flat internal surface 5781 is held in engagement with the catch 5762 until the rotating component 5788 is pushed outward. The opposing outer surface 5782 of the latch 5780 is angled so that the locking bracket 5760 can push the latch 5780 against the spring force when the locking bracket 5760 is closed, until the latch 5780 moves into the catch 5762 and the rotatable component 5788 returns to its closed position.

To enable rotation of component 5788 and release the locking bracket 5760, the rotable component 5788 includes an actuating bumper 5764 that extends through an aperture 5754 in the side of the channel structure 5752. In order to open the locking bracket 5760, a payload retriever passing through the channel 5750 will push the actuating bumper 5764 out of the channel and thereby remove the latch 5780 from the catch 5742 of the locking bracket 5760, which will in turn swing open.

Various embodiments described herein use a payload retriever to unlatch a locking element. In such embodiments, the latches or locking elements may also be coupled to another mechanism to provide an alternative for releasing the locking elements, for example by using a physical or digital key.

The particular arrangements shown in the Figures should not be viewed as limiting. It should be understood that other implementations may include more or less of each element shown in a given Figure. Further, some of the illustrated elements may be combined or omitted. Yet further, an exemplary implementation may include elements that are not illustrated in the Figures.

Additionally, while various aspects and implementations have been disclosed herein, other aspects and implementations will be apparent to those skilled in the art. The various aspects and implementations disclosed herein are for purposes of illustration and are not intended to be limiting, with the true scope and spirit being indicated by the following claims. Other implementations may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

What is claimed is:

1. A payload retrieval apparatus comprising:
    a base;
    an autoloader assembly mounted to the base including:
        a payload holder configured to hold a payload for retrieval by an uncrewed aerial vehicle (UAV),
        a channel coupled to the payload holder and configured to direct a payload retriever suspended from the UAV to the payload holder, the channel having a tether slot adapted for receiving a tether having a first end attached to the UAV and a second end attached to the payload retriever, wherein the channel is adapted to receive the payload retriever, and the tether slot of the channel allows for passage of the tether during movement of the payload retriever through the channel; and
    a locking feature configured to lock access to the payload on the payload holder, the locking feature including a locking member that has a movable end, wherein the locking member has a first position in which the movable end extends through a wall of the channel into an interior of the channel for engagement by the payload retriever as it moves through the channel, wherein when the payload retriever contacts the movable end of the locking member, the movable end moves outwardly thereby moving the locking member to a second position and unlocking the payload on the payload holder;

wherein the payload holder is positioned such that when the payload retriever exits the channel, the payload retriever engages a handle of the payload and removes the payload from the payload holder.

2. The payload retrieval apparatus of claim 1, wherein the movable end of the locking member is spring-biased into the interior of the channel.

3. The payload retrieval apparatus of claim 1, wherein the payload holder includes one or more pins configured to extend through a handle of the payload when the payload is positioned on the payload holder;

wherein the locking features includes a locking strap configured to extend over the one or more pins and the handle of the payload;

wherein the locking strap includes a latch which is latchable onto the autoloader assembly; and wherein the latch is unlatched when the payload retriever engages the movable end of the locking member and moves the locking member into the second unlocked position.

4. The payload retrieval apparatus of claim 3, where the locking strap also extends over the entire payload.

5. The payload retrieval apparatus of claim 1, wherein the payload holder includes one or more pins configured to extend through a handle of the payload when the payload is positioned on the payload holder;

wherein the payload holder and payload are retractable into a slot in the autoloader assembly;

wherein the locking features includes a sprung cover positioned over the payload holder and payload when the payload holder and payload have been retracted into the slot in the autoloader assembly;

wherein the sprung cover includes a latch which is latchable onto the autoloader assembly; and wherein the latch of the sprung cover is unlatched when the payload retriever engages the movable end of the locking member and moves the locking member into the second unlocked position, and moves the payload holder and payload out of the slot and into position for payload retrieval.

6. The payload retrieval apparatus of claim 5, wherein the sprung cover is spring-loaded into an open position and the payload holder is spring-loaded into a position for payload retrieval by the payload retriever.

7. The payload retrieval apparatus of claim 1, wherein the payload holder includes one or more pins configured to extend through a handle of the payload when the payload is positioned on the payload holder;

wherein the payload holder and payload are rotatable into a position within the extending member;

wherein the locking feature includes a latch attached to the autoloader assembly when the payload holder and payload have been rotated into position within the autoloader assembly;

wherein the latch is unlatched when the payload retriever engages the movable end of the locking member and moves the locking member into the second unlocked position causing the payload holder and payload to rotate out of the autoloader assembly into position for payload retrieval.

8. The payload retrieval apparatus of claim 7, wherein the payload holder is spring-loaded to rotate into a position for payload retrieval by the payload retriever.

9. The payload retrieval apparatus of claim 1, wherein the payload holder includes one or more of pins configured to extend through a handle of the payload when the payload is positioned on the payload holder;

wherein the locking feature includes a gate that extends over the payload holder and payload;

wherein the gate includes a latch which is latchable onto the autoloader assembly; and wherein the latch of the gate is unlatched when the payload retriever engages the movable end of the gate and moves the locking member into the second unlocked position and moves the gate from extending over the payload holder and payload.

10. The payload retrieval apparatus of claim 9, wherein the gate is a three-dimensional cage.

11. The payload retrieval apparatus of claim 9, wherein the gate is spring-loaded into an open position where the gate does not extend over the payload holder and payload.

12. A method including:

providing a payload retrieval apparatus having a base; an autoloader assembly mounted to the base including: a payload holder configured to hold a payload for retrieval by an uncrewed aerial vehicle (UAV), a channel coupled to the payload holder and configured to direct a payload retriever suspended from the UAV to the payload holder, the channel having a tether slot adapted for receiving a tether having a first end attached to the UAV and a second end attached to the payload retriever, wherein the channel is adapted to receive the payload retriever, and the tether slot of the channel allows for passage of the tether during movement of the payload retriever through the channel; and a locking feature configured to lock access to the payload on the payload holder, the locking feature including a locking member that has a movable end, wherein the locking member has a first position in which the movable end extends through a wall of the channel into an interior of the channel for engagement by the payload retriever as it moves through the channel, wherein when the payload retriever contacts the movable end of the locking member, the movable end moves outwardly thereby moving the locking member to a second position and unlocking the payload on the payload holder; and wherein the payload holder is positioned such that when the payload retriever exits the channel, the payload retriever engages a handle of the payload and removes the payload from the payload holder; and causing the payload retriever to pass through the channel and engage the movable end of the locking member to unlock access to the payload holder and payload.

13. A payload retrieval apparatus comprising:

a base;

an autoloader assembly mounted to the base including:

a payload holder configured to hold a payload for retrieval by an uncrewed aerial vehicle (UAV), a channel coupled to the payload holder and configured to direct a payload retriever suspended from the UAV to the payload holder, the channel having a tether slot adapted for receiving a tether having a first end attached to the UAV and a second end attached to the payload retriever, wherein the channel is adapted to receive the payload retriever, and the tether slot of the channel allows for passage of the tether during movement of the payload retriever through the channel; and a locking feature configured to lock access to the payload on the payload holder; and wherein the payload holder is positioned such that when the payload retriever exits the channel, the payload retriever engages a handle of the payload and removes the payload from the payload holder.

14. The payload retrieval apparatus of claim 13, wherein the payload holder includes one or more pins configured to extend through a handle of the payload when the payload is positioned on the payload holder;

wherein the locking feature includes a locking strap which extends over the one or more pins and the handle of the payload;

wherein the locking strap includes a latch which is latchable onto the autoloader assembly; and wherein the latch is unlatchable to unlock access to the payload holder and payload.

15. The payload retrieval apparatus of claim 13, wherein the payload holder includes one or more pins configured to extend through a handle of the payload when the payload is positioned on the payload holder;

wherein the payload holder and payload are retractable into a slot in the autoloader assembly;

wherein the locking feature includes a sprung cover positioned over the payload holder and payload when the payload holder and payload have been retracted into the slot in the autoloader assembly;

wherein the sprung cover includes a latch which is latchable onto the autoloader assembly; and wherein the latch of the sprung cover is unlatchable to unlock access to the payload holder and payload and move the payload holder and payload out of the slot and into position for payload retrieval.

16. The payload retrieval apparatus of claim 15, wherein the sprung cover is spring-loaded into an open position and the payload holder is spring-loaded into a position for payload retrieval by the payload retriever.

17. The payload retrieval apparatus of claim 13, wherein the payload holder includes one or more pins configured to extend through a handle of the payload when the payload is positioned on the payload holder;

wherein the payload holder and payload are rotatable into a position within the autoloader assembly;

wherein the locking feature includes a latch attached to the autoloader assembly when the payload holder and payload have been rotated into position within the autoloader assembly;

wherein the latch is unlatchable to unlock access to the payload holder and payload and rotate the payload holder and payload out of the autoloader assembly into position for payload retrieval.

18. The payload retrieval apparatus of claim 17, wherein the payload holder is spring-loaded to rotate into a position for payload retrieval by the payload retriever.

19. The payload retrieval apparatus of claim 13, wherein the payload holder includes one or more of pins configured to extend through a handle of the payload when the payload is positioned on the payload holder;

wherein the locking feature includes a gate that extends over the payload holder and payload;

wherein the gate includes a latch which is latchable onto the autoloader assembly; and wherein the latch of the gate is unlatchable to unlock access to the payload holder and payload and move the gate from extending over the payload holder and payload.

20. The payload retrieval apparatus of claim 19, wherein the gate is spring-loaded into an open position where the gate does not extend over the payload holder and payload.

21. The payload retrieval apparatus of claim 19, wherein the gate is a three-dimensional cage.

22. The payload retrieval apparatus of claim 13, wherein the locking feature includes a locking member that is manually unlockable.

23. The payload retrieval apparatus of claim 22, wherein a key is manually operable to move the locking member into an unlocked position.

24. The payload retrieval apparatus of claim 13, wherein the locking feature includes a locking member that is electronically unlockable.

25. A method including:
providing a base; an autoloader assembly mounted to the base including: a payload holder configured to hold a payload for retrieval by an uncrewed aerial vehicle (UAV), a channel coupled to the payload holder and configured to direct a payload retriever suspended from the UAV to the payload holder, the channel having a tether slot adapted for receiving a tether having a first end attached to the UAV and a second end attached to the payload retriever, wherein the channel is adapted to receive the payload retriever, and the tether slot of the channel allows for passage of the tether during movement of the payload retriever through the channel; and a locking feature configured to lock access to the payload on the payload holder; and wherein the payload holder is positioned such that when the payload retriever exits the channel, the payload retriever engages a handle of the payload and removes the payload from the payload holder; and unlocking the locking feature to provide access to the payload holder and payload for payload retrieval by the payload retriever.

26. A payload retrieval apparatus comprising:
a base;
an autoloader assembly mounted to the base including:
a payload holder configured to hold a payload for retrieval by an uncrewed aerial vehicle (UAV),
a channel coupled to the payload holder and configured to direct a payload retriever suspended from the UAV to the payload holder, the channel having a tether slot adapted for receiving a tether having a first end attached to the UAV and a second end attached to the payload retriever, wherein the channel is adapted to receive the payload retriever, and the tether slot of the channel allows for passage of the tether during movement of the payload retriever through the channel; and
a locking feature configured to lock access to the payload on the payload holder, the locking feature including a switch disposed along the channel and configured to be activated by the payload retriever as it moves through the channel, wherein when the payload retriever activates the switch, the locking member unlocks the payload on the payload holder; and
wherein the payload holder is positioned such that when the payload retriever exits the channel, the payload retriever engages a handle of the payload and removes the payload from the payload holder.

* * * * *